US011472891B2

(12) United States Patent
Furusako et al.

(10) Patent No.: US 11,472,891 B2
(45) Date of Patent: Oct. 18, 2022

(54) PHOTOCROSSLINKABLE ALGINIC ACID DERIVATIVE

(71) Applicant: MOCHIDA PHARMACEUTICAL CO., LTD., Tokyo (JP)

(72) Inventors: Shoji Furusako, Tokyo (JP); Tsutomu Satoh, Tokyo (JP)

(73) Assignee: MOCHIDA PHARMACEUTICAL CO., LTD., Tokyo (JP)

( * ) Notice: Subject to any disclaimer, the term of this patent is extended or adjusted under 35 U.S.C. 154(b) by 7 days.

(21) Appl. No.: 16/976,027

(22) PCT Filed: Feb. 27, 2019

(86) PCT No.: PCT/JP2019/007655
§ 371 (c)(1),
(2) Date: Aug. 26, 2020

(87) PCT Pub. No.: WO2019/168058
PCT Pub. Date: Sep. 6, 2019

(65) Prior Publication Data

US 2021/0380727 A1 Dec. 9, 2021

(30) Foreign Application Priority Data

Feb. 28, 2018 (JP) ............................ JP2018-035943
Oct. 31, 2018 (JP) ............................ JP2018-205325

(51) Int. Cl.
*C08B 37/00* (2006.01)

(52) U.S. Cl.
CPC ................................ *C08B 37/0084* (2013.01)

(58) Field of Classification Search
None
See application file for complete search history.

(56) References Cited

U.S. PATENT DOCUMENTS

| | | | |
|---|---|---|---|
| 6,025,444 | A | 2/2000 | Waki et al. |
| 6,031,017 | A | 2/2000 | Waki et al. |
| 6,107,410 | A | 8/2000 | Waki et al. |
| 2004/0076811 | A1 | 4/2004 | Sato |
| 2006/0057098 | A1 | 3/2006 | Sato |
| 2006/0252925 | A1 | 11/2006 | Sato |
| 2007/0009579 | A1 | 1/2007 | Sato |
| 2008/0071001 | A1 | 3/2008 | Sato |
| 2008/0071050 | A1 | 3/2008 | Sato |
| 2008/0188585 | A1 | 8/2008 | Sato |
| 2008/0249062 | A1 | 10/2008 | Takahashi et al. |
| 2009/0118348 | A1 | 5/2009 | Miyamoto et al. |
| 2011/0098455 | A1 | 4/2011 | Sato |
| 2011/0201570 | A1 | 8/2011 | Takahashi et al. |
| 2012/0055780 | A1 | 3/2012 | Sato |

FOREIGN PATENT DOCUMENTS

| | | | |
|---|---|---|---|
| CN | 1849341 | A | 10/2006 |
| CN | 103923224 | A | 7/2014 |
| CN | 103936710 | A | 7/2014 |
| CN | 105348250 | A | 2/2016 |
| EP | 0 713 859 | A2 | 5/1996 |
| JP | 8-143604 | A | 6/1996 |
| JP | 9-87236 | A | 3/1997 |
| JP | 11-512778 | A | 11/1999 |
| JP | 2006-42758 | A | 2/2006 |
| JP | 2006-111867 | A | 4/2006 |
| JP | 2007-99902 | A | 4/2007 |
| JP | 2010-209130 | A | 9/2010 |
| JP | 2011-102405 | A | 5/2011 |
| WO | WO 02/060971 | A1 | 8/2002 |
| WO | WO 2004/081054 | A1 | 9/2004 |
| WO | WO 2004/099259 | A1 | 11/2004 |
| WO | WO 2005/026214 | A1 | 3/2005 |
| WO | WO 2005/107827 | A1 | 11/2005 |
| WO | WO 2007/004675 | A1 | 1/2007 |

OTHER PUBLICATIONS

Samorezov, Bioconjugate Chem. 2015, 26, 1339-1347. (Year: 2015).*
Extended European Search Report dated Oct. 29, 2021, in European Patent Application No. 19760579.3.
International Search Report, issued in PCT/JP2019/007655, dated Apr. 23, 2019.
Shimada et al., "Quantitative Structure-Cytotoxicity Relationship of Piperic Acid Amides", Anticancer Research, 2014, vol. 34(9), pp. 4877-4884.
Takao et al., "Synthesis and Biological Evaluation of Piperic Acid Amides as Free Radical Scavengers and α-Glucosidase Inhibitors", Chemical & Pharmaceutical Bulletin, 2015, vol. 63(5),pp. 326-333.
Written Opinion of the International Searching Authority, issued in PCT/JP2019/007655, dated Apr. 23, 2019.
Chinese Office Action for Appl. No. 201980015855.2 dated Oct. 18, 2021.
Wen, L., "Pharmaceutical Polymer Materials Science," 2nd Edition, China Traditional Chinese Medicine Publishing, Jun. 30, 2017, pp. 113-114.

* cited by examiner

*Primary Examiner* — Layla D Berry
(74) *Attorney, Agent, or Firm* — Birch, Stewart, Kolasch & Birch, LLP

(57) ABSTRACT

The present invention provides: an alginic acid derivative having a photocrosslinking group represented by general formula (1) for a portion of a carboxyl group of alginic acids, and a photocrosslinking alginic acid structure which is produced using this alginic acid. Due to this configuration, a novel alginic acid derivative is provided.

[C214]

(I)

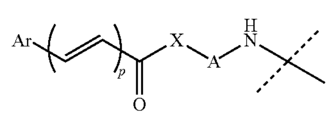

27 Claims, 8 Drawing Sheets

[Fig. 1]
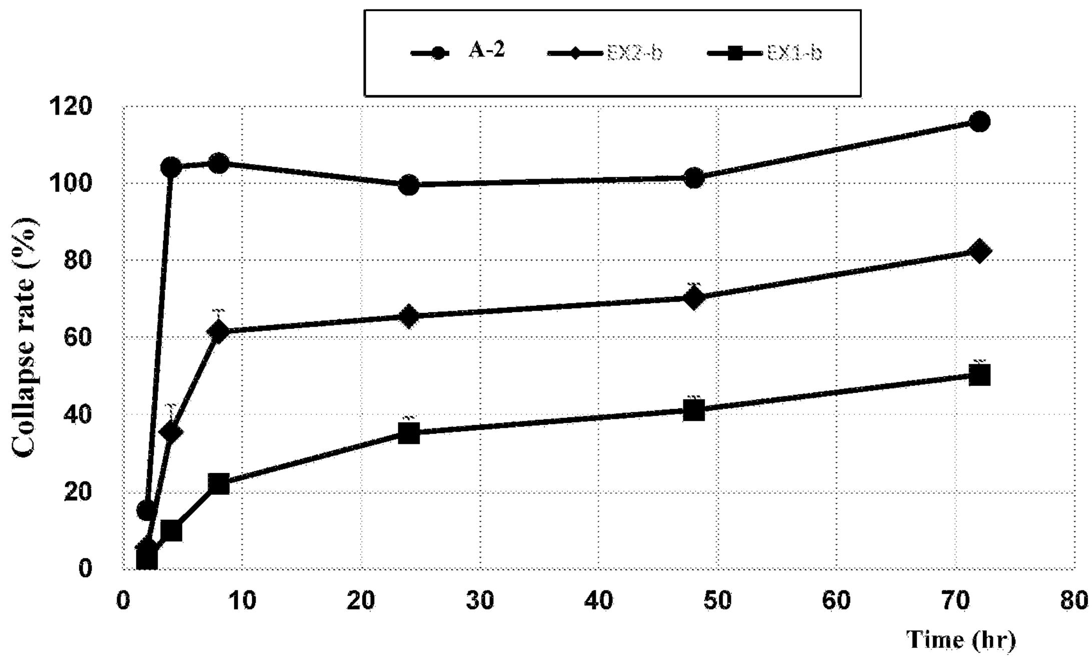

[Fig. 2]
(A)
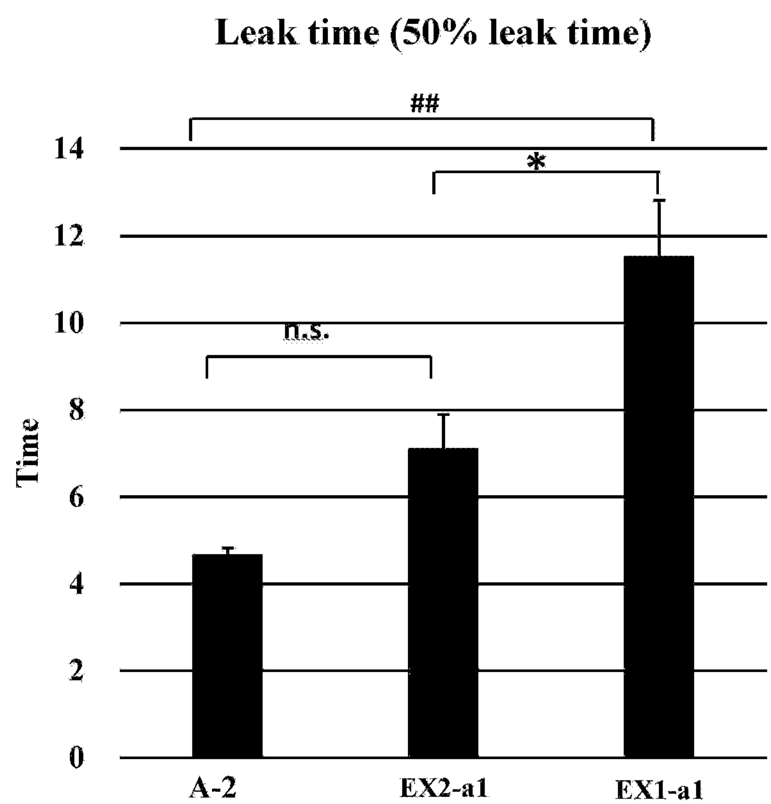

[Fig. 2]
(B)
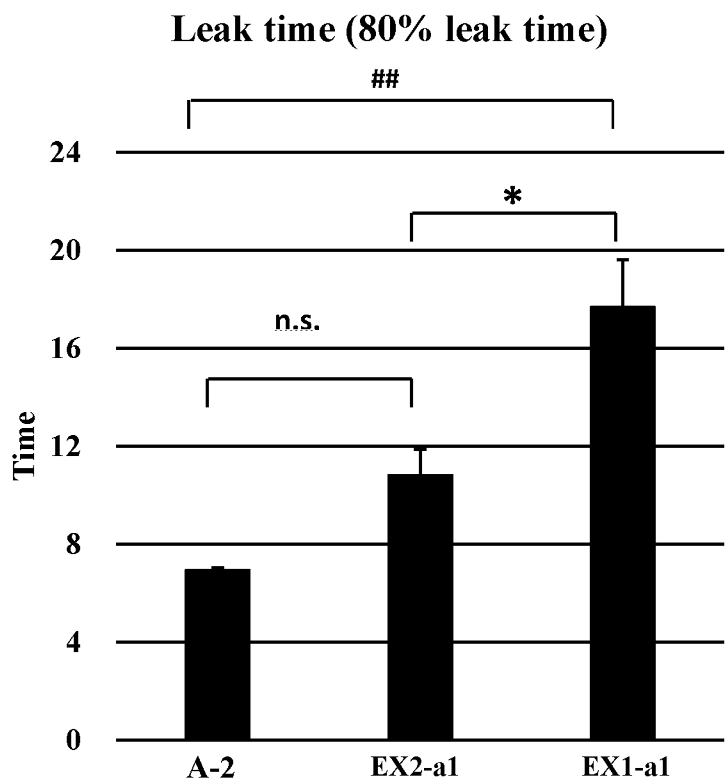

[Fig. 3]
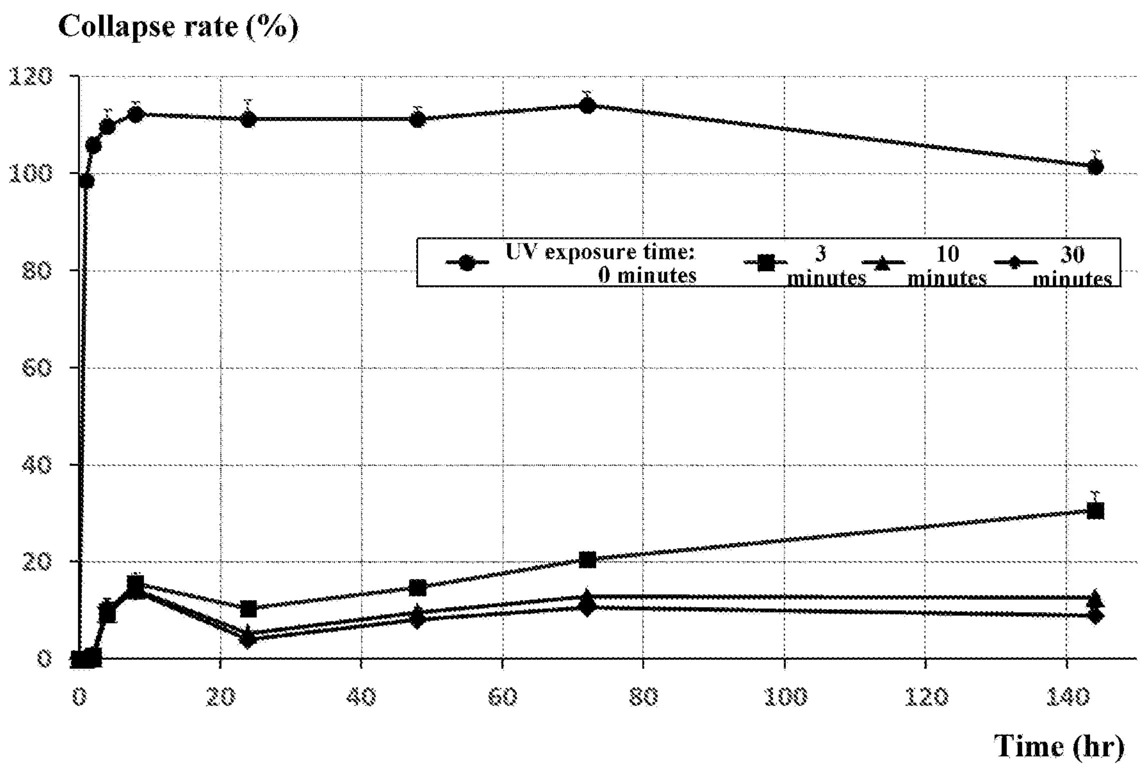

[Fig. 4]
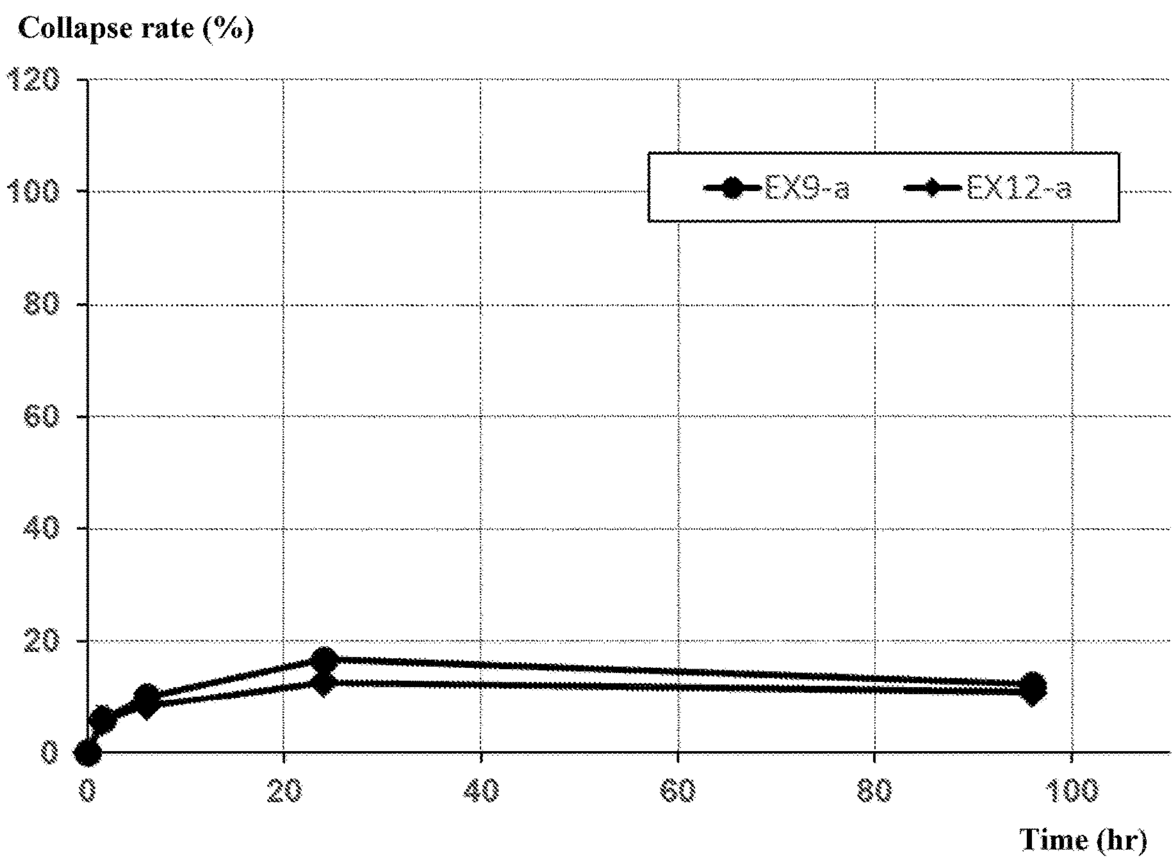

[Fig. 5]
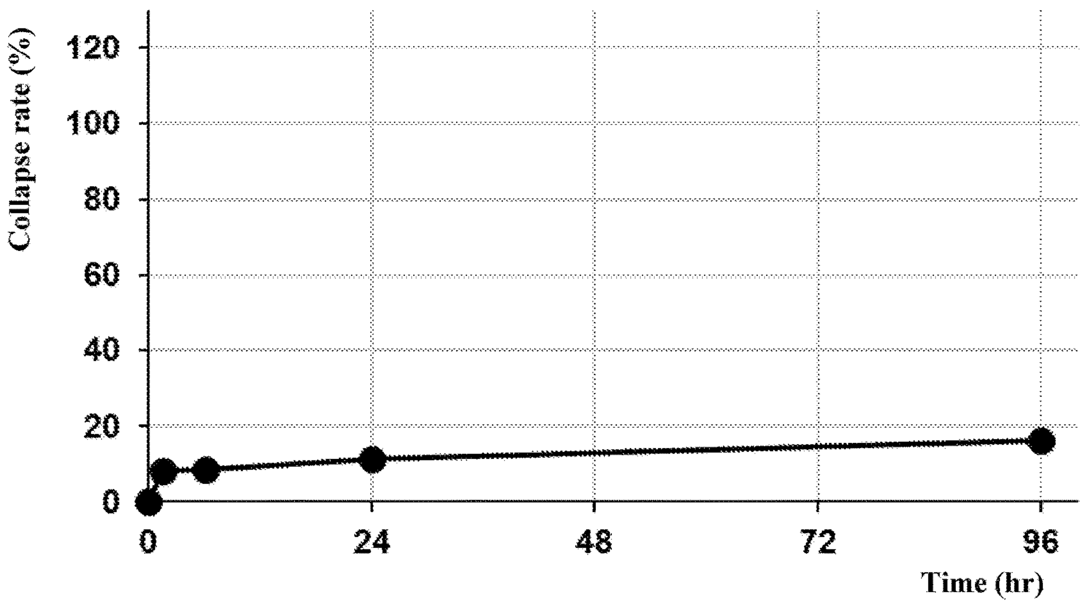
[Fig. 6]
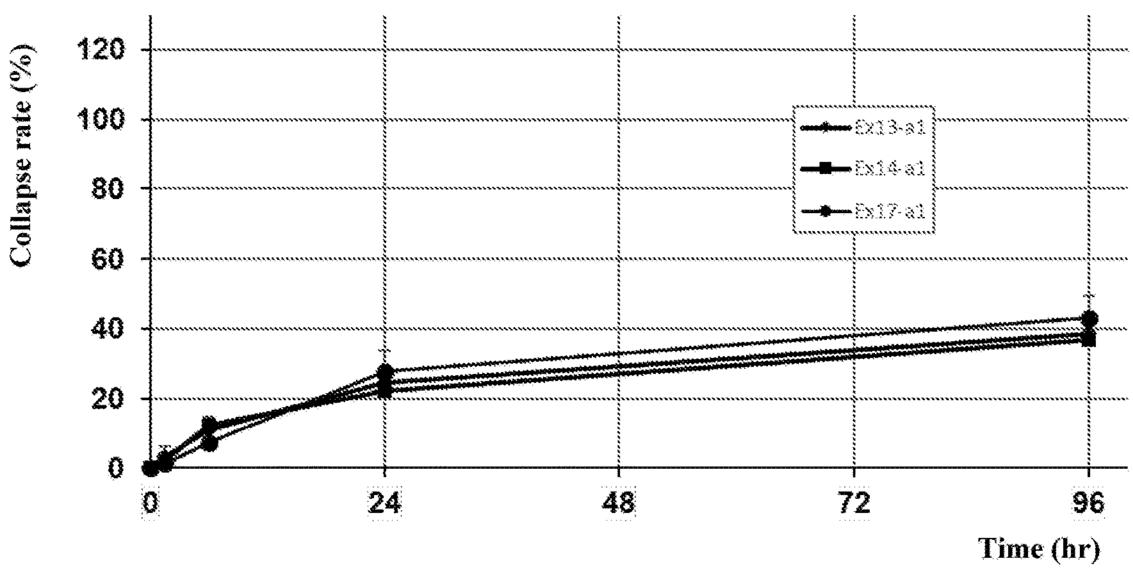

[Fig. 7]
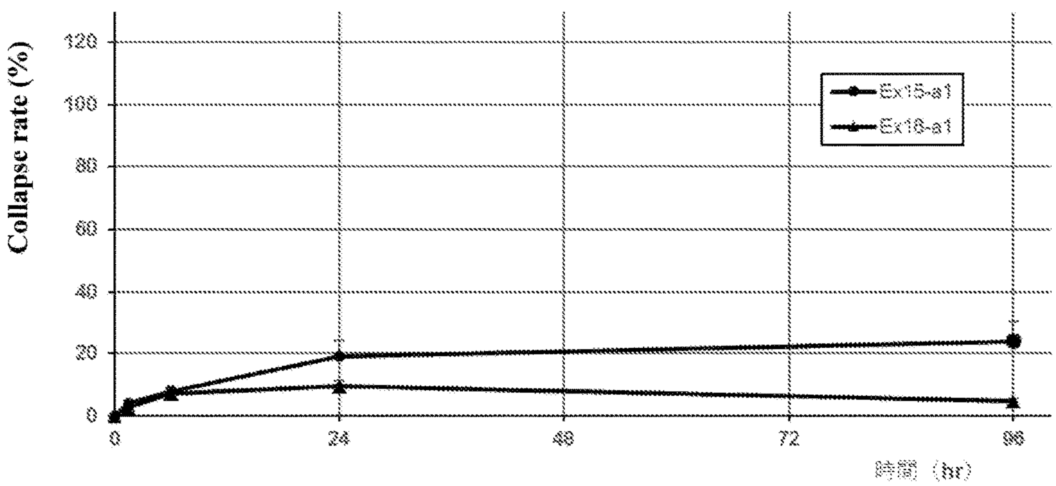
[Fig. 8]
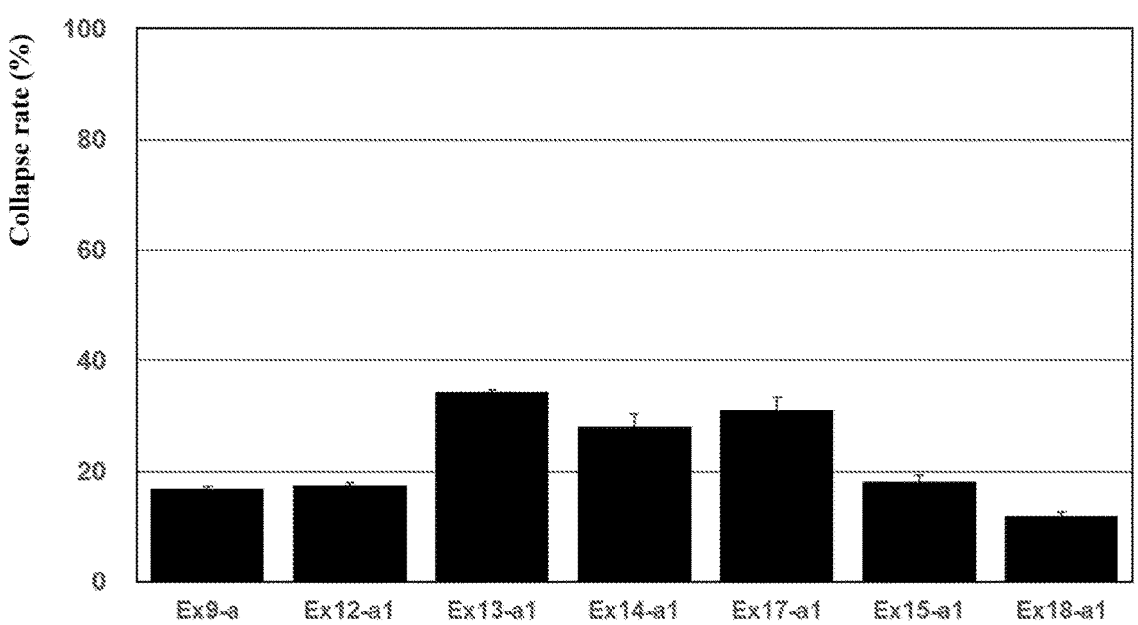

[Fig. 9]
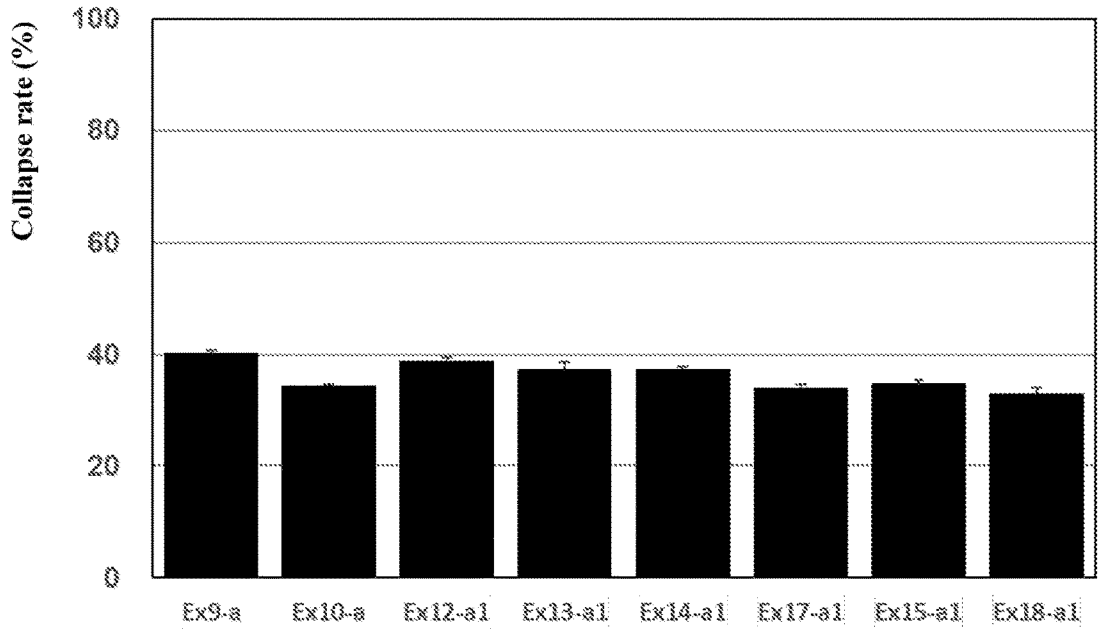
[Fig. 10]
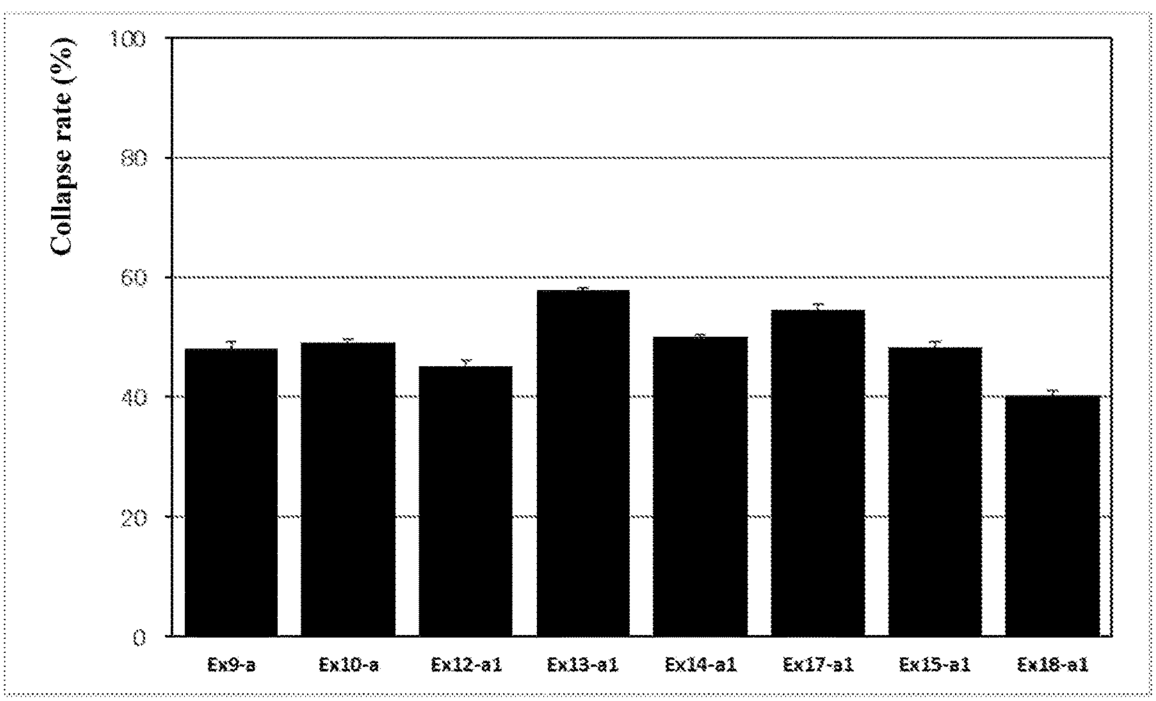

PHOTOCROSSLINKABLE ALGINIC ACID DERIVATIVE

TECHNICAL FIELD

The present invention relates to a novel alginic acid derivative, to a novel photocrosslinked alginic acid, and to methods for manufacturing these.

BACKGROUND ART

Alginic acid, a high-molecular-weight acidic polysaccharide molecule that is extracted from the cell walls of natural brown algae such as Lessonia, Macrocystis, Laminaria, Ascophyllum, Durvillea, Ecklonia cava, Eisenia bicyclis, and Saccharina japonica, is a linear heteropolymer of two kinds of uronic acid, β-D-mannuronate (M residues) and its C-5 epimer α-L-guluronate (G residues), coupled by 1-4 linkages. Specifically, in terms of its chemical structure, it is a block copolymer including homopolymer blocks of mannuronic acid (MM), homopolymer blocks of guluronic acid (GG), and randomly arranged blocks of mannuronic acid and guluronic acid (MG) in complex combination with arbitrary permutations and proportions. Alginic acid is widely used in such fields as medicine, biotechnology, cosmetics, textiles, paper, and foodstuffs.

While monovalent alkali metal salts of alginic acid (such as sodium alginate) are water soluble, divalent alkali earth metal salts of alginic acid (such as calcium alginate) have the property of being gelled (insolubilized) due to crosslinking by metal ions, and attempts have been made to modify or mold these into forms suitable for various applications using these properties (Patent Literature 1 to 3).

To investigate the possibility of modifying or molding polysaccharides (such as hyaluronic acid, chondroitin sulfate, and alginic acid) into various materials and improving their physical properties (such as strength, swelling, and the like), much research has already been done on crosslinked polysaccharides crosslinked by covalent bonds.

As a method of obtaining crosslinked polysaccharides, polysaccharide derivatives including cinnamic acid derivatives with photocrosslinking properties introduced into polysaccharides such as hyaluronic acid and alginic acid are known (Patent Literature 4 to 6).

CITATION LIST

Patent Literature

[Patent Literature 1] Japanese Patent Application Publication No. 2010-209130
[Patent Literature 2] Japanese Patent Application Publication No. 2007-99902
[Patent Literature 3] WO 2004/099259
[Patent Literature 4] Japanese Patent Application Publication No. H 09-87236
[Patent Literature 5] WO 2002/060971
[Patent Literature 6] WO 2005/026214

SUMMARY OF INVENTION

Technical Problem

Under these circumstances, there is demand for a novel alginic acid derivative or novel photocrosslinked alginic acid. There is also demand for methods of manufacturing these.

Solution to Problem

The inventors has completed the present invention as a result of earnest research aimed at solving the above problems after discovering that when an alginic acid derivative including a photoreactive group represented by formula (I) introduced into any one or more carboxyl groups of alginic acid is used to mold beads (dye-containing beads) as a kind of photocrosslinked alginic acid structure, the resulting beads are highly stable, or can be used to prepare a gel having a permeability more suited to the objective in comparison with conventional gels.

That is, the present inventions is as follows.

An alginic acid derivative including a photoreactive group represented by formula (I) introduced into any one or more carboxyl groups of alginic acid, a novel photocrosslinked alginic acid obtained by exposing the alginic acid derivative to light to perform a cyclization reaction, a photocrosslinked alginic acid structure obtained by dripping the alginic acid derivative into a solution containing a divalent metal ion to obtain a gel and exposing the resulting gel to light, and methods for manufacturing the alginic acid derivative, photocrosslinked alginic acid and photocrosslinked alginic acid structure are provided here as described in the following embodiments.

That is, exemplary embodiments may be as described in [1] to [24] below.

[1] An alginic acid derivative including a photoreactive group represented by the following formula (I):

[C1]

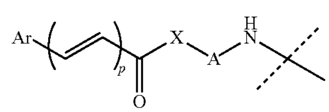

(I)

[in which Ar, p, —X—, and -A- are defined as in Embodiment 1 below] introduced into any one or more carboxyl groups of alginic acid.

[2] The alginic acid derivative according to [1] above, wherein the introduction rate of the photoreactive group represented by the formula (I) is from 0.5% to 30%.

[3] The alginic acid derivative according to [1] above, wherein the weight-average molecular weight as measured by gel permeation chromatography of the alginic acid derivative is 100,000 Da to 3,000,000 Da.

[4] A photocrosslinked alginic acid obtained by exposing the alginic acid derivative according to [1] above to light.

[5-1] The photocrosslinked alginic acid according to [4] above, wherein the chemical crosslink formed by light exposure of the alginic acid derivative according to [1] above (when p=1 in formula (I)) is a structure selected from formula (II-L-1) and formula (II-L-2) below:

[C2]

(II-L-1)

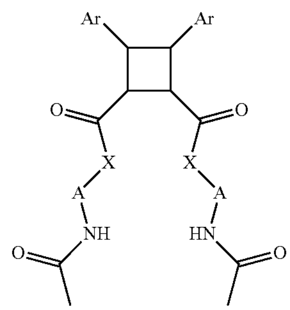

(II-L-2)

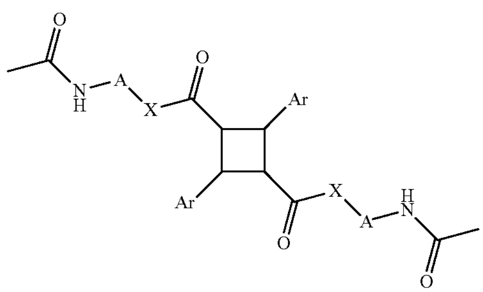

[in formula (II-L-1) or formula (II-L-2), the —CONH— and —NHCO— at either end represent amide bonds via any carboxyl group of alginic acid, and -A-, —X—, and Ar are defined as in Embodiment 5-1 below].

[5-2] The photocrosslinked alginic acid according to [4] above, wherein the chemical crosslink formed by light exposure of the alginic acid derivative according to [1] above (when p=2 in formula (I)) is the structure of formula (II-L-3) below:

[C3]

(II-L-3)

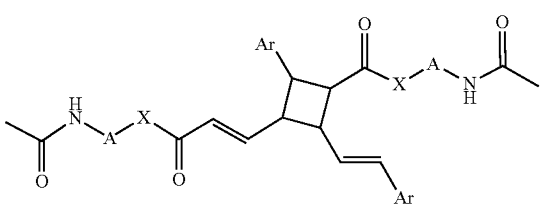

[in formula (II-L-3), the —CONH— and —NHCO— at either end represent amide bonds via any carboxyl group of alginic acid, and -A-, —X—, and Ar are defined as in Embodiment 5-2 below].

[6] The photocrosslinked alginic acid according to any one of [4], [5-1], and [5-2] above, wherein the light for exposure is light selected from ultraviolet rays and LED light.

[7] A photocrosslinked alginic acid structure that is obtained by light exposure of a gel obtained by dripping a solution of the alginic acid derivative according to [1] above into a solution containing a divalent metal ion, and that includes as crosslinks both an ionic crosslink formed by partial crosslinking with a divalent metal ion and a chemical crosslink formed by light exposure.

[8-1] The photocrosslinked alginic acid structure according to [7] above, wherein the chemical crosslink formed by light exposure of the alginic acid derivative according to [1] above (when p=1 in formula (I)) is a structure selected from formula (II-L-1) and formula (II-L-2) below:

[C4]

(II-L-1)

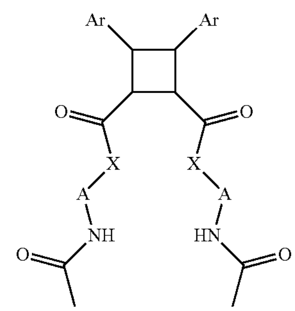

(II-L-2)

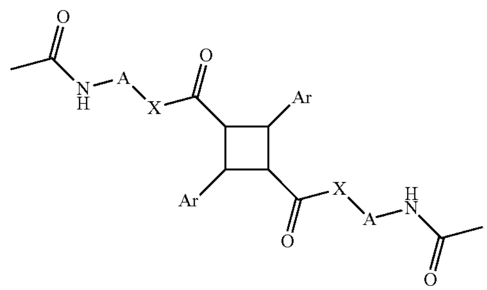

[in formula (II-L-1) or formula (II-L-2), the —CONH— and —NHCO— at either end represent amide bonds via any carboxyl group of alginic acid, and -A-, —X—, and Ar are defined as in Embodiment 8-1 below].

[8-2] The photocrosslinked alginic acid structure according to [7] above, wherein the chemical crosslink formed by light exposure of the alginic acid derivative according to [1] above (when p=2 in formula (I)) is the structure of formula (II-L-3) below:

[C5]

(II-L-3)

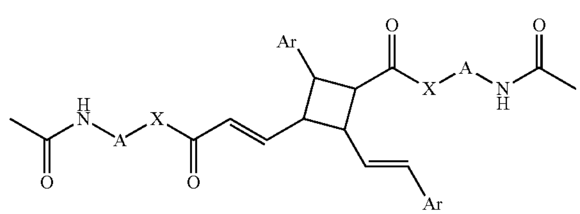

[in formula (II-L-3), the —CONH— and —NHCO— at either end represent amide bonds via any carboxyl group of alginic acid, and -A-, —X—, and Ar are defined as in Embodiment 8-2 below].

[9] The photocrosslinked alginic acid structure according to any one of [7], [8-1] and [8-2] above, wherein the light for exposure is selected from ultraviolet rays and LED light.

[10] The photocrosslinked alginic acid structure according to any one of [7] to [9] above, in the form of beads or a substantially spherical gel.

[11] The medical material containing a photocrosslinked alginic acid structure according to any one of [7] to [9] above.

[12] The medical material according to [11] above, in the form of beads or a substantially spherical gel.

[13] The method for manufacturing the photocrosslinked alginic acid according to [4] above, wherein the alginic acid derivative according to [1] above is exposed to light.

[14-1] The photocrosslinked alginic acid manufacturing method according to [13] above, wherein the chemical crosslink formed by light exposure of the alginic acid derivative according to [1] above (when p=1 in formula (I)) is a structure selected from formula (II-L-1) and formula (II-L-2) below:

[C6]

(II-L-1)

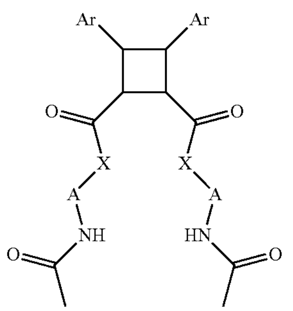

(II-L-2)

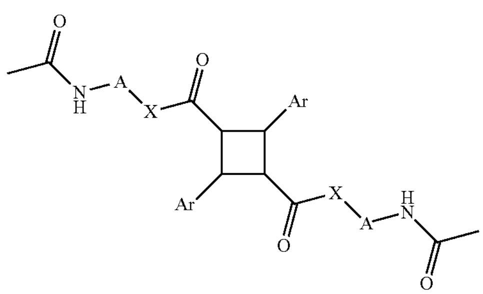

[in formula (II-L-1) or formula (II-L-2), the —CONH— and —NHCO— at either end represent amide bonds via any carboxyl group of alginic acid, and -A-, —X—, and Ar are defined as in Embodiment 14-1 below].

[14-2] The photocrosslinked alginic acid manufacturing method according to [13] above, wherein the chemical crosslink formed by light exposure of the alginic acid derivative according to [1] above (when p=2 in formula (I)) is the structure of formula (II-L-3) below:

[C7]

(II-L-3)

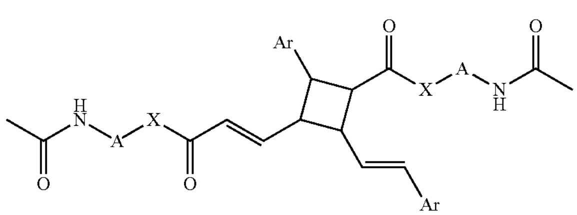

[in formula (II-L-3), the —CONH— and —NHCO— at either end represent amide bonds via any carboxyl group of alginic acid, and -A-, —X—, and Ar are defined as in Embodiment 14-2 below].

[15] The photocrosslinked alginic acid manufacturing method according to any one of [13], [14-1], and [14-2] above, wherein the light for exposure is selected from UV rays and LED light.

[16] A method for manufacturing a photocrosslinked alginic acid structure, comprising dripping a solution of the alginic acid derivative according to [1] above into a solution containing a divalent metal ion to obtain a gel that is then exposed to light to obtain a photocrosslinked alginic acid structure, wherein the photocrosslinked alginic acid structure includes both an ionic crosslink formed by partial crosslinking with a divalent metal ion and a chemical crosslink formed by light exposure.

[17-1] The method for manufacturing a photocrosslinked alginic acid structure according to [16] above, wherein the chemical crosslink formed by light exposure of the alginic acid derivative according to [1] above (when p=1 in formula (I)) is a structure selected from formula (II-L-1) and formula (II-L-2) below:

[C8]

(II-L-1)

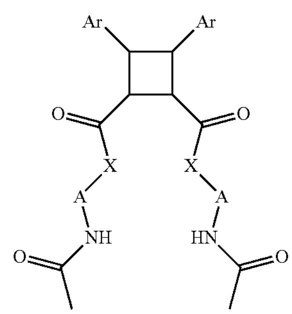

(II-L-2)

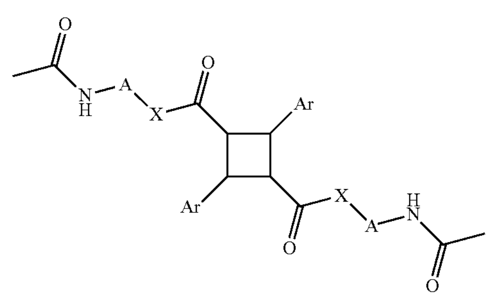

[in formula (II-L-1) or formula (II-L-2), the —CONH— and —NHCO— at either end represent amide bonds via any carboxyl group of alginic acid, and -A-, —X—, and Ar are defined as in Embodiment 17-1 below].

[17-2] The method for manufacturing a photocrosslinked alginic acid structure according to [16] above, wherein the chemical crosslink formed by light exposure of the alginic acid derivative according to [1] above (when p=2 in formula (I)) is the structure of formula (II-L-3) below:

[C9]

(II-L-3)

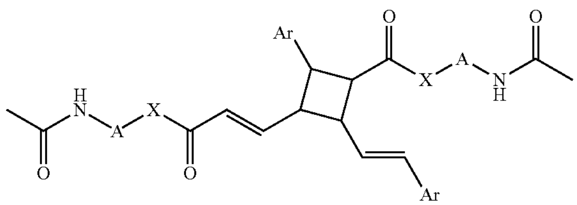

[in formula (II-L-3), the —CONH— and —NHCO— at either end represent amide bonds via any carboxyl group of alginic acid, and -A-, —X—, and Ar are defined as in Embodiment 17-2 below].

[18] A method for manufacturing a photocrosslinked alginic acid structure according to any one of [16], [17-1], and [17-2] above, wherein the light for exposure is selected from UV rays and LED light.

[19] A method for manufacturing a photocrosslinked alginic acid structure, comprising forming a specific structure by partial ionic crosslinking of the alginic acid derivative according to [1] above with a divalent metal ion, and then chemically crosslinking the resultant structure by light exposure to obtain a photocrosslinked alginic acid structure.

[20] The method for manufacturing a photocrosslinked alginic acid structure according to [19] above, wherein the light for exposure is selected from UV rays and LED light.

[21] A photocrosslinked alginic acid structure having the ability to retain contents, obtained by using a divalent metal ion and light exposure to crosslink the alginic acid derivative according to [1] above.

[22] An alginic acid derivative according to any one of [1] to [3] above, a photocrosslinked alginic acid according to any one of [4] to [6] above, and a photocrosslinked alginic acid structure according to any one of [7] to [10] above, having biocompatibility.

[23] A compound represented by the following formula (AM-1):

[C10]

(AM-1)

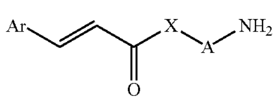

[in formula (AM-1), Ar, —X—, and -A- are defined as in Embodiment 23 below], or a pharmaceutically acceptable salt thereof, or a solvate thereof.

[24] A compound represented by the following formula (AM-2):

[C11]

(AM-2)

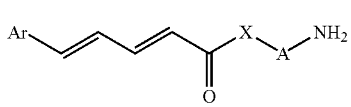

[in the formula (AM-1), Ar, —X—, and -A- are defined as in Embodiment 24 below], or a pharmaceutically acceptable salt thereof, or a solvate thereof.

Advantageous Effects of Invention

The present invention provides a novel alginic acid derivative that can be used for example in chemical cross-link formation, as well as an intermediate (amino compound) for manufacturing this derivative and the like.

Preferably the alginic acid derivative has an introduced reactive group that does not exist in vivo and is thus expected to be safe for living organisms with no risk of continuing crosslinking reactions with cells and other biological components even if unreacted groups persist in the body. Moreover, it can preferably be used safely and easily because the crosslinking reaction is completed by a photoreaction.

The photocrosslinked alginic acid of some embodiments is one that has been chemically crosslinked by a photoreaction (photocyclization reaction). Chemical crosslinking can be used in combination with crosslinking using divalent metal ions such as calcium ions for example, and by adjusting the reaction conditions, the stability is preferably improved in comparison with non-crosslinked alginic acids or non-chemically crosslinked alginic acids (such as alginic acids crosslinked with calcium ions).

Preferably the gel properties of the crosslinked product can be adjusted, as can its substance permeability.

The present invention has at least one of the above effects.

BRIEF DESCRIPTION OF DRAWINGS

FIG. 1 shows an evaluation of the gel stability of photocrosslinked alginic acid structures (prepared using EX1-b, EX2-b, and A-2 (control)).

FIG. 2 shows an evaluation of the gel leak rates of photocrosslinked alginic acid structures (prepared using EX1-a1, EX2-a1, and A-2 (control)). (A) is the 50% leak time (hr), and (B) is the 80% leak time (hr).

FIG. 3 shows an evaluation of the gel stability of a photocrosslinked alginic acid structure (prepared using EX6-b).

FIG. 4 shows an evaluation of the gel stability of photocrosslinked alginic acid structures (prepared using EX9-a and EX12-a).

FIG. 5 shows an evaluation of the gel stability of a photocrosslinked alginic acid structure (prepared using EX10-a).

FIG. 6 shows an evaluation of the gel stability of photocrosslinked alginic acid structures (prepared using EX13-a1, EX14-a1, and EX17-a1).

FIG. 7 shows an evaluation of the gel stability of photocrosslinked alginic acid structures (prepared using EX15-a1, and EX18-a1).

FIG. 8 shows an evaluation of the gel stability of photocrosslinked alginic acid structures (prepared using EX9-a, EX12-a1, EX13-a1, EX14-a1, EX17-a1, EX15-a1, and EX18-a1) after EDTA treatment.

FIG. 9 shows an evaluation of the gel leak rates of photocrosslinked alginic acid structures (prepared using EX9-a, EX10-a, EX12-a1, EX13-a1, EX14-a1, EX17-a1, EX15-a1, and EX18-a1) after 3 hours.

FIG. 10 shows an evaluation of the gel leak rates of photocrosslinked alginic acid structures (prepared using EX9-a, EX10-a, EX12-a1, EX13-a1, EX14-a1, EX17-a1, EX15-a1, and EX18-a1) (after the lapse of 24 hours).

DESCRIPTION OF EMBODIMENTS

Specific Embodiments

More specifically, the following Embodiments [1] to [24] may be included.

[1] Embodiment 1 is as follows. An alginic acid derivative including a photoreactive group represented by formula (I) below [excluding the part to the right of the wavy line in the formula] introduced into any one or more carboxyl groups of alginic acid:

[C12]

(I)

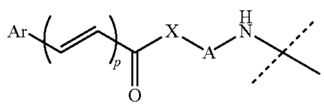

[in formula (I),

Ar represents a $C_{6-10}$ aryl group or heterocyclic group (wherein the $C_{6-10}$ aryl group or heterocyclic group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group or heterocyclic group, they may form a cyclic ether by coupling between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heterocyclic group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring, or 4-N—($C_{1-6}$ alkylsulfonyl)-1,4-oxazepan ring);

p is the integer 1 or 2;

—X— represents —O—, —NH— or a —N($C_{1-6}$ alkyl)-; and

-A- represents formulae (AL-1) to (AL-4) [excluding the parts outside the wavy lines at both ends of each formula]:

[C13]

(AL-1)

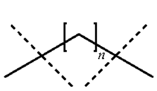

(AL-2)

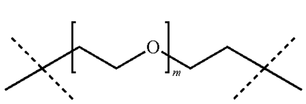

(AL-3)

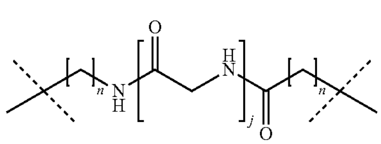

-continued (AL-4)

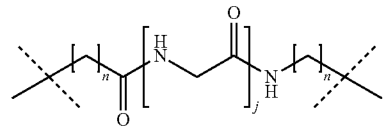

(in formulae (AL-1) to (AL-4), n represents an integer from 1 to 18, m represents an integer from 1 to 9 and j represents an integer from 0 to 9;

a hydrogen atom of a methylene group (—$CH_2$—) in formulae (AL-1) to (AL-4) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the $NR^aR^b$, ($R^aR^b$N)—$C_{1-6}$ alkyl or ($R^aR^b$N)C(═O)—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups; and the —NH— group in formula (AL-3) or formula (AL-4) may also form a non-aromatic heterocyclic ring with these substituents which have been substituted on adjacent carbon atoms)].

The groups in the formula (I) in the Embodiment [1] are explained in detail below. In explanations of compounds, "$C_{1-6}$" for example means that there are from 1 to 6 constituent carbon atoms, and unless otherwise specified, this represents the total number of carbon atoms in a linear, branched, or cyclic group. In groups that contain both chain groups and cyclic groups, it means the total number of carbon atoms in the chain and the ring.

Unless otherwise specified, moreover, the groups in subordinate embodiments of the Embodiment [1] are defined in the same way as the groups in the Embodiment [1].

Unless otherwise specified a "$C_{6-10}$ aryl group" as used herein may be a phenyl, 1-naphthyl, 2-naphthyl, indanyl, indenyl, or 1,2,3,4-tetrahydronaphthyl group, or the like for example.

Unless otherwise specified a "heterocyclic group" as used herein may be a "heteroaryl group", a "non-aromatic heterocyclic group", or the like for example.

Unless otherwise specified a "heteroaryl group" as used herein means a monocyclic, polycyclic or fused cyclic (which may be partially hydrogenated if polycyclic or fused cyclic) 5- to 14-member, or preferably 5- to 8-member, or more preferably 5- to 7-member heteroaryl ring containing 1 to 5 or preferably 1 to 3 hetero atoms selected from the group consisting of the nitrogen, sulfur and oxygen atoms.

Unless otherwise specified, examples of the "heteroaryl group" as used herein include "monocyclic heteroaryl groups", "fused cyclic heteroaryl groups", "partially hydrogenated fused cyclic heteroaryl groups", and the like for example.

Unless otherwise specified the "monocyclic heteroaryl groups" as used herein mean monocyclic examples of the heteroaryl ring as defined above, in which the ring has preferably 5 to 8, or more preferably 5 to 6 members ("5- or 6-member heteroaryl group").

Unless otherwise specified a "5- or 6-member heteroaryl group" as used herein means a 5- or 6-member heteroaryl ring containing 1 to 4 hetero atoms selected from the group consisting of the nitrogen, sulfur and oxygen atoms, and unless otherwise specified the "5- or 6-member heteroaryl group" is a monovalent group obtained by removing any hydrogen atom from this heteroaryl ring.

Unless otherwise specified, examples of the "5- or 6-member heteroaryl group" as used herein include pyrrolyl, furyl, thienyl, imidazolyl, pyrazolyl, oxazolyl, isoxazolyl, thiazolyl, isothiazolyl, 1,2,3-triazolyl, 1,2,4-triazolyl, 1,2,3-oxadiazolyl, 1,2,4-oxadiazolyl, 1,3,4-oxadiazolyl, furazanyl, 1,2,3-thiadiazolyl, 1,2,4-thiadiazolyl, 1,3,4-thiadiazolyl, tetrazolyl, pyridyl, pyridazinyl, pyrimidinyl, pyrazinyl, 1,2,3-triazinyl, 1,2,4-triazinyl, 1,3,5-triazinyl, 2H-1,2,3-thiadiazinyl, 4H-1,2,4-thiadiazinyl, 6H-1,3,4-thiadiazinyl, pyridazin-3(2H)-one, pyrimidin-2(1H)-one, pyrazin-2(1H)-one, and pyridin-2(1H)-one groups, and the like.

Unless otherwise specified a "5-member heteroaryl group" as used herein means a 5-member heteroaryl ring containing 1 to 4 hetero atoms selected from the group consisting of the nitrogen, sulfur, and oxygen atoms, and unless otherwise specified the "5-member heteroaryl group" is a monovalent group obtained by removing any hydrogen atom from this heteroaryl ring. Examples include pyrrolyl, furyl, thienyl, imidazolyl, pyrazolyl, oxazolyl, isoxazolyl, thiazolyl, isothiazolyl, 1,2,3-triazolyl, 1,2,4-triazolyl, 1,2,3-oxadiazolyl, 1,2,4-oxadizolyl, 1,3,4-oxadizolyl, furazanyl, 1,2,3-thiadiazolyl, 1,2,4-thiadiazolyl, 1,3,4-thiadiazolyl, and tetrazolyl groups, and the like.

Unless otherwise specified a "6-member heteroaryl group" as used herein means a 6-member heteroaryl ring containing 1 to 4 hetero atoms selected from the group consisting of the nitrogen, sulfur, and oxygen atoms, and unless otherwise specified the "6-member heteroaryl group" is a monovalent group obtained by removing any hydrogen atom from this heteroaryl ring. Examples include pyridyl (pyridinyl), pyridazinyl, pyrimidinyl, pyrazinyl, 1,2,3-triazinyl, 1,2,4-triazinyl, 1,3,5-triazinyl, 2H-1,2,3-thiadiazinyl, 4H-1,2,4-thiadiazinyl, 6H-1,3,4-thiadiazinyl, pyridazin-3(2H)-one, pyrimidin-2(1H)-one, pyrazin-2(1H)-one, and pyridin-2(1H)-one groups, and the like.

Unless otherwise specified the "5- or 6-member heteroaryl group" in a "5- or 6-member heteroaryl $C_{1-6}$ alkyl group" as used herein means a group substituted on the "$C_{1-6}$ alkyl group", and examples include pyrolylmethyl, furylmethyl, thienylmethyl, imidazolylmethyl, pyrazolylmethyl, oxazolylmethyl, isoxazolylmethyl, thiazolylmethyl, isothiazolylmethyl, 1,2,3-triazolylmethyl, 1,2,4-triazolylmethyl, 1,2,3-oxadiazolylmethyl, 1,2,4-oxadiazolylmethyl, 1,3,4-oxadiazolylmethyl, furazanylmethyl, 1,2,3-thiadiazolylmethyl, 1,2,4-thiadiazolylmethyl, 1,3,4-thiadiazolylmethyl, tetrazolylmethyl, pyridylmethyl, pyridazinylmethyl, pyrimidinylmethyl, pyrazinylmethyl, 1,2,3-triazinylmethyl, 1,2,4-triazinylmethyl, 1,3,5-triazinylmethyl, 2H-1,2,3-thiadiazinylmethyl, 4H-1,2,4-thiadiazinylmethyl, and 6H-1,3,4-thiadiazinylmethyl groups, and the like.

A "partially hydrogenated fused cyclic heteroaryl group" is a monovalent group produced by removing any hydrogen atom from the partially hydrogenated fused ring in a fused ring formed by condensing a "heterocyclic group" with an "aryl group" or a "heterocyclic group" with a "heteroaryl group". The "any hydrogen atom" may be a hydrogen atom removed from either the "heterocyclic group", "aryl group" or "heteroaryl group" ring part in the fused ring, or a hydrogen atom removed from the hydrogenated ring part, and in the case of tetrahydroquinolyl in which the quinoline is partially hydrogenated for example, examples include 5,6,7,8-tetrahydroquinolyl, and 1,2,3,4-tetrahydroquinolyl, and the like. Depending on the position from which the "any hydrogen atom" is removed, examples of 5,6,7,8-tetrahydroquinolyl include -2-yl, -3-yl, -4-yl, -5-yl, -6-yl, -7-yl and, -8-yl, and the like, while in the case of 1,2,3,4-tetrahydroquinolyl, examples include -1-yl, -2-yl, -3-yl, -4-yl, -5-yl, -6-yl, -7-yl, -8-yl, and the like.

The "partially hydrogenated fused cyclic heteroaryl group" preferably has a 8- to 12-member ring, or in other words is a "partially hydrogenated 8- to 12-member fused cyclic heteroaryl group", and examples include indolinyl, 2,3-dihydrobenzofuranyl, 4,5,6,7-tetrahydro-benzofuranyl, 2,3-dihydrobenzo[d]oxazolyl, 2,3-dihydrobenzo[d]thiazolyl, 4,5,6,7-tetrahydrobenzo[d]oxazolyl, 4,5,6,7-tetrahydrobenzo[d]thiazolyl, 4,5,6,7-tetrahydro-1H-benzo[d]imidazolyl, benzo[d][1,3]dioxonyl, 2,3-dihydrobenzo[b][1,4]dioxinyl, 2,3-dihydrobenzo[b][1,4]oxathiinyl, 3,4-dihydro-2H-benzo[b][1,4]oxazinyl, 3,4-dihydro-2H-benzo[b][1,4]thiazinyl, 1,2,3,4-tetrahydroquinoxalinyl, 3,4-dihydro-2H-benzo[b][1,4]dioxepin, 2,3,4,5-tetrahydrobenzo[b][1,4]dioxocinyl, N-acetyl-2,3-dihydrobenzo[d]oxazolyl, N-acetyl-3,4-dihydro-2H-benzo[b][1,4]oxazinyl, N-acetyl-2,3,4,5-tetrahydrobenzo[b][1,4]-oxazepinyl, N-acetyl-3,4,5,6-tetrahydro-2H-benzo[b][1,4]oxazocinyl, N-methanesulfonyl-2,3-dihydrobenzo[d]oxazolyl, N-methanesulfonyl-3,4-dihydro-2H-benzo[b][1,4]oxazinyl, N-methanesulfonyl-2,3,4,5-tetrahydrobenzo[b][1,4]oxazepinyl, N-methanesulfonyl-3,4,5,6-tetrahydro-2H-benzo[b][1,4]oxazocinyl, and the like.

Unless otherwise specified a "non-aromatic heterocyclic group" as used herein means a "3- to 14-member saturated or unsaturated non-aromatic heterocyclic group".

Unless otherwise specified a "3- to 14-member saturated or unsaturated non-aromatic heterocyclic group" as used herein means a monovalent group obtained by removing any hydrogen atom from a 3- to 14-member saturated or unsaturated heterocycle containing 1 to 4 hetero atoms selected from the oxygen, sulfur, and nitrogen atoms.

Unless otherwise specified a "non-aromatic heterocyclic group" as used herein may be an aziridinyl, azetidinyl, oxiranyl, thiiranyl, oxetanyl, thietanyl, pyrrolidinyl, tetrahydrofuryl, dihydrofuryl, thioranyl, pyrazolinyl, pyrazolidinyl, imidazolidinyl, piperidinyl, dihydropyranyl, tetrahydropyranyl (2-tetrahydro-2H-pyranyl, 3-tetrahydro-2H-pyranyl, 4-tetrahydro-2H-pyranyl (4-tetrahydro-2H-pyran-4-yl group)), tetrahydrothiopyranyl, piperazinyl, dioxanyl, oxazolidinyl, isoxazolinyl, 1,3-oxazolidinyl, isoxazolidinyl, thiazolinyl, isothiazolinyl, 1,3-thiazolidinyl, isothiazolidinyl, oxadiazolinyl, 1,3,4-oxadiazolidinyl, morpholinyl, thiomorpholinyl, quinuclidinyl, azepanyl, diazepinyl, or oxepanyl group or the like.

Unless otherwise specified a "halogen atom" as used herein may be a fluorine atom, chlorine atom, bromine atom, iodine atom, or the like for example.

Unless otherwise specified, "halogenated" in a "halogenated $C_{1-6}$ alkyl group" or the like as used herein means that multiple or preferably 1 to 5 such halogen atoms are present as substituents.

Unless otherwise specified a "$C_{1-6}$ alkyl group" as used herein may be a methyl, ethyl, propyl, isopropyl, butyl, isobutyl, sec-butyl, tert-butyl, pentyl, isopentyl, neopentyl or hexyl group or the like for example.

Unless otherwise specified a "halogenated $C_{1-6}$ alkyl group" as used herein means a group obtained by substituting multiple or preferably 1 to 5 halogen atoms arbitrarily in the above "$C_{1-6}$ alkyl", and examples include fluoromethyl, difluoromethyl, trifluoromethyl, 2,2,2-trifluoroethyl, 1,1,2,2-tetrafluoroethyl, and pentafluoroethyl groups, and the like.

Unless otherwise specified a "$C_{1-6}$ alkoxy group" as used herein means an alkoxy including the above "$C_{1-6}$ alkyl group" bound to an oxygen atom, and examples include methoxy, ethoxy, propoxy, isopropoxy, butoxy, isobutoxy, sec-butoxy, tert-butoxy, pentyloxy, and hexyloxy groups, and the like.

Unless otherwise specified a "—$NR^AR^B$ group" as used herein means a group including —$R^A$ and —$R^B$ substituted for the two hydrogen atoms on the nitrogen atom of an "amino group".

Unless otherwise specified, each of —$R^A$ and $R^B$ as used herein may each independently mean a group selected from a hydrogen atom, a $C_{1-6}$ alkyl group, a $C_{2-7}$ alkanoyl group, and a $C_{1-6}$ alkylsulfonyl group, and examples include amino, N-methylamino, N,N-dimethylamino, N-acetylamino, N-methanesulfonylamino, and N-acetyl-N-methylamino groups for example.

Unless otherwise specified a "—$NR^aR^b$ group" as used herein means a group including —$R^a$ and —$R^b$ substituted for the two hydrogen atoms on the nitrogen atom of an "amino group".

Unless otherwise specified, each of $R^a$ and $R^b$ as used herein may each independently mean a group selected from a hydrogen atom, a $C_{1-6}$ alkyl group, a $C_{2-7}$ alkanoyl group, and a $C_{1-6}$ alkylsulfonyl group, and examples include amino, methylamino, ethylamino, N,N-dimethylamino, N-acetylamino, N-methanesulfonylamino, and N-acetyl-N-methylamino groups, and the like.

Unless otherwise specified a "$C_{2-7}$ alkanoyl group" as used herein means a "$C_{1-6}$ alkylcarbonyl group" including a carbonyl group bound to a "$C_{1-6}$ alkyl group", and examples include acetyl, propionyl, butyryl, isobutyryl, valeryl, isovaleryl, pivaloyl, hexanoyl, heptanoyl, cyclopropyl carbonyl, cyclobutyl carbonyl, cyclopentylcarbonyl, cyclohexylcarbonyl, cyclopropylmethylcarbonyl, and 2-methylcyclopropylcarbonyl groups, and the like.

Unless otherwise specified a "$C_{1-6}$ alkylsulfonyl group" as used herein means a group including the above "$C_{1-6}$ alkyl group" substituted on a "sulfonyl (—$SO_2$—) group", and examples include methylsulfonyl, ethylsulfonyl, propylsulfonyl, and isopropyl sulfonyl groups, and the like.

Unless otherwise specified a "cyclic ether" as used herein means an ether having a structure including an oxygen substituted for a carbon of a cyclic hydrocarbon (such as cyclopropane, cyclobutane, cyclopentene, cyclohexane, cyclopentane, and cyclooctane, which are $C_{3-8}$ cyclic hydrocarbons ($C_{3-8}$ cycloalkyl rings) out of the monocyclic or polycyclic saturated hydrocarbon ring groups), and examples include cyclic ethers such as epoxide, oxetane, tetrahydrofuran, tetrahydropyran, 1,3-dioxolane, 1,3-dioxane, 1,4-dioxane, 1,3-dioxepane, 1,4-dioxepane, 1,4-dioxocane, and 1,5-dioxocane.

Unless otherwise specified a "3-N—($C_{2-7}$ alkanoyl) oxazolidine ring" as used herein means a ring obtained by substituting the above "$C_{2-7}$ alkanoyl group" for the hydrogen atom of the NH group of an oxazolidine ring, and examples include 3-N-acetyl-oxazolidine and 3-N-ethylcarbonykl-oxazolidine rings, and the like.

Unless otherwise specified a "4-N—($C_{2-7}$ alkanoyl)morpholine ring" as used herein means a ring obtained by substituting the above "$C_{2-7}$ alkanoyl group" for the hydrogen atom of the NH group of a morpholine ring, and examples include 4-N-acetyl-morpholine, and 4-N-ethylcarbonyl-morpholine rings, and the like.

Unless otherwise specified a "4-N—($C_{2-7}$ alkanoyl)-1,4-oxazepan ring" as used herein means a ring obtained by substituting the above "$C_{2-7}$ alkanoyl group" for the hydrogen atom of the NH group of a 1,4-oxazepan ring, and examples include 4-N-acetyl-1,4-oxazepan and 4-N-ethylcarbonyl-1,4-oxazepan rings, and the like.

Unless otherwise specified a "3-N—($C_{1-6}$ alkylsulfonyl) oxazolidine ring" as used herein means a ring obtained by substituting the above "$C_{1-6}$ alkylsulfonyl group" for the hydrogen atom of the NH group of an oxazolidine ring, and examples include 3-N-methanesulfonyl-oxazolidine and 3-N-ethylsulfonyl-oxazolidine rings, and the like.

Unless otherwise specified a "4-N—($C_{1-6}$ alkylsulfonyl) morpholine ring" as used herein means a ring obtained by substituting the above "$C_{1-6}$ alkylsulfonyl group" for the hydrogen atom of the NH group of a morpholine ring, and examples include 4-N-methanesulfonyl-morpholine and 4-N-ethylsulfonyl-morpholine rings, and the like.

Unless otherwise specified a "4-N—($C_{2-7}$ alkanoyl)-1,4-oxazepan ring" as used herein means a ring obtained by substituting the above "$C_{1-6}$ alkylsulfonyl group" for the hydrogen atom of the NH group of a 1,4-oxazepan ring, and examples include 4-N-methanesulfonyl-1,4-oxazepan and 4-N-ethylsulfonyl-1,4-oxazepan rings, and the like.

Unless otherwise specified a "hydroxy $C_{1-6}$ alkyl group" as used herein means a group including preferably 1 to 5 hydroxyl groups arbitrarily substituted for any hydrogen atom of the above "$C_{1-6}$ alkyl group", and examples include hydroxymethyl, 2-hydroxyethyl, 3-hydroxypropyl and 2,2-dimethyl-2-hydroxyethyl (=2-hydroxy-2-methylpropyl) groups, and the like.

Unless otherwise specified a "thiol $C_{1-6}$ alkyl group" as used herein means a group including the above "$C_{1-6}$ alkyl group" arbitrarily substituted with multiple or preferably 1 to 5 thiol (—SH) groups, and examples include thiolmethyl, 2-thiolethyl and 3-thiolpropyl groups, and the like.

Unless otherwise specified a "$C_{1-6}$ alkylthio $C_{1-6}$ alkyl group" as used herein means a group including the above "thiol $C_{1-6}$ alkyl group" with a "$C_{1-6}$ alkyl group" substituted for the hydrogen atom of the thiol (—SH) group, and examples include methylthiomethyl, methylthioethyl, ethylthiomethyl, and ethylthioethyl groups, and the like.

Unless otherwise specified a "carboxy $C_{1-6}$ alkyl group" as used herein means a group including preferably 1 to 5 carboxyl groups arbitrarily substituted for any hydrogen atom of the above "$C_{1-6}$ alkyl", and examples include carboxymethyl and carboxyethyl groups, and the like.

Unless otherwise specified a "$NR^aR^b$—$C_{1-6}$ alkyl group" as used herein means a group including a "—$NR^aR^b$ group" (each of $R^a$ and $R^b$ as used herein may each independently mean a group selected from a hydrogen atom, $C_{1-6}$ alkyl group, $C_{2-7}$ alkanoyl group, and $C_{1-6}$ alkylsulfonyl group) arbitrarily substituted for any hydrogen atom of the above "$C_{1-6}$ alkyl group", and examples include aminomethyl, aminoethyl, aminopropyl, aminoxbutyl, N-methylaminomethyl, N-acetylaminomethyl, and N-methanesulfonylaminomethyl groups, and the like.

Unless otherwise specified a "$(R^aR^bN)C(=O)$—$C_{1-6}$ alkyl group" as used herein means a group including a "$(R^aR^bN)C(=O)$— group" (each of $R^a$ and $R^b$ as used herein may each independently mean a group selected from a hydrogen atom, $C_{1-6}$ alkyl group, $C_{2-7}$ alkanoyl group, and $C_{1-6}$ alkylsulfonyl group) arbitrarily substituted for any hydrogen atom of the above "$C_{1-6}$ alkyl group", and examples include aminocarbonylmethyl, aminocarbonylethyl, N-methylaminocarbonylmethyl, N-acetylaminocarbonylethyl, and N-methanesulfonylaminocarbonylethyl groups, and the like.

Unless otherwise specified a "guanidino $C_{1-6}$ alkyl group" as used herein means a group including a guanidino group (—NH—C(═NH)—$NH_2$) substituted for any hydrogen atom of the above "$C_{1-6}$ alkyl group", and examples include guanidinomethyl, guanidinoethyl, and guanidinopropyl groups, and the like.

Unless otherwise specified a "$C_{7-16}$ aralkyl group" as used herein means a group including the above "$C_{6-10}$ aryl group" substituted for any carbon atom of the above "$C_{1-6}$ alkyl group", and examples include benzyl, phenethyl, diphenylmethyl, trityl, biphenylmethyl, naphthylmethyl, indanylmethyl, and 1,2,3,4-tetrahydronaphthlene-1-ylmethyl groups, and the like.

Unless otherwise specified a "hydroxy $C_{6-10}$ aryl $C_{1-6}$ alkyl group" as used herein means a group including multiple or preferably 1 to 5 hydroxyl groups arbitrarily substituted for a hydrogen atom in the "$C_{6-10}$ aryl group" of the above "$C_{7-16}$ aralkyl group", and examples include 2-hydroxybenzyl, 3-hydroxybenzyl, and 4-hydroxybenzyl groups, and the like.

Unless otherwise specified a "heteroaryl $C_{1-6}$ alkyl group" as used herein means a group including the above "$C_{1-6}$ alkyl group" substituted for any hydrogen atom of the above "heteroaryl group", and examples include 2-pyridylmethyl, 4-imidazoylmethyl, and 3-indolylmethyl groups, and the like.

Unless otherwise specified a "non-aromatic heterocyclic ring" as used herein means a "3- to 14-member saturated or unsaturated non-aromatic heterocyclic ring".

Unless otherwise specified a "3- to 14-member saturated or unsaturated non-aromatic heterocyclic ring" as used herein means a 3- to 14-member saturated or unsaturated heterocyclic ring containing 1 to 4 hetero atoms selected from the oxygen, sulfur, and nitrogen atoms.

Unless otherwise specified a "non-aromatic heterocyclic ring" as used herein may be for example an aziridine, azetidine, pyrrolidine, pyrazolidine, oxazolidine, thiazolidine, isoxazolidine, isothiazolidine, imidazolidine, piperidine, piperazine, morpholine, thiomorpholine, oxazepan, diazepan, thiazepan, oxazocan, diazocan, thiazocan, or oxadine group, or the like.

Unless otherwise specified a "$C_{3-8}$ cycloalkyl group" as used herein means a cyclic saturated hydrocarbon ring (including monocyclic and polycyclic rings) with 3 to 8 carbon atoms, and examples include cyclopropane, cyclobutane, cyclopentane, cyclohexane, cyclopentane, and cyclooctane groups, and the like.

[1-1] In the alginic acid derivative of Embodiment [1], Ar is preferably a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

More preferably, Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

Still more preferably, Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group or pyridyl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring, or 4-N—($C_{1-6}$ alkylsulfonyl)-1,4-oxazepan ring);

Particularly preferably, Ar is a phenyl group or 2-pyridyl group (wherein the phenyl group or 2-pyridyl group may have any 1 to 3 groups selected from a cyano group, a fluorine atom, a trifluoromethyl group and a methoxy group substituted for a hydrogen atom on the ring, and when two methoxy groups are substituted adjacent to one another on the phenyl group or 2-pyridyl group, they may form a 1,4-dioxane ring by binding between carbon atoms from which any one hydrogen atom each has been removed in the methyl groups of each of the two methoxy groups); and Ar is for example a phenyl group, 4-fluorophenyl group, 4-(trifluoromethyl)phenyl group, 4-methoxyphenyl group, 4-cyanophenyl group, 2,3-dihydrobenzo[b][1,4]dioxinyl group or 2-pyridyl group or the like.

[1-1-1] In the alginic acid derivative of Embodiment [1-1], particularly preferably Ar is a phenyl group, 2-pyridyl group or 5-pyridyl group (wherein the phenyl group, 2-pyridyl group or 5-pyridyl group may have any 1 to 3 groups selected from a cyano group, a fluorine atom, a trifluoromethyl group, a methoxy group and an N-acetylamino group substituted for a hydrogen atom on the ring, and when two methoxy groups are substituted adjacent to one another on the phenyl group, 2-pyridyl group or 5-pyridyl group, they may form a 1,4-dioxane ring by binding between carbon atoms from which any one hydrogen atom each has been removed in the methyl groups of the two methoxy groups); and Ar is for example a phenyl group, 4-fluorophenyl group, 4-(trifluoromethyl)phenyl group, 4-methoxyphenyl group, 3,4-dimethoxyphenyl group, 4-(N-acetylamino)phenyl group, 4-cyanophenyl group, 2,3-dihydrobenzo[b][1,4]dioxinyl group, 2-pyridyl group or 2-methoxy-5-pyridyl group or the like.

[1-1-2] In the alginic acid derivative of Embodiment [1-1], particularly preferably Ar is a phenyl group, 2-pyridyl group or 5-pyridyl group (wherein the phenyl group, 2-pyridyl group or 5-pyridyl group may have any 1 to 3 groups selected from a cyano group, a methoxy group, and an N-acetylamino group substituted for a hydrogen atom on the ring, and when two methoxy groups are substituted adjacent to one another on the phenyl group, 2-pyridyl group or 5-pyridyl group, they may form a 1,4-dioxane ring by binding between carbon atoms from which any one hydrogen atom each has been removed in the methyl groups of the two methoxy groups); and Ar is for example a phenyl group, 4-methoxyphenyl group, 3,4-dimethoxyphenyl group, 4-cyanophenyl group, 4-(N-acetylamino)phenyl group, 2,3-dihydrobenzo[b][1,4]dioxinyl group, 2-pyridyl group or 2-methoxy-5-pyridyl group.

[1-1a] In the alginic acid derivative of Embodiment [1], Ar is preferably a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —NR$^A$R$^B$ group (in which each of R$^A$ and R$^B$ in —NR$^A$R$^B$ is each independently a hydrogen atom or $C_{1-6}$ alkyl group) substituted for a hydrogen atom on the ring);

More preferably, Ar is a $C_{6-10}$ aryl group or 5- or 6-member heteroaryl group (wherein the $C_{6-10}$ aryl group or 5- or 6-membered heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —NR$^A$R$^B$ group (in which each of R$^A$ and R$^B$ in —NR$^A$R$^B$ is each independently a group selected from a hydrogen atom and a $C_{1-6}$ alkyl group) substituted for a hydrogen atom on the ring);

Still more preferably, Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —NR$^A$R$^B$ group (in which each of R$^A$ and R$^B$ in —NR$^A$R$^B$ is each independently a group selected from a hydrogen atom and a $C_{1-6}$ alkyl group) substituted for a hydrogen atom on the ring);

Particularly preferably, Ar is a phenyl group (wherein the phenyl group may have any 1 to 3 groups selected from a fluorine atom and a trifluoromethyl group substituted for a hydrogen atom on the ring); and Ar is for example a phenyl group, a 4-fluorophenyl group or a 4-(trifluoromethyl)phenyl group or the like.

[1-1b] In the alginic acid derivative of Embodiment [1], Ar is preferably a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —NR$^A$R$^B$ group (in which each of R$^A$ and R$^B$ in —NR$^A$R$^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —NHR$^G$ group (in which R$^G$ in the —NHR$^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

More preferably, Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —NR$^A$R$^B$ group (in which each of R$^A$ and R$^B$ in —NR$^A$R$^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —NHR$^G$ group (in which R$^G$ in the —NHR$^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

Still more preferably, Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —NR$^A$R$^B$ group (in which each of R$^A$ and R$^B$ in —NR$^A$R$^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —NHR$^G$ group (in which R$^G$ in the —NHR$^G$ group is a $C_{2-7}$ alkanoyl group or $C_{1-6}$ alkylsulfonyl group) are substituted adjacent to one another on the phenyl group or pyridyl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

Particularly preferably, Ar is a phenyl group or 2-pyridyl group (wherein the phenyl group or 2-pyridyl group may have any 1 to 3 groups selected from a cyano group and a methoxy group substituted for a hydrogen atom on the ring, and when two methoxy groups are substituted adjacent to one another on the phenyl group or 2-pyridyl group, they may form a 1,4-dioxane ring by binding between carbon atoms from which any one hydrogen atom each has been removed in the methyl groups of each of the two methoxy groups); and Ar is for example a phenyl group, 4-methoxyphenyl group, 4-cyanophenyl group, 2,3-dihydrobenzo[b][1,4]dioxinyl group, 2-pyridyl group or the like.

[1-1c] In the alginic acid derivative of Embodiment [1-1b], particularly preferably Ar is a phenyl group or 5-pyridyl group (in which the phenyl group or 5-pyridyl group may have any 1 to 3 groups selected from a cyano group, a methoxy group and an N-acetylamino group substituted for a hydrogen atom on the ring, and when two methoxy groups are substituted adjacent to one another on the phenyl group or 5-pyridyl group, they may form a 1,4-dioxane ring by binding between carbon atoms from which any one hydrogen atom each has been removed in the methyl groups of the two methoxy groups); and Ar is for example a 4-cyanophenyl group, 4-methoxyphenyl group, 3,4-dimethoxyphenyl group, 4-(N-acetylamino) phenyl group, 2,3-dihydrobenzo[b][1,4]dioxinyl group, 2-methoxy-5-pyridyl group or the like.

[1-2] In the alginic acid derivative of Embodiment [1], —X— is preferably —O— or —NH—.

[1-2a] In the alginic acid derivative of Embodiment [1], —X— is preferably —O—.

[1-3] In the alginic acid derivative of Embodiment [1], -A- is preferably formula (AL-1) or formula (AL-2) [excluding the parts outside the wavy lines at both ends of each formula]:

[C14]

(AL-1)

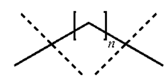

(AL-2)

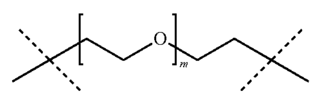

(wherein n in formula (AL-1) is an integer from 1 to 10; m in formula (AL-2) is an integer from 1 to 7; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —NR$^a$R$^b$, (R$^a$R$^b$N)—$C_{1-6}$ alkyl or (R$^a$R$^b$N)C(═O)—$C_{1-6}$ alkyl group (in which each of R$^a$ and R$^b$ in the —NR$^a$R$^b$, (R$^a$R$^b$N)—$C_{1-6}$ alkyl or (R$^a$R$^b$N)C(═O)—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups);

More preferably, -A- is formula (AL-1) or formula (AL-2) [excluding the parts outside the wavy lines at both ends of each formula]:

[C15]

(AL-1)

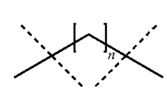

(AL-2)

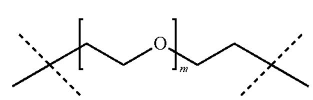

(wherein n in formula (AL-1) is an integer from 1 to 8; m in formula (AL-2) is an integer from 1 to 5; a hydrogen atom of a methylene group ($—CH_2—$) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a $—NR^aR^b$ group (in which each of $R^a$ and $R^b$ in the $—NR^aR^b$ group is each independently a group selected from a hydrogen atom, $C_{1-6}$ alkyl group, $C_{2-7}$ alkanoyl group or $C_{1-6}$ alkylsulfonyl group), a $C_{7-16}$ aralkyl group or a heteroaryl $C_{1-6}$ alkyl group; and if $C_{1-6}$ alkyl groups are substituted for the two hydrogen atoms of the methylene group ($—CH_2—$) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups);

Still more preferably, -A- is formula (AL-1) or formula (AL-2) [excluding the parts outside the wavy lines at both ends of each formula]:

[C16]

(AL-1)

(AL-2)

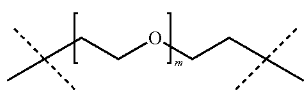

(wherein n in the formula (AL-1) is an integer from 2 to 6; and m in the formula (AL-2) is an integer from 1 to 3); and Particularly preferably, -A- is formula (AL-1-1), formula (AL-2-1) or formula (AL-2-2) [excluding the parts outside the wavy lines at both ends of each formula]:

[C17]

(AL-1-1)

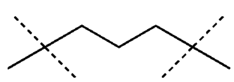

(AL-2-1)

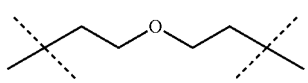

(AL-2-2)

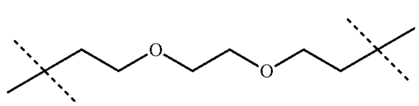

[1-3a] In the alginic acid derivative of Embodiment [1-3], particularly preferably -A- is formula (AL-1-1) or formula (AL-2-1) [excluding the parts outside the wavy lines at both ends of each formula]:

[C18]

(AL-1-1)

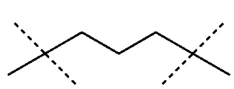

-continued (AL-2-1)

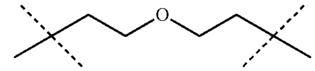

[1-3b] In the alginic acid derivative of Embodiment [1-3], particularly preferably -A- is formula (AL-2-1) or formula (AL-2-2) [excluding the parts outside the wavy lines at both ends of each formula]:

[C19]

(AL-2-1)

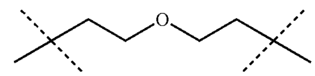

(AL-2-2)

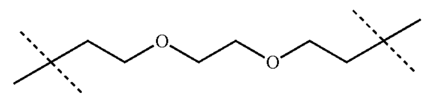

[1-3-1] In the alginic acid derivative of Embodiment [1], looking at n, m and j in formulae (AL-1) to (AL-4) as -A-, n is preferably an integer from 1 to 10, or more preferably an integer from 1 to 8, or still more preferably an integer from 2 to 6, or particularly preferably 3; m is preferably an integer from 1 to 7, or more preferably an integer from 1 to 5, or still more preferably an integer from 1 to 3, or particularly preferably 1 or 2; and j is preferably an integer from 0 to 8, or more preferably an integer from 1 to 6, or still more preferably an integer from 2 to 4.

[1-3-2] In the alginic acid derivative of Embodiment [1], the following formula (AL-3-1) and formula (AL-4-1) [excluding the parts outside the wavy lines at both ends of each formula] are preferred embodiments of formula (AL-3) and formula (AL-4), which are included in -A-:

[C20]

(AL-3-1)

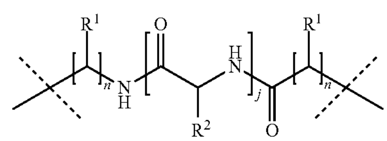

(AL-4-1)

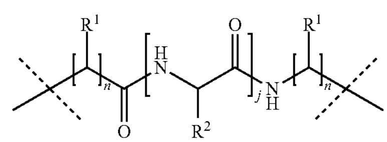

(in formula (AL-3-1) or formula (AL-4-1), n represents an integer from 1 to 18; m represents an integer from 1 to 9; j represents an integer from 0 to 9; each of $R^1$ and $R^2$ is each independently a group selected from a hydrogen atom, halogen atom, hydroxyl group, methyl group, isopropyl group, isobutyl group, sec-butyl group, hydroxymethyl group, 2-hydroxyethyl group, thiolmethyl group, methylthioethyl group, carboxymethyl group, carboxyethyl group, aminocarbonylmethyl group, aminocarbonylethyl group, aminobutyl group, guanidinopropyl group, benzyl group, 4-hydroxybenzyl group, 3-indolylmethyl group and 4-imidazoylmethyl group; and a pyrrolidine ring may be formed by the carbon atom substituted by $R^1$ and the nitrogen atom to which the carbon atom is bonded).

[1-3-2-1] Looking a n, m and j in formula (AL-3-1) or formula (AL-4-1) of Embodiment [1-3-2], n is preferably an integer from 1 to 10, or more preferably an integer from 1 to 8, or still more preferably an integer from 2 to 6, or particularly preferably 3; m is preferably an integer from 1 to 7, or more preferably an integer from 1 to 5, or still more preferably an integer from 1 to 3, or particularly preferably 1 or 2; and j is preferably an integer from 0 to 8, or more preferably an integer from 1 to 6, or still more preferably an integer from 2 to 4.

[1-4-1] Regarding the combination of Ar, p, —X—, and -A- in the alginic acid derivative of Embodiment [1], preferably Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O— or —NH—; and

-A- is formula (AL-1) or (AL-2) of Embodiment [1-3] [excluding the parts outside the wavy lines at both ends of each formula] (wherein n in formula (AL-1) is an integer from 1 to 10; m in formula (AL-2) is an integer from 1 to 7; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the —$NR^aR^b$, ($R^aR^b$N)—$C_{1-6}$ alkyl or ($R^aR^b$N)C(═O)—$C_{1-6}$ alkyl group is each independently a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups).

[1-4-1a] Regarding the combination of Ar, p, —X—, and -A- in the alginic acid derivative of Embodiment [1], preferably Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and an $C_{1-6}$ alkyl group) substituted for a hydrogen atom on the ring);

p is the integer 1;

—X— is —O— or —NH—;

-A- is formula (AL-1) or (AL-2) in Embodiment [1-3] [excluding the parts outside the wavy lines at both ends of each formula] (wherein n in formula (AL-1) is an integer from 1 to 10; m in formula (AL-2) is an integer from 1 to 7; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the —$NR^aR^b$, ($R^aR^b$N)—$C_{1-6}$ alkyl or ($R^aR^b$N)C(═O)—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups).

[1-4-1b] Regarding the combination of Ar, p, —X—, and -A- in the alginic acid derivative of Embodiment [1], preferably Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—

($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O—; and

-A- is formula (AL-1) or (AL-2) of Embodiment [1-3] [excluding the parts outside the wavy lines at both ends of each formula] (wherein n in formula (AL-1) is an integer from 1 to 10; m in formula (AL-2) is an integer from 1 to 7; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^bN$)—$C_{1-6}$ alkyl or ($R^aR^bN$)C(═O)—$C_{1-6}$ alkyl group (in which each of $R^a$ and $R^b$ in the —$NR^aR^b$, ($R^aR^bN$)—$C_{1-6}$ alkyl or ($R^aR^bN$)C(═O)—$C_{1-6}$ alkyl group is each independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups).

[1-4-1c] Regarding the combination of Ar, p, —X—, and -A- in the alginic acid derivative of Embodiment [1], preferably Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O— or —NH—; and

-A- is formula (AL-1) or (AL-2) of Embodiment [1-3] [excluding the parts outside the wavy lines at both ends of each formula] (wherein n in formula (AL-1) is an integer from 1 to 10; m in formula (AL-2) is an integer from 1 to 7; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^bN$)—$C_{1-6}$ alkyl or ($R^aR^bN$)C(═O)—$C_{1-6}$ alkyl group (in which each of $R^a$ and $R^b$ in the —$NR^aR^b$, ($R^aR^bN$)—$C_{1-6}$ alkyl or ($R^aR^bN$)C(═O)—$C_{1-6}$ alkyl group is each independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups).

[1-4-2] Regarding the combination of Ar, p, —X—, and -A- in the alginic acid derivative of Embodiment [1], more preferably Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl) oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O— or —NH—; and

-A- is formula (AL-1) or (AL-2) of Embodiment [1-3] [excluding the parts outside the wavy lines at both ends of each formula] (wherein n in formula (AL-1) is an integer from 1 to 8; m in formula (AL-2) is an integer from 1 to 5; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a —$NR^aR^b$ group (in which each of $R^a$ and $R^b$ in the —$NR^aR^b$ group is each independently a group selected from a hydrogen atom, $C_{1-6}$ alkyl group, $C_{2-7}$ alkanoyl group or $C_{1-6}$ alkylsulfonyl group), a $C_{7-16}$ aralkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups).

[1-4-2a] Regarding the combination of Ar, p, —X—, and -A- in the alginic acid derivative of Embodiment [1], more preferably Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and $C_{1-6}$ alkyl group) substituted for a hydrogen atom on the ring);

p is the integer 1;

—X— is —O— or —NH—; and

-A- is formula (AL-1) or (AL-2) of Embodiment [1-3] [excluding the parts outside the wavy lines at both ends of each formula] (wherein n in formula (AL-1) is an integer from 1 to 8; m in formula (AL-2) is an integer from 1 to 5; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a —$NR^aR^b$ group (in which each of $R^a$ and $R^b$ in the —$NR^aR^b$ group is each independently a group selected from a hydrogen atom, $C_{1-6}$ alkyl group, $C_{2-7}$ alkanoyl group or $C_{1-6}$ alkylsulfonyl group), a $C_{7-16}$ aralkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups).

[1-4-2b] Regarding the combination of Ar, p, —X—, and -A- in the alginic acid derivative of Embodiment [1], more preferably Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group or $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl) oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O— and

-A- is formula (AL-1) or (AL-2) of Embodiment [1-3] [excluding the parts outside the wavy lines at both ends of each formula] (wherein n in formula (AL-1) is an integer from 1 to 8; m in formula (AL-2) is an integer from 1 to 5; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a —$NR^aR^b$ group (in which each of $R^a$ and $R^b$ in the —$NR^aR^b$ group is each independently a group selected from a hydrogen atom, $C_{1-6}$ alkyl group, $C_{2-7}$ alkanoyl group or $C_{1-6}$ alkylsulfonyl group), a $C_{7-16}$ aralkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups).

[1-4-2c] Regarding the combination of Ar, p, —X—, and -A- in the alginic acid derivative of Embodiment [1], more preferably Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom $C_{1-6}$ alkyl group, $C_{2-7}$ alkanoyl group or $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl) oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O— or -NEE; and

-A- is formula (AL-1) or (AL-2) of Embodiment [1-3] [excluding the parts outside the wavy lines at both ends of each formula] (wherein n in formula (AL-1) is an integer from 1 to 8; m in formula (AL-2) is an integer from 1 to 5; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a —$NR^aR^b$ group (in which each of $R^a$ and $R^b$ in the —$NR^aR^b$ group is each independently a group selected from a hydrogen atom, $C_{1-6}$ alkyl group, $C_{2-7}$ alkanoyl group or $C_{1-6}$ alkylsulfonyl group), a $C_{7-16}$ aralkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups).

[1-4-3] Regarding the combination of Ar, p, —X—, and -A- in the alginic acid derivative of Embodiment [1], still more preferably Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NNHR^G$ group is a $C_{2-7}$ alkanoyl group or $C_{1-6}$ alkylsulfonyl group) are substituted adjacent to one another on the phenyl group or pyridyl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O— or —NH—; and

-A- is formula (AL-1) or (AL-2) in Embodiment [1-3] [excluding the parts outside the wavy lines at both ends of each formula] (wherein n in formula (AL-1) is an integer from 2 to 6 and m in formula (AL-2) is an integer from 1 to 3).

[1-4-3a] Regarding the combination of Ar, p, —X—, and -A- in the alginic acid derivative of the Embodiment [1], still more preferably Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group —$NR^AR^B$ group (in which each of $R^A$ and $R^B$ in —$NR^AR^B$ is each independently a group selected from a hydrogen atom and $C_{1-6}$ alkyl group) substituted for a hydrogen atom on the ring);

p is the integer 1;

—X— is —O— or —NH—; and

-A- is formula (AL-1) or (AL-2) in Embodiment [1-3] [excluding the parts outside the wavy lines at both ends of each formula] (wherein n in formula (AL-1) is an integer from 2 to 6 and m in formula (AL-2) is an integer from 1 to 3).

[1-4-3b] Regarding the combination of Ar, p, —X—, and -A- in the alginic acid derivative of Embodiment [1], still more preferably Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group or pyridyl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O—; and

-A- is formula (AL-1) or (AL-2) in Embodiment [1-3] [excluding the parts outside the wavy lines at both ends of each formula] (wherein n in formula (AL-1) is an integer from 2 to 6 and m in formula (AL-2) is an integer from 1 to 3).

[1-4-3c] Regarding the combination of Ar, p, —X—, and -A- in the alginic acid derivative of Embodiment [1], still more preferably Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group or pyridyl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O— or —NH—; and

-A- is formula (AL-1) or (AL-2) in Embodiment [1-3] [excluding the parts outside the wavy lines at both ends of each formula] (wherein n in formula (AL-1) is an integer from 2 to 6 and m in formula (AL-2) is an integer from 1 to 3).

[1-4-4] Regarding the combination of Ar, p, —X—, and -A- in the alginic acid derivative of the Embodiment [1], particularly preferably Ar is a phenyl group or 2-pyridyl group (wherein the phenyl group or 2-pyridyl group may have any 1 to 3 groups selected from a cyano group, a fluorine atom, a trifluoromethyl group and a methoxy group substituted for a hydrogen atom on the ring, and when two methoxy groups are substituted adjacent to one another on the phenyl group or 2-pyridyl group, they may form a 1,4-dioxane ring by binding between carbon atoms from which any one hydrogen atom each has been removed in the methyl groups of each of the two methoxy groups); and as a combination of Ar, p, —X—, and -A-, for example Ar is a phenyl group, 4-fluorophenyl group, 4-(trifluoromethyl)phenyl group, 4-methoxyphenyl group, 4-cyanophenyl group, 2,3-dihydrobenzo[b][1,4]dioxinyl group or 2-pyridyl group;

p is the integer 1 or 2;

—X— is —O— or —NH—;

-A- is formula (AL-1-1), (AL-2-1) or (AL-2-2) in Embodiment [1-3] [excluding the parts outside the wavy lines at both ends of each formula]; and for example, the combination of Ar, p, —X—, and -A is as shown in the following partial structural formulae [excluding the part to the right of the wavy line in each formula]:

[C21]

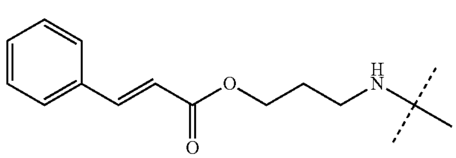

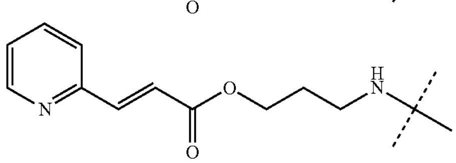

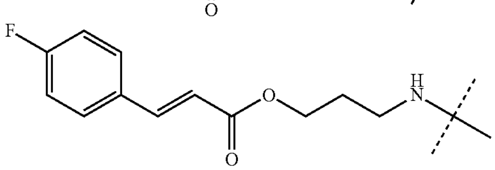

-continued

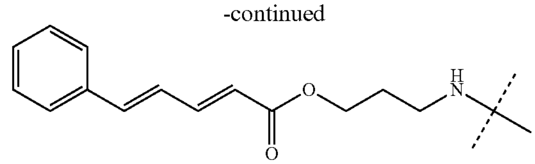

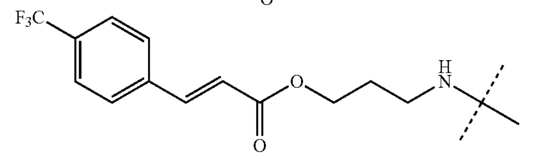

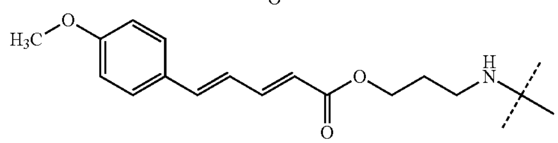

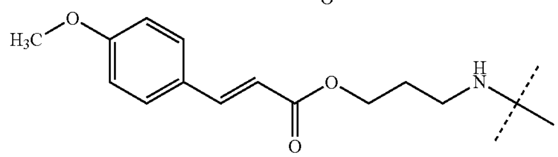

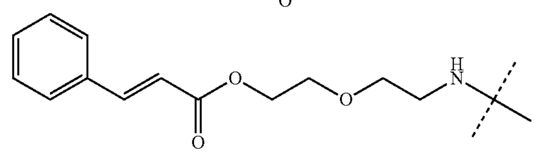

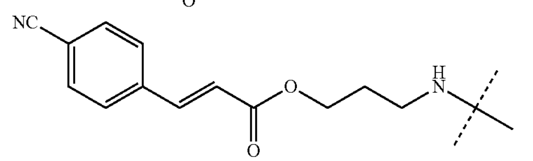

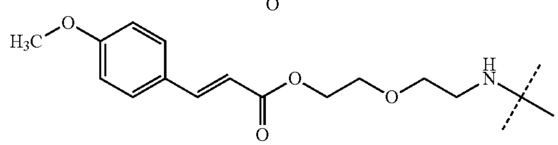

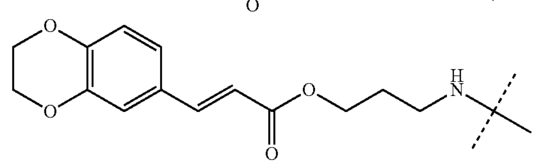

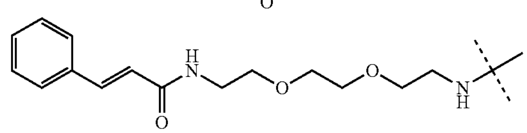

[1-4-4-1] Regarding the combination of Ar, p, —X—, and -A- in the alginic acid derivative of Embodiment [1], particularly preferably Ar is a phenyl group, 2-pyridyl group or 5-pyridyl group (wherein the phenyl group, 2-pyridyl group or 5-pyridyl group may have any 1 to 3 groups selected from a cyano group, a fluorine atom, a trifluoromethyl group, a methoxy group and an N-acetylamino group substituted for a hydrogen atom on the ring, and when two methoxy groups are substituted adjacent to one another on the phenyl group, 2-pyridyl group or 5-pyridyl group, they may form a 1,4-dioxane ring by binding between carbon atoms from which any one hydrogen atom each has been removed in the methyl groups of the two methoxy groups); and as a combination of Ar, p, —X—, and -A-, for example Ar is a phenyl group, 4-fluorophenyl group, 4-(trifluoromethyl)phenyl group, 4-methoxyphenyl group, 3,4-dimethoxyphenyl group, 4-(N-acetylamino)phenyl group, 4-cyanophenyl group, 2,3-dihydrobenzo[b][1,4]dioxinyl group, 2-pyridyl group or 2-methoxy-5-pyridyl group;

p is the integer 1 or 2;

—X— is —O— or —NH—;

-A- is formula (AL-1-1), (AL-2-1) or (AL-2-2) in Embodiment [1-3] [excluding the parts outside the wavy lines at both ends of each formula]; and for example, the combination of Ar, p, —X—, and -A is as shown in the following partial structural formulae [excluding the part to the right of the wavy line in each formula]:

[C22]

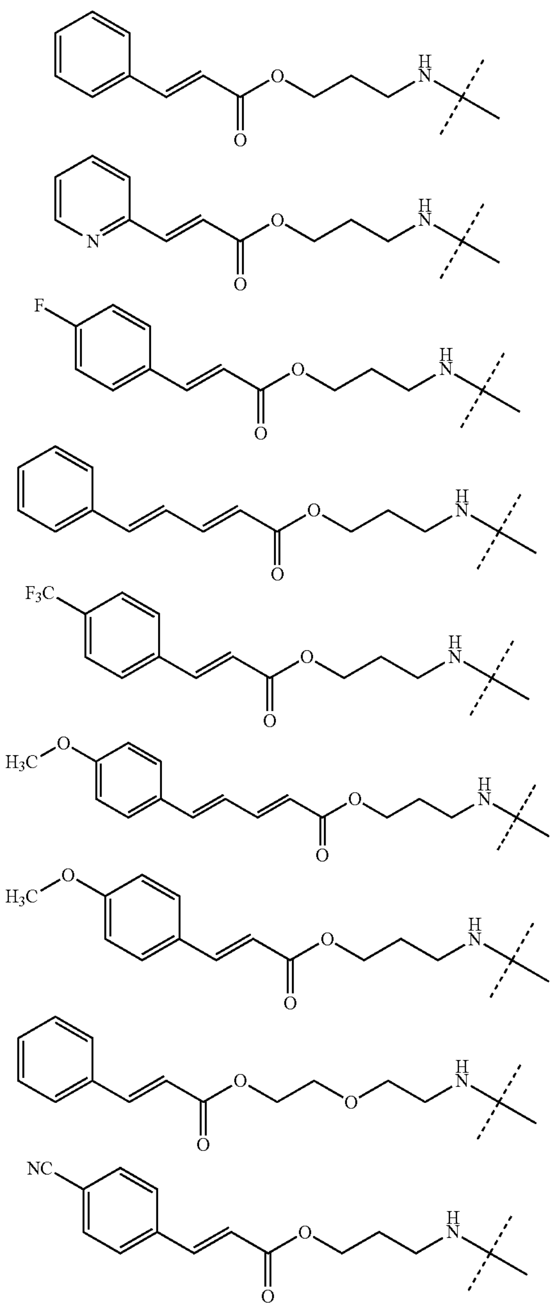

-continued

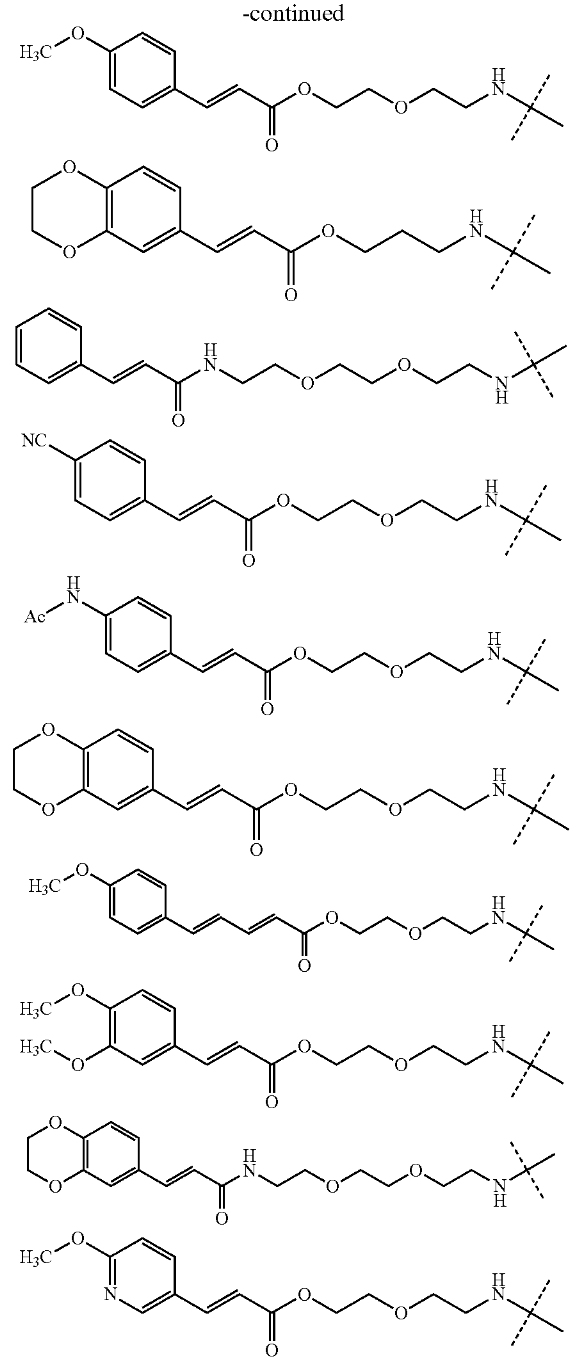

[1-4-4-2] Regarding the combination of Ar, p, —X—, and -A- in the alginic acid derivative of Embodiment [1], particularly preferably Ar is a phenyl group, 2-pyridyl group or 5-pyridyl group (wherein the phenyl group, 2-pyridyl group or 5-pyridyl group may have any 1 to 3 groups selected from a cyano group, a methoxy group and an N-acetylamino group substituted for a hydrogen atom on the ring, and when two methoxy groups are substituted adjacent to one another on the phenyl group, 2-pyridyl group or 5-pyridyl group, they may form a 1,4-dioxane ring by binding between carbon atoms from which any one hydrogen atom each has been removed in the methyl groups of the two methoxy groups); and as a combination of Ar, p, —X—, and -A-, for example Ar is a phenyl group, 4-methoxyphenyl group, 3,4-dimethoxyphenyl group, 4-(N-acetylamino)phenyl group, 4-cyanophenyl group, 2,3-dihydrobenzo[b][1,4]dioxinyl group, 2-pyridyl group or 2-methoxy-5-pyridyl group;

p is the integer 1 or 2;

—X— is —O— or —NH—;

-A- is formula (AL-1-1), (AL-2-1) or (AL-2-2) in Embodiment [1-3] [excluding the parts outside the wavy lines at both ends of each formula]; and for example, the combination of Ar, p, —X—, and -A is as shown in the following partial structural formulae [excluding the part to the right of the wavy line in each formula]:

[C23]

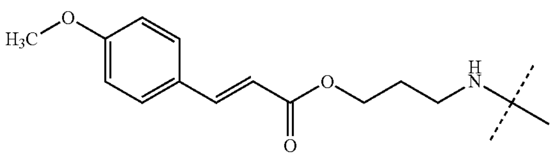

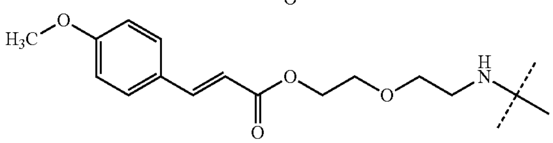

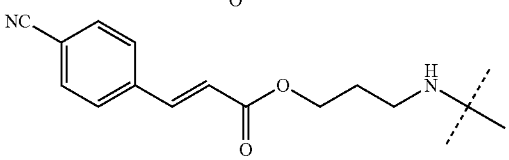

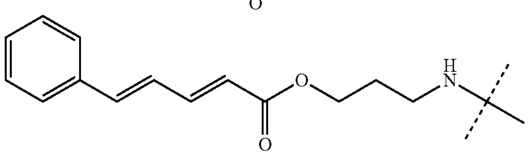

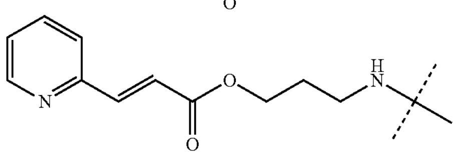

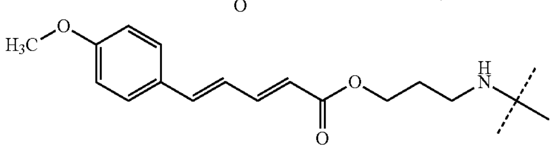

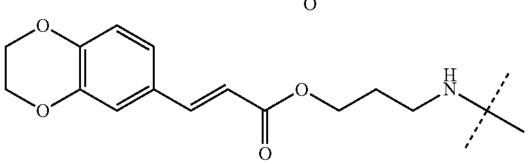

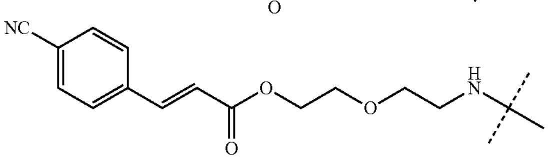

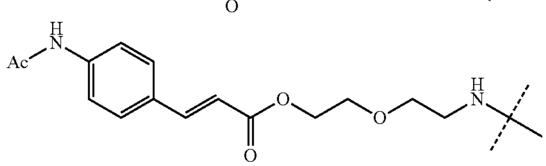

-continued

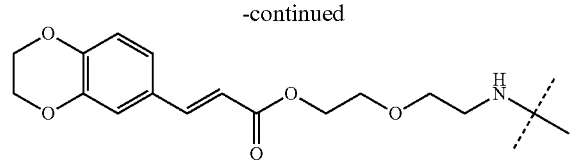

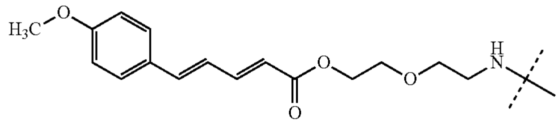

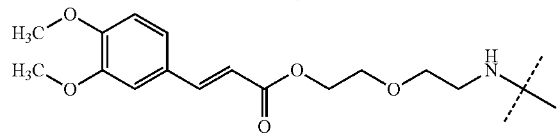

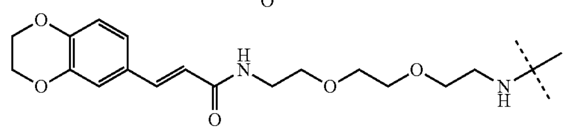

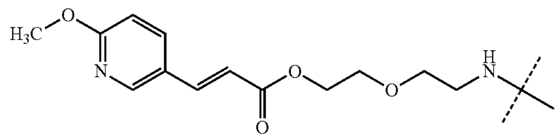

[1-4-4a] Regarding the combination of Ar, p, —X—, and -A- in the alginic acid derivative of Embodiment [1], particularly preferably Ar is a phenyl group (wherein the phenyl group may have any 1 to 3 groups selected from a fluorine atom and a trifluoromethyl group substituted for a hydrogen atom on the ring); and as a combination of Ar, p, —X—, and -A-, for example Ar is a phenyl group, 4-fluorophenyl group or 4-(trifluoromethyl)phenyl group;

p is the integer 1;

—X— is —O— or —NH—;

-A- is formula (AL-1-1), (AL-2-1) or (AL-2-2) in Embodiment [1-3] [excluding the parts outside the wavy lines at both ends of each formula]; and for example, the combination of Ar, p, —X—, and -A is as shown in the following partial structural formulae [excluding the part to the right of the wavy line in each formula]:

[C24]

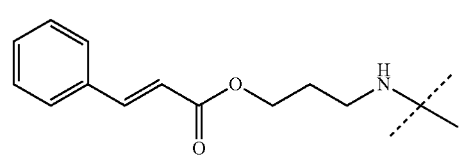

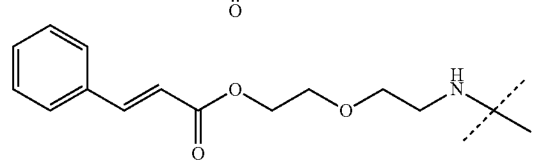

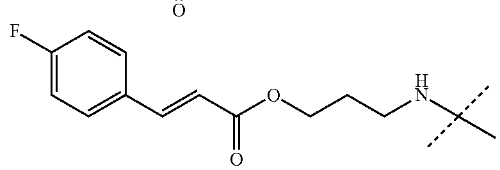

-continued

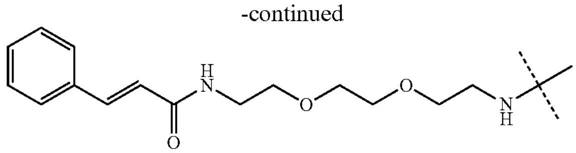

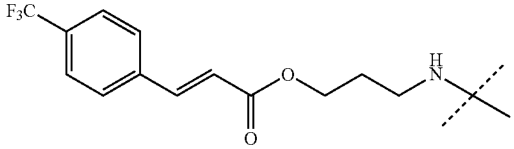

[1-4-4b] Regarding the combination of Ar, p, —X—, and -A- in the alginic acid derivative of Embodiment [1], particularly preferably Ar is a phenyl group or 2-pyridyl group (wherein the phenyl group or 2-pyridyl group may have any 1 to 3 groups selected from a cyano group and a methoxy group substituted for a hydrogen atom on the ring, and when two methoxy groups are substituted adjacent to one another on the phenyl group or 2-pyridyl group, they may form a 1,4-dioxane ring by binding between carbon atoms from which any one hydrogen atom each has been removed in the methyl groups of each of the two methoxy groups); and as a combination of Ar, p, —X—, and -A-, for example Ar is a phenyl group, 4-methoxyphenyl group, 4-cyanophenyl group, 2,3-dihydrobenzo[b][1,4]dioxinyl group or 2-pyridyl group;

p is the integer 1 or 2;

—X— is —O—;

-A- is formula (AL-1-1) or (AL-2-1) of the Embodiment [1-3] [excluding the parts outside the wavy lines at both ends of each formula]; and for example, the combination of Ar, p, —X—, and -A is as shown in the following partial structural formulae [excluding the part to the right of the wavy line in each formula]:

[C25]

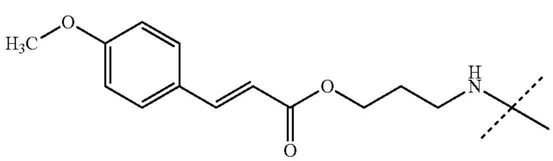

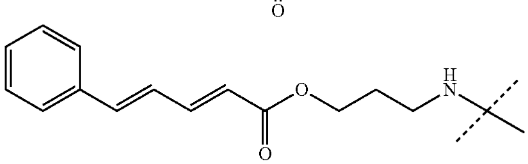

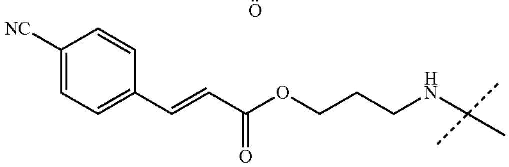

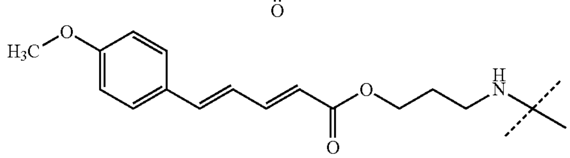

-continued

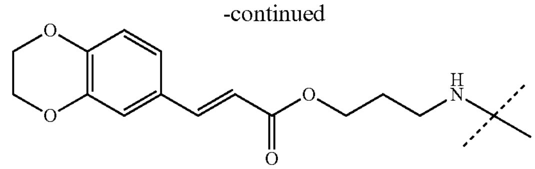

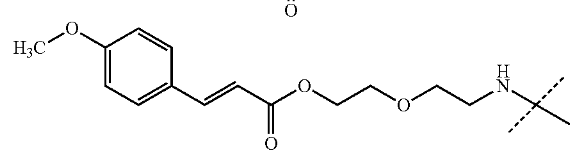

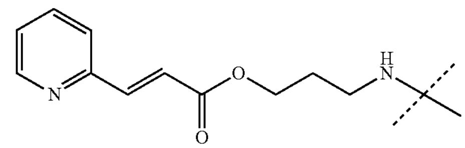

[1-4-4c] Regarding the combination of Ar, p, —X—, and -A- in the alginic acid derivative of Embodiment [1], particularly preferably Ar is a phenyl group or 5-pyridyl group (wherein the phenyl group or 5-pyridyl group may have any 1 to 3 groups selected from a cyano group, a methoxy group and an N-acetylamino group substituted for a hydrogen atom on the ring, and when two methoxy groups are substituted adjacent to one another on the phenyl group or 2-pyridyl group, they may form a 1,4-dioxane ring by binding between carbon atoms from which any one hydrogen atom each has been removed in the methyl groups of the two methoxy groups); and as a combination of Ar, p, —X—, and -A-, for example Ar is a 4-cyanophenyl group, 4-methoxyphenyl group, 3,4-dimethoxyphenyl group, 4-(N-acetylamino)phenyl group, 2,3-dihydrobenzo[b][1,4]dioxinyl group or 2-methoxy-5-pyridyl group;

p is the integer 1 or 2;

—X— is —O— or —NH—;

-A- is formula (AL-2-1) or (AL-2-2) of the Embodiment [1-3] [excluding the parts outside the wavy lines at both ends of each formula]; and for example, the combination of Ar, p, —X—, and -A is as shown in the following partial structural formulae [excluding the part to the right of the wavy line in each formula]:

[C26]

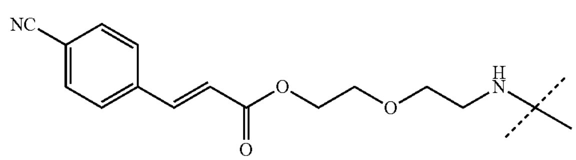

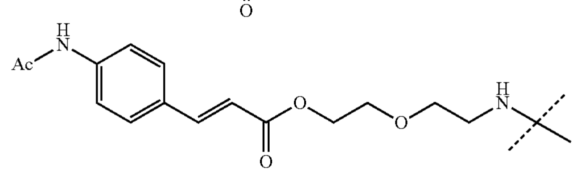

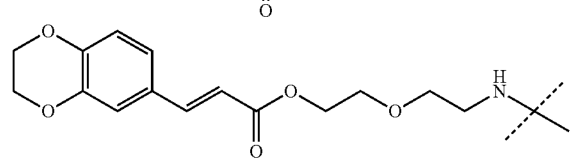

-continued

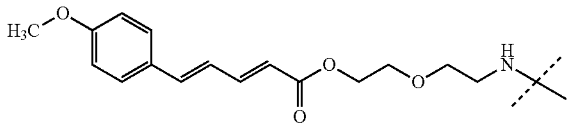

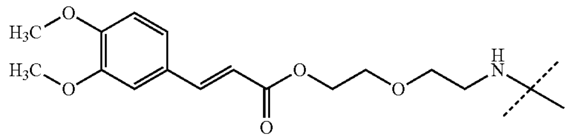

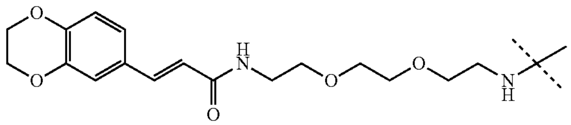

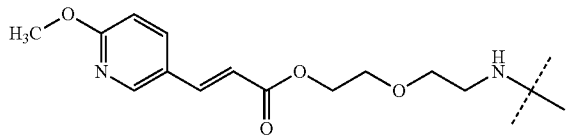

[1-4-5] In the alginic acid derivative of Embodiment [1], the following partial structural formulae [excluding the part to the right of the wavy line in each formula] are most preferred:

[C27]

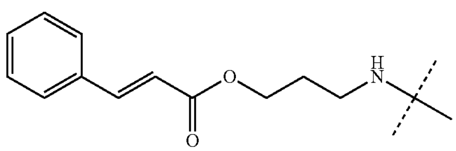

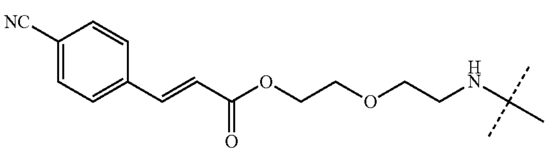

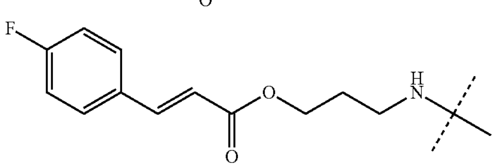

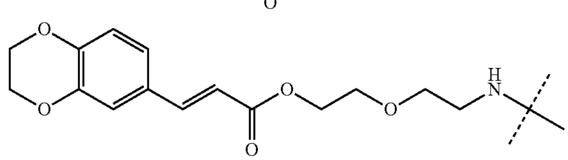

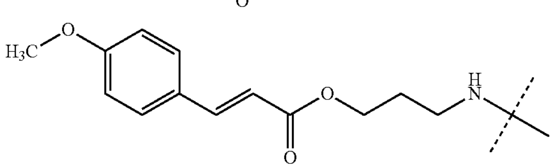

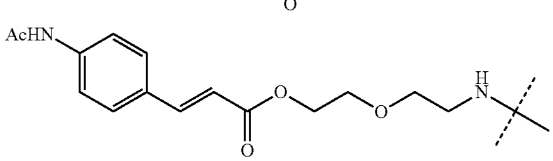

-continued

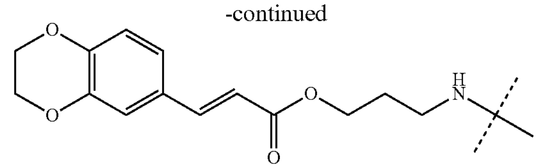

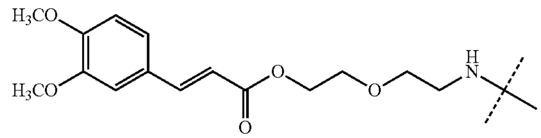

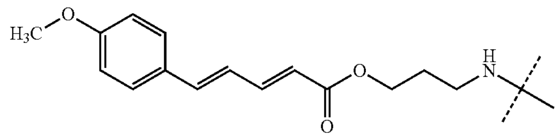

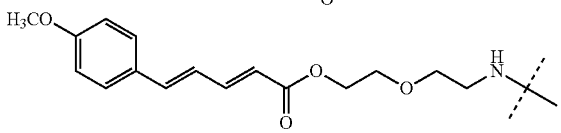

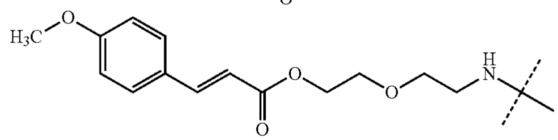

[1a] Embodiment 1a is a preferred embodiment of Embodiment [1], and specifically is an alginic acid derivative including a photoreactive group represented by formula (I) below introduced into any one or more carboxyl groups of alginic acid:

[C28]

(I)

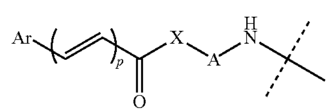

[in formula (I), Ar represents a $C_{6-10}$ aryl group or heterocyclic group (wherein the $C_{6-10}$ aryl group or heterocyclic group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —$NH(C_{1-6}$ alkyl), and —$N(C_{1-6}$ alkyl$)_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or heterocyclic group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heterocyclic group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— represents —O—, —NH— or a —N($C_{1-6}$ alkyl)-; and

-A- represents formulae (AL-1) to (AL-4) [excluding the parts outside the wavy lines at both ends of each formula]:

[C29]

(AL-1)

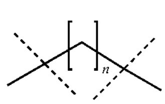

(AL-2)

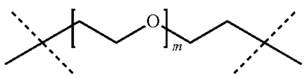

(AL-3)

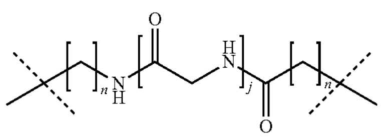

(AL-4)

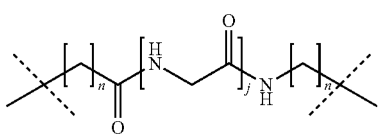

(in formulae (AL-1) to (AL-4), n represents an integer from 1 to 18, m represents an integer from 1 to 9 and j represents an integer from 0 to 9;

a hydrogen atom of a methylene group (—$CH_2$—) in formulae (AL-1) to (AL-4) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —NR$^a$R$^b$, (R$^a$R$^b$N)—$C_{1-6}$ alkyl or (R$^a$R$^b$N)C(═O)—$C_{1-6}$ alkyl group (in which each of R$^a$ and R$^b$ in the NR$^a$R$^b$, (R$^a$R$^b$N)—$C_{1-6}$ alkyl or (R$^a$R$^b$N)C(═O)—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) to (AL-4), a $C_{3-8}$ cycloalkyl ring may be formed by binding between carbon atoms from which any one hydrogen atom each has been removed in the alkyl groups of the two $C_{1-6}$ alkyl groups; and the —NH— group in formula (AL-3) or formula (AL-4) may also form a non-aromatic heterocyclic ring with these substituents which have been substituted on adjacent carbon atoms)] (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1a-1] In the alginic acid derivative of Embodiment [1a], preferably, Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —NR$^A$R$^B$ group (in which each of R$^A$ and R$^B$ in —NR$^A$R$^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —NHR$^G$ group (in which R$^G$ in the —NHR$^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl) morpholine ring, 4-N—($C_{2-7}$ alkanoyl)-1,4-oxazepan ring or 4-N—($C_{1-6}$ alkylsulfonyl)-1,4-oxazepan ring) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar);

More preferably, Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —NR$^A$R$^B$ group (in which each of R$^A$ and R$^B$ in —NR$^A$R$^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring; and when a $C_{1-6}$ alkyl group and $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —NHR$^G$ group (in which R$^G$ in the —NHR$^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl) oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar);

Still more preferably, Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group or pyridyl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar);

Particularly preferably, Ar is a phenyl group or 2-pyridyl group (wherein the phenyl group or 2-pyridyl group may have any 1 to 3 groups selected from a cyano group, a fluorine atom, a trifluoromethyl group and a methoxy group substituted for a hydrogen atom on the ring, and when two methoxy groups are substituted adjacent to one another on the phenyl group or 2-pyridyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar); and for example Ar is a phenyl group, 4-fluorophenyl group, 4-(trifluoromethyl)phenyl group, 4-methoxyphenyl group, 4-cyanophenyl group, 2,3-dihydrobenxo[b][1,4]dioxinyl group, 2-pyridyl group or the like.

[1a-1-1] In the alginic acid derivative of Embodiment [1a-1], particularly preferably Ar is a phenyl group, 2-pyridyl group or 5-pyridyl group (wherein the phenyl group, 2-pyridyl group or 5-pyridyl group may have any 1 to 3 groups selected from a cyano group, a fluorine atom, a trifluoromethyl group, a methoxy group and an N-acetylamino group substituted for a hydrogen atom on the ring, and when two methoxy groups are substituted adjacent to one another on the phenyl group, 2-pyridyl group or 5-pyridyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom in the phenyl group of this Ar); and for example Ar is a phenyl group, 4-fluorophenyl group, 4-(trifluormethyl)phenyl group, 4-methoxyphenyl group, 3,4-dimethoxyphenyl group, 4-(N-acetylamino)phenyl group, 4-cyanophenyl group, 2,3-dihydrobenzo[b][1,4]dioxinyl group, 2-pyridyl group or 2-methoxy-5-pyridyl group or the like.

[1a-1-2] In the alginic acid derivative of Embodiment [1a-1], particularly preferably Ar is a phenyl group, 2-pyridyl group or 5-pyridyl group (wherein the phenyl group, 2-pyridyl group or 5-pyridyl group may have any 1 to 3 groups selected from a cyano group, a methoxy group and a N-acetylamino group substituted for a hydrogen atom on the ring, and when two methoxy groups are substituted adjacent to one another on the phenyl group, 2-pyridyl group or 5-pyridyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom in the phenyl group of this Ar); and for example Ar is a phenyl group, 4-methoxyphenyl group, 3,4-dimethoxyphenyl group, 4-cyanophenyl group, 4-(N-acetylamino)phenyl group, 2,3-dihydrobenzo[b][1,4]dioxinyl group, 2-pyridyl group or 2-methoxy-5-pyridyl group or the like.

[1a-1a] In the alginic acid derivative of Embodiment [1a], preferably, Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and a $C_{1-6}$ alkyl group (provided that —$NH_2$, —NH($C_{1-6}$ alkyl), and —N($C_{1-6}$ alkyl)$_2$ groups are excluded)) substituted for a hydrogen atom on the ring) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar);

More preferably, Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and a $C_{1-6}$ alkyl group (provided that —$NH_2$, —NH($C_{1-6}$ alkyl), and —N($C_{1-6}$ alkyl)$_2$ groups are excluded)) substituted for a hydrogen atom on the ring) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar);

Still more preferably, Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and a $C_{1-6}$ alkyl group (provided that —$NH_2$, —NH($C_{1-6}$ alkyl), and —N($C_{1-6}$ alkyl)$_2$ groups are excluded)) substituted for a hydrogen atom on the ring) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar);

Particularly preferably, Ar is a phenyl group (wherein the phenyl group may have any 1 to 3 groups selected from a fluorine atom and a trifluoromethyl group substituted for a hydrogen atom on the ring) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and for example, Ar is a 4-fluorophenyl group or 4-(trifluoromethyl)phenyl group or the like.

[1a-1b] In the alginic acid derivative of Embodiment [1a], preferably, Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl) morpholine ring, 4-N—($C_{2-7}$ alkanoyl)-1,4-oxazepan ring or 4-N—($C_{1-6}$ alkylsulfonyl)-1,4-oxazepan ring) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar);

More preferably, Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkyl sulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar);

Still more preferably, Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl or pyridyl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar);

Particularly preferably, Ar is a phenyl group or 2-pyridyl group (wherein the phenyl group or 2-pyridyl group may have any 1 to 3 groups selected from a cyano group and a methoxy group substituted for a hydrogen atom on the ring, and when two methoxy groups are substituted adjacent to one another on the phenyl group or 2-pyridyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and for example Ar is a phenyl group, 4-methoxyphenyl group, 4-cyanophenyl group, 2,3-dihydrobenzo[b][1,4]dioxinyl group or 2-pyridyl group or the like.

[1a-1c] In the alginic acid derivative of Embodiment [1a-1b], particularly preferably Ar is a phenyl group or 5-pyridyl group (wherein the phenyl group or 5-pyridyl group may have any 1 to 3 groups selected from a cyano group, a methoxy group and an N-acetylamino group substituted for a hydrogen atom on the ring, and when two methoxy groups are substituted adjacent to one another on the phenyl group or 5-pyridyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and for example Ar is a 4-cyanophenyl group, 4-methoxyphenyl group, 3,4-dimethoxyphenyl group, 4-(N-acetylamino) phenyl group, 2,3-dihydrobenzo[b][1,4]dioxinyl group or 2-methoxy-5-pyridyl group or the like.

[1a-2] In the alginic acid derivative of Embodiment [1a], —X— is preferably —O— or —NH—.

[1a-2a] In the alginic acid derivative of Embodiment [1a], —X— is preferably —O—.

[1a-3] In the alginic acid derivative of Embodiment [1a], the preferred, more preferred, still more preferred and particularly preferred groups for -A- are as defined in Embodiment [1-3].

[1a-3a] In the alginic acid derivative of Embodiment [1a-3], particularly preferably -A- is formula (AL-1-1) or (AL-2-1) [excluding the parts outside the wavy lines at both ends of each formula].

[1a-3b] In the alginic acid derivative of Embodiment [1a-3], particularly preferably -A- is formula (AL-2-1) or (AL-2-2) [excluding the parts outside the wavy lines at both ends of each formula].

[1a-3-1] In the alginic acid derivative of Embodiment [1a], the preferred, more preferred, still more preferred and particularly preferred ranges of values for n, m, and j in formulae (AL-1) to (AL-4) as -A- are as defined in Embodiment [1-3-1].

[1a-3-2] In the alginic acid derivative of Embodiment [1a], the preferred embodiments of formula (AL-3) or formula (AL-4), which are included in -A-, are as defined in Embodiment [1-3-2].

[1a-3-2-1] The preferred, more preferred, still more preferred and particular preferred embodiments of n, m, and j in formula (AL-3-1) or formula (AL-4-1) of Embodiment [1a-3-2] are as defined in Embodiment [1-3-2-1].

[1a-4-1] Regarding the combination of Ar, p, —X—, and -A- in the alginic acid derivative of Embodiment [1a], preferably Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —NR$^A$R$^B$ group (in which each of R$^A$ and R$^B$ in —NR$^A$R$^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —NHR$^G$ group (in which R$^G$ in the —NHR$^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— represents —O— or —NH—;

-A- is formula (AL-1) or formula (AL-2) of Embodiment [1a-3] [excluding the parts outside the wavy lines at both ends of each formula] (wherein n in formula (AL-1) is an integer from 1 to 10 and m in formula (AL-2) is an integer from 1 to 7;

a hydrogen atom of a methylene group (—$CH_2$—) in formula (AL-1) or formula (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —NR$^a$R$^b$, (R$^a$R$^b$N)—$C_{1-6}$ alkyl or (R$^a$R$^b$N)C(═O)—$C_{1-6}$ alkyl group (in which each of R$^a$ and R$^b$ in the NR$^a$R$^b$, (R$^a$R$^b$N)—$C_{1-6}$ alkyl or (R$^a$R$^b$N)C(═O)—$C_{1-6}$ alkyl group is each independently a group selected from a hydrogen atom, a $C_{1-6}$ alkyl group, a $C_{2-7}$ alkanoyl group, and a $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1a-4-1a] Regarding the combination of Ar, p, —X—, and -A- in the alginic acid derivative of Embodiment [1a], preferably Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and a $C_{1-6}$ alkyl group (provided that —$NH_2$, —NH($C_{1-6}$ alkyl), and —N($C_{1-6}$ alkyl)$_2$ groups are excluded) substituted for a hydrogen atom on the ring), p is the integer 1;

—X— represents —O— or —NH—;

-A- is formula (AL-1) or formula (AL-2) in Embodiment [1a-3] [excluding the parts outside the wavy lines at both ends of each formula) (wherein n in formula (AL-1) is an integer from 1 to 10 and m in formula (AL-2) is an integer from 1 to 7;

a hydrogen atom of a methylene group (—$CH_2$—) in formula (AL-1) or formula (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the $NR^aR^b$, ($R^aR^b$N)—$C_{1-6}$ alkyl or ($R^aR^b$N)C(═O)—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group, and a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1a-4-1b] Regarding the combination of Ar, p, —X—, and -A- in the alginic acid derivative of Embodiment [1a], preferably Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl) morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— represents —O—;

-A- is formula (AL-1) or formula (AL-2) in Embodiment [1a-3] [excluding the parts outside the wavy lines at both ends of each formula] (wherein n in formula (AL-1) is an integer from 1 to 10 and m in formula (AL-2) is an integer from 1 to 7;

a hydrogen atom of a methylene group (—$CH_2$—) in formula (AL-1) or formula (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the —$NR^aR^b$, ($R^aR^b$N)—$C_{1-6}$ alkyl or ($R^aR^b$N)C(═O)—$C_{1-6}$ alkyl group is each independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1a-4-1c] Regarding the combination of Ar, p, —X—, and -A- in the alginic acid derivative of Embodiment [1a], preferably Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl) morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— represents —O— or —NH—;

-A- is formula (AL-1) or formula (AL-2) in Embodiment [1a-3][excluding the parts outside the wavy lines at both ends of each formula] (wherein n in formula (AL-1) is an integer from 1 to 10 and m in formula (AL-2) is an integer from 1 to 7; a hydrogen atom of a methylene group (—$CH_2$—) in formula (AL-1) or formula (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^bN$)—$C_{1-6}$ alkyl or ($R^aR^bN$)C(═O)—$C_{1-6}$ alkyl group (in which each of $R^a$ and $R^b$ in the —$NR^aR^b$, ($R^aR^bN$)—$C_{1-6}$ alkyl or ($R^aR^bN$)C(═O)—$C_{1-6}$ alkyl group is each independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1a-4-2] Regarding the combination of Ar, p, —X—, and -A- in the alginic acid derivative of Embodiment [1a], more preferably Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group, and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O— or —NH—; and

-A- is formula (AL-1) or (AL-2) of Embodiment [1a-3] [excluding the parts outside the wavy lines at both ends of each formula] (wherein n in formula (AL-1) is an integer from 1 to 8; m in formula (AL-2) is an integer from 1 to 5; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a —$NR^aR^b$ group (in which each of $R^a$ and $R^b$ in the —$NR^aR^b$ group is each independently a group selected from a hydrogen atom, $C_{1-6}$ alkyl group, $C_{2-7}$ alkanoyl group or $C_{1-6}$ alkylsulfonyl group), a $C_{7-16}$ aralkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1a-4-2a] Regarding the combination of Ar, p, —X—, and -A- in the alginic acid derivative of Embodiment [1a], more preferably Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and $C_{1-6}$ alkyl group (provided that —$NH_2$, —NH($C_{1-6}$ alkyl), and —N($C_{1-6}$ alkyl)$_2$ groups are excluded)) substituted for a hydrogen atom on the ring);

p is the integer 1;

X is —O— or —NH—

-A- is formula (AL-1) or (AL-2) of Embodiment [1a-3] [excluding the parts outside the wavy lines at both ends of each formula] (wherein n in formula (AL-1) is an integer from 1 to 8; m in formula (AL-2) is an integer from 1 to 5; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a —$NR^aR^b$ group (in which each of $R^a$ and $R^b$ in the —$NR^aR^b$ group is each independently a group selected from a hydrogen atom, $C_{1-6}$ alkyl group, $C_{2-7}$ alkanoyl group or $C_{1-6}$ alkylsulfonyl group), a $C_{7-16}$ aralkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1a-4-2b] Regarding the combination of Ar, p, —X—, and -A- in the alginic acid derivative of Embodiment [1a], more preferably Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring; and when a $C_{1-6}$ alkyl group and $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O—; and

-A- is formula (AL-1) or (AL-2) of Embodiment [1a-3] [excluding the parts outside the wavy lines at both ends of each formula] (wherein n in formula (AL-1) is an integer from 1 to 8; m in formula (AL-2) is an integer from 1 to 5; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a —$NR^aR^b$ group (in which each of $R^a$ and $R^b$ in the —$NR^aR^b$ group is each independently a group selected from a hydrogen atom, $C_{1-6}$ alkyl group, $C_{2-7}$ alkanoyl group or $C_{1-6}$ alkylsulfonyl group), a $C_{7-16}$ aralkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1a-4-2c] Regarding the combination of Ar, p, —X—, and -A- in the alginic acid derivative of Embodiment [1a], more preferably Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring; and when a $C_{1-6}$ alkyl group and $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O— or —NH—; and

-A- is formula (AL-1) or (AL-2) in Embodiment [1a-3] [excluding the parts outside the wavy lines at both ends of each formula] (wherein n in formula (AL-1) is an integer from 1 to 8; m in formula (AL-2) is an integer from 1 to 5; a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a —$NR^aR^b$ group (in which each of $R^a$ and $R^b$ in the —$NR^aR^b$ group is each independently a group selected from a hydrogen atom, $C_{1-6}$ alkyl group, $C_{2-7}$ alkanoyl group or $C_{1-6}$ alkylsulfonyl group), a $C_{7-16}$ aralkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1a-4-3] Regarding the combination of Ar, p, —X—, and -A- in the alginic acid derivative of Embodiment [1a], still more preferably Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group or pyridyl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl) morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2

—X— is —O— or —NH—; and

-A- is formula (AL-1) or (AL-2) in Embodiment [1a-3] [excluding the parts outside the wavy lines at both ends of each formula] (wherein n in formula (AL-1) is an integer from 2 to 6 and m in formula (AL-2) is an integer from 1 to 3) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar).

[1a-4-3a] Regarding the combination of Ar, p, —X—, and -A- in the alginic acid derivative of Embodiment [1a], still more preferably Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and $C_{1-6}$ alkyl group (provided that —$NH_2$, —NH($C_{1-6}$ alkyl), and —N($C_{1-6}$ alkyl)$_2$ groups are excluded)) substituted for a hydrogen atom on the ring);

p is the integer 1;

—X— is —O— or —NH—; and

-A- is formula (AL-1) or (AL-2) in Embodiment [1a-3] [excluding the parts outside the wavy lines at both ends of each formula] (wherein n in formula (AL-1) is an integer from 2 to 6 and m in formula (AL-2) is an integer from 1 to 3) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar).

[1a-4-3b] Regarding the combination of Ar, p, —X—, and -A- in the alginic acid derivative of Embodiment [1a], still more preferably Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group or pyridyl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl) morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2

—X— is —O—; and

-A- is formula (AL-1) or (AL-2) in Embodiment [1a-3] [excluding the parts outside the wavy lines at both ends of each formula] (wherein n in formula (AL-1) is an integer from 2 to 6 and m in formula (AL-2) is an integer from 1 to 3) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar).

[1a-4-3c] Regarding the combination of Ar, p, —X—, and -A- in the alginic acid derivative of Embodiment [1a], still more preferable ones are as follows:

Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group or pyridyl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl) morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2

—X— is —O— or —NH—; and

-A- is formula (AL-1) or (AL-2) in Embodiment [1a-3] [excluding the parts outside the wavy lines at both ends of each formula] (wherein n in formula (AL-1) is an integer from 2 to 6 and m in formula (AL-2) is an integer from 1 to 3) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar).

[1a-4-4] Regarding the combination of Ar, p, —X—, and -A- in the alginic acid derivative of Embodiment [1a], particularly preferably Ar is a phenyl group or 2-pyridyl group (wherein the phenyl group or 2-pyridyl group may have any 1 to 3 groups selected from a cyano group, a fluorine atom, a trifluoromethyl group, and a methoxy group substituted for a hydrogen atom on the ring, and when two methoxy groups are substituted adjacent to one another on the phenyl group or 2-pyridyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a phenyl group, 4-fluorophenyl group, 4-(trifluoromethyl)phenyl group, 4-methoxyphenyl group, 4-cyanophenyl group, 2,3-dihydrobenzo[b][1,4]dioxinyl group or 2-pyridyl group;

p is the integer 1 or 2

—X— is —O— or —NH—; and

-A- is formula (AL-1-1), (AL-2-1) or (AL-2-2) in Embodiment [1a-3] [excluding the parts outside the wavy lines at both ends of each formula]; and for example, the combination of Ar, p, —X—, and -A- is as shown in the following partial structural formula [excluding the part to the right of the wavy line in each formula]:

[C30]

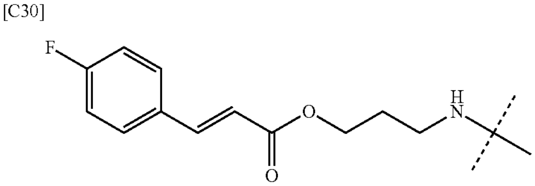

-continued

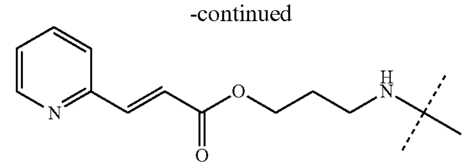

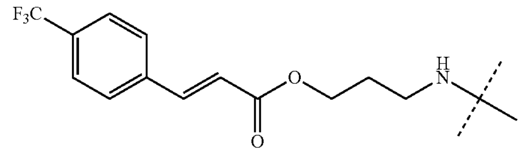

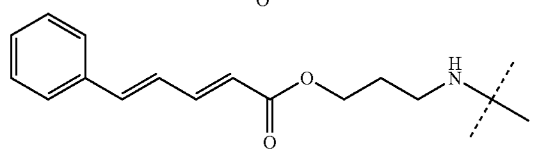

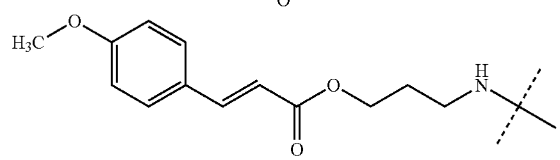

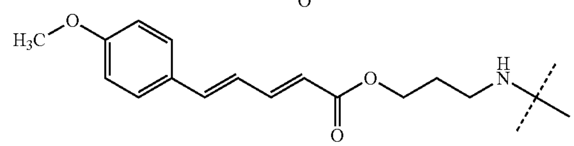

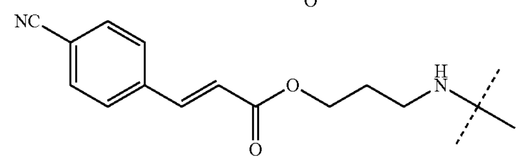

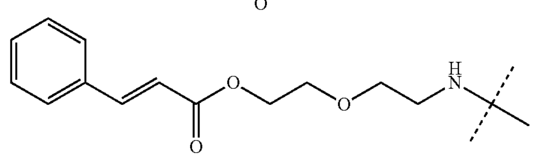

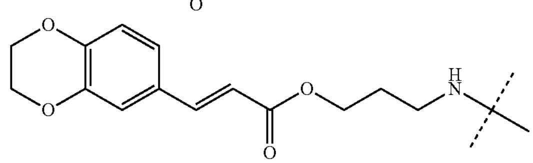

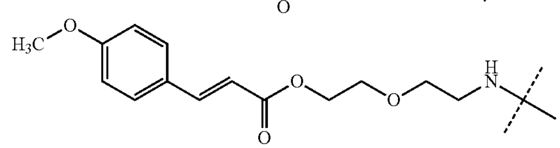

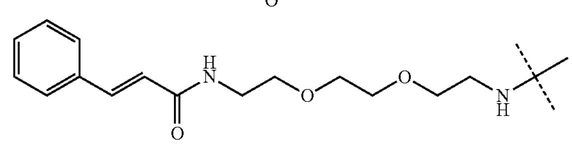

[1a-4-4-1] Regarding the combination of Ar, p, —X—, and -A- in the alginic acid derivative of Embodiment [1a], particularly preferably Ar is a phenyl group, 2-pyridyl group or 5-pyridyl group (wherein the phenyl group, 2-pyridyl group or 5-pyridyl group may have any 1 to 3 groups selected from a cyano group, a fluorine atom, a trifluoromethyl group, a methoxy group, and an N-acetylamino group substituted for a hydrogen atom on the ring, and when two methoxy groups are substituted adjacent to one another on the phenyl group, 2-pyridyl group or 5-pyridyl group, they may form a 1,4- dioxane ring by binding between carbon atoms from which any one hydrogen atom each has been removed in the methyl groups of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom in the phenyl group of this Ar); and as a combination of Ar, p, —X—, and -A-, for example Ar is a phenyl group, 4-fluorophenyl group, 4-(trifluoromethyl)phenyl group, 4-methoxyphenyl group, 3,4-dimethoxyphenyl group, 4-(N-acetylamino)phenyl group, 4-cyanophenyl group, 2,3-dihydrobenzo[b][1,4]dioxinyl group, 2-pyridyl group or 2-methoxy-5-pyridyl group;

p is the integer 1 or 2

—X— is —O— or —NH—; and

-A- is formula (AL-1-1), (AL-2-1) or (AL-2-2) in Embodiment [1a-3] [excluding the parts outside the wavy lines at both ends of each formula]; and for example, the combination of Ar, p, —X—, and -A- is as shown in the following partial structural formula [excluding the part to the right of the wavy line in each formula]:

[C31]

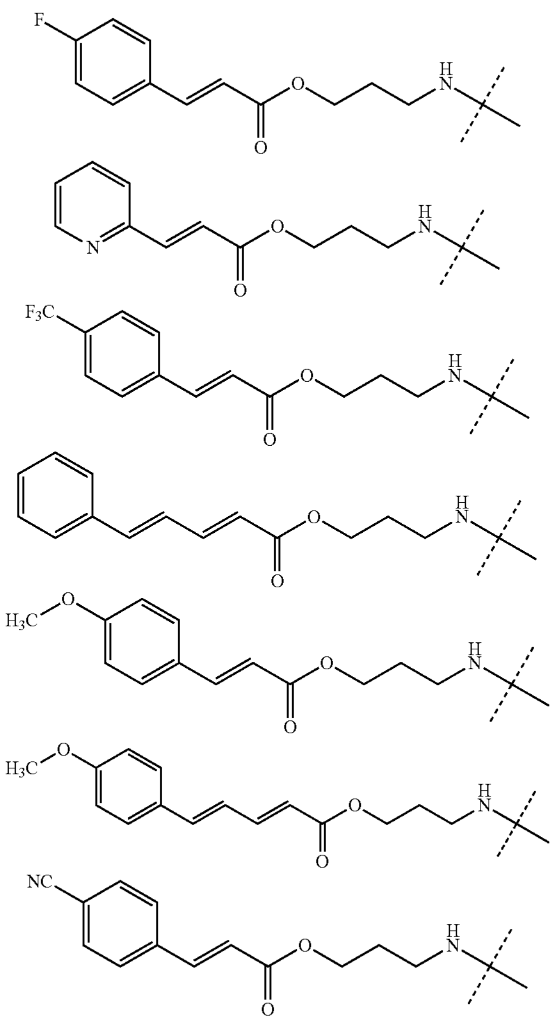

-continued

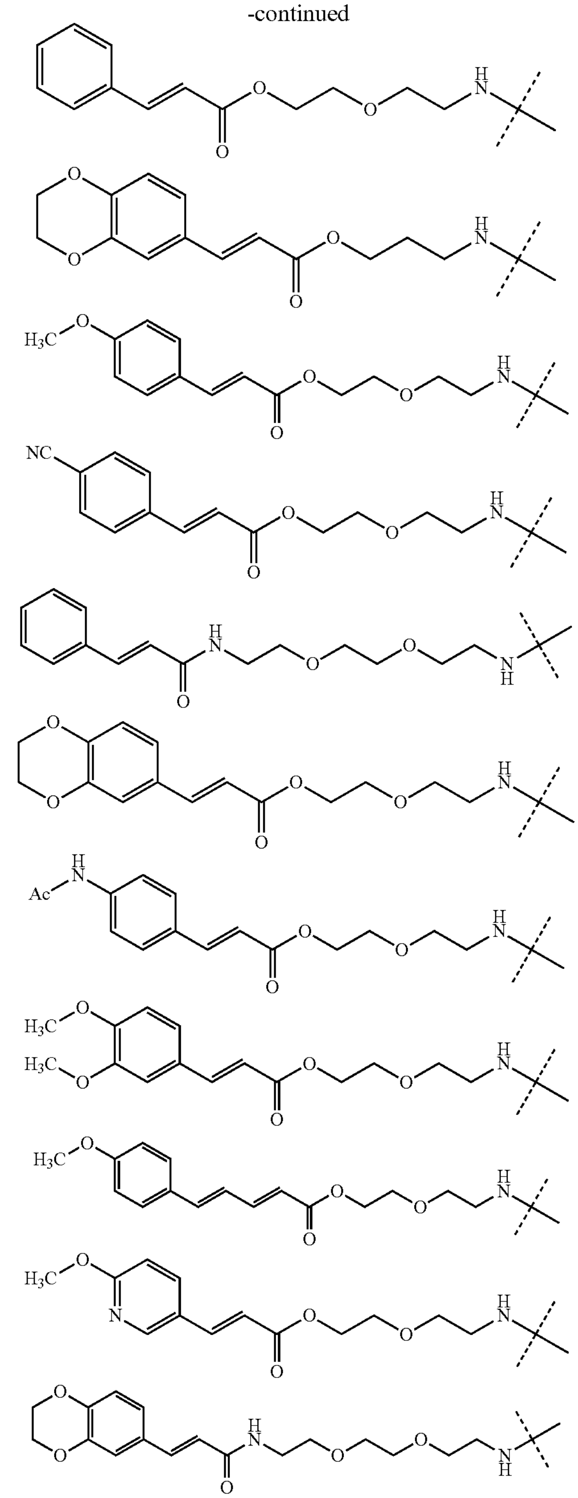

[1a-4-4-2] Regarding the combination of Ar, p, —X—, and -A- in the alginic acid derivative of Embodiment [1a], particularly preferably Ar is a phenyl group, 2-pyridyl group or 5-pyridyl group (wherein the phenyl group, 2-pyridyl group or 5-pyridyl group may have any 1 to 3 groups selected from a cyano group, a methoxy group, and an N-acetylamino group substituted for a hydrogen atom on the ring, and when two methoxy groups are substituted adjacent to one another on the phenyl group, 2-pyridyl group or 5-pyridyl group, they may form a 1,4-dioxane ring by binding between carbon atoms from which any one hydrogen atom each has been removed in the methyl groups of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a phenyl group, 4-methoxyphenyl group, 3,4-dimethoxyphenyl group, 4-(N-acetylamino)phenyl group, 4-cyanophenyl group, 2,3-dihydrobenzo[b][1,4]dioxinyl group, 2-pyridyl group or 2-methoxy-5-pyridyl group;

p is the integer 1 or 2;

—X— is —O— or —NH—; and

-A- is formula (AL-1-1), (AL-2-1) or (AL-2-2) in Embodiment [1a-3] [excluding the parts outside the wavy lines at both ends of each formula]; and for example, the combination of Ar, p, —X—, and -A- is as shown in the following partial structural formula [excluding the part to the right of the wavy line in each formula]:

[C32]

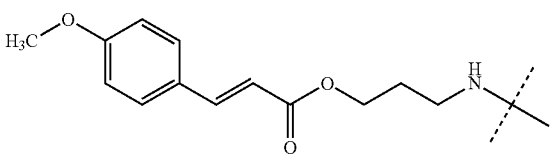

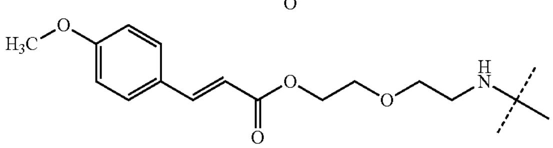

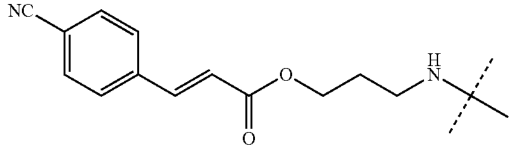

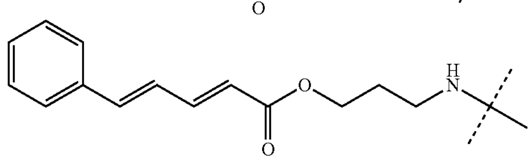

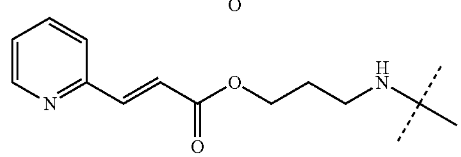

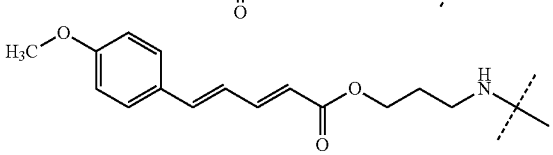

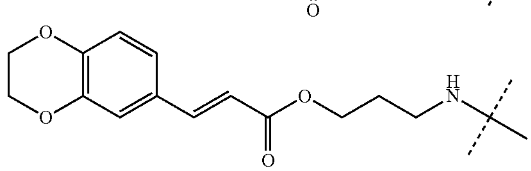

-continued

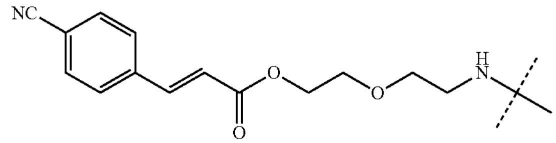

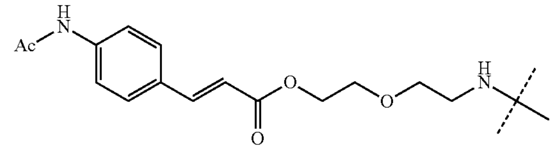

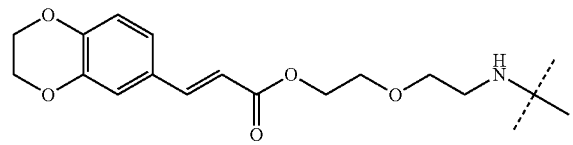

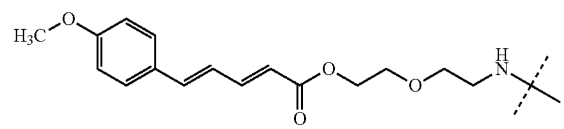

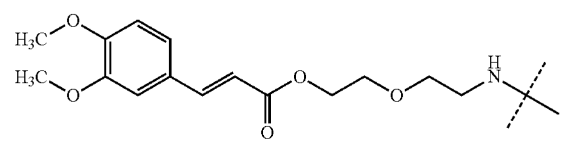

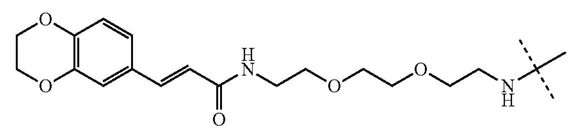

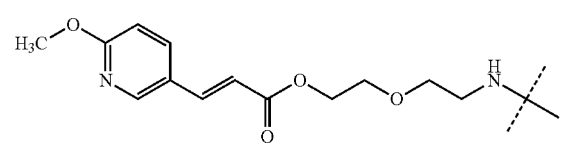

[1a-4-4a] Regarding the combination of Ar, p, —X—, and -A- in the alginic acid derivative of Embodiment [1a], particularly preferably Ar is a phenyl group (wherein the phenyl group may have any 1 to 3 groups selected from a fluorine atom and a trifluoromethyl group substituted for a hydrogen atom on the ring) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a phenyl group, 4-fluorophenyl group or 4-(trifluoromethyl)phenyl group;

p is the integer 1;

—X— is —O— or —NH—; and

-A- is formula (AL-1-1), (AL-2-1) or (AL-2-2) in Embodiment [1-3] [excluding the parts outside the wavy lines at both ends of each formula]; and for example, the combination of Ar, p, —X—, and -A- is as shown in the following partial structural formula [excluding the part to the right of the wavy line in each formula]:

[C33]

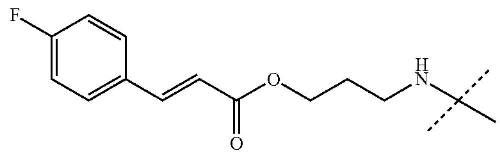

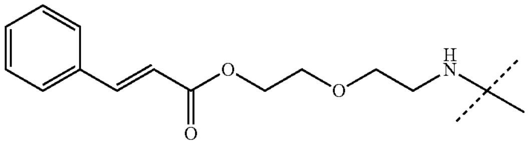

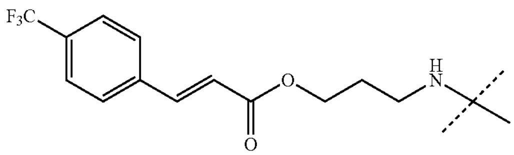

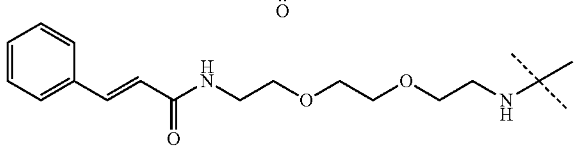

[1a-4-4b] Regarding the combination of Ar, p, —X—, and -A- in the alginic acid derivative of the Embodiment [1a], particularly preferably Ar is a phenyl group or 2-pyridyl group (wherein the phenyl group or 2-pyridyl group may have any 1 to 3 groups selected from a cyano group and a methoxy group substituted for a hydrogen atom on the ring, and when two methoxy groups are substituted adjacent to one another on the phenyl group or 2-pyridyl group, they may form a 1,4-dioxane ring by binding between carbon atoms from which any one hydrogen atom each has been removed in the methyl groups of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a phenyl group, 4-methoxyphenyl group, 4-cyanophenyl group, 2,3-dihydrobenzo[b][1,4]dioxinyl group or 2-pyridyl group;

p is the integer 1 or 2;

—X— is —O—; and

-A- is formula (AL-1-1) or (AL-2-1) in Embodiment [1-3], [excluding the parts outside the wavy lines at both ends of each formula]; and for example, the combination of Ar, p, —X—, and -A- is as shown in the following partial structural formula [excluding the part to the right of the wavy line in each formula]:

[C34]

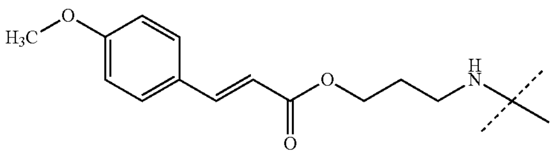

-continued

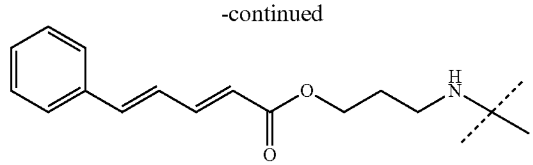

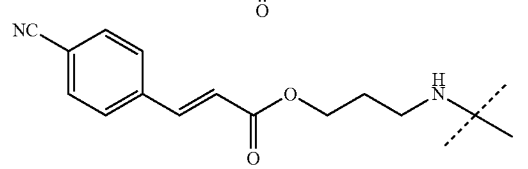

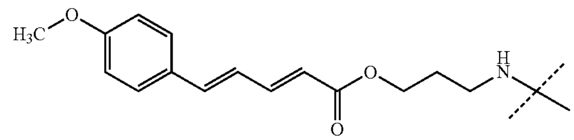

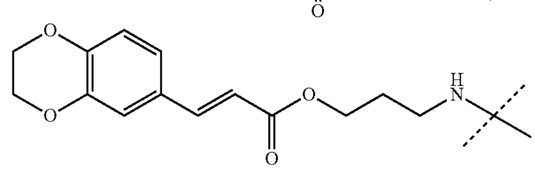

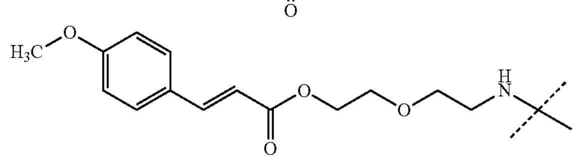

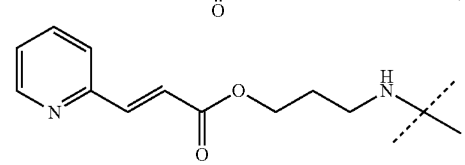

[1a-4-4c] Regarding the combination of Ar, p, —X—, and -A- in the alginic acid derivative of Embodiment [1a], particularly preferably Ar is a phenyl group or 5-pyridyl group (wherein the phenyl group or 5-pyridyl group may have any 1 to 3 groups selected from a cyano group, a methoxy group and an N-acetylamino group substituted for a hydrogen atom on the ring, and when two methoxy groups are substituted adjacent to one another on the phenyl group or 5-pyridyl group, they may form a 1,4-dioxane ring by binding between carbon atoms from which any one hydrogen atom each has been removed in the methyl groups of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a 4-cyanophenyl group, 4-methoxyphenyl group, 3,4-dimethoxyphenyl group, 4-(N-acetylamino)phenyl group, 2,3-dihydrobenzo[b][1,4]dioxinyl group or 2-methoxy-5-pyridyl group;

p is the integer 1 or 2;

—X— is —O— or —NH—; and

-A- is formula (AL-2-1) or (AL-2-2) in Embodiment [1a-3], [excluding the parts outside the wavy lines at both ends of each formula]; and for example, the combination of Ar, p, —X—, and -A- is as shown in the following partial structural formulae [excluding the part to the right of the wavy line in each formula]:

[C35]

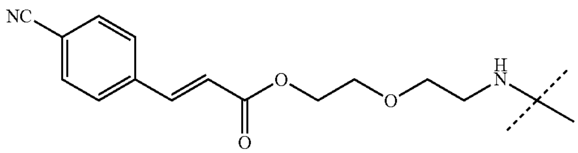

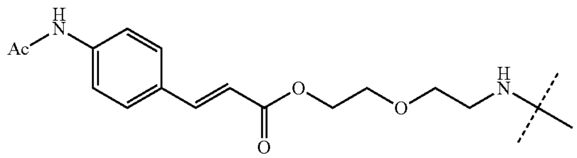

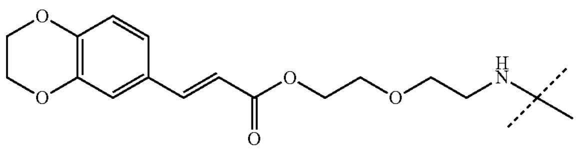

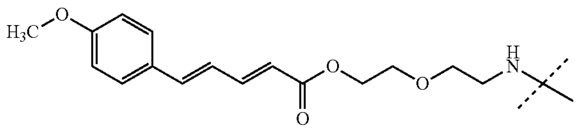

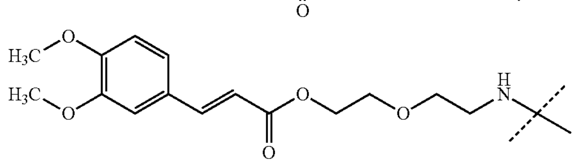

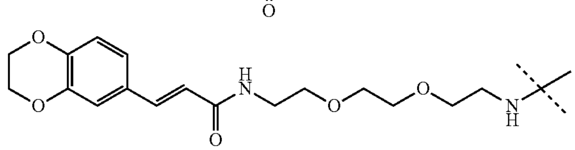

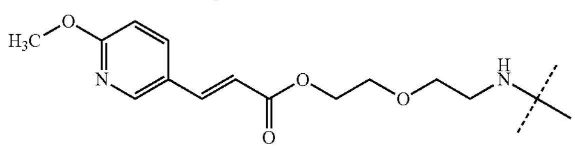

-continued

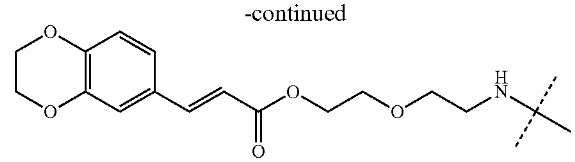

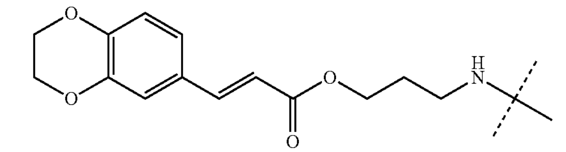

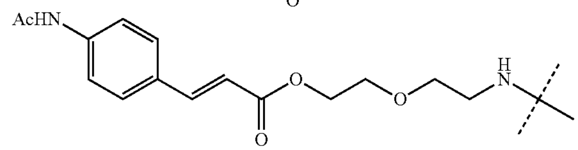

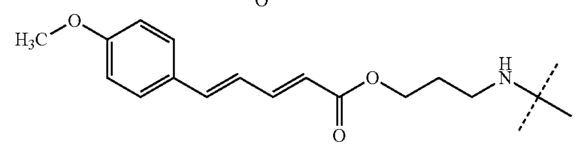

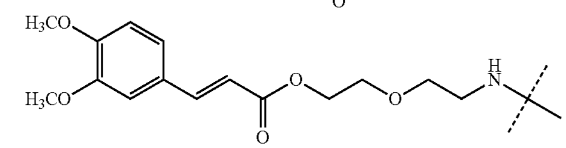

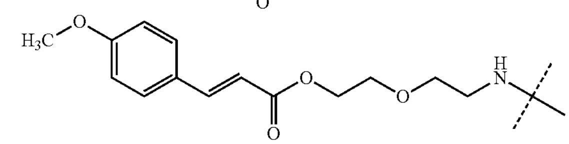

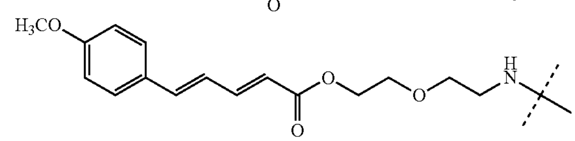

[1a-4-5] In the alginic acid derivative of Embodiment [1a], the following partial structural formulae [excluding the part to the right of the wavy line in each formula] are most preferred:

[C36]

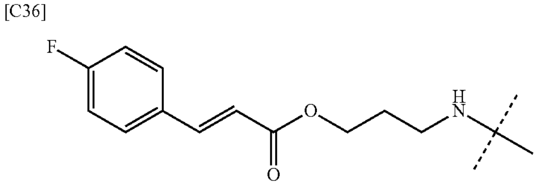

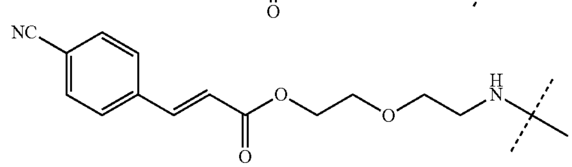

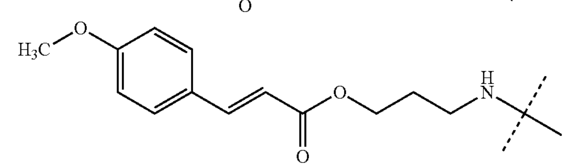

[1b] Embodiment 1b is a preferred embodiment of Embodiment [1], and specifically is an alginic acid derivative including a photoreactive group represented by formula (I) below introduced into any one or more carboxyl groups of alginic acid:

[C37]

(I)

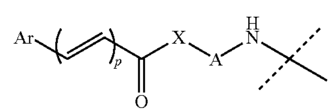

[in formula (I), Ar represents a $C_{6-10}$ aryl group (wherein the $C_{6-10}$ aryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —$NH(C_{1-6}$ alkyl), and —$N(C_{1-6}$ alkyl$)_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the $C_{6-10}$ aryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —NHR$^G$ group (in which R$^G$ in the —NHR$^G$ group is a $C_{2-7}$ alkanoyl group or $C_{1-6}$ alkylsulfonyl group) are substituted adjacent to one another on the $C_{6-10}$ aryl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— represents —O—,

-A- represents formulae (AL-1) to (AL-4) [excluding the parts outside the wavy lines at both ends of each formula]:

[C38]

(AL-1)

(AL-2)

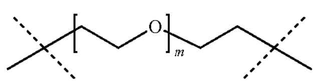

(AL-3)

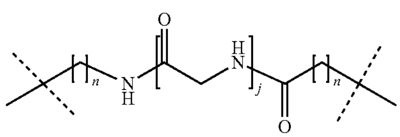

(AL-4)

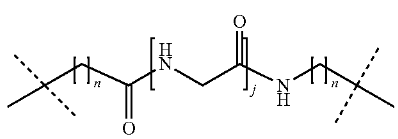

(in formulae (AL-1) to (AL-4), n represents an integer from 1 to 18, m represents an integer from 1 to 9 and j represents an integer from 0 to 9;

a hydrogen atom of a methylene group (—$CH_2$—) in formulae (AL-1) to (AL-4) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —NR$^a$R$^b$, (R$^a$R$^b$N)—$C_{1-6}$ alkyl or (R$^a$R$^b$N)C(═O)—$C_{1-6}$ alkyl group (in which each of R$^a$ and R$^b$ in the NR$^a$R$^b$, (R$^a$R$^b$N)—$C_{1-6}$ alkyl or (R$^a$R$^b$N)C(═O)—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formulae (AL-1) to (AL-4), a $C_{3-8}$ cycloalkyl ring may be formed by binding between carbon atoms from which any one hydrogen atom each has been removed in the alkyl groups of the two $C_{1-6}$ alkyl groups; and the —NH— group in formula (AL-3) or formula (AL-4) may also form a non-aromatic heterocyclic ring with these substituents which have been substituted on adjacent carbon atoms)] (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1b-1] In the alginic acid derivative of Embodiment [1b], preferably, Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —NR$^A$R$^B$ group (in which each of R$^A$ and R$^B$ in —NR$^A$R$^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —NHR$^G$ group (in which R$^G$ in the —NHR$^G$ group is a $C_{2-7}$ alkanoyl group or $C_{1-6}$ alkylsulfonyl group) are substituted adjacent to one another on the phenyl group, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl) oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar);

More preferably, Ar is a phenyl group (wherein the phenyl group may have any 1 to 3 groups selected from a cyano group, a fluorine atom, a trifluoromethyl group, and a methoxy group substituted for hydrogen atom on the ring, and when two methoxy groups are substituted adjacent to one another on the phenyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and Ar is for example a phenyl group, 4-fluorophenyl group, 4-(trifluoromethyl)phenyl group, 4-methoxyphenyl group, 4-cyanophenyl group or 2,3-dihydrobenzo[b][1,4]dioxinyl group or the like.

[1b-1-1] In the alginic acid derivative of Embodiment [1b-1], Ar is more preferably a phenyl group (wherein the phenyl group may have any 1 to 3 groups selected from a cyano group, a fluorine atom, a trifluoromethyl group, a methoxy group, and an N-acetylamino group substituted for a hydrogen atom on the ring, and when two methoxy groups are substituted adjacent to one another on the phenyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and Ar is for example a phenyl group, 4-fluorophenyl group, 4-(trifluoromethyl)phenyl group, 4-methoxyphenyl group, 3,4-dimethoxyphenyl group, 4-(N-acetylamino)phenyl group, 4-cyanophenyl group or 2,3-dihydrobenzo[b][1,4-dioxinyl group or the like.

[1b-1-2] In the alginic acid derivative of Embodiment [1b-1], Ar is more preferably a phenyl group (wherein the phenyl group may have any 1 to 3 groups selected from a cyano group, a methoxy group, and an N-acetylamino group substituted for a hydrogen atom on the ring, and when two methoxy groups are substituted adjacent to one another on the phenyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and Ar is for example a phenyl group, 4-methoxyphenyl group, 3,4-dimethoxyphenyl group, 4-cyanophenyl group, 4-(N-acetylamino)phenyl group or 2,3-dihydrobenzo[b][1,4]dioxinyl group or the like.

[1b-1a] In the alginic acid derivative of Embodiment [1b], Ar is preferably a $C_{6-10}$ aryl group (wherein the $C_{6-10}$ aryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and $C_{1-6}$ alkyl group) (provided that —$NH_2$, —NH($C_{1-6}$ alkyl), and —N($C_{1-6}$ alkyl)$_2$ groups are excluded) substituted for a hydrogen atom on the ring)) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar);

More preferably Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and a $C_{1-6}$ alkyl group) (provided that —$NH_2$, —NH($C_{1-6}$ alkyl), and —N($C_{1-6}$ alkyl)$_2$ groups are excluded)) substituted for a hydrogen atom on the ring) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar);

Still more preferably, Ar is a phenyl group (wherein the phenyl group may have any 1 to 3 groups selected from a fluorine atom and a trifluoromethyl group substituted for a hydrogen atom on the ring) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom in the phenyl group of this Ar); and Ar is a 4-fluorophenyl group or 4-(trifluoromethyl)phenyl group or the like for example.

[1b-1b] In the alginic acid derivative of Embodiment [1b], preferably, Ar is a $C_{6-10}$ aryl group (wherein the $C_{6-10}$ aryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar);

More preferably, Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl) oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar);

Still more preferably Ar is a phenyl group (wherein the phenyl group may have any 1 to 3 groups selected from a cyano group and a methoxy group substituted for a hydrogen atom on the ring, and when two methoxy groups are substituted adjacent to one another on the phenyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and Ar is a phenyl group, 4-methoxyphenyl group, 4-cyanophenyl group or 2,3-dihydrobenzo[b][1,4]dioxinyl group or the like for example.

[1b-1c] In the alginic acid derivative of the Embodiment [1b-1b], still more preferably Ar is a phenyl group (wherein the phenyl group may have any 1 to 3 groups selected from a cyano group, a methoxy group and an N-acetylamino substituted for a hydrogen atom on the ring, and when two methoxy groups are substituted adjacent to one another on the phenyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and Ar is a 4-cyanophenyl group, 4-methoxyphenyl group, 3,4-dimethoxyphenyl group, 4-(N-acetylamino)phenyl group or 2,3-dihydrobenzo[b][1,4]dioxinyl group or the like for example.

[1b-2] In the alginic acid derivative of Embodiment [1b], the preferred, more preferred, still more preferred and particularly preferred groups used as -A- are as defined in Embodiment [1-3].

[1b-2a] In the alginic acid derivative of Embodiment [1b-2], formula (AL-1-1) or (AL-2-1) [excluding the parts outside the wavy lines at both ends of each formula] is particularly preferred as -A-.

[1b-2-1] In the alginic acid derivative of Embodiment [1b], the preferred, more preferred, still more preferred and particularly preferred numerical ranges of n, m and j in the formulae (AL-1) to (AL-4) as -A- are as defined in Embodiment [1-3-1].

[1b-2-2] In the alginic acid derivative of Embodiment [1b], preferred embodiments of formulae (AL-3) and (AL-4), which are included in -A-, are as defined in Embodiment [1-3-2].

[1b-2-2-1] The preferred, more preferred, still more preferred and particularly preferred numerical ranges of n, m and j in formula (AL-3-1) or formula (AL-4-1) of Embodiment [1b-2-2] are as defined in Embodiment [1-3-2-1].

[1b-3-1] Regarding the combination of Ar, p, —X—, and -A- in the alginic acid derivative of Embodiment [1b], preferably Ar is a $C_{6-10}$ aryl group (wherein the $C_{6-10}$ aryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O—; and

-A- is formula (AL-1) or (AL-2) in Embodiment [1b-2] [excluding the parts outside the wavy lines at both ends of each formula] (wherein n in formula (AL-1) is an integer from 1 to 10 and m in formula (AL-2) is an integer from 1 to 7;

a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(=O)—$C_{1-6}$ alkyl group (in which each of $R^a$ and $R^b$ in the $NR^aR^b$, ($R^aR^b$N)—$C_{1-6}$ alkyl or ($R^aR^b$N)C(=O)—$C_{1-6}$ alkyl group is each independently a group selected from a hydrogen atom, a $C_{1-6}$ alkyl group, a $C_{2-7}$ alkanoyl group, and a $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1b-3-1a] Regarding the combination of Ar, p, —X—, and -A- in the alginic acid derivative of Embodiment [1b], preferably Ar is a $C_{6-10}$ aryl group (wherein the $C_{6-10}$ aryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and a $C_{1-6}$ alkyl group) (provided that —$NH_2$, —NH($C_{1-6}$ alkyl), and —N($C_{1-6}$ alkyl)$_2$ groups are excluded) substituted for a hydrogen atom on the ring);

p is the integer 1;

—X— is —O—; and

-A- is formula (AL-1) or (AL-2) in Embodiment [1b-2] [excluding the parts outside the wavy lines at both ends of each formula] (wherein n in formula (AL-1) is an integer from 1 to 10 and m in formula (AL-2) is an integer from 1 to 7;

a hydrogen atom of a methylene group (—$CH_2$—) in formula (AL-1) or formula (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the $NR^aR^b$, ($R^aR^b$N)—$C_{1-6}$ alkyl or ($R^aR^b$N)C(═O)—$C_{1-6}$ alkyl group is each independently a group selected from a hydrogen atom, a $C_{1-6}$ alkyl group, a $C_{2-7}$ alkanoyl group, and a $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1b-3-1b] Regarding the combination of Ar, p, —X—, and -A- in the alginic acid derivative of Embodiment [1b], preferably Ar is a $C_{6-10}$ aryl group (wherein the $C_{6-10}$ aryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl) and —N($C_{1-6}$ alkyl)$_2$ groups are excluded)) substituted for a hydrogen atom on the ring; and when a $C_{1-6}$ alkyl group and a $C_{1-6}$ alkoxy group or two $C_{1-6}$ alkoxy groups are substituted adjacent to one other on the $C_{6-10}$ aryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2

—X— is —O—; and

-A- is formula (AL-1) or (AL-2) in Embodiment [1b-2] [excluding the parts outside the wavy lines at both ends of each formula] (wherein n in formula (AL-1) is an integer from 1 to 10 and m in formula (AL-2) is an integer from 1 to 7;

a hydrogen atom of a methylene group (—$CH_2$—) in formula (AL-1) or formula (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the $NR^aR^b$, ($R^aR^b$N)—$C_{1-6}$ alkyl or ($R^aR^b$N)C(═O)—$C_{1-6}$ alkyl group is each independently a group selected from a hydrogen atom, a $C_{1-6}$ alkyl group, a $C_{2-7}$ alkanoyl group, and a $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1b-3-1c] Regarding the combination of Ar, p, —X—, and -A- in the alginic acid derivative of Embodiment [1b], preferably Ar is a $C_{6-10}$ aryl group (wherein the $C_{6-10}$ aryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring; and when a $C_{1-6}$ alkyl group and a $C_{1-6}$ alkoxy group or two $C_{1-6}$ alkoxy groups are substituted adjacent to one other on the $C_{6-10}$ aryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2

—X— is —O—; and

-A- is formula (AL-1) or (AL-2) in Embodiment [1b-2] [excluding the parts outside the wavy lines at both ends of each formula] (wherein n in formula (AL-1) is an integer from 1 to 10 and m in formula (AL-2) is an integer from 1 to 7;

a hydrogen atom of a methylene group (—$CH_2$—) in formula (AL-1) or formula (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the $NR^aR^b$, ($R^aR^b$N)—$C_{1-6}$ alkyl or ($R^aR^b$N)C(═O)—$C_{1-6}$ alkyl group is each independently a group selected from a hydrogen atom, a $C_{1-6}$ alkyl group, a $C_{2-7}$ alkanoyl group, and a $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formula (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups) (with the proviso that, when Ar is a phenyl group, p is 1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar).

[1b-3-2] Regarding the combination of Ar, p, —X—, and -A- in the alginic acid derivative of Embodiment [1b], more preferably Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, a $C_{1-6}$ alkyl group, a $C_{2-7}$ alkanoyl group, and a $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl) oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O—; and

-A- is formula (AL-1) or (AL-2) in Embodiment [1b-2] [excluding the parts outside the wavy lines at both ends of each formula] (wherein n in formula (AL-1) is an integer from 2 to 6 and m in formula (AL-2) is an integer from 1 to 3) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar).

[1b-3-2a] Regarding the combination of Ar, p, —X—, and -A- in the alginic acid derivative of Embodiment [1b], more preferably Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom and a $C_{1-6}$ alkyl group (provided that —$NH_2$, —NH ($C_{1-6}$ alkyl), and —N($C_{1-6}$ alkyl)$_2$ groups are excluded)) substituted for a hydrogen atom on the ring);

p is the integer 1;

—X— is —O—; and

-A- is formula (AL-1) or (AL-2) in Embodiment [1b-2] [excluding the parts outside the wavy lines at both ends of each formula] (wherein n in formula (AL-1) is an integer from 2 to 6 and m in formula (AL-2) is an integer from 1 to 3) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar).

[1b-3-2b] Regarding the combination of Ar, p, —X—, and -A- in the alginic acid derivative of Embodiment [1b], more preferably Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, a $C_{1-6}$ alkyl group, a $C_{2-7}$ alkanoyl group, and a $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl) oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O—; and

-A- is formula (AL-1) or (AL-2) in Embodiment [1b-2] [excluding the parts outside the wavy lines at both ends of each formula] (wherein n in formula (AL-1) is an integer from 2 to 6 and m in formula (AL-2) is an integer from 1 to 3) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar).

[1b-3-2c] Regarding the combination of Ar, p, —X—, and -A- in the alginic acid derivative of Embodiment [1b], more preferably Ar is a phenyl group (wherein the phenyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and $—NR^AR^B$ group (in which each of $R^A$ and $R^B$ in $—NR^AR^B$ is each independently a group selected from a hydrogen atom, a $C_{1-6}$ alkyl group, a $C_{2-7}$ alkanoyl group, and a $C_{1-6}$ alkylsulfonyl group (provided that $—NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and $C_{1-6}$ alkoxy group or two $C_{1-6}$ alkoxy groups are substituted adjacent to one other on the phenyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group, and a $—NHR^G$ group (in which $R^G$ in the $—NHR^G$ group is a $C_{2-7}$ alkanoyl group or $C_{1-6}$ alkylsulfonyl group) are substituted adjacent to one another on the phenyl group, a carbon atom from which any one hydrogen atom has been removed in the alkyl group of the $C_{1-6}$ alkoxy group may bind with the nitrogen atom from which the hydrogen atom has been removed in the $—NHR^G$ group to form a 3-N—($C_{2-7}$ alkanoyl)oxazolidine ring, 3-N—($C_{1-6}$ alkylsulfonyl) oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

p is the integer 1 or 2;

—X— is —O—; and

-A- is formula (AL-1) or (AL-2) in Embodiment [1a-3] [excluding the parts outside the wavy lines at both ends of each formula] (wherein n in formula (AL-1) is an integer from 2 to 6 and m in formula (AL-2) is an integer from 1 to 3) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar).

[1b-3-3] Regarding the combination of Ar, p, —X—, and -A- in the alginic acid derivative of Embodiment [1b], still more preferably Ar is a phenyl group (wherein the phenyl group may have any 1 to 3 groups selected from a cyano group, a fluorine atom, a trifluoromethyl group, and a methoxy group substituted for a hydrogen atom on the ring, and when two methoxy groups are substituted adjacent to one another on the phenyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a phenyl group, 4-fluorophenyl group, 4-(trifluoromethyl)phenyl group, 4-methoxyphenyl group, 4-cyanophenyl group or 2,3-dihydrobenzo[b][1,4]dioxinyl group;

p is the integer 1 or 2;

—X— is —O—; and

-A- is formula (AL-1-1) or (AL-2-1) in Embodiment [1b-2] [excluding the parts outside the wavy lines at both ends of each formula]; and for example, the combination of Ar, p, —X—, and -A is as shown in the following partial structural formulae [excluding the part to the right of the wavy line in each formula]:

[C39]

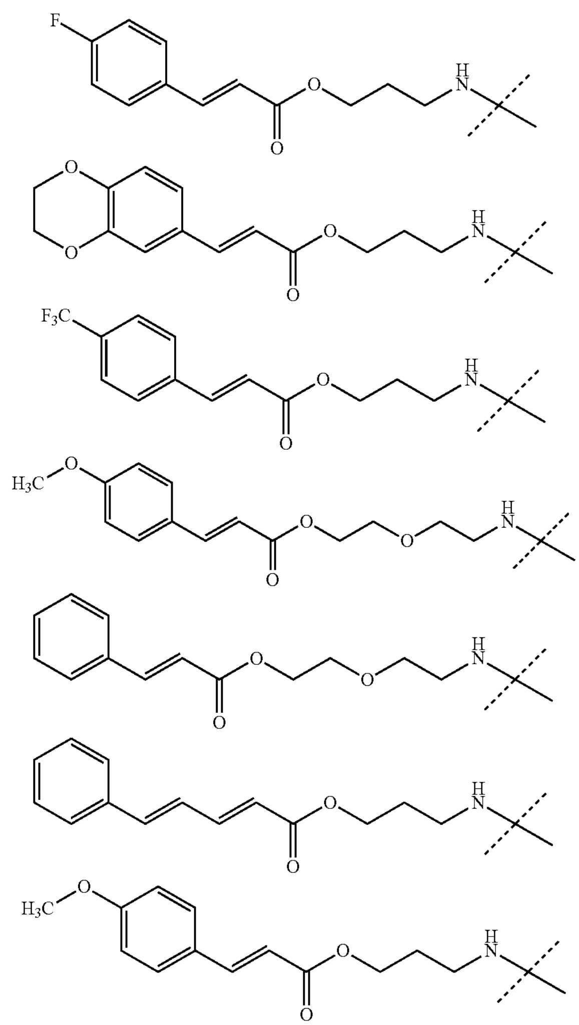

-continued

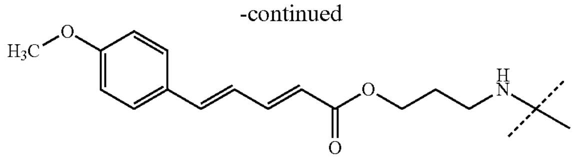

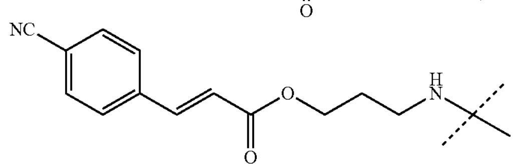

[1b-3-3-1] Regarding the combination of Ar, p, —X—, and -A- in the alginic acid derivative of Embodiment [1b], still more preferably Ar is a phenyl group (wherein the phenyl group may have any 1 to 3 groups selected from a cyano group, a fluorine atom, a trifluoromethyl group, a methoxy group and an N-acetylamino group substituted for a hydrogen atom on the ring, and when two methoxy groups are substituted adjacent to one another on the phenyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a phenyl group, 4-fluorophenyl group, 4-(trifluoromethyl)phenyl group, 4-methoxyphenyl group, 3,4-dimethoxyphenyl group, 5-(N-acetylamino)phenyl group, 4-cyanophenyl group or 2,3-dihydrobenzo[b][1,4]dioxinyl group;

p is the integer 1 or 2;

—X— is —O—; and

-A- is formula (AL-1-1) or (AL-2-1) in Embodiment [1b-2] [excluding the parts outside the wavy lines at both ends of each formula]; and for example, the combination of Ar, p, —X—, and -A is as shown in the following partial structural formulae [excluding the part to the right of the wavy line in each formula]:

[C40]

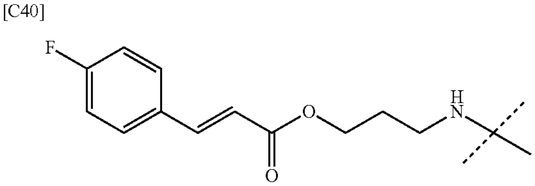

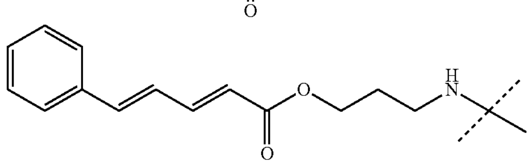

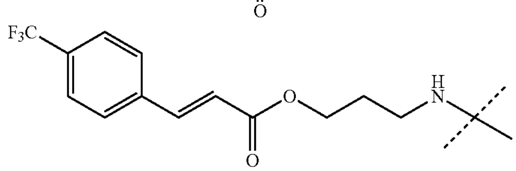

-continued

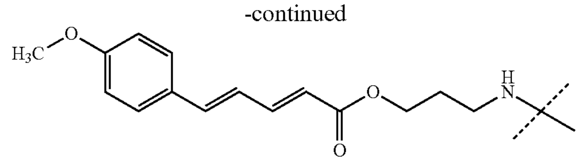

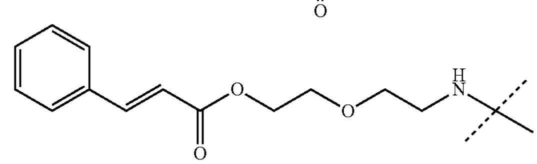

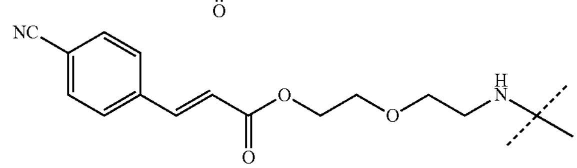

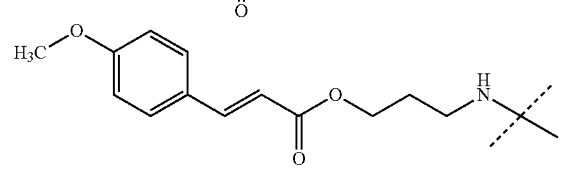

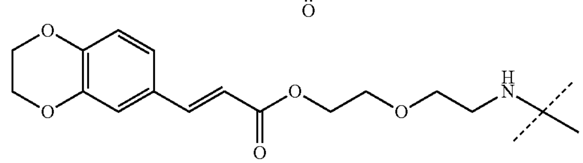

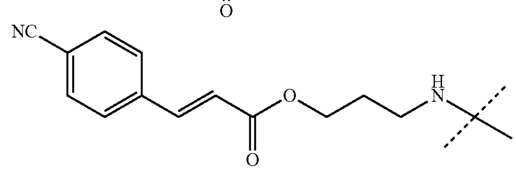

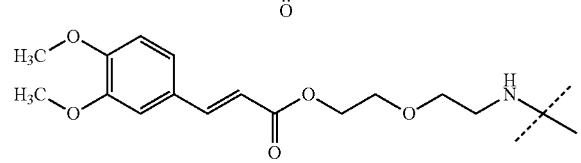

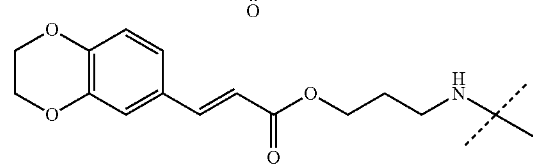

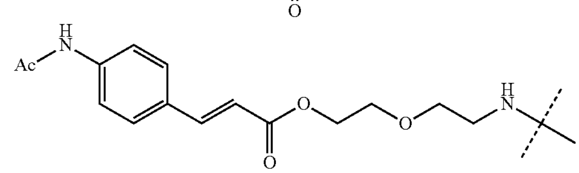

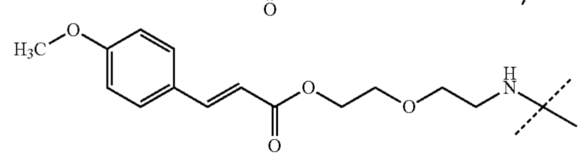

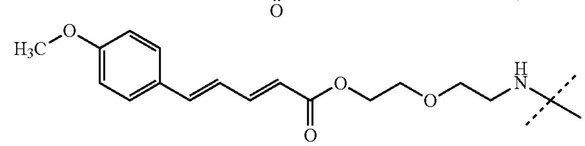

[1b-3-3-2] Regarding the combination of Ar, p, —X—, and -A- in the alginic acid derivative of Embodiment [1b], still more preferably Ar is a phenyl group (wherein the phenyl group may have any 1 to 3 groups selected from a cyano group, a methoxy group, and an N-acetylamino group substituted for a hydrogen atom on the ring, and when two methoxy groups are substituted adjacent to one another on the phenyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a phenyl group, 4-methoxyphenyl group, 3,4-dimethoxyphenyl group, 4-(N-acetylamino)phenyl group, 4-cyanophenyl group, 2,3-dihydrobenzo[b][1,4]dioxinyl group or 2-pyridyl group;

p is the integer 1 or 2;

—X— is —O—; and

-A- is formula (AL-1-1) or (AL-2-1) in Embodiment [1b-2] [excluding the parts outside the wavy lines at both ends of each formula]; and for example, the combination of Ar, p, —X—, and -A is as shown in the following partial structural formulae [excluding the part to the right of the wavy line in each formula]:

[C41]

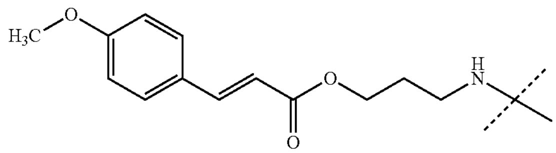

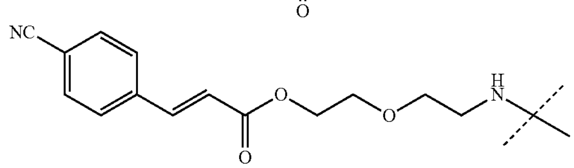

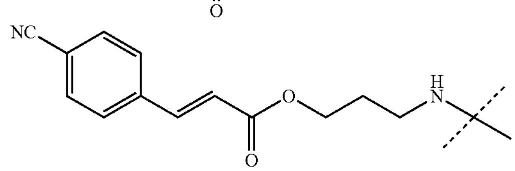

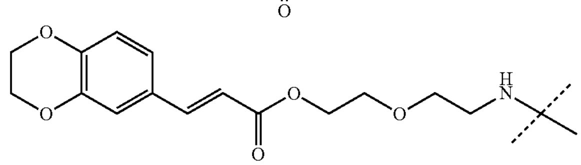

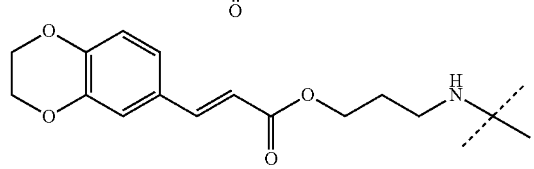

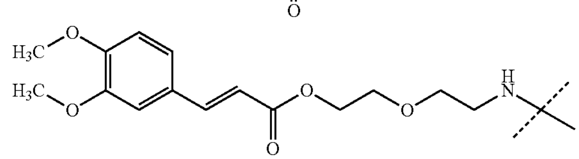

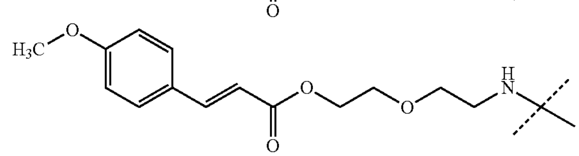

-continued

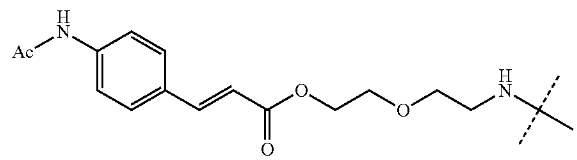

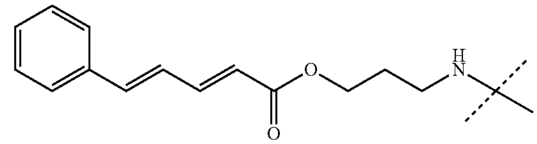

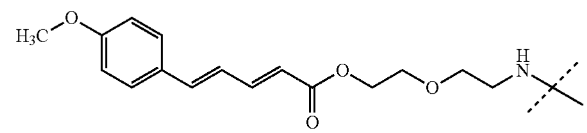

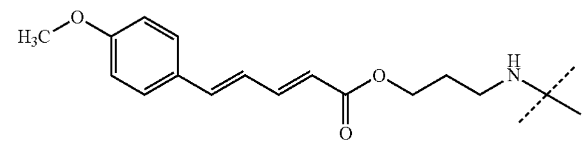

[1b-3-3a] Regarding the combination of Ar, p, —X—, and -A- in the alginic acid derivative of Embodiment [1b], still more preferably Ar is a phenyl group (wherein the phenyl group may have any 1 to 3 groups selected from a fluorine atom and a trifluoromethyl group substituted for a hydrogen atom on the ring) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a phenyl group, 4-fluorophenyl group or 4-(trifluoromethyl)phenyl group;

p is the integer 1;

—X— is —O—; and

-A- is formula (AL-1-1) or (AL-2-1) in Embodiment [1b-2] [excluding the parts outside the wavy lines at both ends of each formula]; and for example, the combination of Ar, p, —X—, and -A is as shown in the following partial structural formulae [excluding the part to the right of the wavy line in each formula]:

[C42]

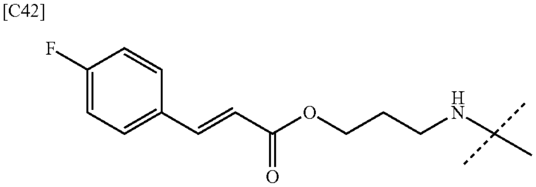

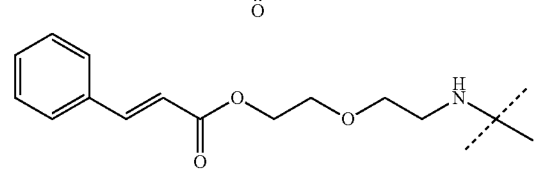

-continued

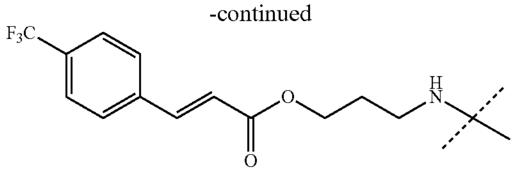

[1b-3-3b] Regarding the combination of Ar, p, —X—, and -A- in the alginic acid derivative of Embodiment [1b], still more preferably Ar is a phenyl group (wherein the phenyl group may have any 1 to 3 groups selected from a cyano group and a methoxy group substituted for a hydrogen atom on the ring, and when two methoxy groups are substituted adjacent to one another on the phenyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a phenyl group, 4-methoxyphenyl group, 4-cyanophenyl group or 2,3-dihydrobenzo[b][1,4]dioxinyl group; p is the integer 1 or 2;

—X— is —O—; and

-A- is formula (AL-1-1) or (AL-2-1) in Embodiment [1b-2] [excluding the parts outside the wavy lines at both ends of each formula]; and for example, the combination of Ar, p, —X—, and -A is as shown in the following partial structural formulae [excluding the part to the right of the wavy line in each formula]:

[C43]

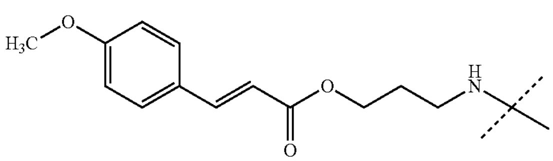

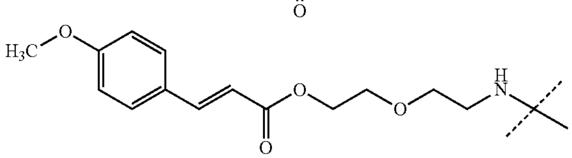

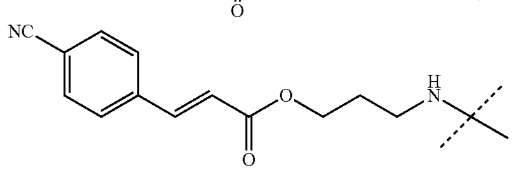

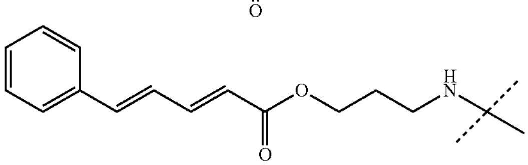

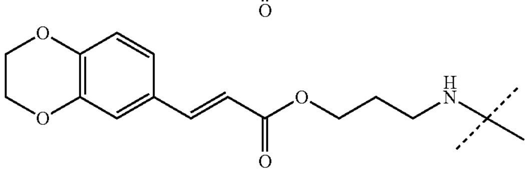

-continued

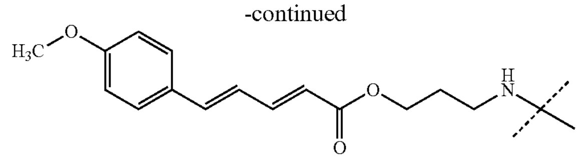

[1b-3-3c] Regarding the combination of Ar, p, —X—, and -A- in the alginic acid derivative of Embodiment [1b], still more preferably Ar is a phenyl group (wherein the phenyl group may have any 1 to 3 groups selected from a cyano group, a methoxy group and an N-acetylamino group substituted for a hydrogen atom on the ring, and when two methoxy groups are substituted adjacent to one another on the phenyl group, they may form a 1,4-dioxane ring by binding between carbon atoms from which any one hydrogen atom each has been removed in the methyl groups of each of the two methoxy groups) (with the proviso that, when Ar is a phenyl group, p is 1, -A- is formula (AL-1) and n=3 in formula (I), the any 1 to 3 groups selected from the group of substituents that are optionally substituted for a hydrogen atom on a phenyl group are substituted for a hydrogen atom on the phenyl group of this Ar); and as a combination of Ar, p, —X—, and -A-, for example Ar is a 4-cyanophenyl group, 4-methoxyphenyl group, 3,4-dimethoxyphenyl group, 4-(N-acetylamino)phenyl group or 2,3-dihydrobenzo[b][1,4]dioxinyl group;

p is the integer 1 or 2;

—X— is —O—; and

-A- is formula (AL-2-1) in Embodiment [1b-2] [excluding the parts outside the wavy lines at both ends of the formula]; and for example, the combination of Ar, p, —X—, and -A is as shown in the following partial structural formulae [excluding the part to the right of the wavy line in each formula]:

[C44]

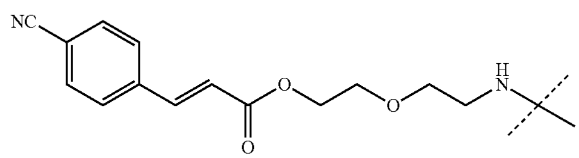

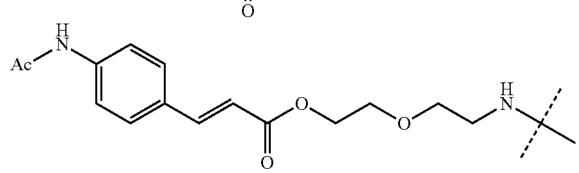

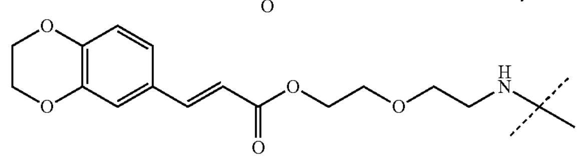

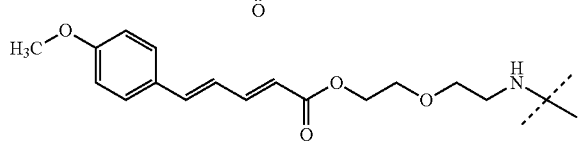

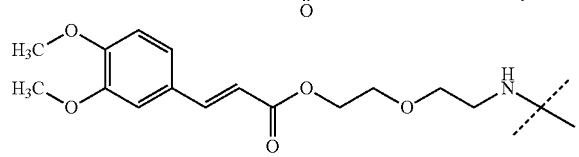

[1b-3-4] The following partial structural formulae [excluding the part to the right of the wavy line in each formula] are particularly preferred in the alginic acid derivative of Embodiment [1b]:

[C45]

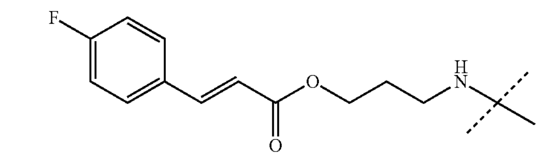

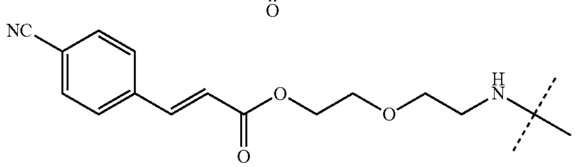

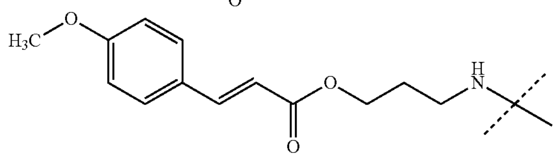

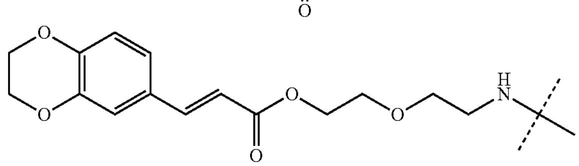

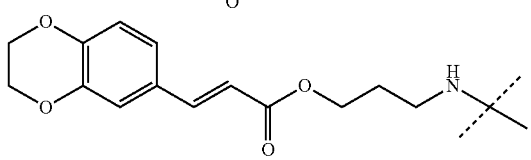

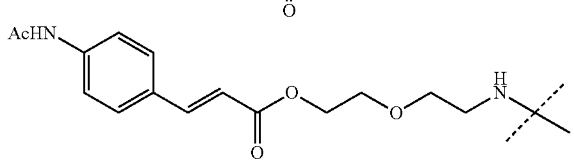

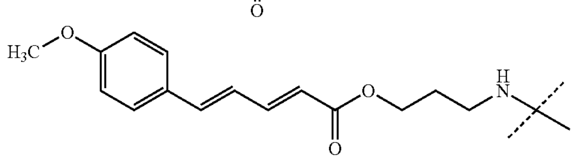

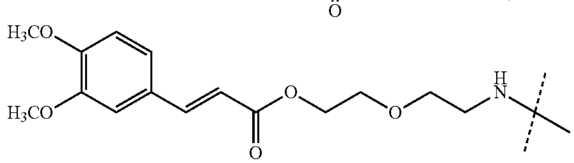

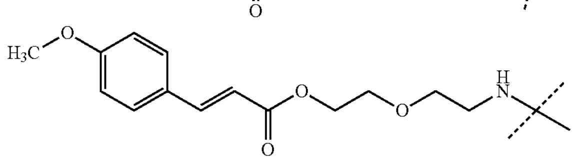

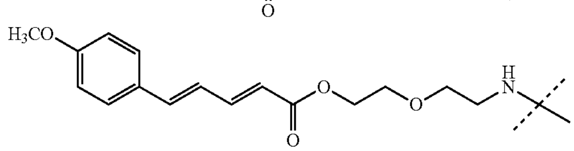

Preferred embodiments of the alginic acid derivative of Embodiment [1] may be formed at will by suitably combining the preferred embodiments of the Embodiment [1], [1a], or [1b] and the definitions of Ar, p, —X—, and -A-.

[2] Embodiment 2 is as follows: an alginic acid derivative according to the Embodiment [1], [1a], or [1b], wherein the introduction rate of the photoreactive group represented by formula (I) is from 0.5% to 30%.

[3] Embodiment 3 is as follows: an alginic acid derivative according to the Embodiment [1], [1a], or [1b], wherein the weight-average molecular weight as measured by gel permeation chromatography of the alginic acid derivative is 100,000 Da to 3,000,000 Da.

[4] Embodiment 4 is as follows: a photocrosslinked alginic acid obtained by exposing an alginic acid derivative according to the Embodiment [1], [1a], or [1b] to light.

[4-1] Embodiment 4-1 is a preferred embodiment of the Embodiment [4], and specifically is a photocrosslinked alginic acid obtained by light exposure of an alginic acid derivative according to the Embodiment [1-4-1], [1-4-1a], [1-4-1b], [1-4-1c], [1a-4-1], [1a-4-1a], [1a-4-1b], or [1a-4-1c]; or more preferably a photocrosslinked alginic acid obtained by light exposure of an alginic acid derivative according to the Embodiment [1-4-2], [1-4-2a], [1-4-2b], [1-4-2c], [1a-4-2], [1a-4-2a], [1a-4-2b], or [1a-4-2c]; or still more preferably a photocrosslinked alginic acid obtained by light exposure of an alginic acid derivative according to the Embodiment [1-4-3], [1-4-3a], [1-4-3b], [1-4-3c], [1a-4-3], [1a-4-3a], [1a-4-3b], or [1a-4-3c]; or particularly preferably a photocrosslinked alginic acid obtained by light exposure of an alginic acid derivative according to the Embodiment [1-4-4a] or [1a-4-4a]; such as for example, a photocrosslinked alginic acid obtained by light exposure of an alginic acid derivative having an introduced photoreactive group selected from the following formulae [excluding the part to the right of the wavy line in each formula]:

[C46]

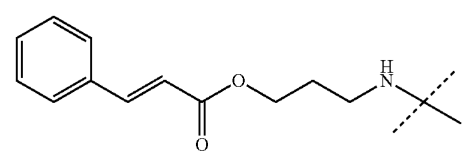

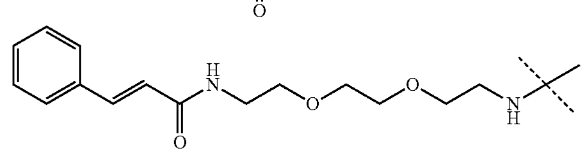

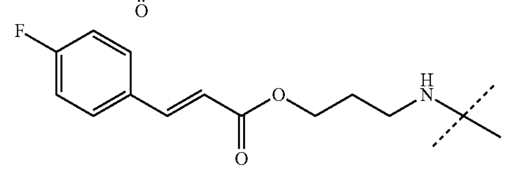

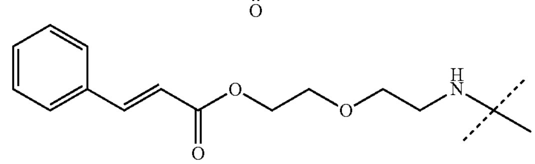

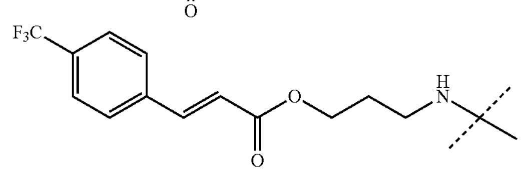

or particularly preferably a photocrosslinked alginic acid obtained by light exposure of an alginic acid derivative according to the Embodiment [1-4-4b] or [1a-4-4b]; such as for example, a photocrosslinked alginic acid obtained by light exposure of an alginic acid derivative having an introduced photoreactive group selected from the following formulae for example [excluding the part to the right of the wavy line in each formula]:

[C47]

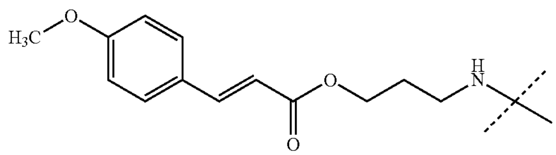

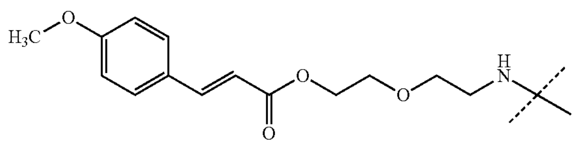

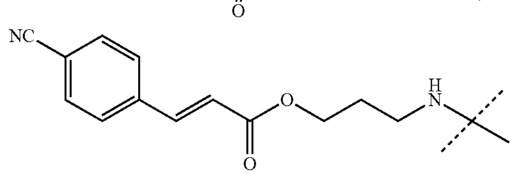

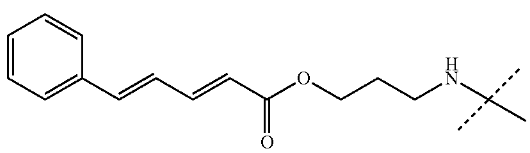

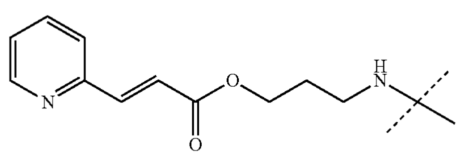

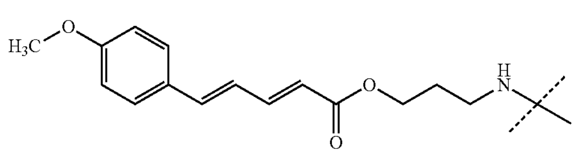

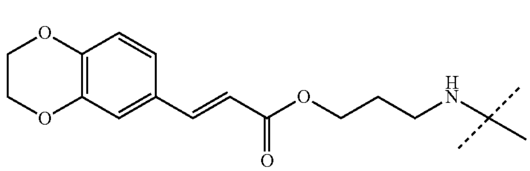

or particularly preferably a photocrosslinked alginic acid derivative obtained by light exposure of an alginic acid derivative according to the Embodiment [1-4-4c] or [1a-4-4c]; such as for example, a photocrosslinked alginic acid obtained by light exposure of an alginic acid derivative having an introduced photoreactive group selected from the following formulae [excluding the part to the right of the wavy line in each formula]:

[C48]

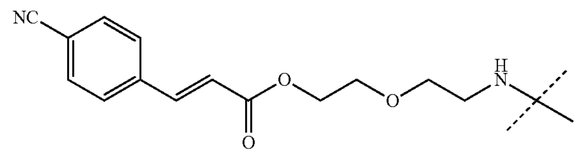

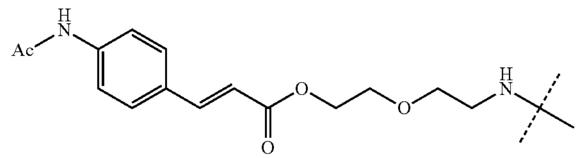

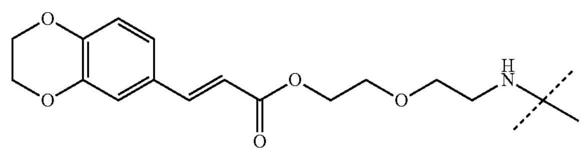

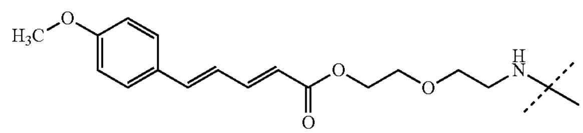

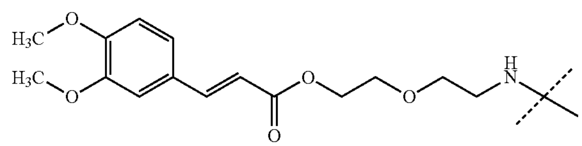

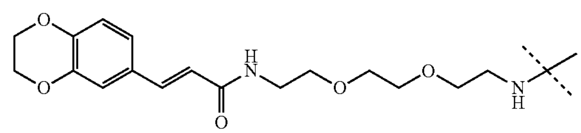

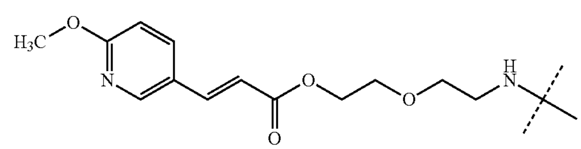

or particularly preferably a photocrosslinked alginic acid obtained by light exposure of an alginic acid derivative according to the Embodiment [1-4-4] or [1a-4-4]; such as for example, a photocrosslinked alginic acid obtained by light exposure of an alginic acid derivative having an introduced photoreactive group selected from the following formulae [excluding the part to the right of the wavy line in each formula]:

[C49]

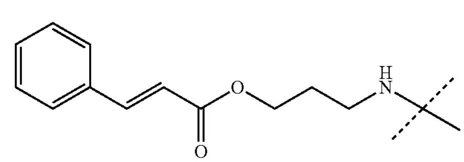

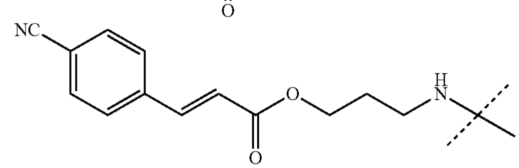

-continued

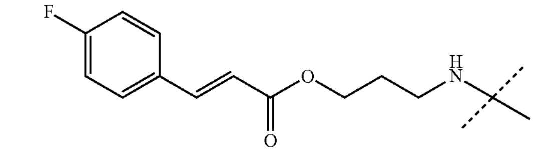

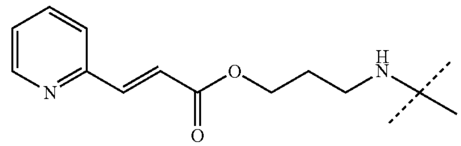

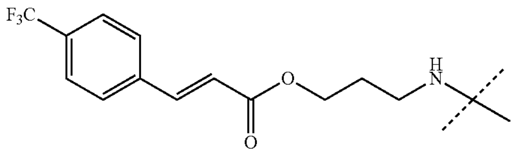

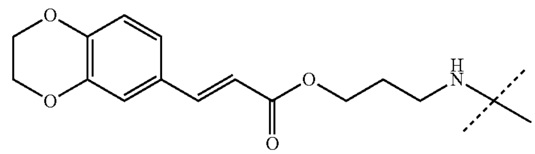

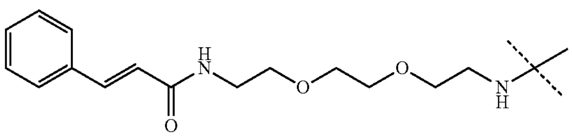

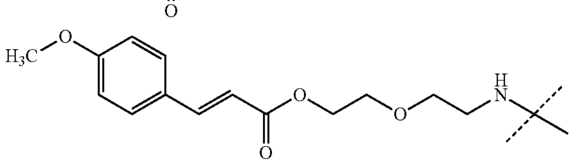

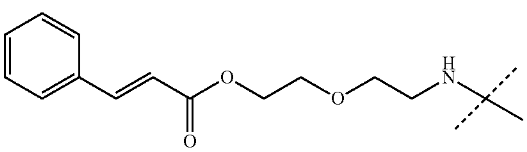

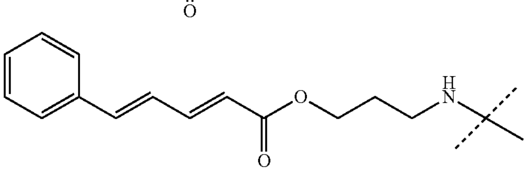

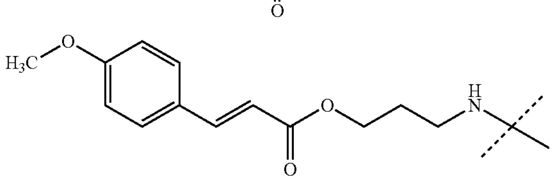

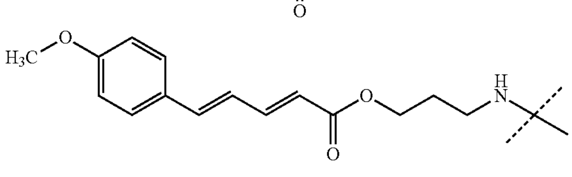

or particularly preferably a photocrosslinked alginic acid obtained by light exposure of an alginic acid derivative according to the Embodiment [1-4-4-1] or [1a-4-4-1]; such as for example, a photocrosslinked alginic acid obtained by light exposure of an alginic acid derivative having an introduced photoreactive group selected from the following formulae [excluding the part to the right of the wavy line in each formula]:

[C50]

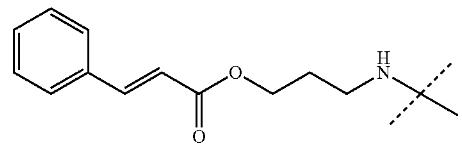

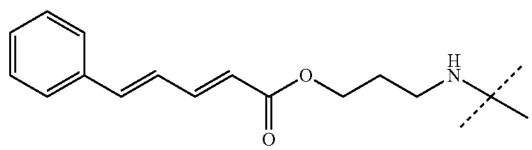

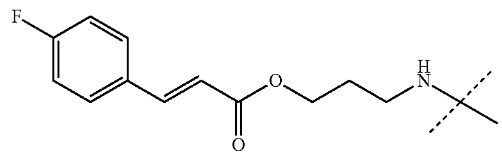

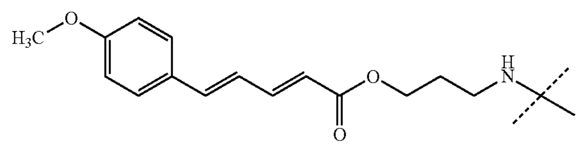

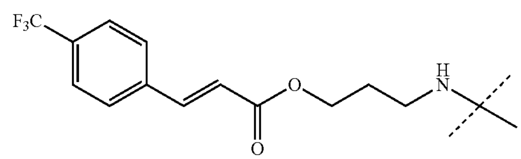

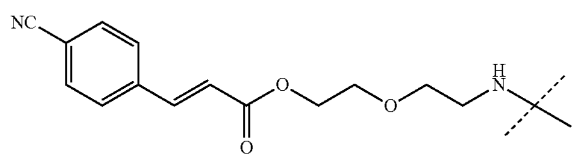

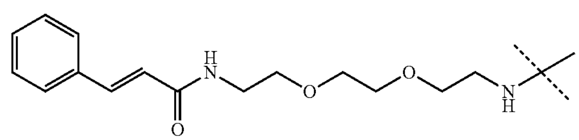

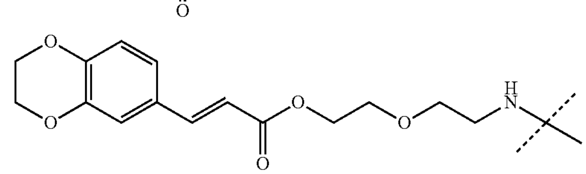

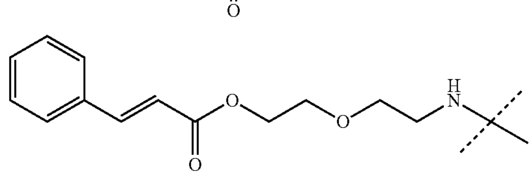

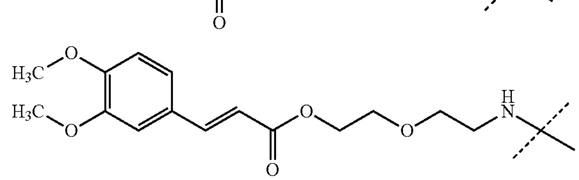

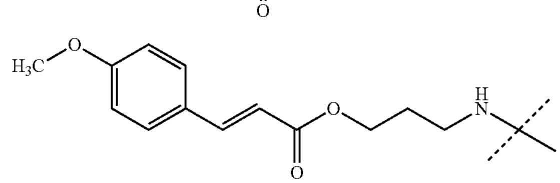

-continued

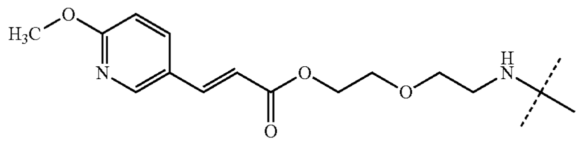

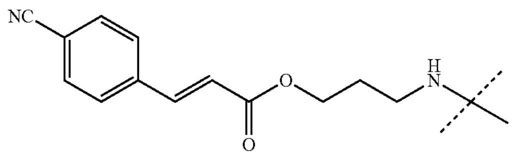

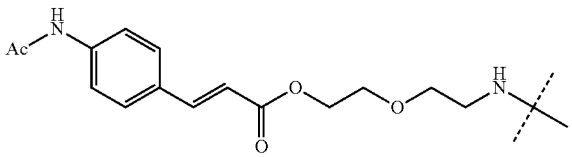

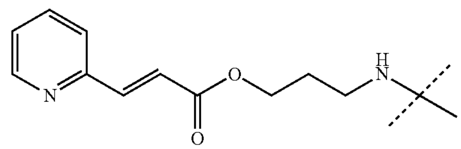

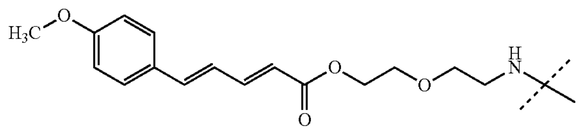

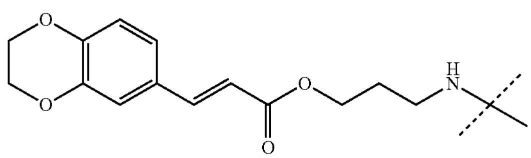

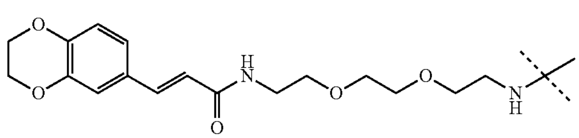

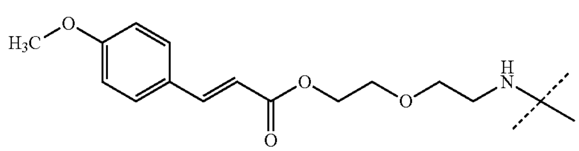

or particularly preferably a photocrosslinked alginic acid obtained by light exposure of an alginic acid derivative according to the Embodiment [1-4-4-2] or [1a-4-4-2]; such as for example, a photocrosslinked alginic acid obtained by light exposure of an alginic acid derivative having an introduced photoreactive group selected from the following formulae [excluding the part to the right of the wavy line in each formula]:

[C51]

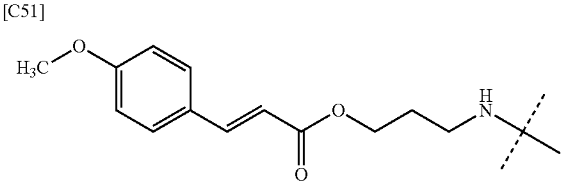

-continued

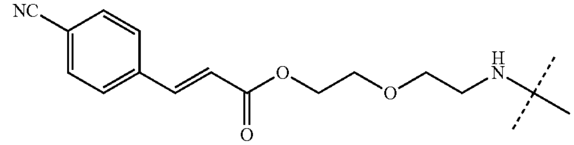

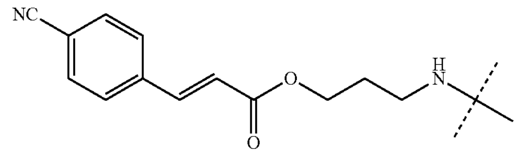

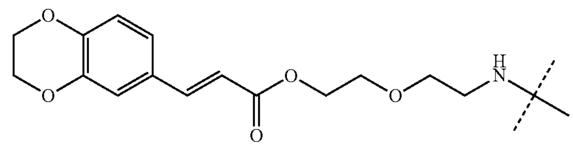

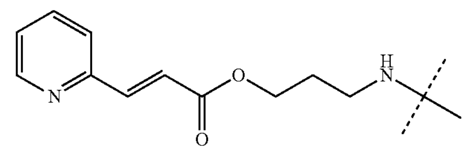

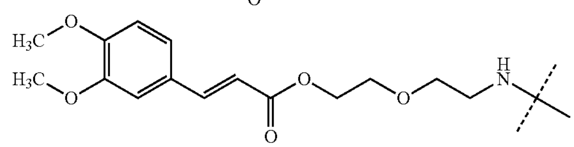

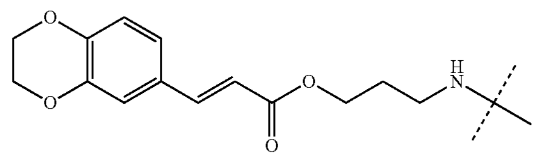

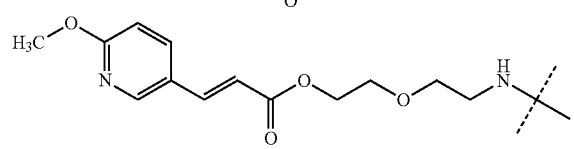

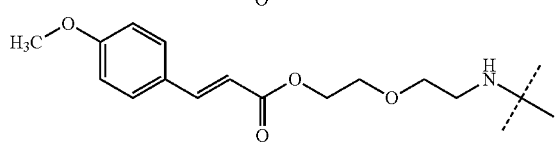

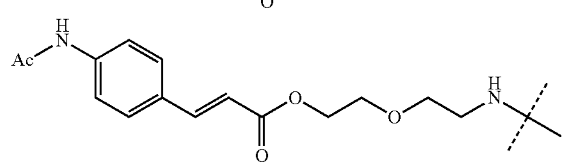

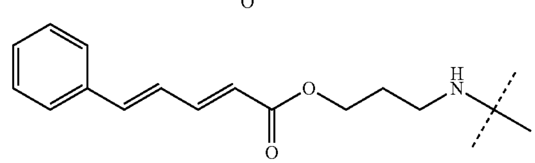

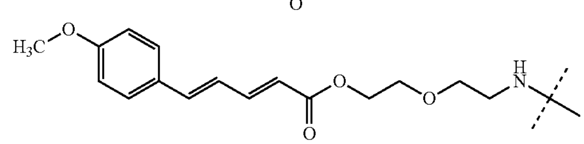

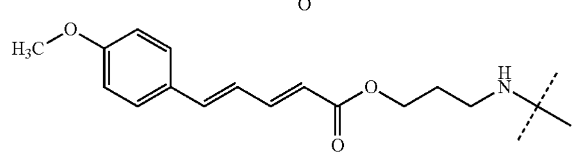

-continued

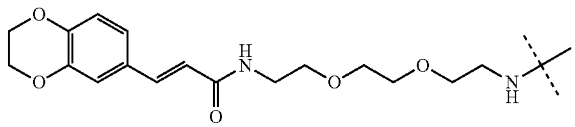

or most preferably a photocrosslinked alginic acid obtained by light exposure of an alginic acid derivative having an introduced photoreactive group selected from the following formulae [excluding the part to the right of the wavy line in each formula]:

[C52]

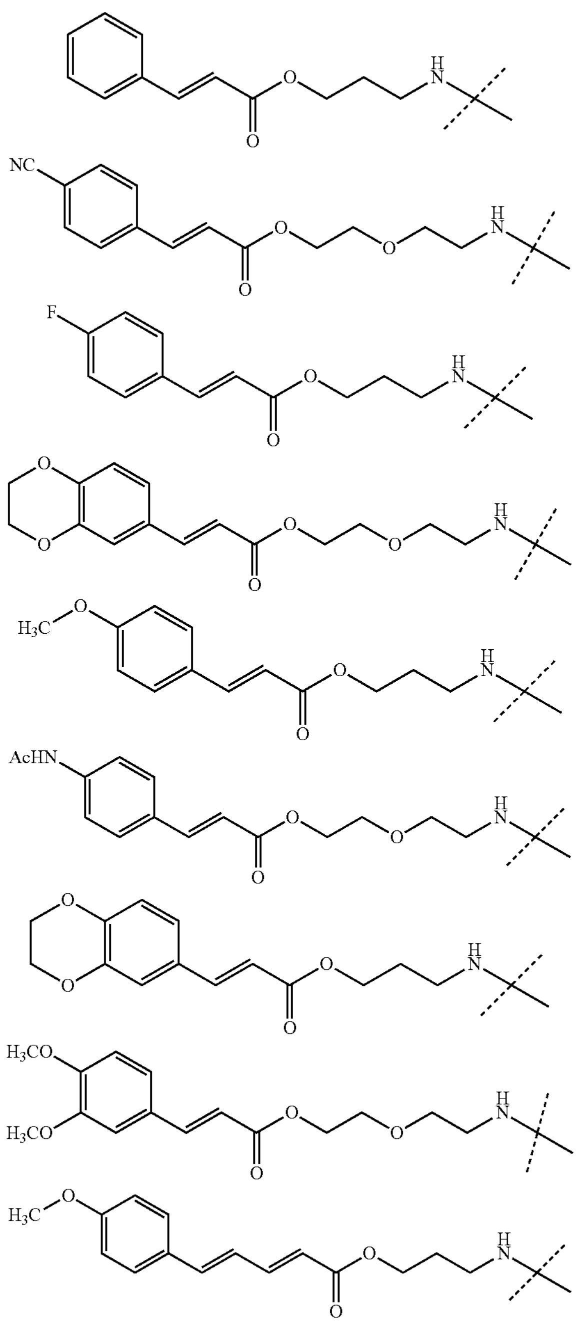

-continued

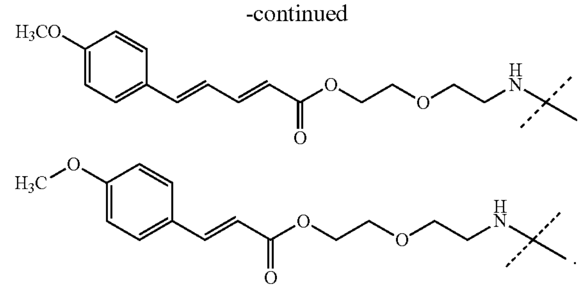

[4-2] Embodiment 4-2 is a preferred embodiment of the Embodiment [4], and specifically is a photocrosslinked alginic acid obtained by light exposure of an alginic acid derivative according to the Embodiment [1b-3-1], [1b-3-1a], [1b-3-1b], or [1b-3-1c]; or more preferably a photocrosslinked alginic acid obtained by light exposure of an alginic acid derivative according to the Embodiment [1b-3-2], [1b-3-2a], [1b-3-2b], or [1b-3-2c]; or still more preferably a photocrosslinked alginic acid obtained by light exposure of an alginic acid derivative according to the Embodiment [1b-3-3a], such as for example, a photocrosslinked alginic acid obtained by light exposure of an alginic acid derivative having an introduced photoreactive group selected from the following formulae [excluding the part to the right of the wavy line in each formula]:

[C53]

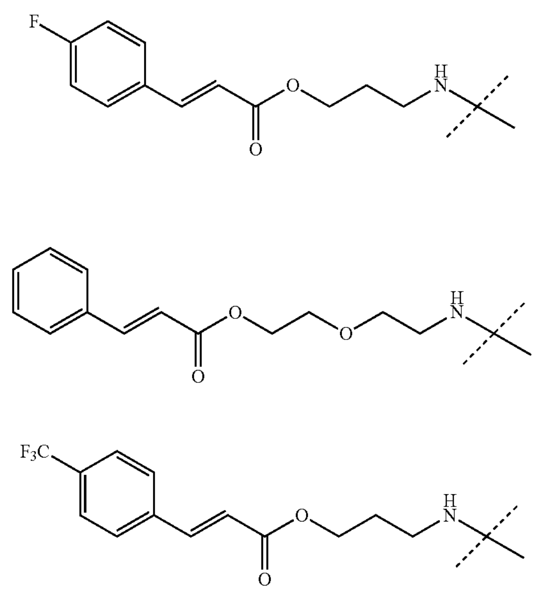

or still more preferably a photocrosslinked alginic acid obtained by light exposure of an alginic acid derivative according to the Embodiment [1b-3-3b], such as for example, a photocrosslinked alginic acid obtained by light exposure of an alginic acid derivative having an introduced photoreactive group selected from the following formulae [excluding the part to the right of the wavy line in each formula]:

[C54]

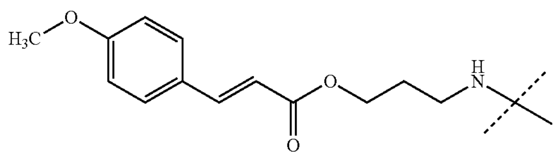
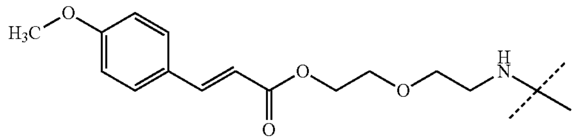
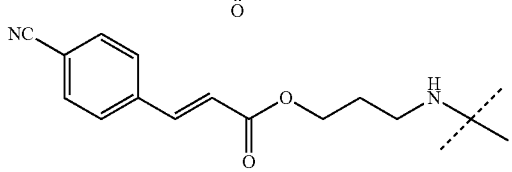
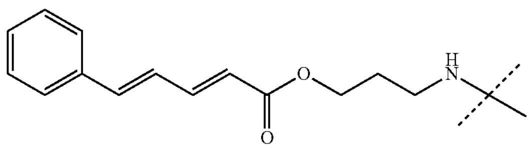
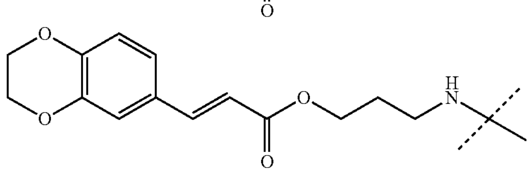
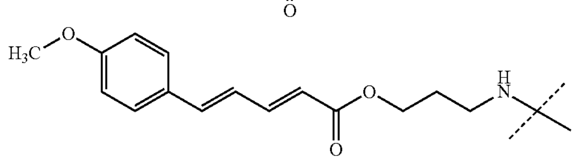

or still more preferably a photocrosslinked alginic acid obtained by light exposure of an alginic acid derivative according to the Embodiment [1b-3-3c], such as for example, a photocrosslinked alginic acid obtained by light exposure of an alginic acid derivative having an introduced photoreactive group selected from the following formulae [excluding the part to the right of the wavy line in each formula]:

[C55]

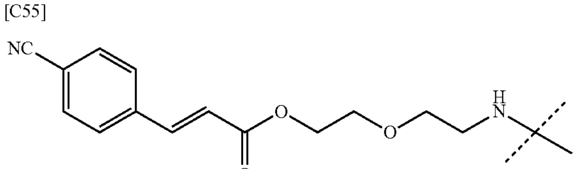
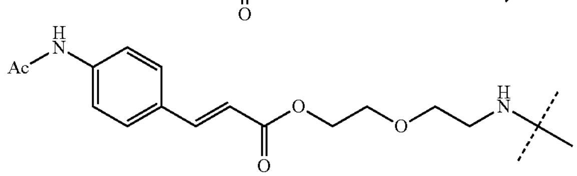
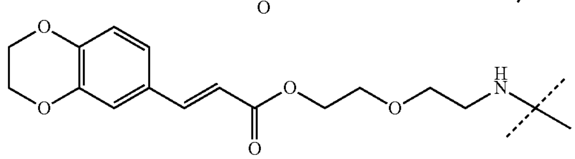

-continued

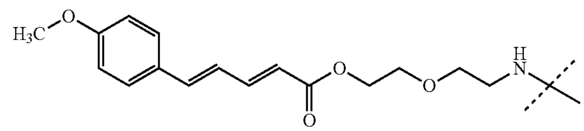
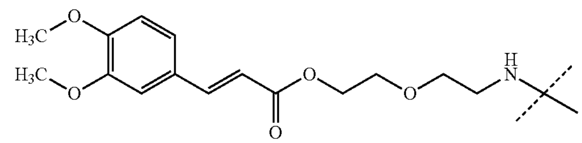

or still more preferably a photocrosslinked alginic acid obtained by light exposure of an alginic acid derivative according to the Embodiment [1b-3-3], such as for example, a photocrosslinked alginic acid obtained by light exposure of an alginic acid derivative having an introduced photoreactive group selected from the following formulae [excluding the part to the right of the wavy line in each formula]:

[C56]

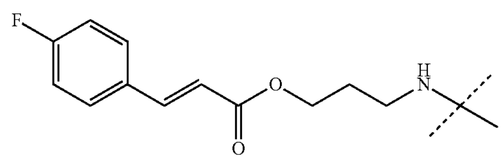
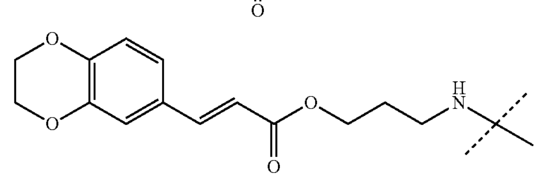
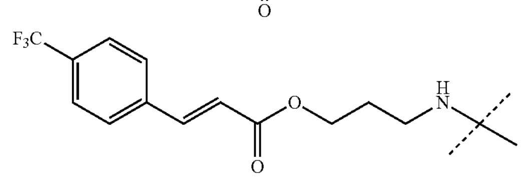
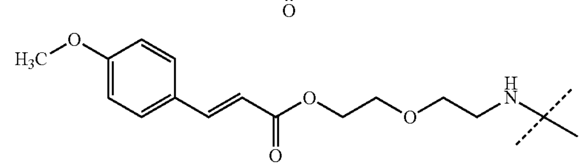
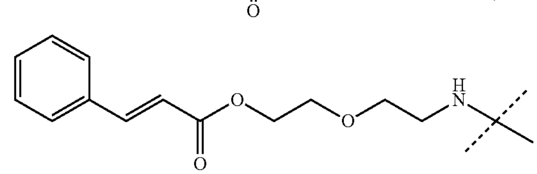
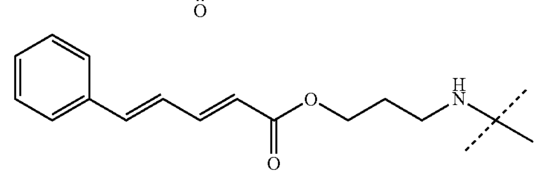
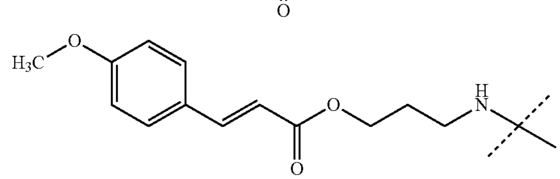

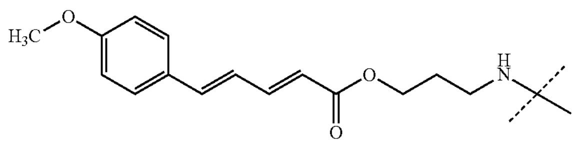

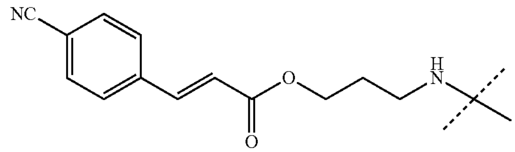

or still more preferably a photocrosslinked alginic acid obtained by light exposure of an alginic acid derivative according to the Embodiment [1b-3-3-1], such as for example, a photocrosslinked alginic acid obtained by light exposure of an alginic acid derivative having an introduced photoreactive group selected from the following formulae [excluding the part to the right of the wavy line in each formula]:

[C57]

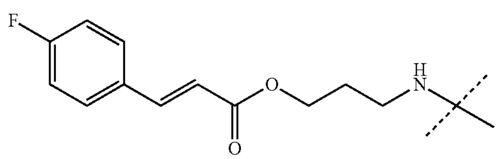

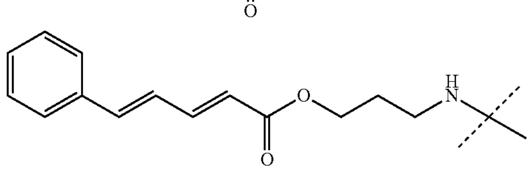

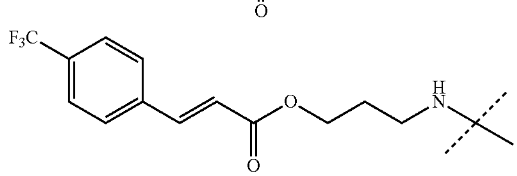

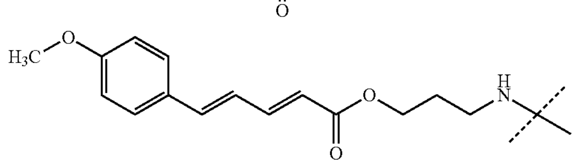

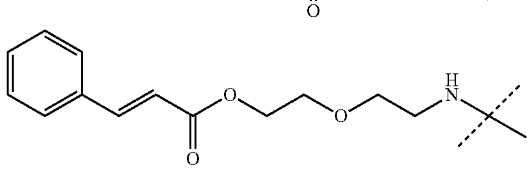

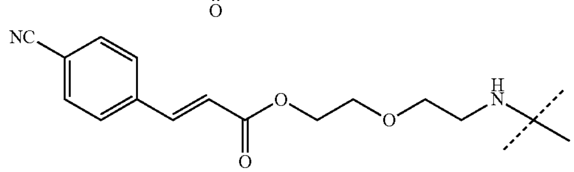

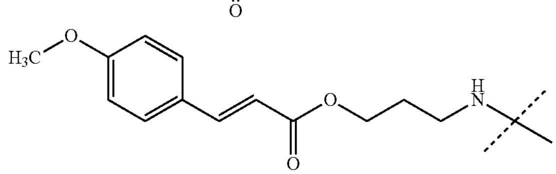

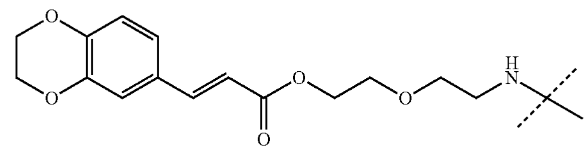

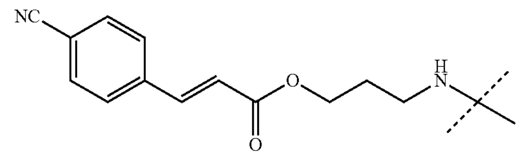

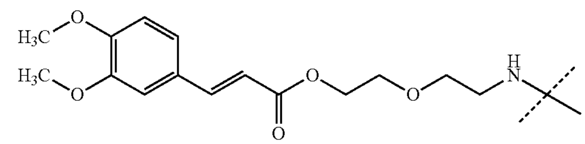

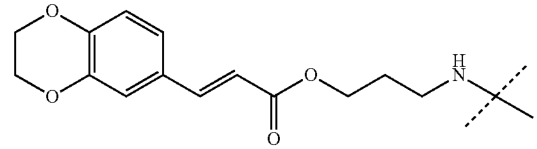

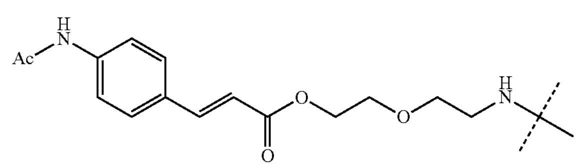

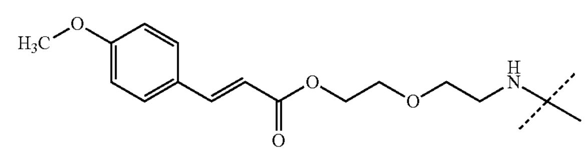

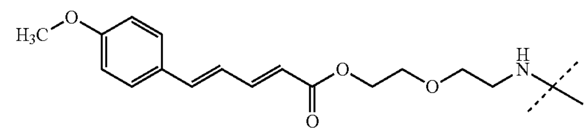

or still more preferably a photocrosslinked alginic acid obtained by light exposure of an alginic acid derivative according to the Embodiment [1b-3-3-2], such as for example, a photocrosslinked alginic acid obtained by light exposure of an alginic acid derivative having an introduced photoreactive group selected from the following formulae [excluding the part to the right of the wavy line in each formula]:

[C58]

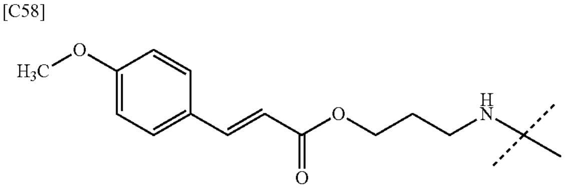

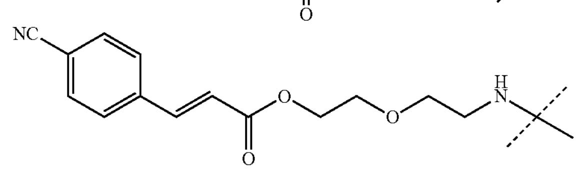

-continued

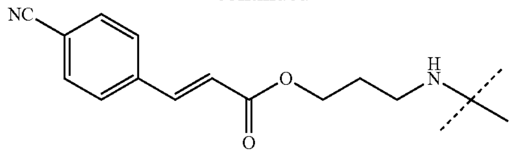

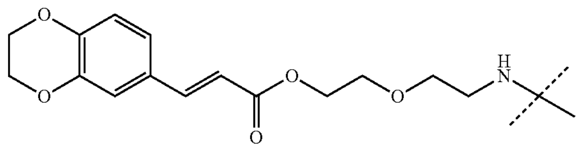

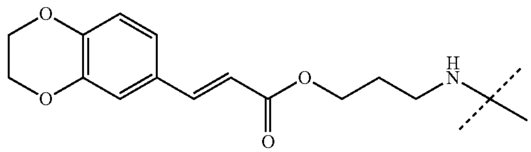

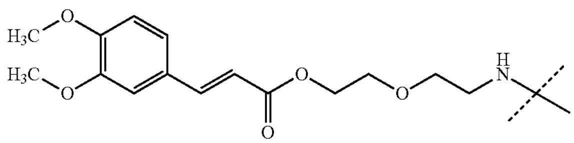

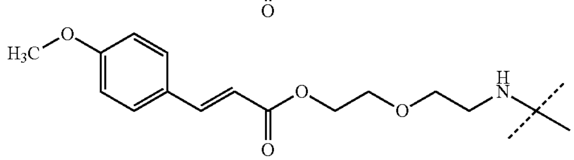

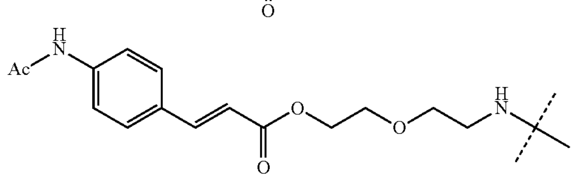

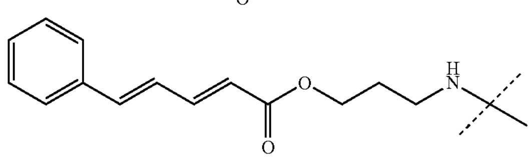

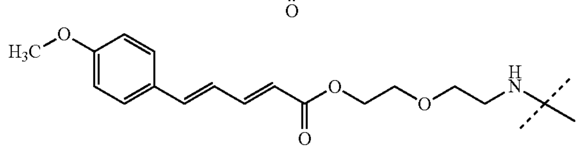

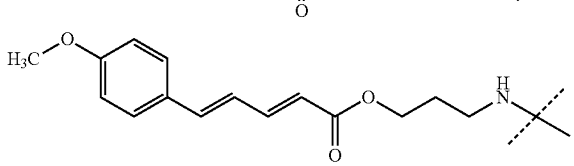

or particularly preferably a photocrosslinked alginic acid obtained by light exposure of an alginic acid derivative having an introduced photoreactive group selected from the following formulae [excluding the part to the right of the wavy line in each formula]:

[C59]

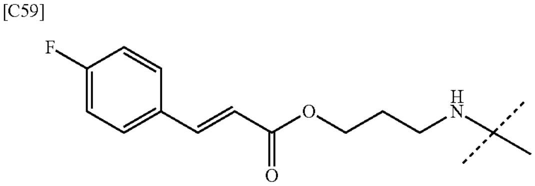

-continued

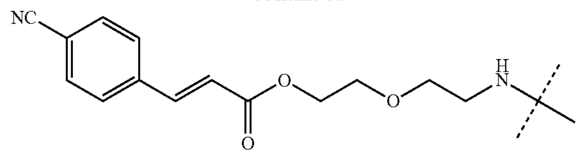

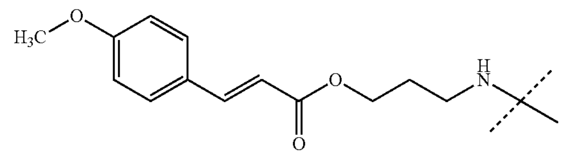

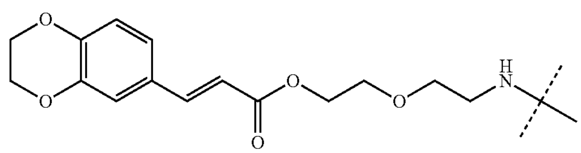

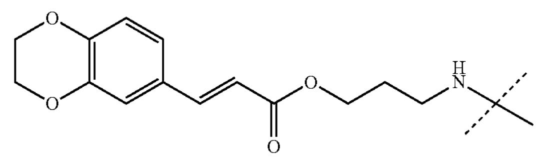

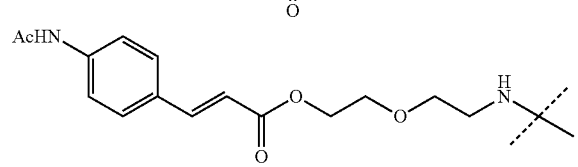

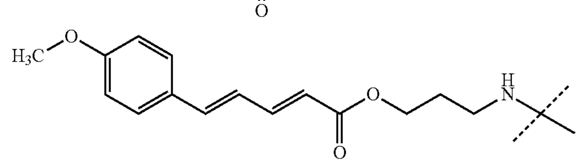

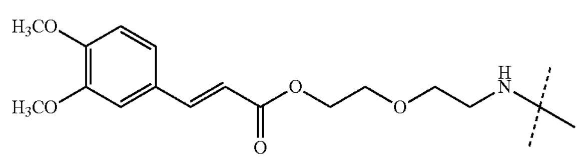

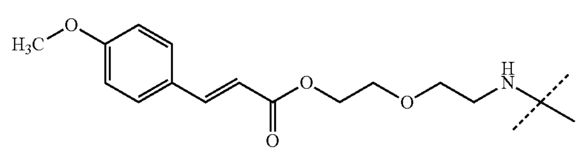

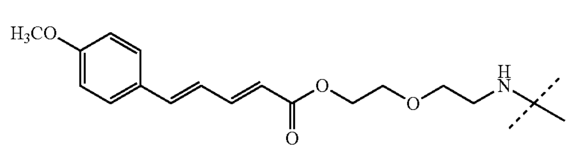

[5-1] Embodiment 5-1 is as follows: the photocrosslinked alginic acid according to the Embodiment [4], wherein the chemical crosslink formed by light exposure of the alginic acid derivative according to the Embodiment [1], [1a], or [1b] (when p=1 in formula (I)) is a structure selected from formula (II-L-1) and formula (II-L-2) below:

[C60]

(II-L-1)

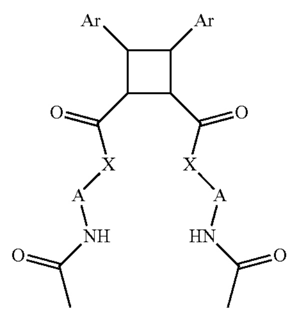

(II-L-2)

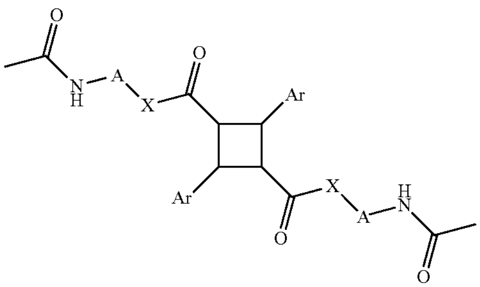

[in formula (II-L-1) or formula (II-L-2), the —CONH— and —NHCO— at either end represent amide bonds via any carboxyl group of alginic acid, and -A-, —X—, and Ar are as defined in the Embodiment [1], [1a], or [1b]].

[5-2] Embodiment 5-2 is as follows: the photocrosslinked alginic acid according to the Embodiment [4], wherein the chemical crosslink formed by light exposure of the alginic acid derivative according to the Embodiment [1], [1a], or [1b] (when p=2 in formula (I)) is the structure of formula (II-L-3) below:

[C61]

(II-L-3)

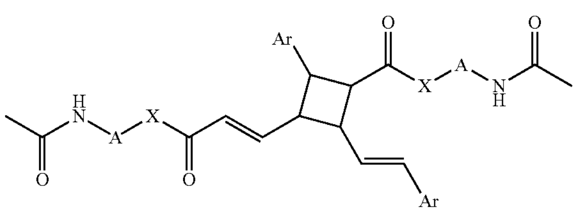

[in formula (II-L-3), the —CONH— and —NHCO— at either end represent amide bonds via any carboxyl group of alginic acid, and -A-, —X—, and Ar are as defined in the Embodiment [1], [1a], or [1b]].

[6] Embodiment 6 is as follows: a photocrosslinked alginic acid according to any one of the Embodiments [4], [5-1], and [5-2], wherein the light for exposure is light selected from UV rays and LED light.

[7] Embodiment 7 is as follows: a photocrosslinked alginic acid structure that is obtained by light exposure of a gel obtained by dripping a solution of the alginic acid derivative according to the Embodiment [1], [1a], or [1b] into a solution containing a divalent metal ion, and that includes as crosslinks both an ionic crosslink formed by partial crosslinking with a divalent metal ion and a chemical crosslink formed by light exposure.

[7-1] Embodiment 7-1 is a preferred embodiment of the Embodiment [7], and specifically is a photocrosslinked alginic acid structure that is obtained by light exposure of a gel obtained by dripping a solution of the alginic acid derivative according to the Embodiment [1-4-1], [1-4-1a], [1-4-1b], [1-4-1c], [1a-4-1], [1a-4-1a], [1a-4-1b], or [1a-4-1c] into a solution containing a divalent metal ion, and that comprises as crosslinks both an ionic crosslink formed by partial crosslinking with a divalent metal ion and a chemical crosslink formed by light exposure; or more preferably, it is a photocrosslinked alginic acid structure that is obtained by light exposure of a gel obtained by dripping a solution of the alginic acid derivative according to the Embodiment [1-4-2], [1-4-2a], [1-4-2b], [1-4-2c], [1a-4-2], [1a-4-2a], [1a-4-2b], or [1a-4-2c] into a solution containing a divalent metal ion, and that comprises as crosslinks both an ionic crosslink formed by partial crosslinking with a divalent metal ion and a chemical crosslink formed by light exposure;

or still more preferably, it is a photocrosslinked alginic acid structure that is obtained by light exposure of a gel obtained by dripping a solution of the alginic acid derivative according to the Embodiment [1-4-3], [1-4-3a], [1-4-3b], [1-4-3c], [1a-4-3], [1a-4-3a], [1a-4-3b], or [1a-4-3c] into a solution containing a divalent metal ion, and that comprises as crosslinks both an ionic crosslink formed by partial crosslinking with a divalent metal ion and a chemical crosslink formed by light exposure; or particularly preferably, it is a photocrosslinked alginic acid structure that is obtained by light exposure of a gel obtained by dripping a solution of the alginic acid derivative according to the Embodiment [1-4-4a] or [1a-4-4a] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C62]

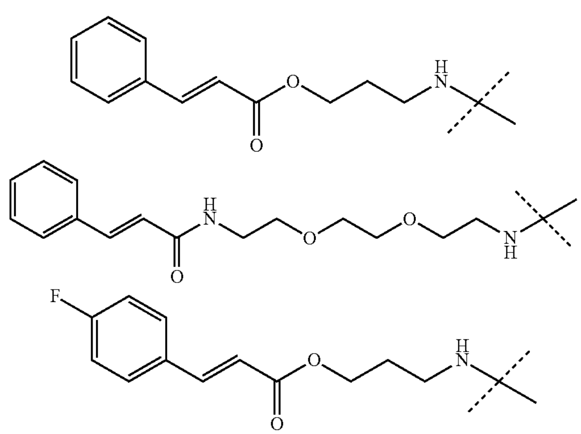

-continued

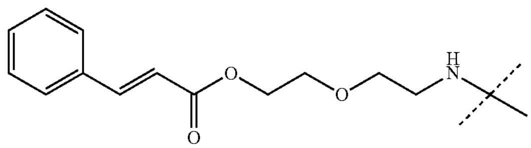

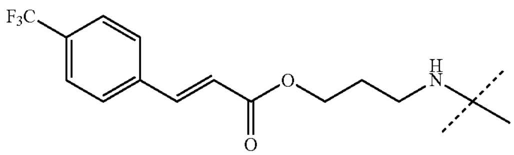

into a solution containing a divalent metal ion, and that comprises as crosslinks both an ionic crosslink formed by partial crosslinking with a divalent metal ion and a chemical crosslink formed by light exposure;

or particularly preferably, it is a photocrosslinked alginic acid structure that is obtained by light exposure of a gel obtained by dripping a solution of the alginic acid derivative according to the Embodiment [1-4-4b] or [1a-4-4b] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C63]

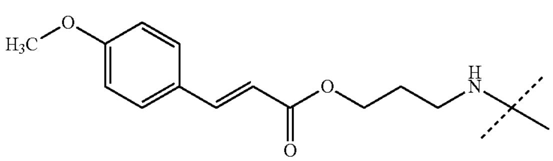

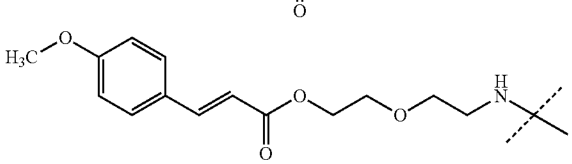

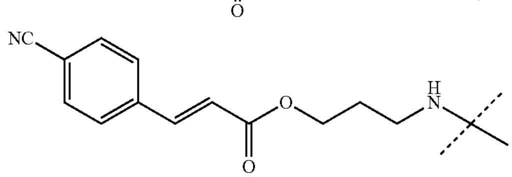

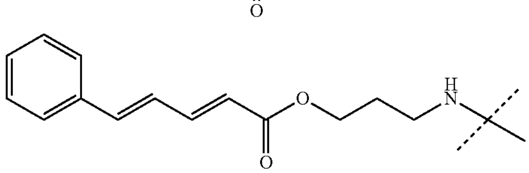

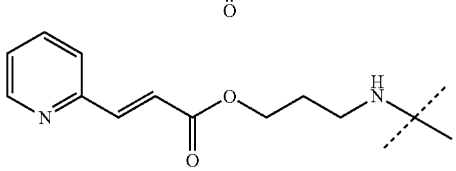

-continued

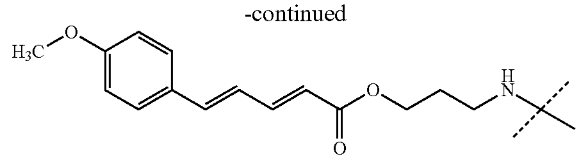

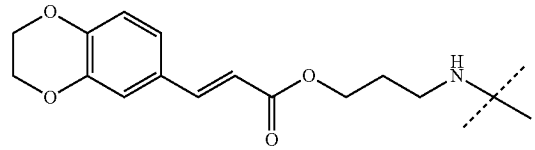

into a solution containing a divalent metal ion, and that comprises as crosslinks both an ionic crosslink formed by partial crosslinking with a divalent metal ion and a chemical crosslink formed by light exposure;

or particularly preferably, it is a photocrosslinked alginic acid structure that is obtained by light exposure of a gel obtained by dripping a solution of the alginic acid derivative according to the Embodiment [1-4-4c] or [1a-4-4c] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C64]

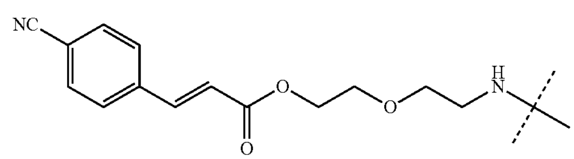

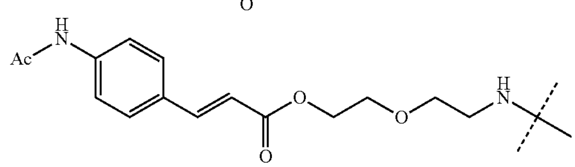

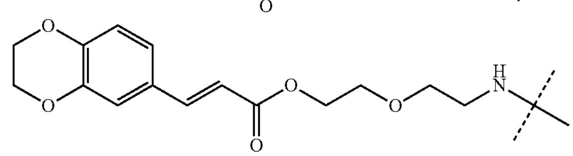

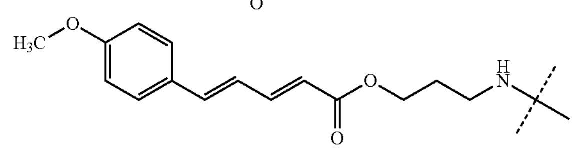

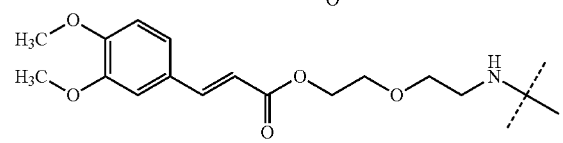

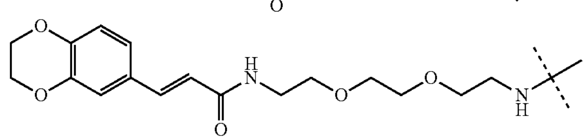

-continued

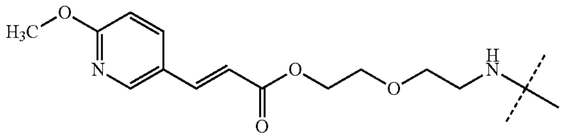

into a solution containing a divalent metal ion, and that comprises as crosslinks both an ionic crosslink formed by partial crosslinking with a divalent metal ion and a chemical crosslink formed by light exposure;

or particularly preferably, it is a photocrosslinked alginic acid structure that is obtained by light exposure of a gel obtained by dripping a solution of the alginic acid derivative according to the Embodiment [1-4-4] or [1a-4-4] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C65]

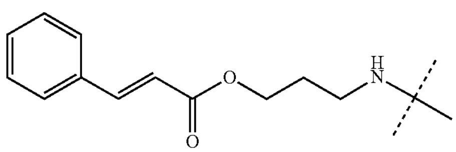

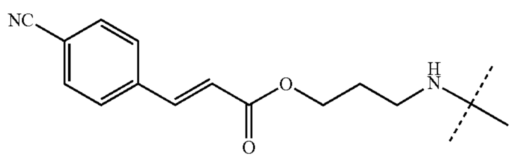

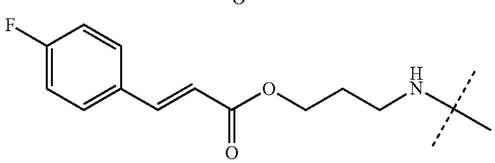

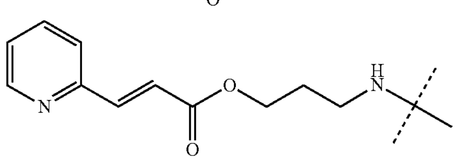

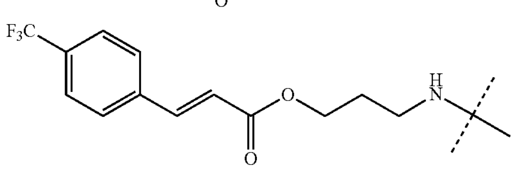

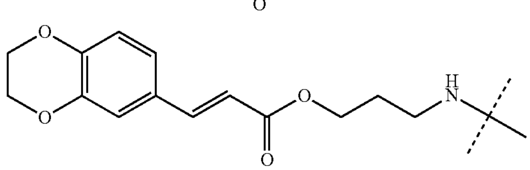

-continued

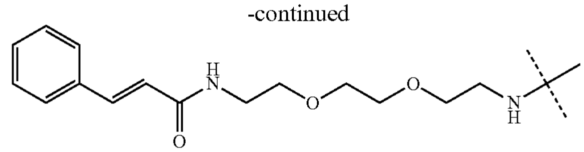

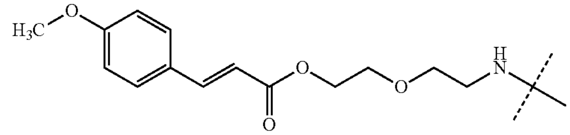

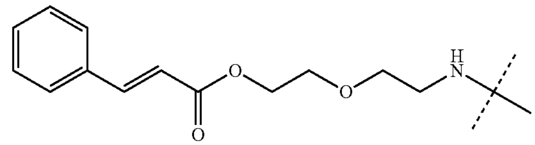

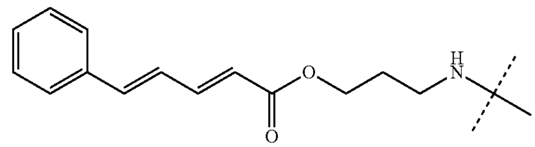

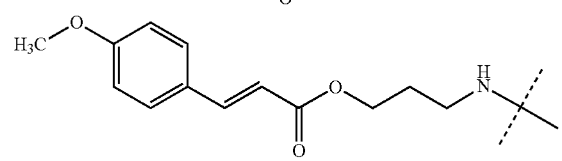

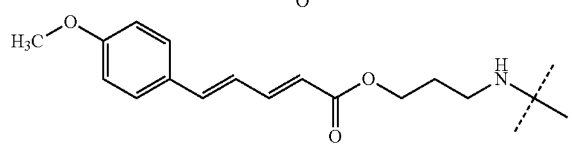

into a solution containing a divalent metal ion, and that comprises as crosslinks both an ionic crosslink formed by partial crosslinking with a divalent metal ion and a chemical crosslink formed by light exposure;

or particularly preferably, it is a photocrosslinked alginic acid structure that is obtained by light exposure of a gel obtained by dripping a solution of the alginic acid derivative according to the Embodiment [1-4-4-1] or [1a-4-4-1] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C66]

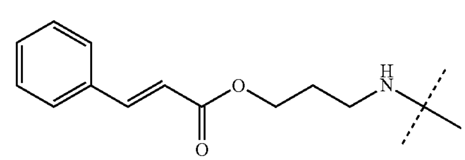

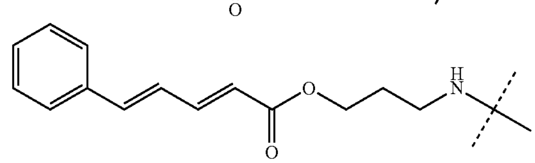

-continued

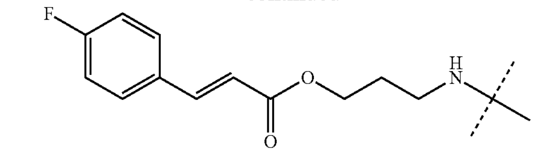
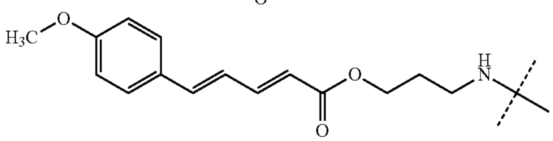
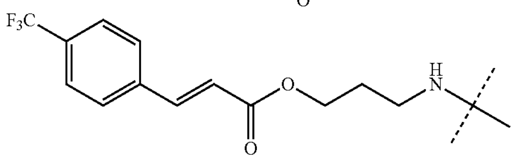
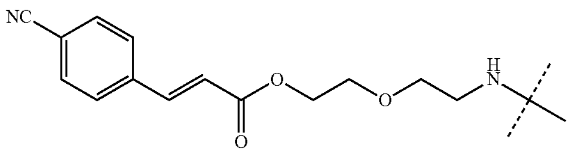
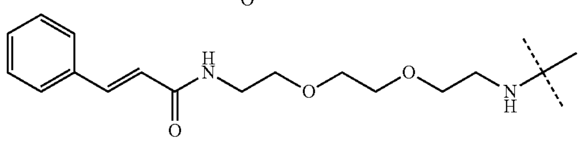
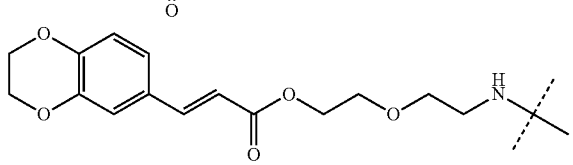
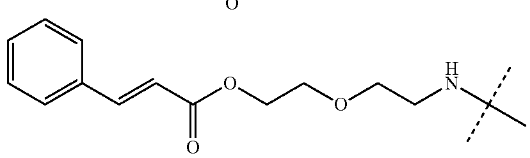
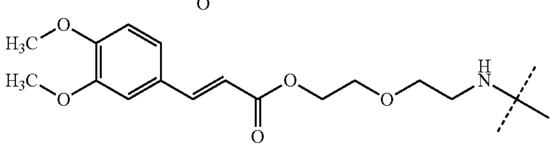
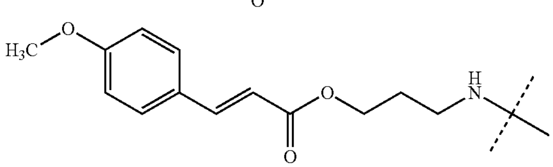
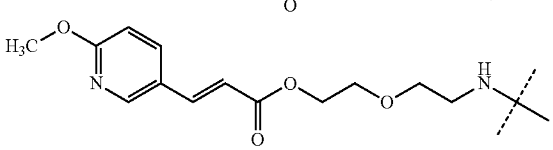
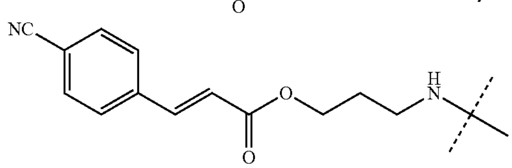
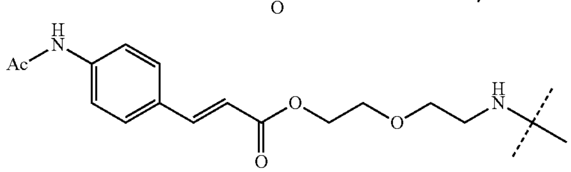

-continued

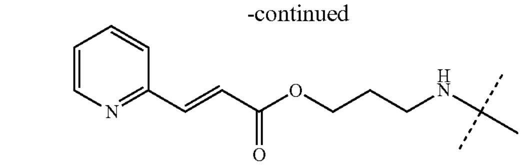
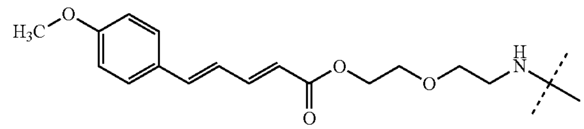
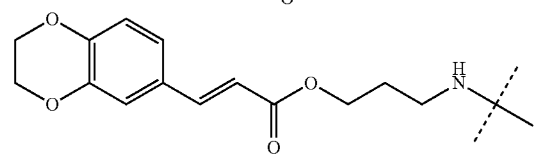
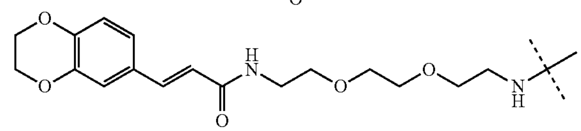
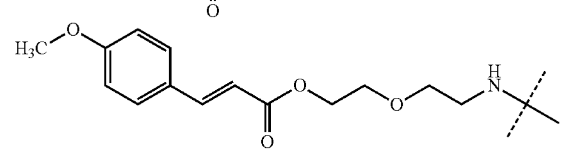

into a solution containing a divalent metal ion, and that comprises as crosslinks both an ionic crosslink formed by partial crosslinking with a divalent metal ion and a chemical crosslink formed by light exposure;

or particularly preferably, it is a photocrosslinked alginic acid structure that is obtained by light exposure of a gel obtained by dripping a solution of the alginic acid derivative according to the Embodiment [1-4-4-2] or [1a-4-4-2] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C67]

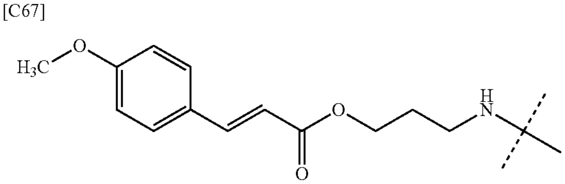
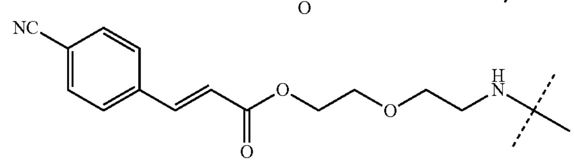
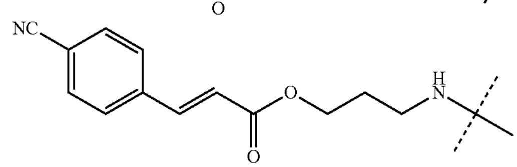

-continued

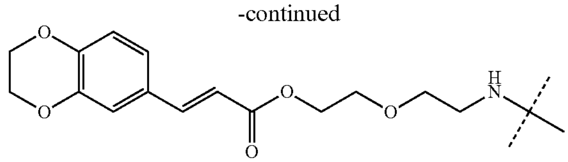

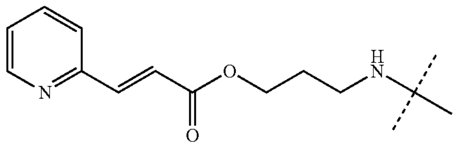

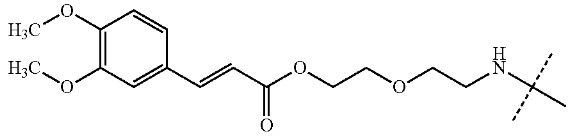

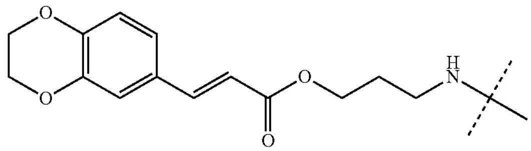

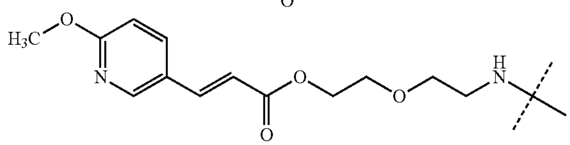

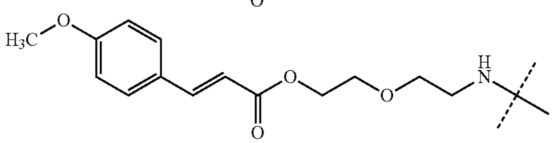

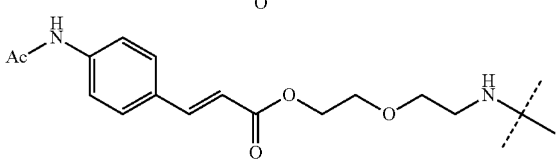

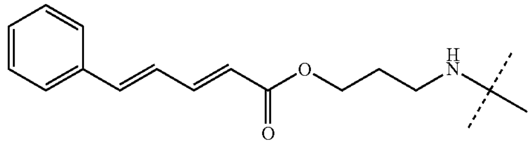

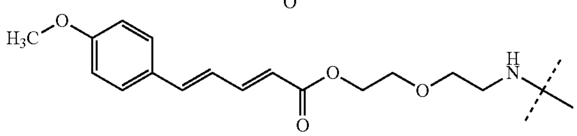

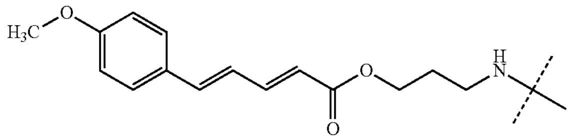

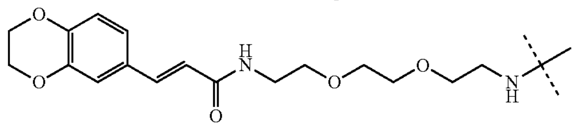

into a solution containing a divalent metal ion, and that comprises as crosslinks both an ionic crosslink formed by partial crosslinking with a divalent metal ion and a chemical crosslink formed by light exposure; or most preferably, it is a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C68]

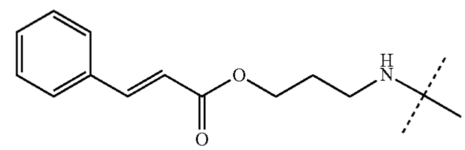

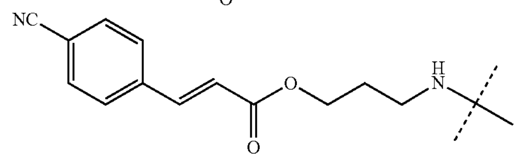

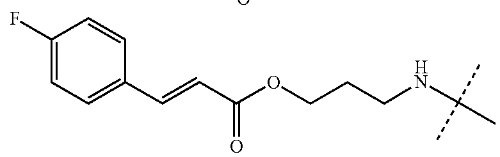

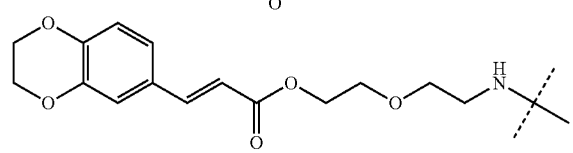

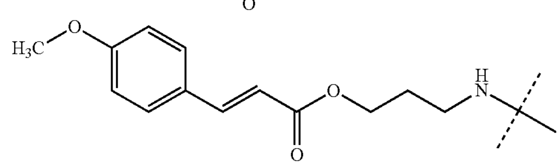

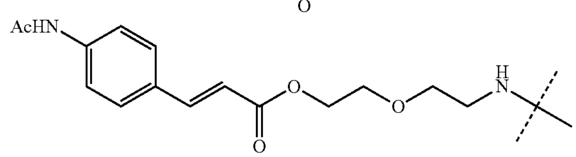

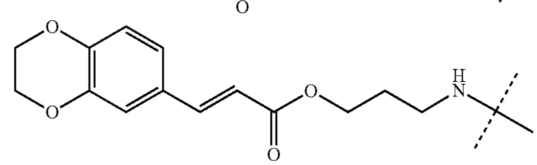

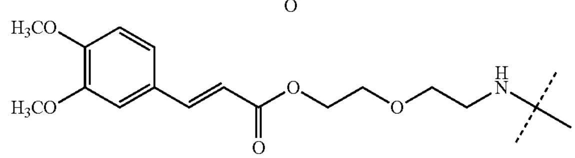

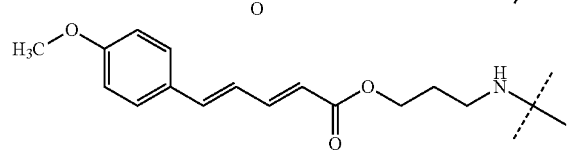

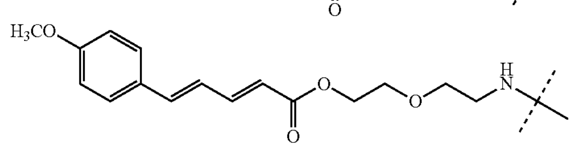

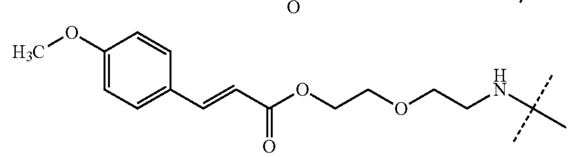

into a solution containing a divalent metal ion, and that comprises as crosslinks both an ionic crosslink formed by partial crosslinking with a divalent metal ion and a chemical crosslink formed by light exposure.

[7-2] Embodiment 7-2 is a preferred embodiment of the Embodiment [7], and specifically is a photocrosslinked alginic acid structure that is obtained by light exposure of a gel obtained by dripping a solution of the alginic acid derivative according to the Embodiment [1b-3-1], [1b-3-1a], [1b-3-1b], or [1b-3-1c] into a solution containing a divalent metal ion, and that comprises as crosslinks both an ionic crosslink formed by partial crosslinking with a divalent metal ion and a chemical crosslink formed by light exposure; or more preferably, it is a photocrosslinked alginic acid structure that is obtained by light exposure of a gel obtained by dripping a solution of the alginic acid derivative according to the Embodiment [1b-3-2], [1b-3-2a], [1b-3-2b], or [1b-3-2c] into a solution containing a divalent metal ion, and that comprises as crosslinks both an ionic crosslink formed by partial crosslinking with a divalent metal ion and a chemical crosslink formed by light exposure; or still more preferably, it is a photocrosslinked alginic acid structure that is obtained by light exposure of a gel obtained by dripping a solution of the alginic acid derivative according to the Embodiment [1b-3-3a] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C69]

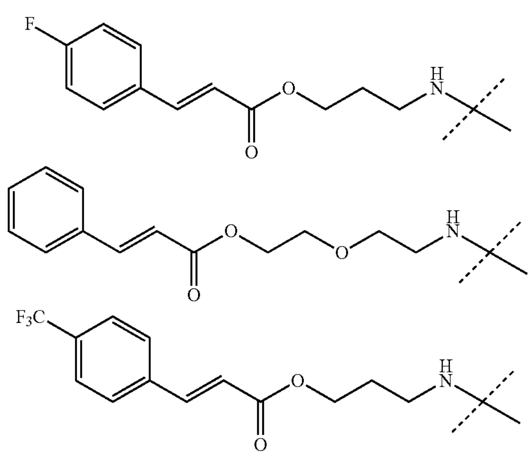

into a solution containing a divalent metal ion, and that comprises as crosslinks both an ionic crosslink formed by partial crosslinking with a divalent metal ion and a chemical crosslink formed by light exposure;

or still more preferably, it is a photocrosslinked alginic acid structure that is obtained by light exposure of a gel obtained by dripping a solution of the alginic acid derivative according to the Embodiment [1b-3-3b] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C70]

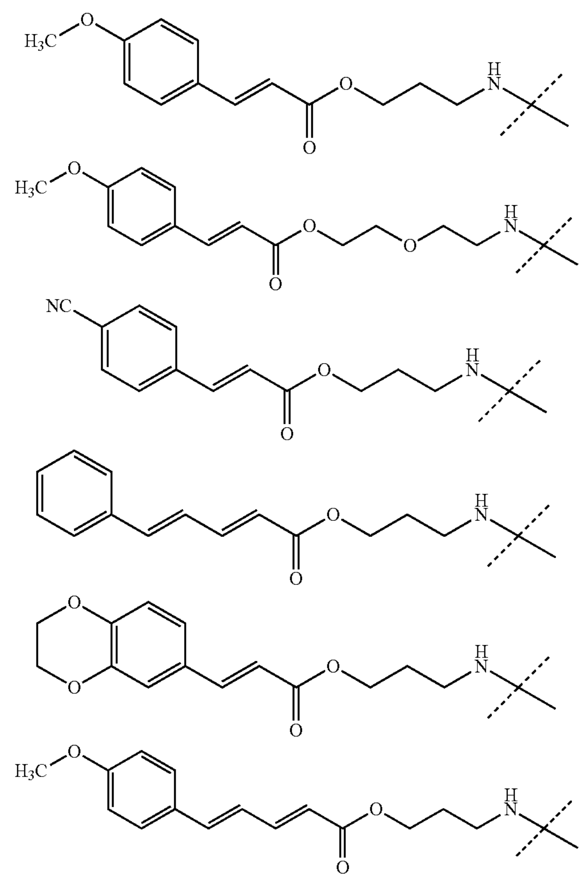

into a solution containing a divalent metal ion, and that comprises as crosslinks both an ionic crosslink formed by partial crosslinking with a divalent metal ion and a chemical crosslink formed by light exposure;

or still more preferably, it is a photocrosslinked alginic acid structure that is obtained by light exposure of a gel obtained by dripping a solution of the alginic acid derivative according to the Embodiment [1b-3-3c] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C71]

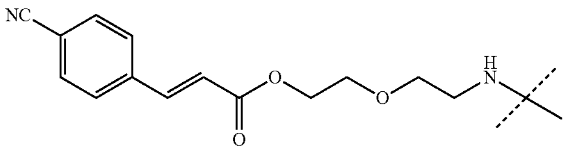
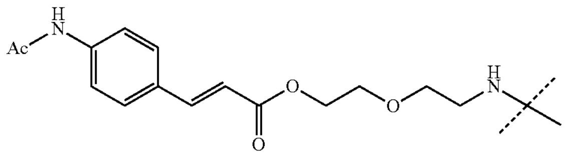
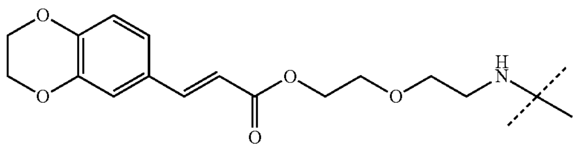
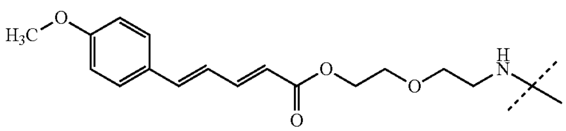
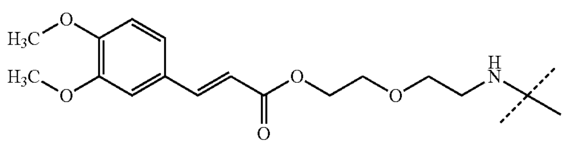

into a solution containing a divalent metal ion, and that comprises as crosslinks both an ionic crosslink formed by partial crosslinking with a divalent metal ion and a chemical crosslink formed by light exposure;

or still more preferably, it is a photocrosslinked alginic acid structure that is obtained by light exposure of a gel obtained by dripping a solution of the alginic acid derivative according to the Embodiment [1b-3-3] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C72]

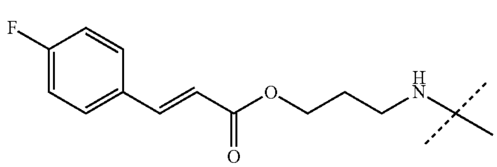
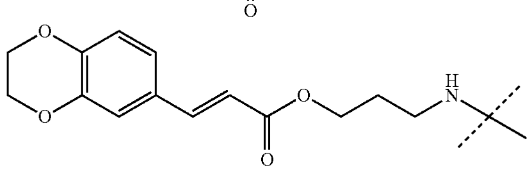

-continued

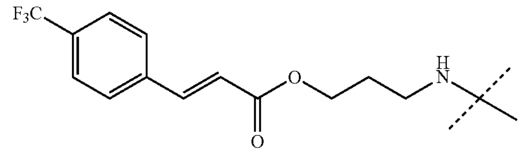
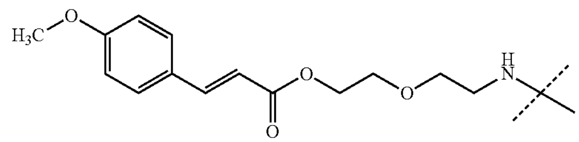
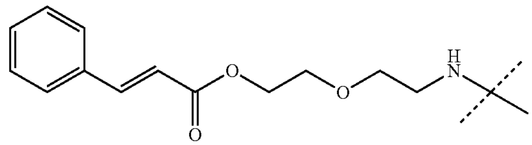
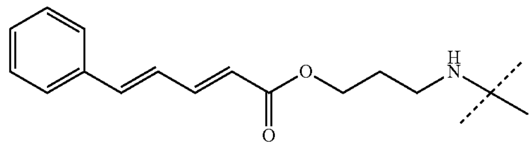
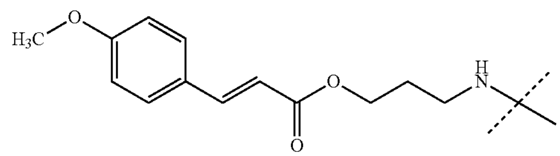
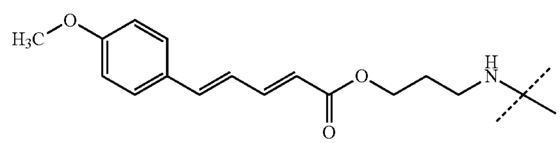
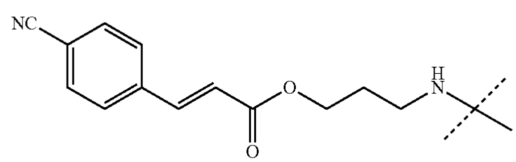

into a solution containing a divalent metal ion, and that comprises as crosslinks both an ionic crosslink formed by partial crosslinking with a divalent metal ion and a chemical crosslink formed by light exposure;

or still more preferably, it is a photocrosslinked alginic acid structure that is obtained by light exposure of a gel obtained by dripping a solution of the alginic acid derivative according to the Embodiment [1b-3-3-1] into a solution containing a divalent metal ion, and that comprises as crosslinks both an ionic crosslink formed by partial crosslinking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C73]

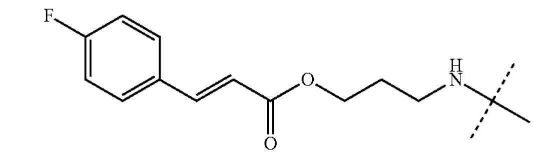

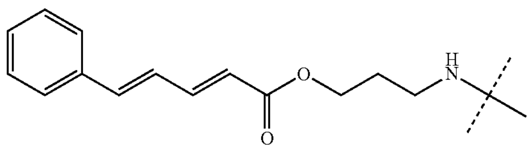

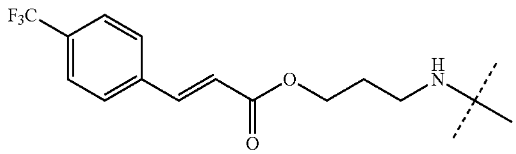

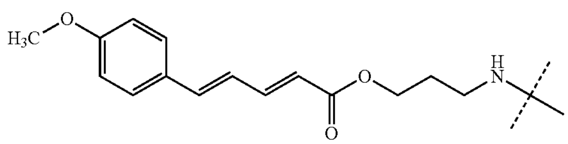

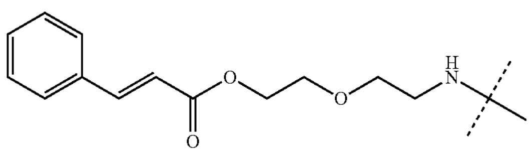

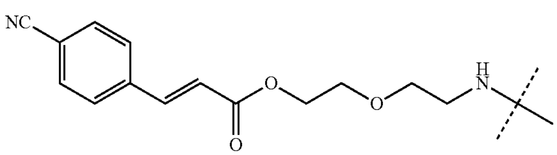

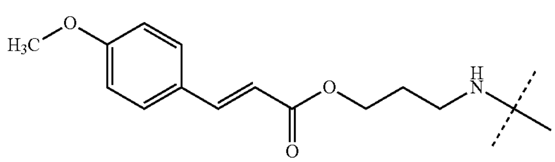

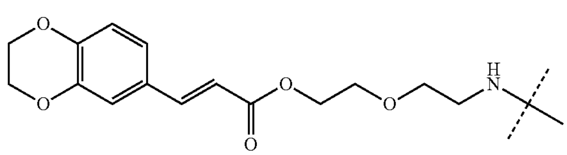

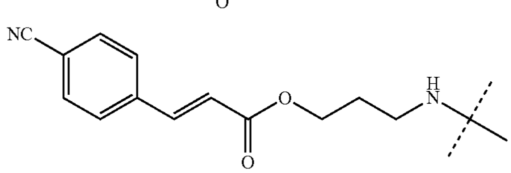

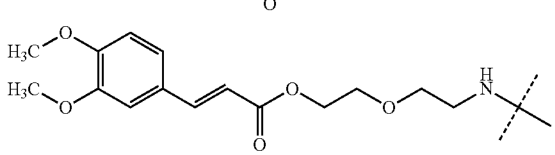

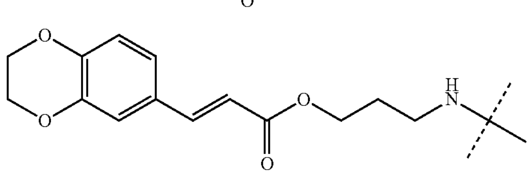

-continued

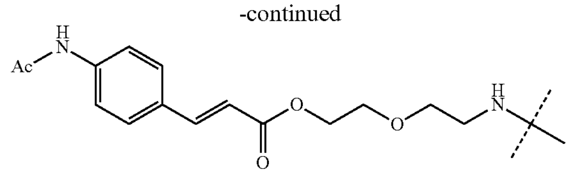

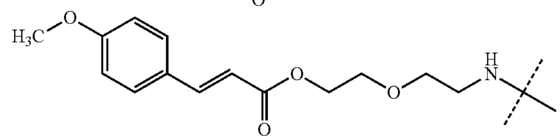

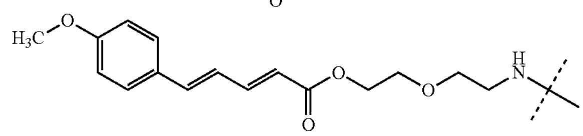

into a solution containing a divalent metal ion, and that comprises as crosslinks both an ionic crosslink formed by partial crosslinking with a divalent metal ion and a chemical crosslink formed by light exposure;

or still more preferably, it is a photocrosslinked alginic acid structure that is obtained by light exposure of a gel obtained by dripping a solution of the alginic acid derivative according to the Embodiment [1b-3-3-2] into a solution containing a divalent metal ion, and that comprises as crosslinks both an ionic crosslink formed by partial cross-linking with a divalent metal ion and a chemical crosslink formed by light exposure; such as for example, a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C74]

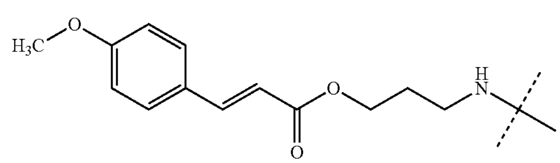

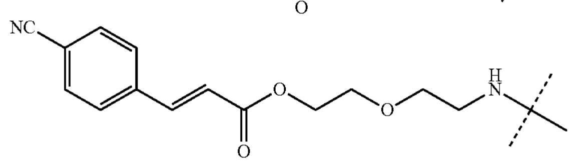

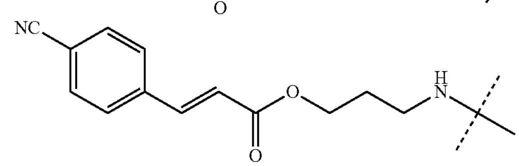

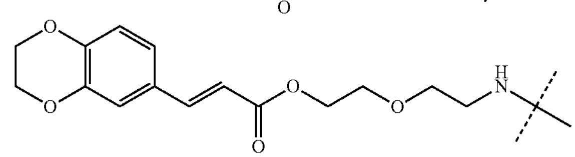

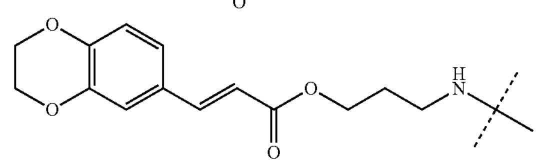

-continued

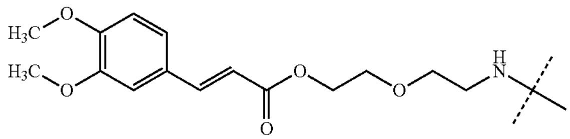

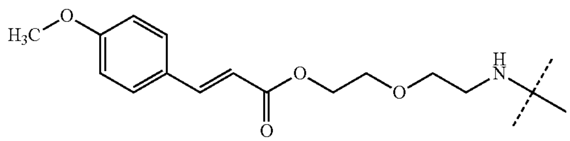

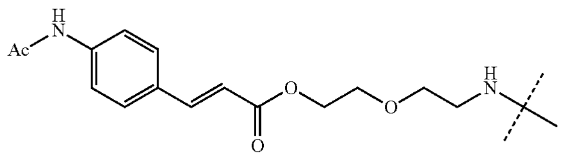

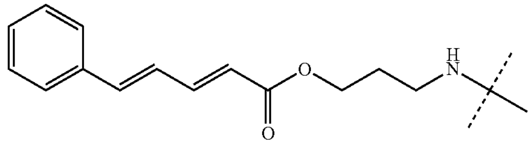

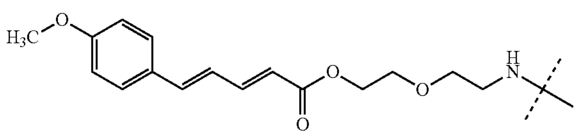

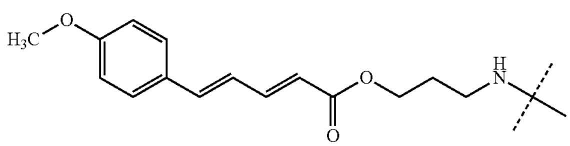

into a solution containing a divalent metal ion, and that comprises as crosslinks both an ionic crosslink formed by partial crosslinking with a divalent metal ion and a chemical crosslink formed by light exposure;

or particularly preferably, it is a photocrosslinked alginic acid structure that is obtained by light exposure of a gel obtained by dripping a solution of an alginic acid derivative having an introduced photoreactive group selected from the following formulae [excluding the part to the right of the wavy line in each formula]:

[C75]

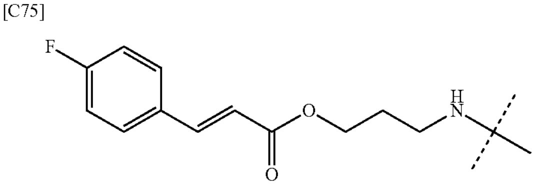

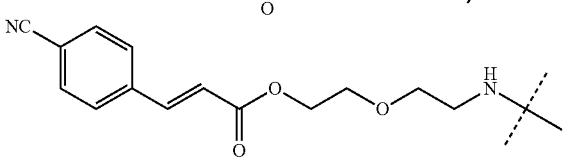

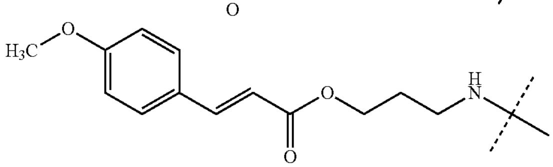

-continued

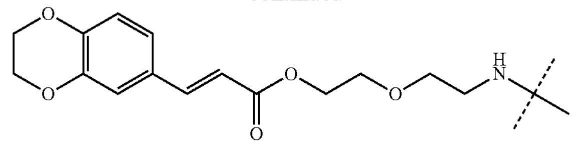

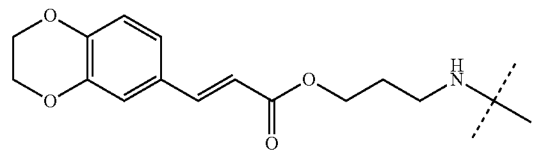

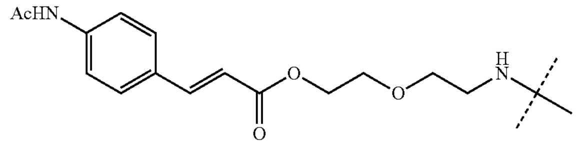

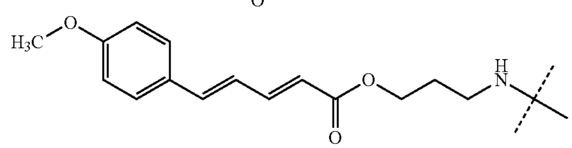

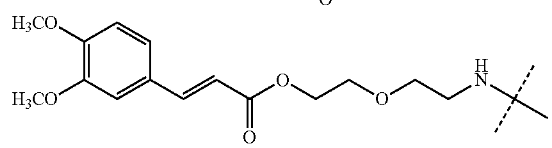

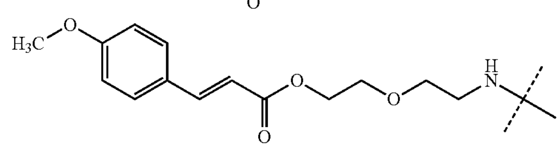

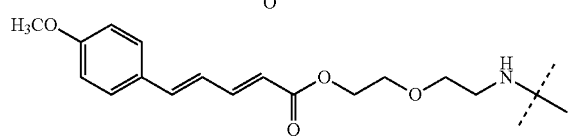

into a solution containing a divalent metal ion, and that comprises as crosslinks both an ionic crosslink formed by partial crosslinking with a divalent metal ion and a chemical crosslink formed by light exposure.

[8-1] Embodiment 8-1 is as follows: the photocrosslinked alginic acid structure according to the Embodiment [7], wherein the chemical crosslink formed by light exposure of the alginic acid derivative according to the Embodiment [1], [1a], or [1b] (when p=1 in formula (I)) is a structure selected from formula (II-L-1) and formula (II-L-2) below:

[C76]

(II-L-1)

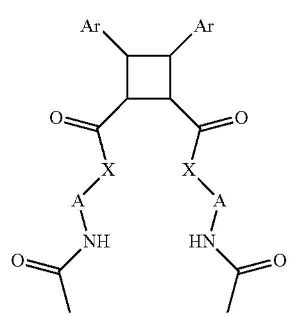

-continued (II-L-2)

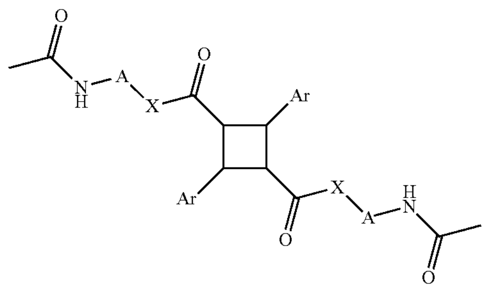

[in formula (II-L-1) or formula (II-L-2), the —CONH— and —NHCO— at either end represent amide bonds via any carboxyl group of alginic acid, and -A-, —X—, and Ar are defined as in the Embodiment [1], [1a], or [1b]].

[8-2] Embodiment 8-2 is as follows: the photocrosslinked alginic acid structure according to the Embodiment [7], wherein the chemical crosslink formed by light exposure of the alginic acid derivative according to the Embodiment [1], [1a], or [1b] (when p=2 in formula (I)) is the structure of formula (II-L-3) below:

[C77]

(II-L-3)

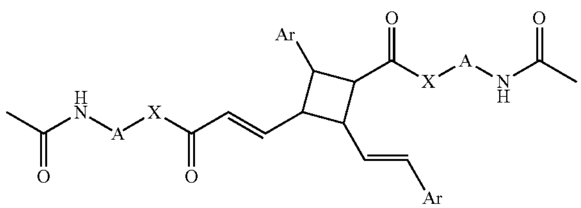

[in formula (II-L-3), the —CONH— and —NHCO— at either end represent amide bonds via any carboxyl group of alginic acid, and -A-, —X—, and Ar are defined as in the Embodiment [1], [1a], or [1b]].

[9] Embodiment 9 is as follows: a photocrosslinked alginic acid structure according to the Embodiments [7], [8-1], and [8-2], wherein the light for exposure is selected from UV rays and LED light.

[10] Embodiment 10 is as follows: a photocrosslinked alginic acid structure according to any one of the Embodiments [7] to [9], in the form of beads or a substantially spherical gel.

[11] Embodiment 11 is as follows: a medical material containing a photocrosslinked alginic acid structure according to any one of the Embodiments [7] to [10].

[12] Embodiment 12 is as follows: a medical material according to the Embodiment [11], in the form of beads or a substantially spherical gel.

[13] Embodiment 13 is as follows: a method for manufacturing the photocrosslinked alginic acid according to the Embodiment [4], wherein an alginic acid derivative according to the Embodiment [1], [1a], or [1b] is exposed to light.

[13-1] Embodiment 13-1 is a preferred embodiment of the method for manufacturing a photocrosslinked alginic acid described in the Embodiment [13], and specifically is a photocrosslinked alginic acid manufacturing method wherein an alginic acid derivative according to the Embodiment [1-4-1], [1-4-1a], [1-4-1b], [1-4-1c], [1a-4-1], [1a-4-1a], [1a-4-1b], or [1a-4-1c] is exposed to light; or more preferably, it is a photocrosslinked alginic acid manufacturing method wherein an alginic acid derivative according to the Embodiment [1-4-2], [1-4-2a], [1-4-2b], [1-4-2c], [1a-4-2], [1a-4-2a], [1a-4-2b], or [1a-4-2c] is exposed to light; or still more preferably, it is a photocrosslinked alginic acid manufacturing method wherein an alginic acid derivative according to the Embodiment [1-4-3], [1-4-3a], [1-4-3b], [1-4-3c], [1a-4-3], [1a-4-3a], [1a-4-3b], or [1a-4-3c] is exposed to light; or particularly preferably, it is a photocrosslinked alginic acid manufacturing method wherein an alginic acid derivative according to the Embodiment [1-4-4a] or [1a-4-4a] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C78]

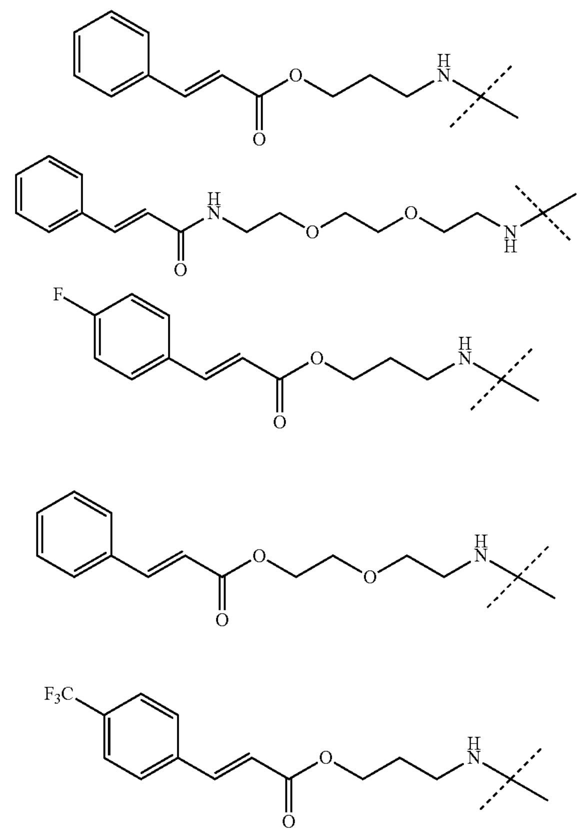

or particularly preferably, it is a photocrosslinked alginic acid manufacturing method wherein an alginic acid derivative according to the Embodiment [1-4-4b] or [1a-4-4b] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C79]

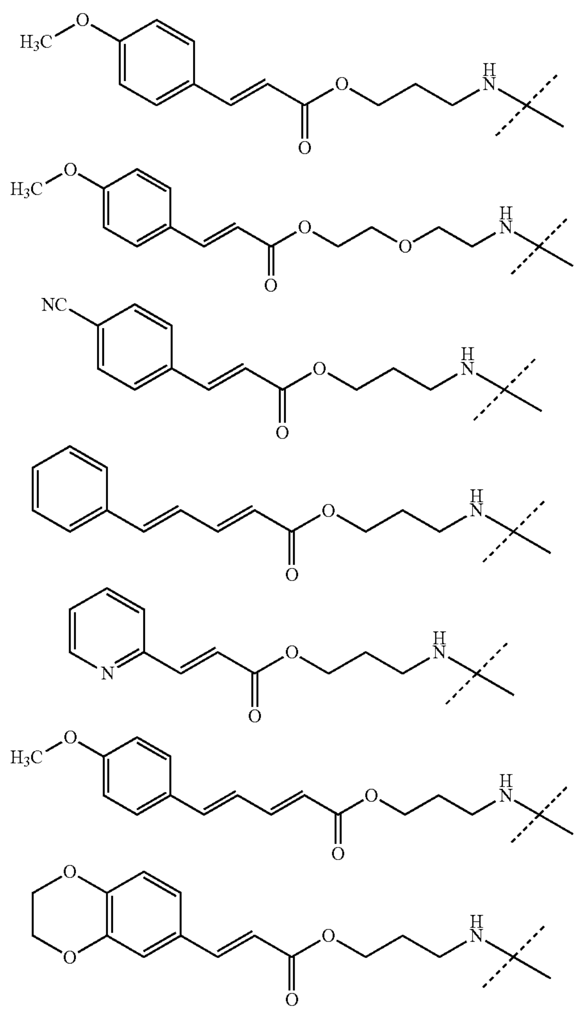

or particularly preferably, it is a photocrosslinked alginic acid manufacturing method wherein an alginic acid derivative according to the Embodiment [1-4-4c] or [1a-4-4c] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C80]

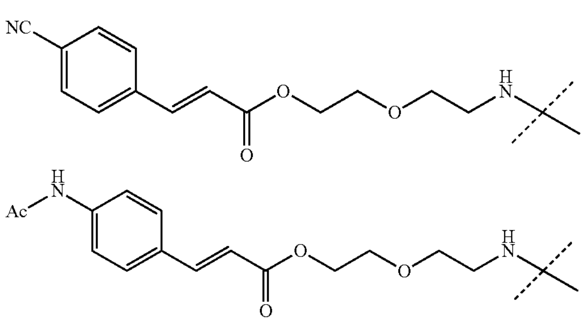

-continued

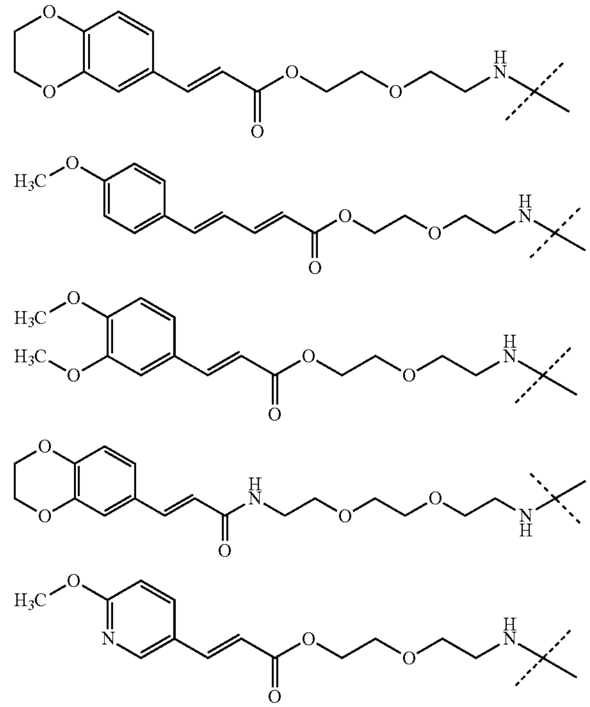

or particularly preferably, it is a photocrosslinked alginic acid manufacturing method wherein an alginic acid derivative according to the Embodiment [1-4-4] or [1a-4-4] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C81]

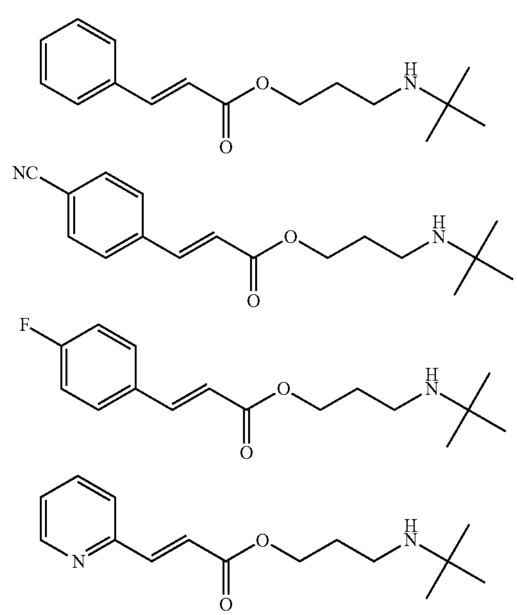

-continued

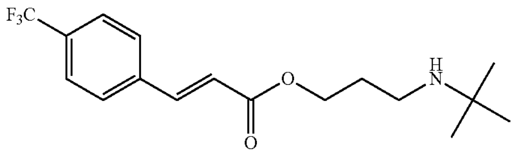

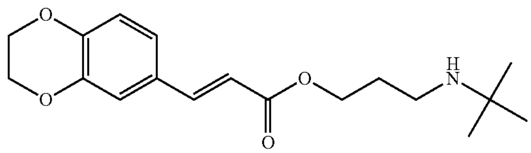

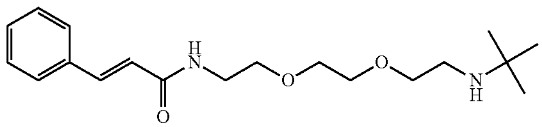

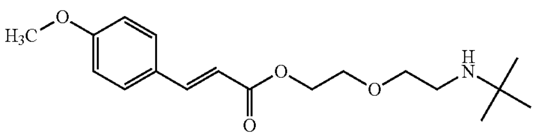

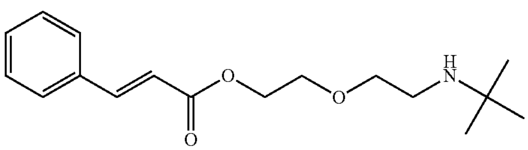

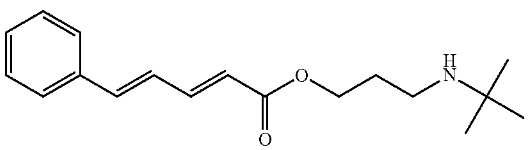

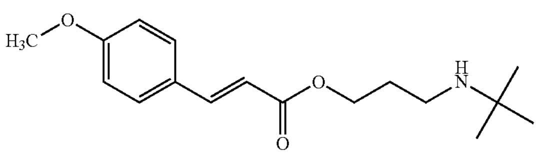

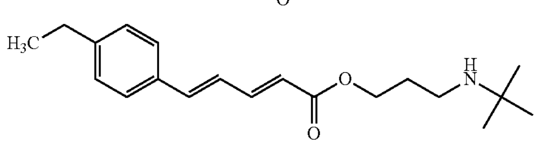

or particularly preferably, it is a photocrosslinked alginic acid manufacturing method wherein an alginic acid derivative according to the Embodiment [1-4-4-1] or [1a-4-4-1] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C82]

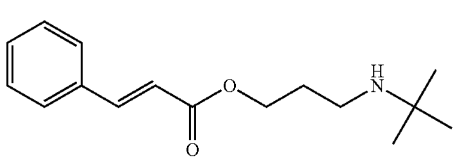

-continued

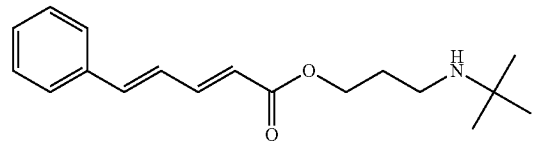

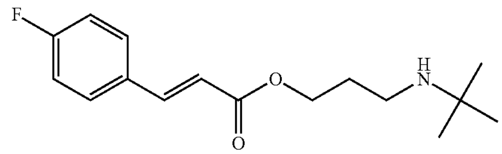

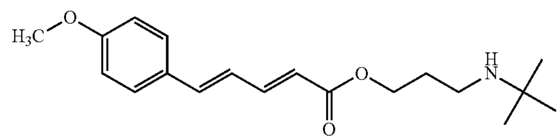

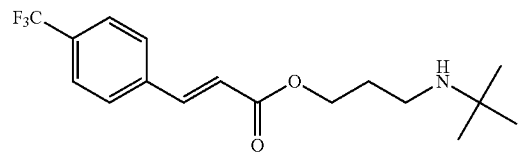

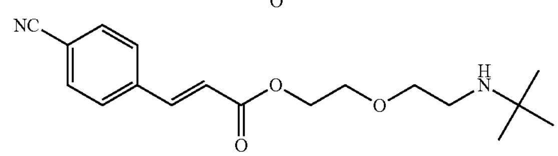

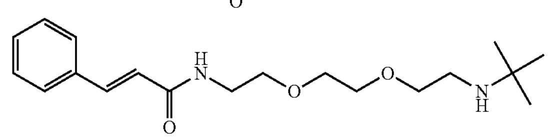

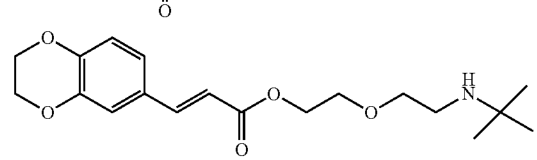

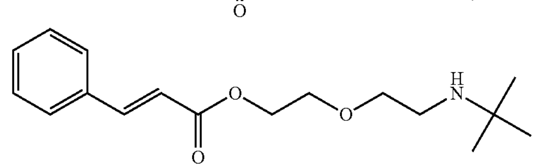

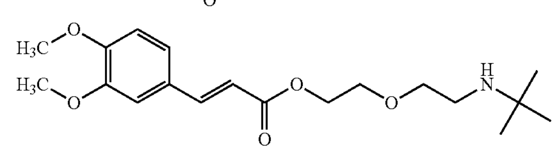

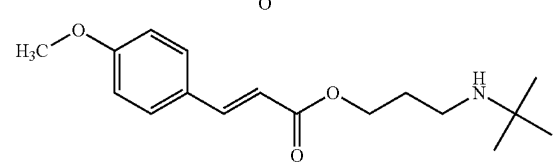

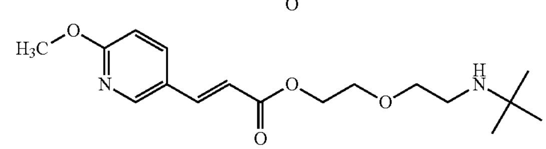

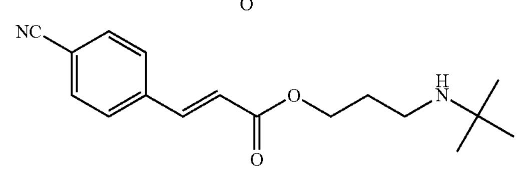

-continued

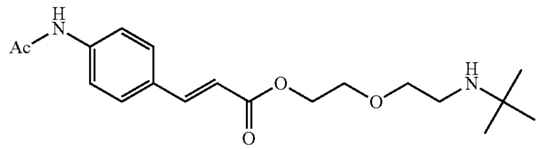

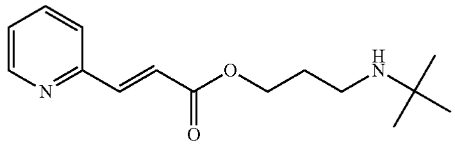

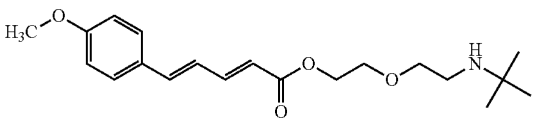

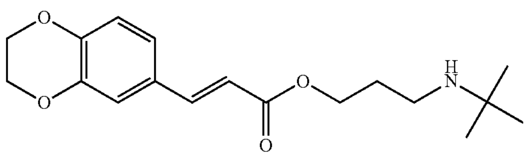

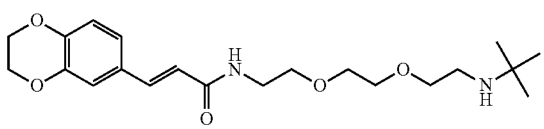

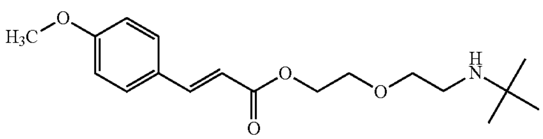

or particularly preferably, it is a photocrosslinked alginic acid manufacturing method wherein an alginic acid derivative according to the Embodiment [1-4-4-2] or [1a-4-4-2] is exposed to light, such as for example, a photocrosslinked alginic acid manufacturing method wherein an alginic acid derivative having an introduced photoreactive group selected from the following formulae excluding the part to the right of the wavy line in each formula] is exposed to light:

[C83]

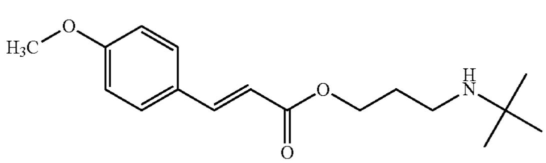

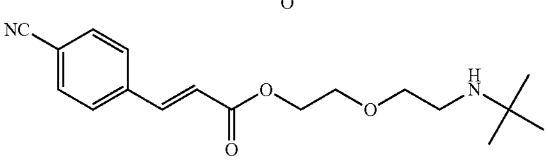

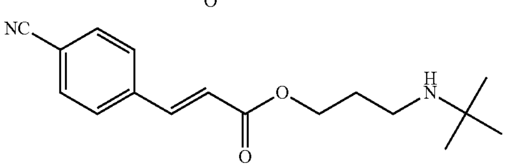

-continued

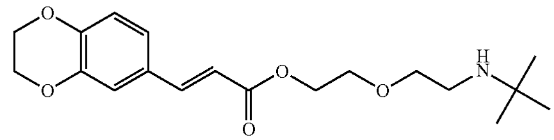

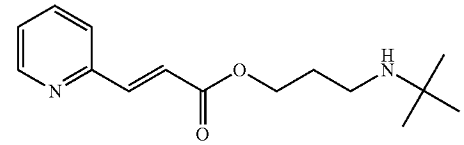

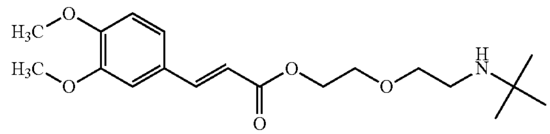

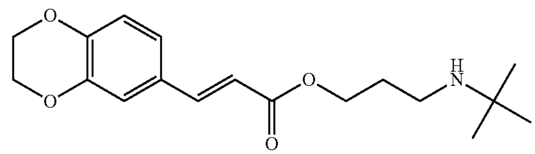

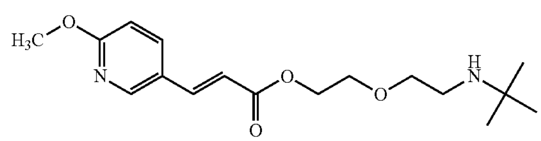

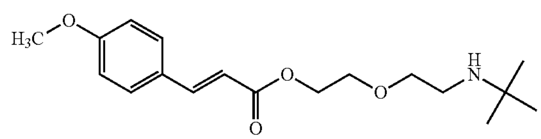

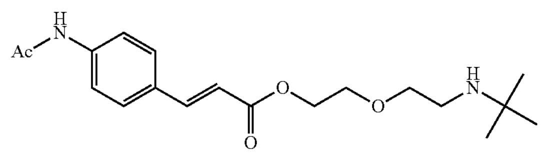

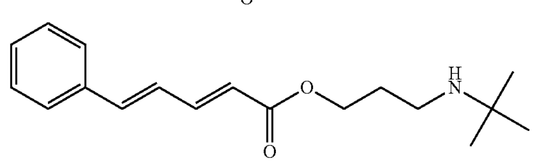

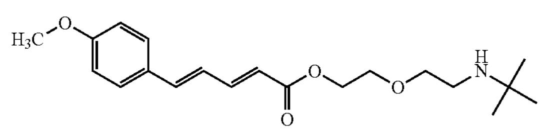

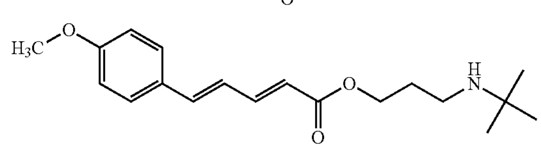

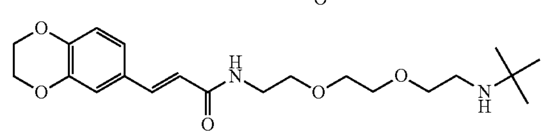

or most preferably, it is a photocrosslinked alginic acid manufacturing method wherein an alginic acid derivative having an introduced photoreactive group selected from the following formulae [excluding the part to the right of the wavy line in each formula] is exposed to light:

[C84]

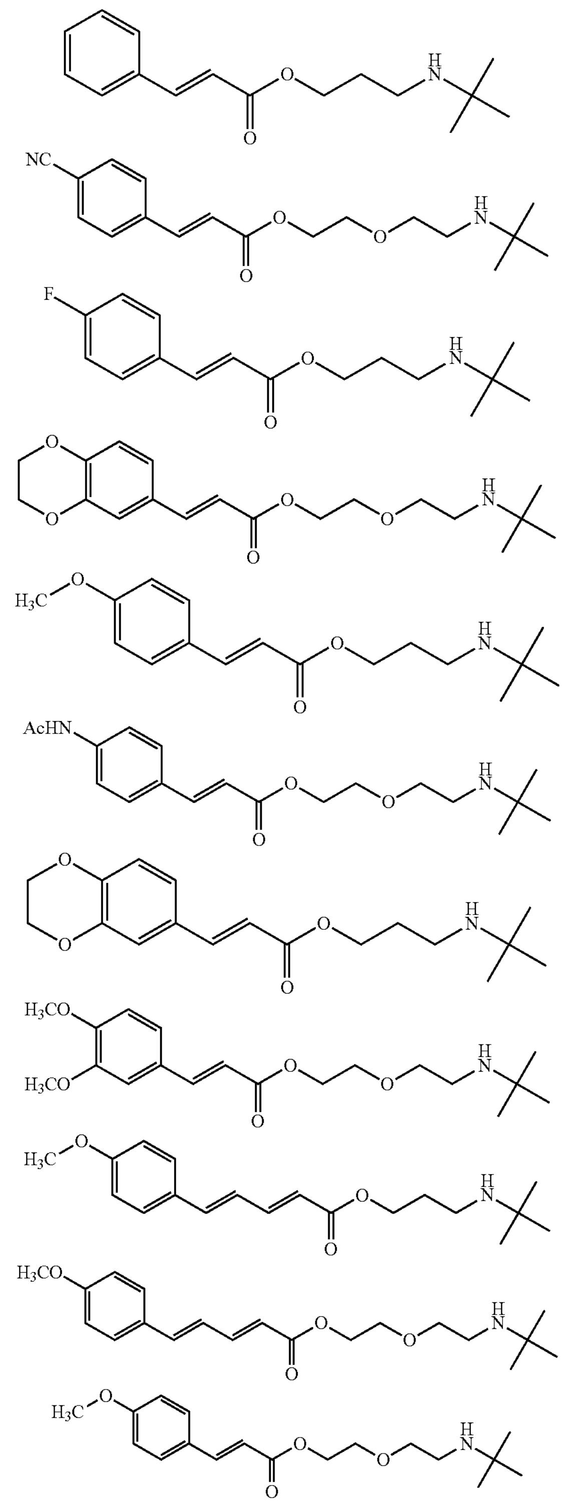

[13-2] Embodiment 13-2 is a preferred embodiment of the method for manufacturing a photocrosslinked alginic acid described in the Embodiment [13], and specifically is a photocrosslinked alginic acid manufacturing method wherein an alginic acid derivative according to the Embodiment [1b-3-1], [1b-3-1a], [1b-3-1b], or [1b-3-1c] is exposed to light; or more preferably, it is a photocrosslinked alginic acid manufacturing method wherein an alginic acid derivative according to the Embodiment [1b-3-2], [1b-3-2a], [1b-3-2b], or [1b-3-2c] is exposed to light; or still more preferably, it is a photocrosslinked alginic acid manufacturing method wherein an alginic acid derivative according to the Embodiment [1b-3-3a] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C85]

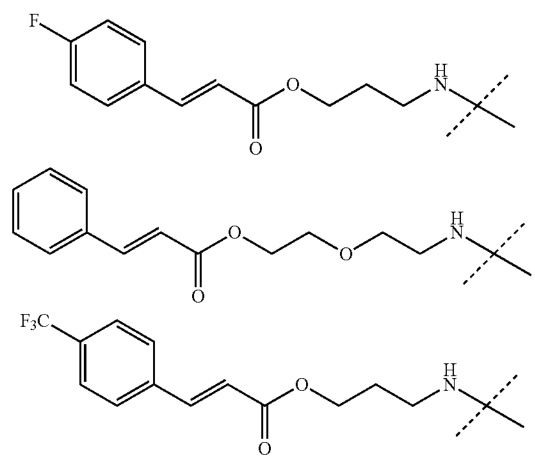

or still more preferably, it is a photocrosslinked alginic acid manufacturing method wherein an alginic acid derivative according to the Embodiment [1b-3-3b] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C86]

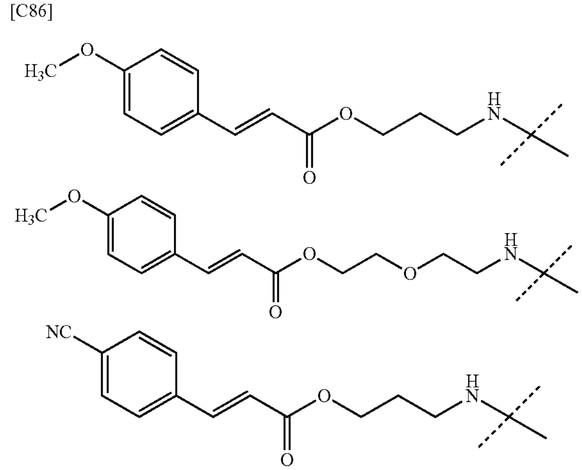

-continued

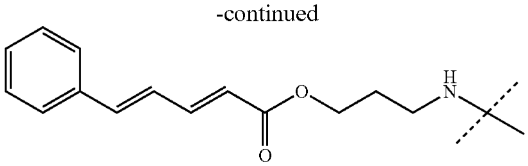

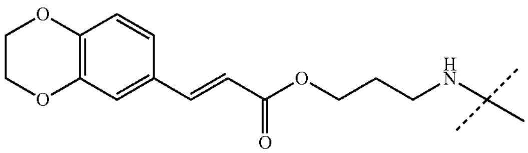

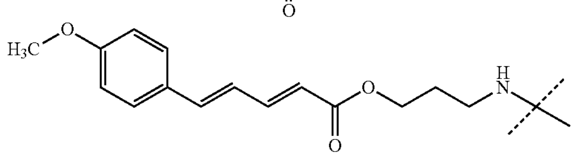

or still more preferably, it is a photocrosslinked alginic acid manufacturing method wherein an alginic acid derivative according to the Embodiment [1b-3-3c] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C87]

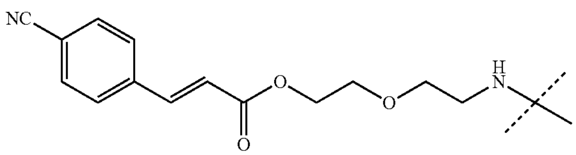

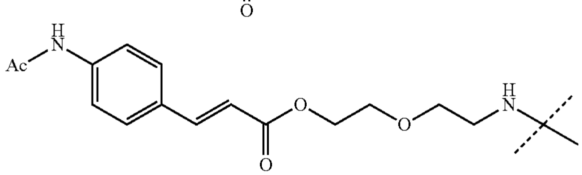

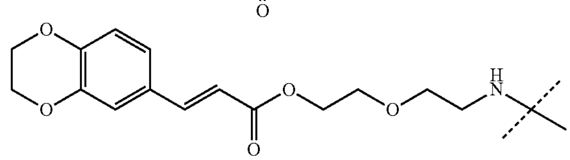

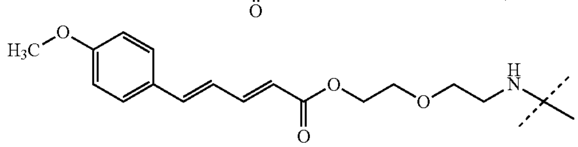

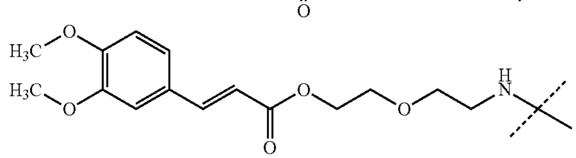

or still more preferably, it is a photocrosslinked alginic acid manufacturing method wherein an alginic acid derivative according to the Embodiment [1b-3-3] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C88]

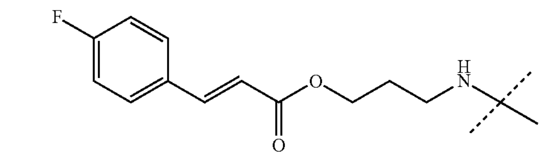

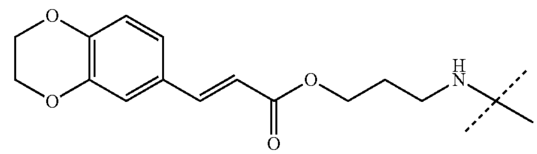

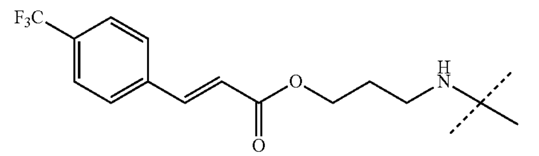

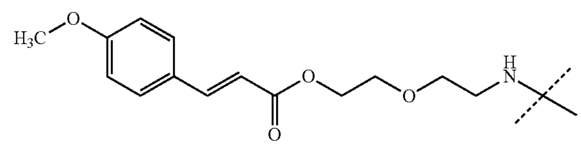

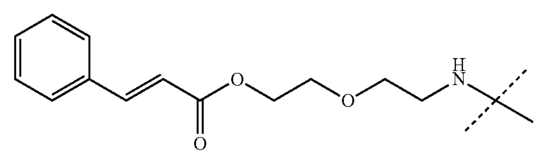

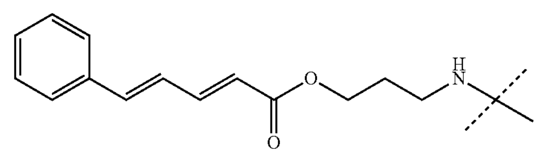

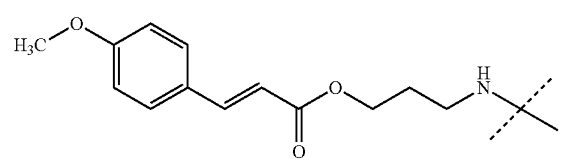

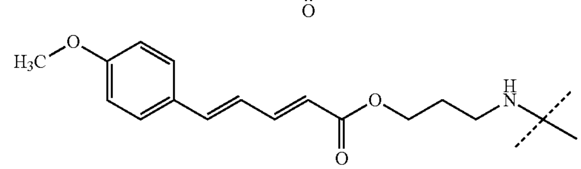

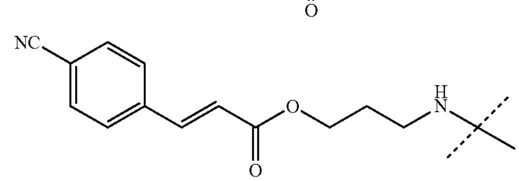

or still more preferably, it is a photocrosslinked alginic acid manufacturing method wherein an alginic acid derivative according to the Embodiment [1b-3-3-1] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C89]

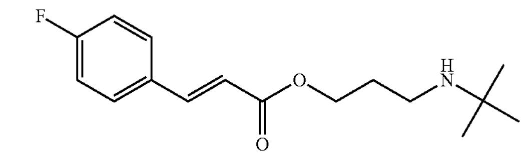
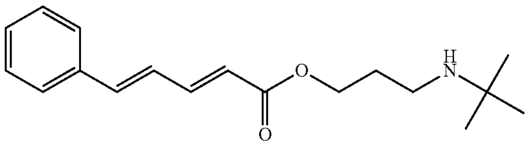
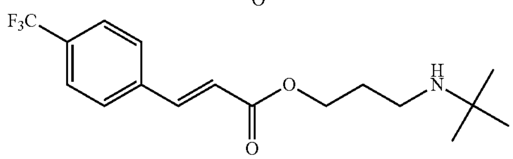
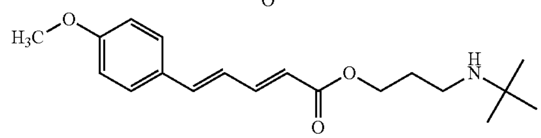
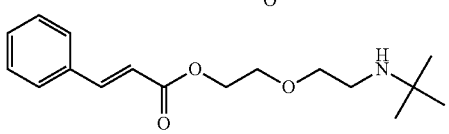
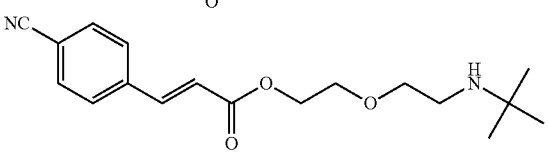
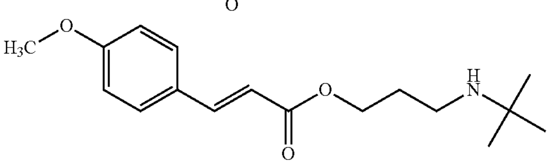
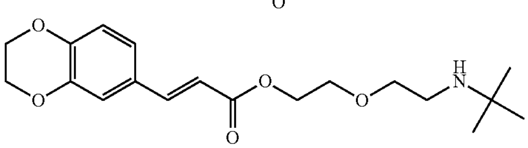
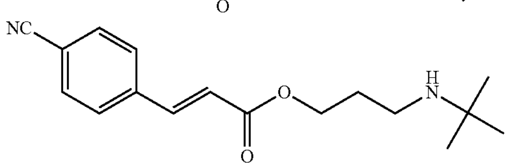
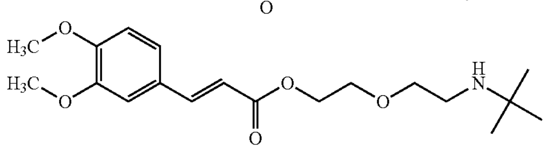
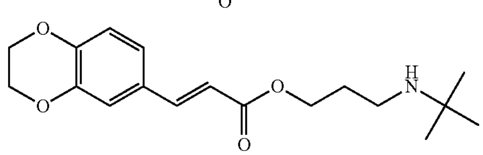
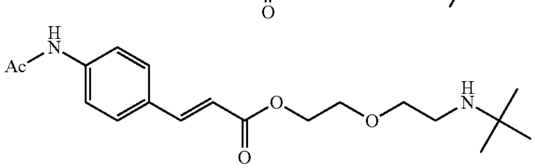

-continued

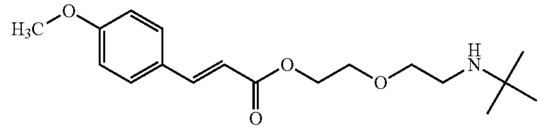
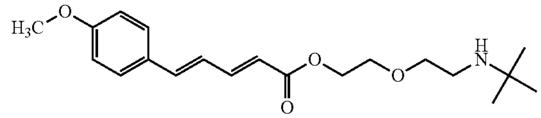

or still more preferably, it is a photocrosslinked alginic acid manufacturing method wherein an alginic acid derivative according to the Embodiment [1b-3-3-2] is exposed to light, such as for example, a photocrosslinked alginic acid manufacturing method wherein an alginic acid derivative having an introduced photoreactive group selected from the following formulae [excluding the part to the right of the wavy line in each formula] is exposed to light:

[C90]

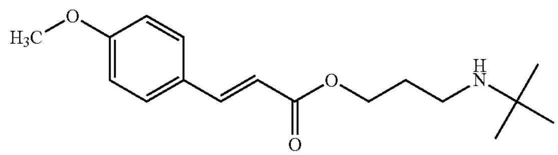
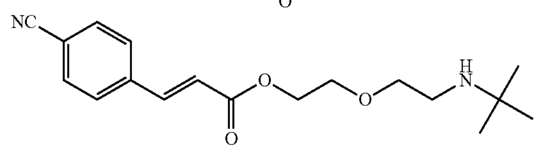
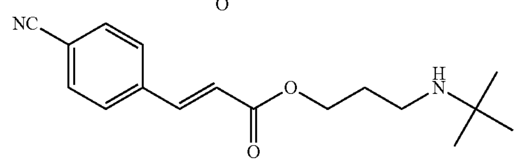
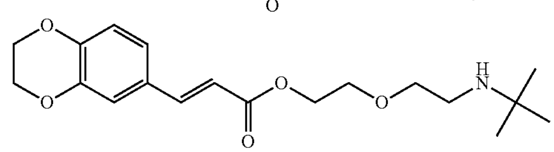
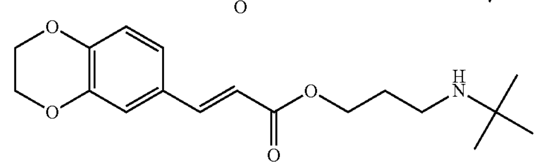
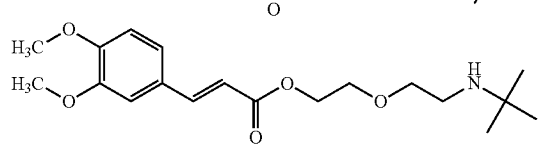
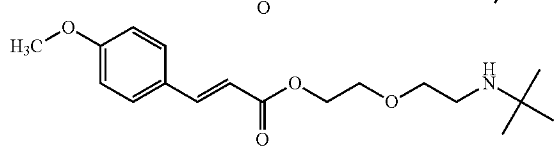
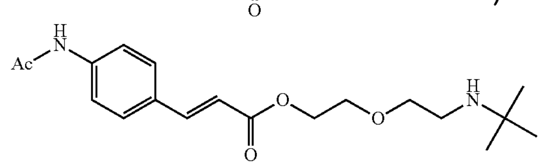

-continued

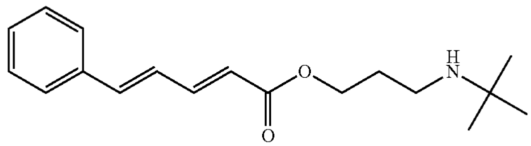

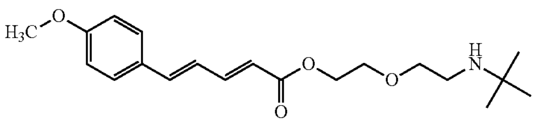

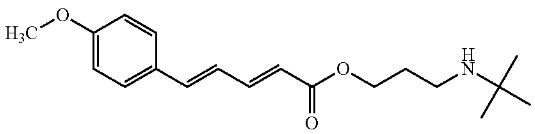

or particularly preferably, it is a photocrosslinked alginic acid manufacturing method wherein an alginic acid derivative having an introduced photoreactive group selected from the following formulae [excluding the part to the right of the wavy line in each formula] is exposed to light:

[C91]

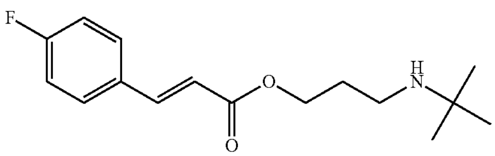

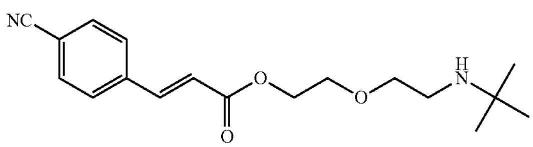

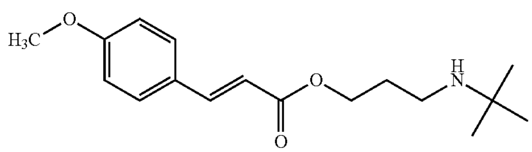

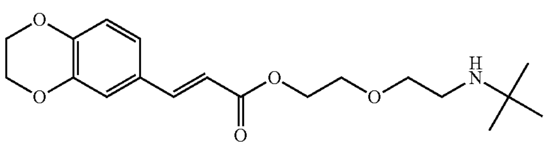

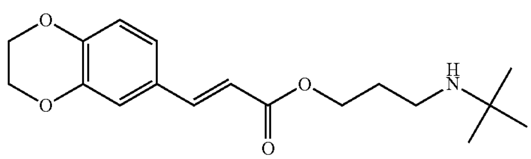

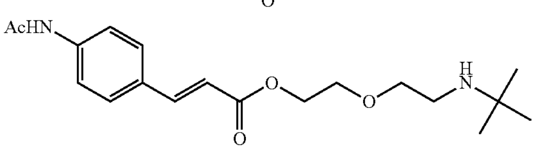

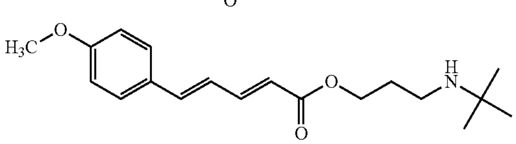

-continued

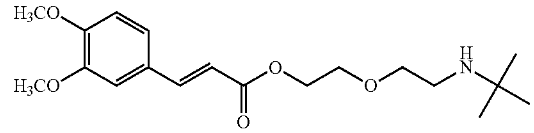

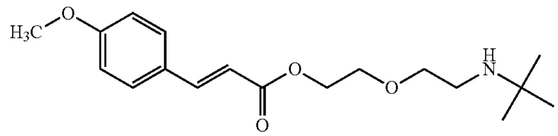

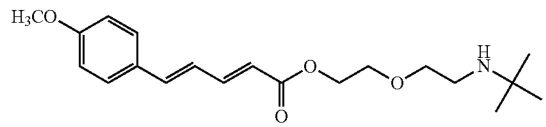 [SMILES: COc1ccc(/C=C/C=C/C(=O)OCCOCCNC(C)(C)C)cc1]

[14-1] Embodiment 14-1 is as follows: the method for manufacturing a photocrosslinked alginic acid described in the Embodiment [13], wherein the chemical crosslink formed by light exposure of the alginic acid derivative according to the Embodiment [1], [1a], or [1b] (when p=1 in formula (I)) is a structure selected from formula (II-L-1) and formula (II-L-2) below:

[C92]

(II-L-1)

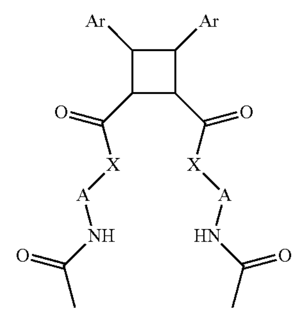

(II-L-2)

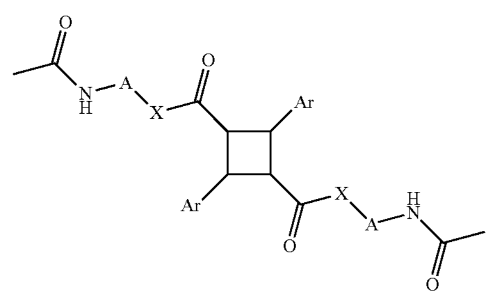

[in formula (II-L-1) or formula (II-L-2), the —CONH— and —NHCO— at either end represent amide bonds via any carboxyl group of alginic acid, and -A-, —X—, and Ar are as defined in the Embodiment [1], [1a], or [1b]].

[14-2] Embodiment 14-2 is as follows: the method for manufacturing a photocrosslinked alginic acid described in the Embodiment [13], wherein the chemical crosslink formed by light exposure of the alginic acid derivative according to the Embodiment [1], [1a], or [1b] (when p=2 in formula (I)) is the structure of formula (II-L-3) below:

[C93]

(II-L-3)

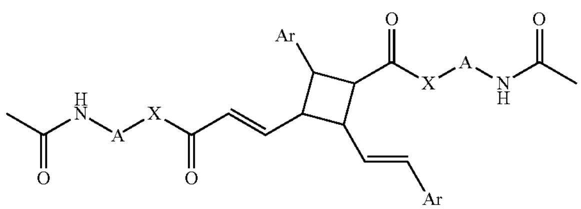

[in formula (II-L-3), the —CONH— and —NHCO— at either end represent amide bonds via any carboxyl group of alginic acid, and -A-, —X—, and Ar are as defined in the Embodiment [1], [1a], or [1b]].

[15] Embodiment 15 is as follows: a photocrosslinked alginic acid manufacturing method according to any one of the Embodiments [13], [14-1], and [14-2], wherein the light for exposure is selected from UV rays and LED light.

[16] Embodiment 16 is as follows: a method for manufacturing the photocrosslinked alginic acid structure according to the Embodiment [7] above, comprising dripping a solution of an alginic acid derivative according to the Embodiment [1], [1a], or [1b] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure.

[16-1] Embodiment 16-1 is a preferred embodiment of the method for manufacturing a photocrosslinked alginic acid structure according to the Embodiment [16], and specifically is a method for manufacturing a photocrosslinked alginic acid structure, comprising dripping a solution of an alginic acid derivative according to the Embodiment [1-4-1], [1-4-1a], [1-4-1b], [1-4-1c], [1a-4-1], [1a-4-1a], [1a-4-1b], or [1a-4-1c] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; or more preferably, it is a method for manufacturing a photocrosslinked alginic acid structure, comprising dripping a solution of an alginic acid derivative according to the Embodiment [1-4-2], [1-4-2a], [1-4-2b], [1-4-2c], [1a-4-2], [1a-4-2a], [1a-4-2b], or [1a-4-2c] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; or still more preferably, it is a method for manufacturing a photocrosslinked alginic acid structure, comprising dripping a solution of an alginic acid derivative according to the Embodiment [1-4-3], [1-4-3a], [1-4-3b], [1-4-3c], [1a-4-3], [1a-4-3a], [1a-4-3b], or [1a-4-3c] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; or particularly preferably, it is a method for manufacturing a photocrosslinked alginic acid structure, comprising dripping a solution of an alginic acid derivative according to the Embodiment [1-4-4a] or [1a-4-4a] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C94]

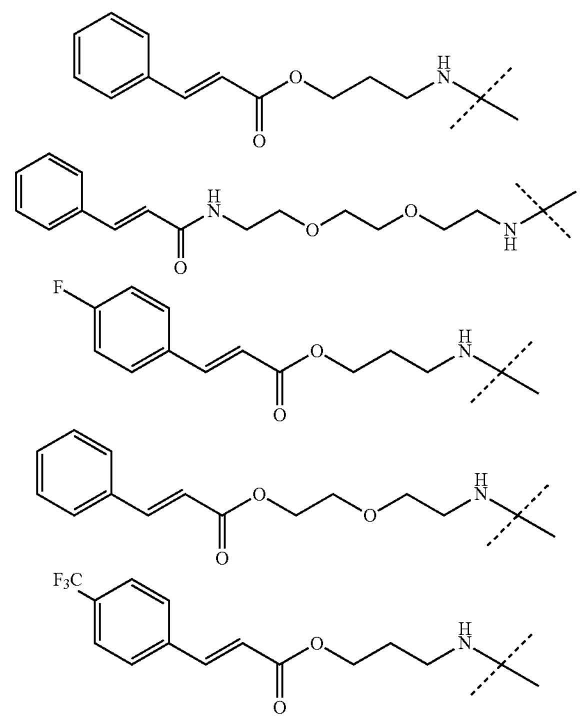

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; or particularly preferably, it is a method for manufacturing a photocrosslinked alginic acid structure, comprising dripping a solution of an alginic acid derivative according to the Embodiment [1-4-4b] or [1a-4-4b] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C95]

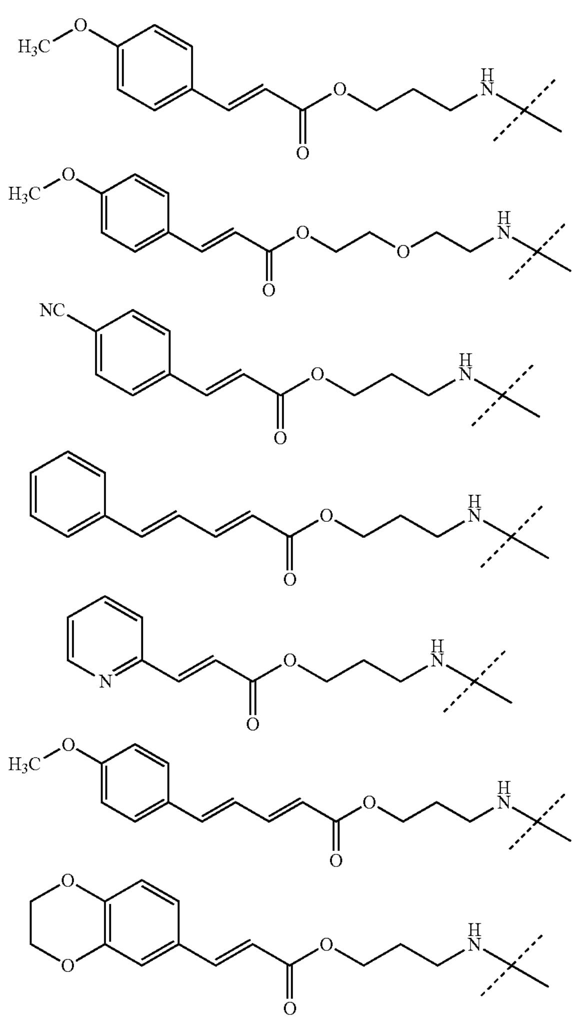

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure;

or particularly preferably, it is a method for manufacturing a photocrosslinked alginic acid structure, comprising dripping a solution of an alginic acid derivative according to the Embodiment [1-4-4c] or [1a-4-4c] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C96]

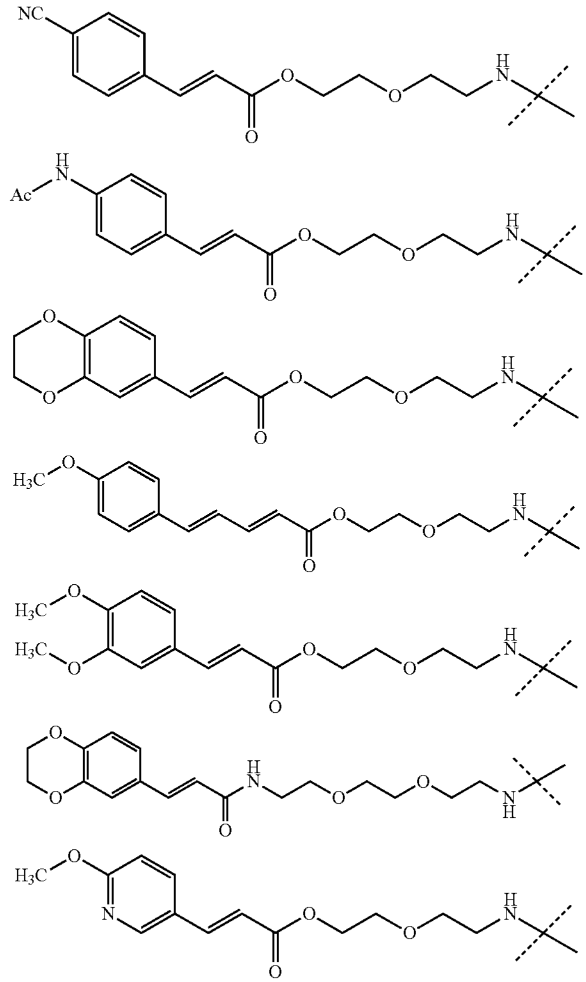

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure;

or particularly preferably, it is a method for manufacturing a photocrosslinked alginic acid structure, comprising dripping a solution of an alginic acid derivative according to the Embodiment [1-4-4] or [1a-4-4] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C97]

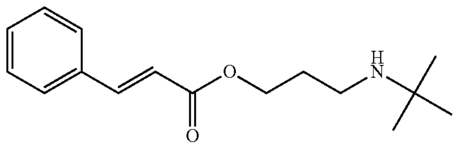

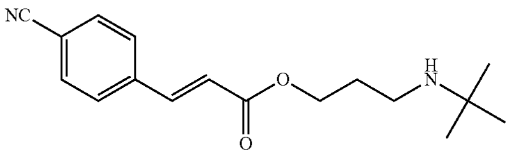

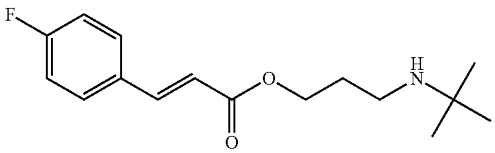

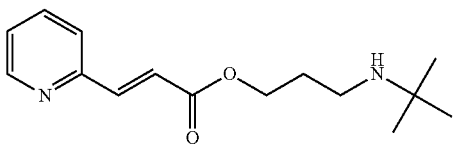

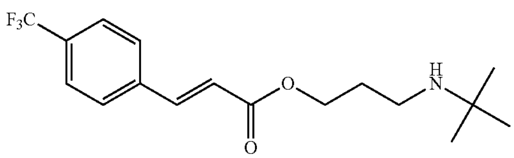

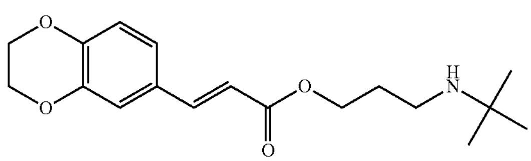

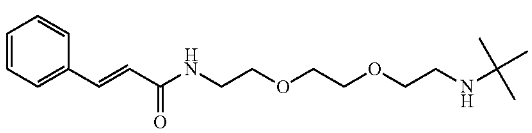

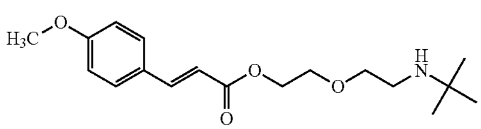

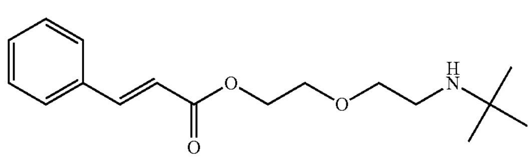

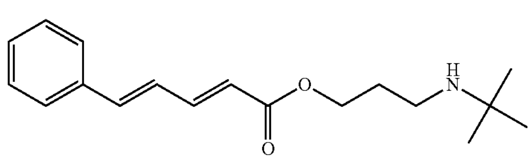

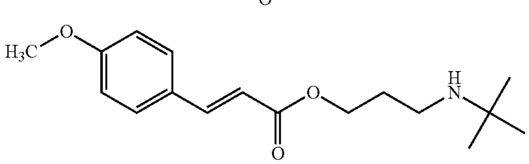

-continued

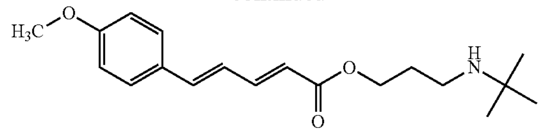

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure;

or particularly preferably, it is a method for manufacturing a photocrosslinked alginic acid structure, comprising dripping a solution of an alginic acid derivative according to the Embodiment [1-4-4-1] or [1a-4-4-1] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C98]

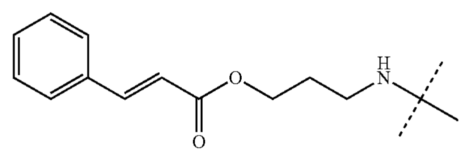

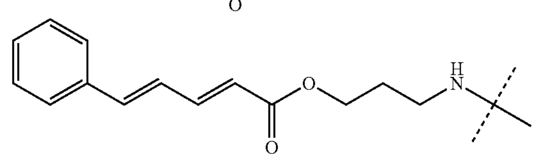

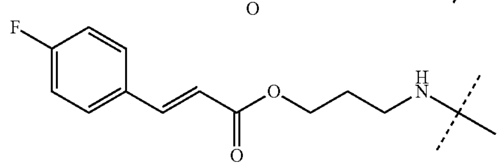

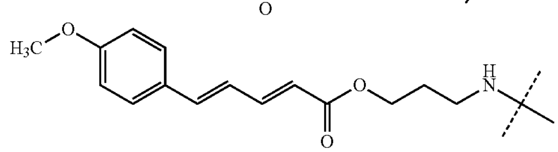

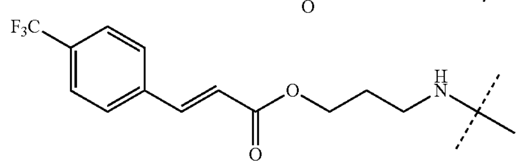

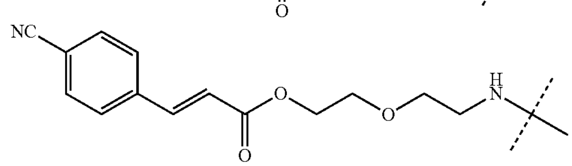

-continued

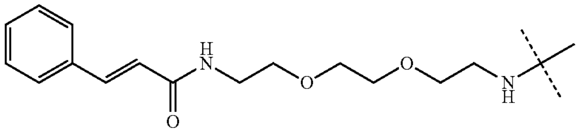

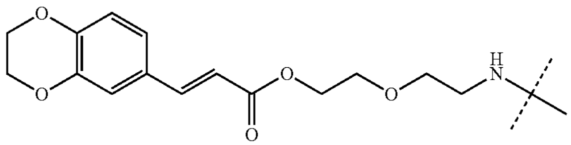

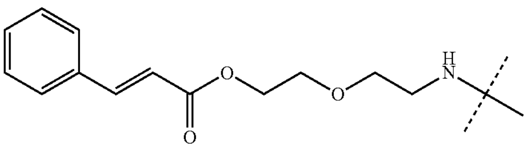

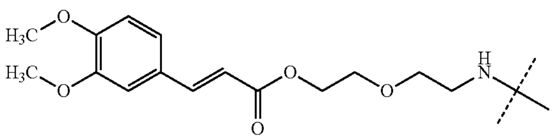

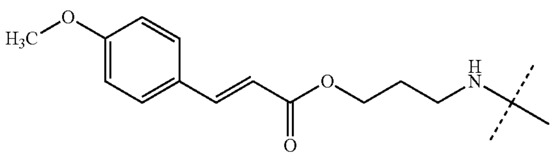

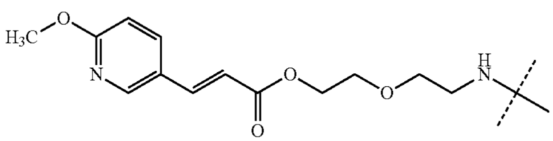

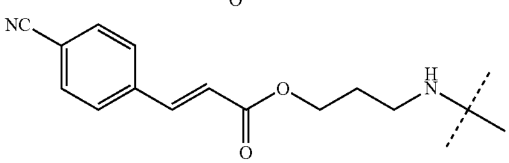

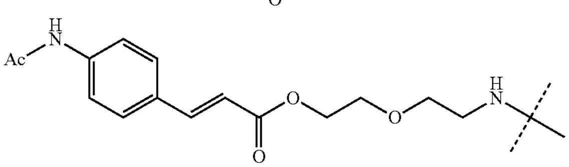

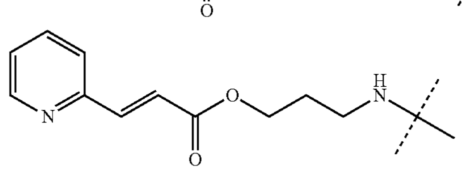

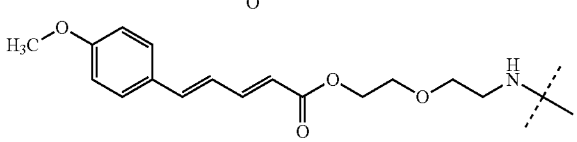

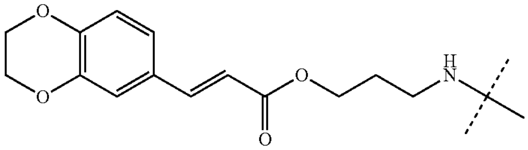

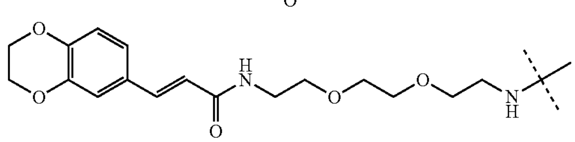

-continued

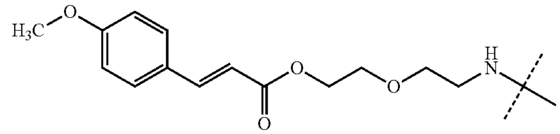

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure;

or particularly preferably, it is a method for manufacturing a photocrosslinked alginic acid structure, comprising dripping a solution of an alginic acid derivative according to the Embodiment [1-4-4-2] or [1a-4-4-2] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C99]

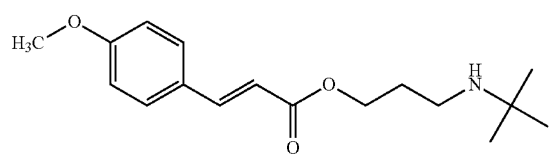

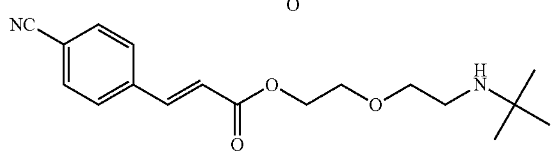

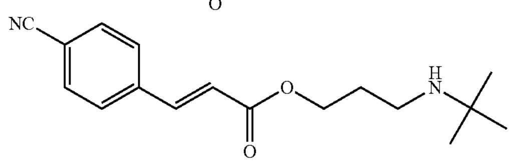

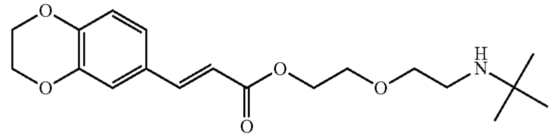

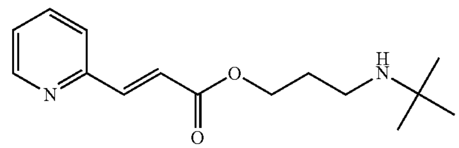

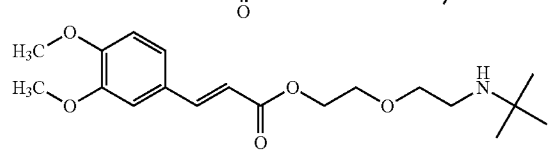

-continued

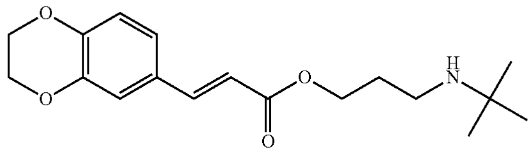

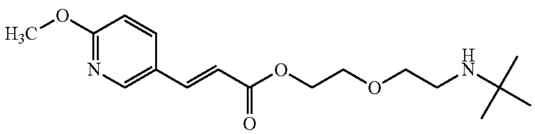

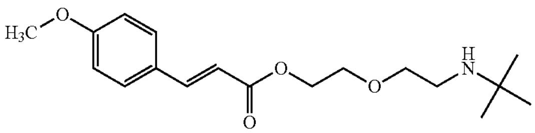

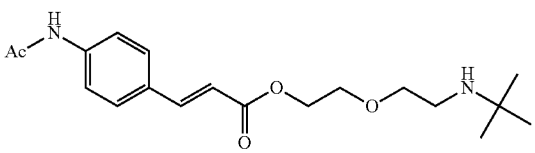

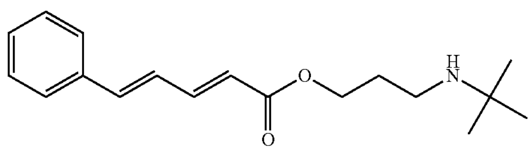

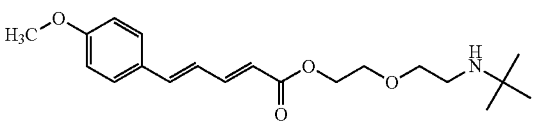

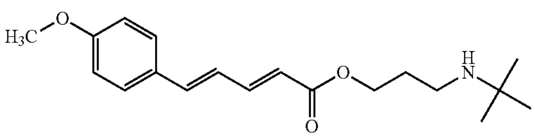

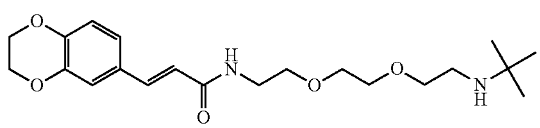

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; or most preferably, it is a method for manufacturing a photocrosslinked alginic acid structure, comprising dripping a solution of an alginic acid derivative having a photoreactive group selected from the following formulae [excluding the part to the right of the wavy line in each formula]:

[C100]

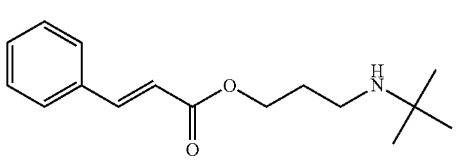

-continued

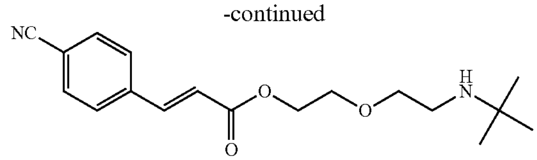

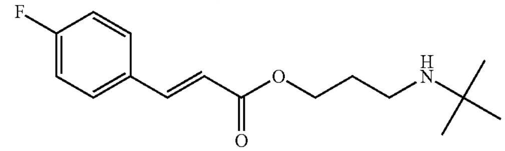

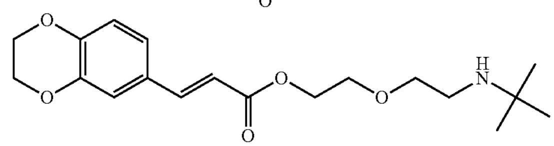

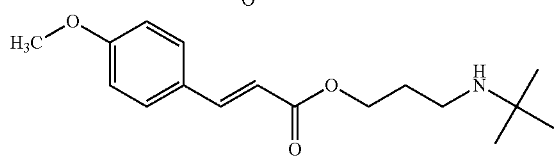

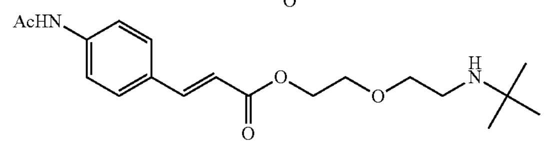

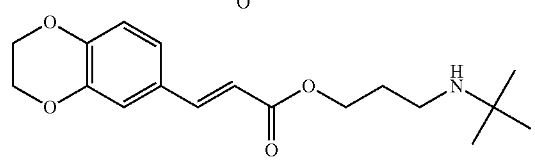

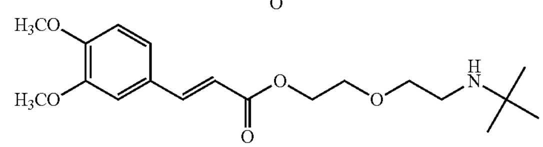

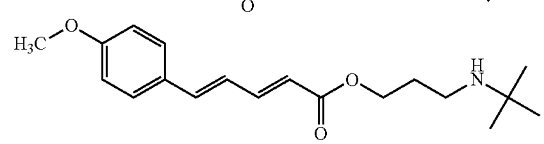

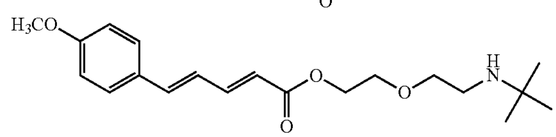

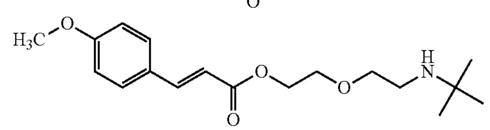

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure.

[16-2] Embodiment 16-2 is a preferred embodiment of the method for manufacturing a photocrosslinked alginic acid structure according to the Embodiment [16], and specifically is a method for manufacturing a photocrosslinked alginic acid structure, comprising dripping a solution of an alginic acid derivative according to the Embodiment [1b-3-1], [1b-3-1a], [1b-3-1b], or [1b-3-1c] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; or more preferably, it is a method for manufacturing a photocrosslinked alginic acid structure, comprising dripping a solution of an alginic acid derivative according to the Embodiment [1b-3-2], [1b-3-2a], [1b-3-2b], or [1b-3-2c] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; or still more preferably, it is a method for manufacturing a photocrosslinked alginic acid structure, comprising dripping a solution of an alginic acid derivative according to the Embodiment [1b-3-3a] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C101]

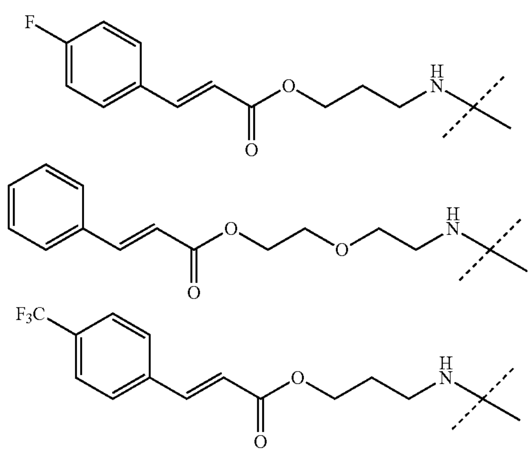

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; or still more preferably, it is a method for manufacturing a photocrosslinked alginic acid structure, comprising dripping a solution of an alginic acid derivative according to the Embodiment [1b-3-3b] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C102]

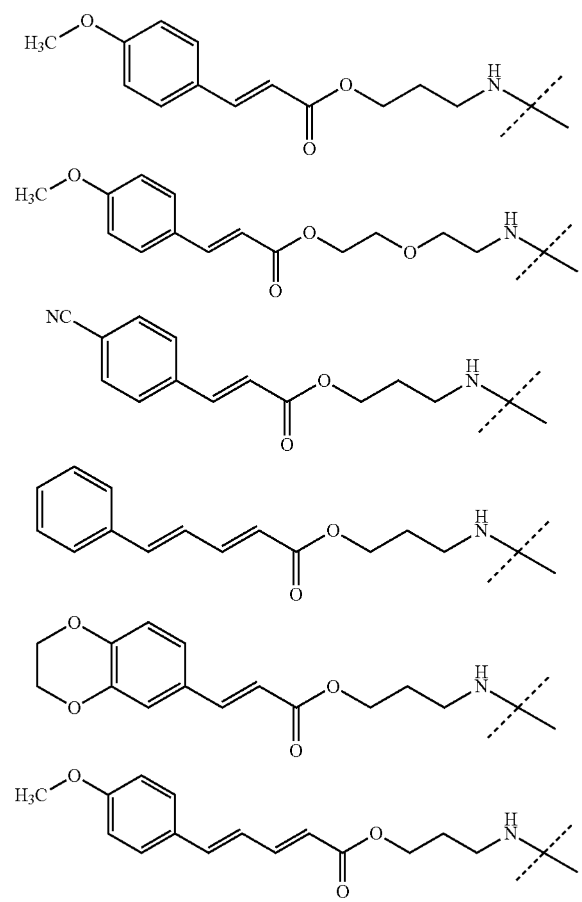

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure;

or still more preferably, it is a method for manufacturing a photocrosslinked alginic acid structure, comprising dripping a solution of an alginic acid derivative according to the Embodiment [1b-3-3c] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C103]

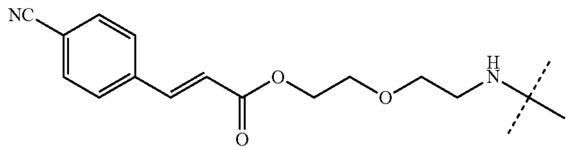

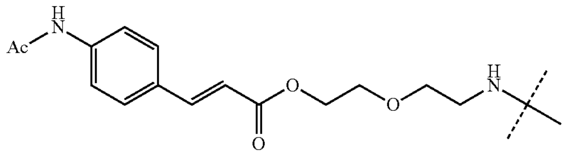

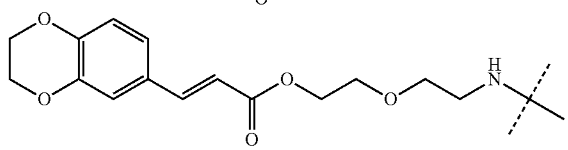

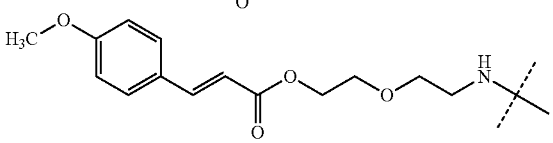

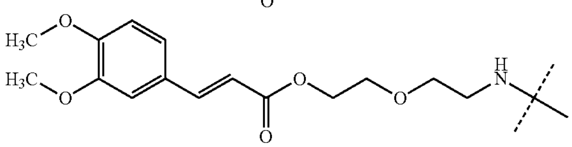

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure;

or still more preferably, it is a method for manufacturing a photocrosslinked alginic acid structure, comprising dripping a solution of an alginic acid derivative according to the Embodiment [1b-3-3] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C104]

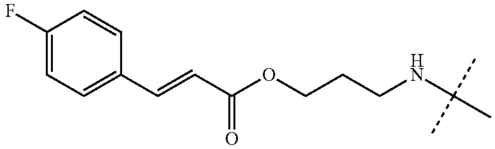

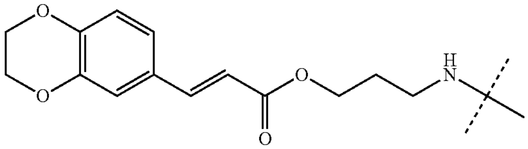

-continued

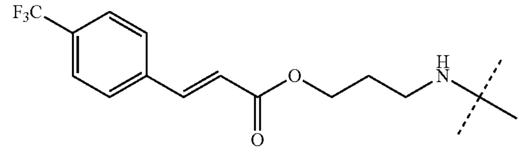

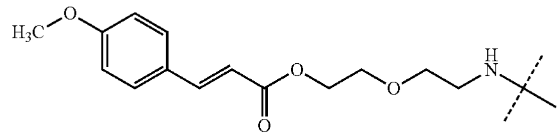

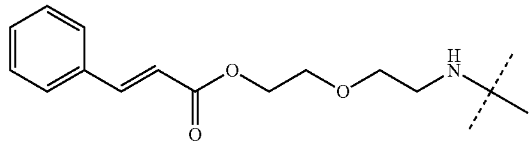

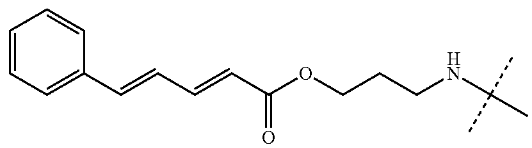

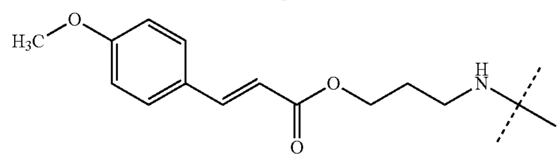

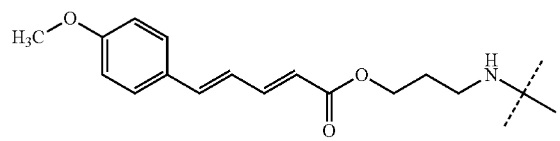

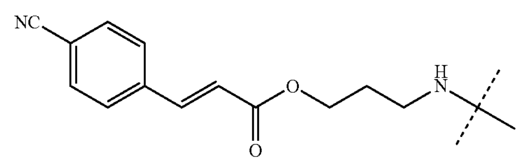

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure;

or still more preferably, it is a method for manufacturing a photocrosslinked alginic acid structure, comprising dripping a solution of an alginic acid derivative according to the Embodiment [1b-3-3-1] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C105]

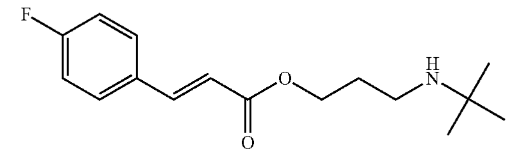

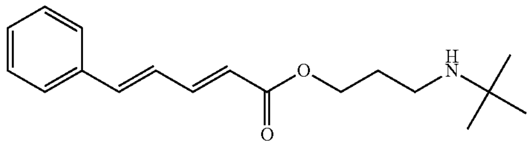

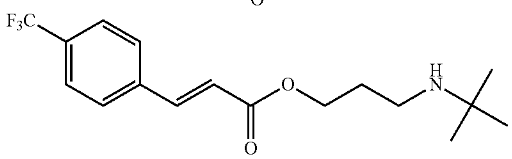

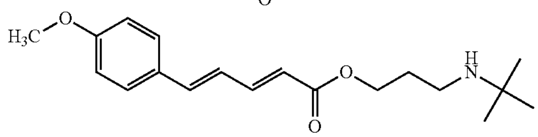

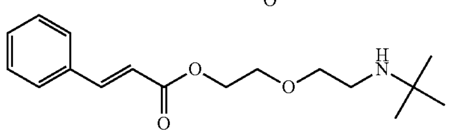

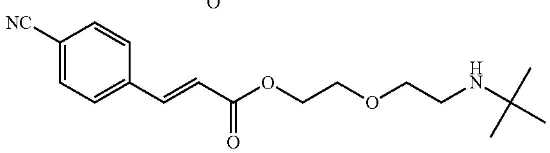

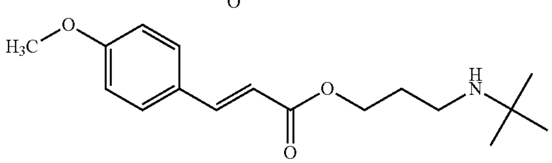

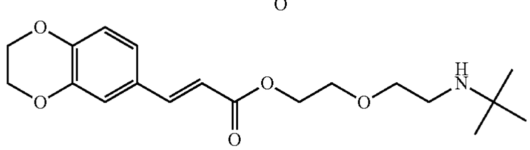

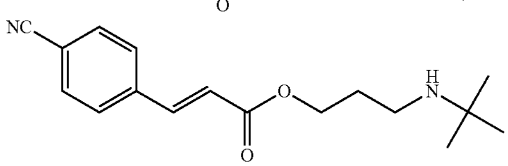

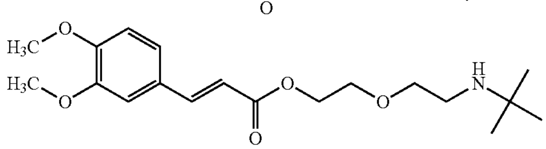

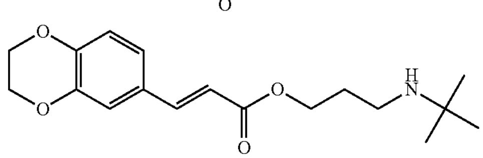

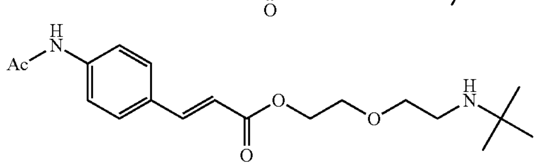

-continued

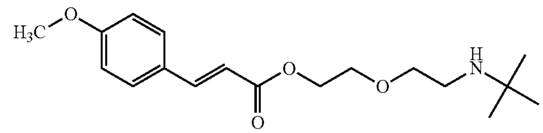

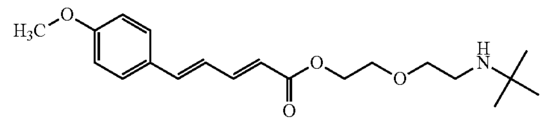

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure;

or still more preferably, it is a method for manufacturing a photocrosslinked alginic acid structure, comprising dripping a solution of an alginic acid derivative according to the Embodiment [1b-3-3-2] into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; such as for example, a method for manufacturing a photocrosslinked alginic acid structure, comprising dripping a solution of an alginic acid derivative having a photoreactive group selected from the following formulae [excluding the part to the right of the wavy line in each formula]:

[C106]

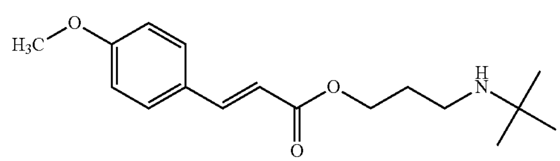

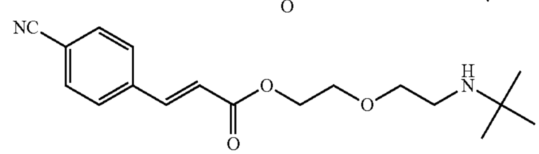

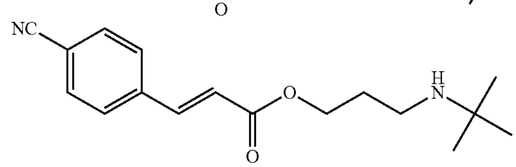

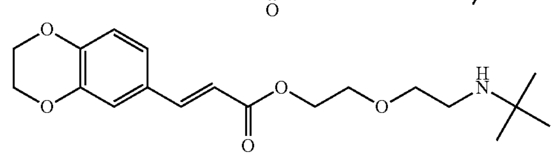

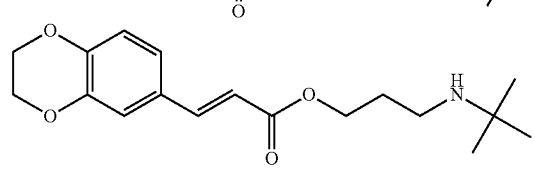

-continued

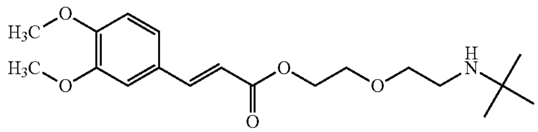

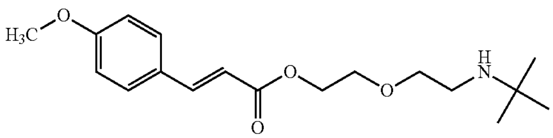

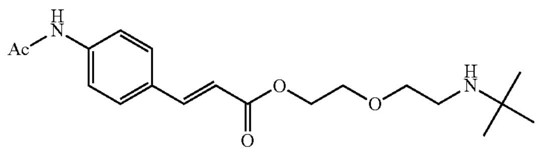

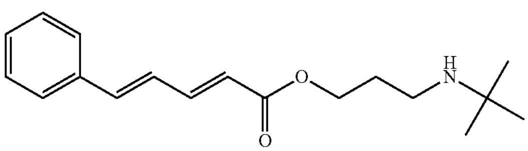

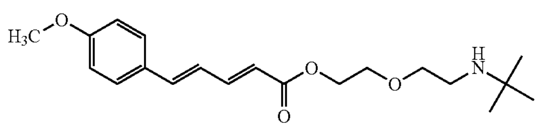

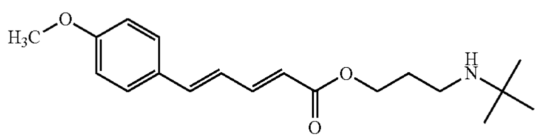

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure; or particularly preferably, it is a method for manufacturing a photocrosslinked alginic acid structure, comprising dripping a solution of an alginic acid derivative having a photoreactive group selected from the following formulae [excluding the part to the right of the wavy line in each formula]:

[C107]

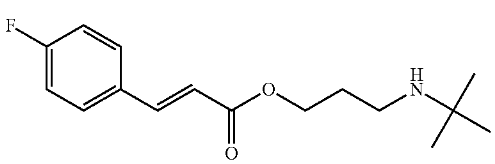

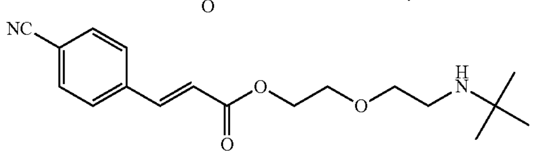

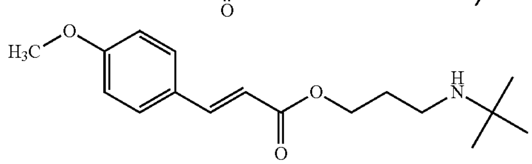

-continued

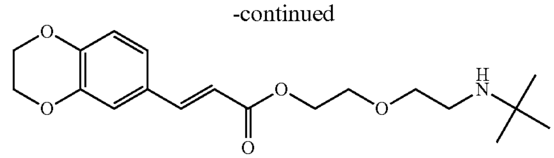

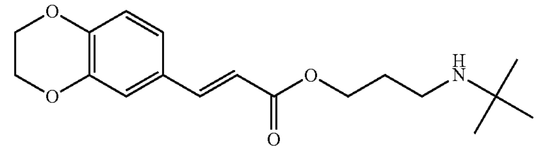

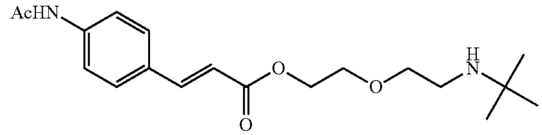

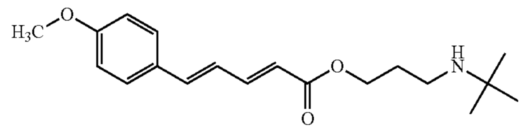

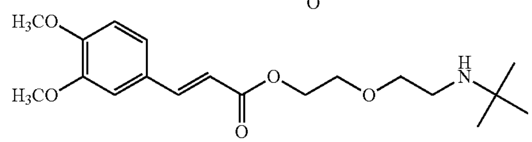

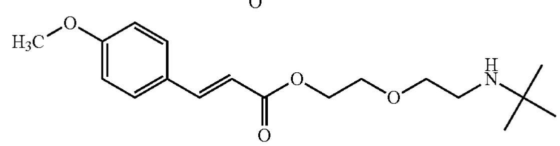

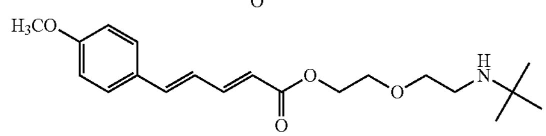

into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure.

[17-1] Embodiment 17-1 is as follows: the method for manufacturing a photocrosslinked alginic acid structure according to the Embodiment [16], wherein the chemical crosslink formed by light exposure of the alginic acid derivative according to the Embodiment [1], [1a], or [1b] (when p=1 in formula (I)) is a structure selected from formula (II-L-1) and formula (II-L-2) below:

[C108]

(II-L-1)

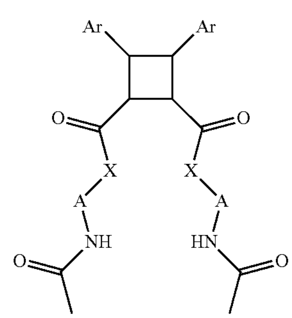

-continued (II-L-2)

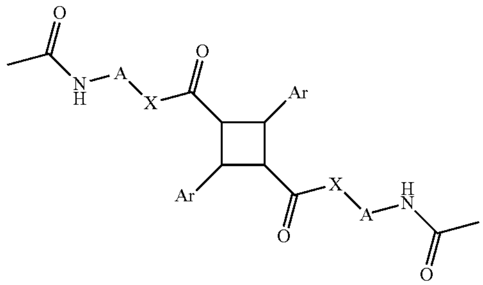

(in formula (II-L-1) or formula (II-L-2), the —CONH— and —NHCO— at either end represent amide bonds via any carboxyl group of alginic acid, and -A-, —X—, and Ar are as defined in the Embodiment [1], [1a], or [1b]).

[17-2] Embodiment 17-2 is as follows: the method for manufacturing a photocrosslinked alginic acid structure according to the Embodiment [16], wherein the chemical crosslink formed by light exposure of the alginic acid derivative according to the Embodiment [1], [1a], or [1b] (when p=2 in formula (I)) is the structure of formula (II-L-3) below:

[C109]

(II-L-3)

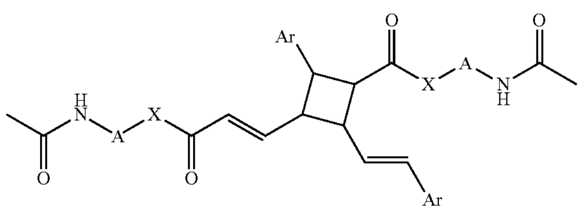

[in formula (II-L-3), the —CONH— and —NHCO— at either end represent amide bonds via any carboxyl group of alginic acid, and -A-, —X—, and Ar are as defined in the Embodiment [1], [1a], or [1b]].

[18] Embodiment 18 is as follows: a method for manufacturing a photocrosslinked alginic acid structure according to any one of the Embodiments [16], [17-1], and [17-2], wherein the light for exposure is selected from UV rays and LED light.

[19] Embodiment 19 is a method for manufacturing a photocrosslinked alginic acid structure, comprising forming a specific structure by partial ionic crosslinking of the alginic acid derivative according to the Embodiment [1], [1a], or [1b] with a divalent metal ion, and then chemically crosslinking the resultant structure by light exposure to obtain a photocrosslinked alginic acid structure.

[20] Embodiment 20 is as follows: the method for manufacturing a photocrosslinked alginic acid structure according to the Embodiment [19], wherein the light for exposure is selected from UV rays and LED light.

[21] Embodiment 21 is as follows: a photocrosslinked alginic acid structure having the ability to retain contents, obtained by using a divalent metal ion and light exposure to crosslink the alginic acid derivative according to the Embodiment [1], [1a], or [1b].

[22] Embodiment 22 is as follows: an alginic acid derivative according to any one of the Embodiments [1] to [3], a photocrosslinked alginic acid according to any one of the Embodiments [4] to [6], and a photocrosslinked alginic acid structure according to any one of the Embodiments [7] to [10], having biocompatibility.

[23] Embodiment 23 is as follows: a compound represented by the following formula (AM-1):

[C110]

(AM-1)

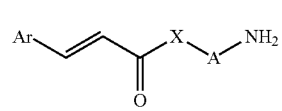

[in the formula (AM-1), Ar represents a $C_{6-10}$ aryl group or heterocyclic group (wherein the $C_{6-10}$ aryl group or heterocyclic group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group or heterocyclic group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heterocyclic group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

—X— represents —O—, —NH— or a —N($C_{1-6}$)alkyl; and -A- represents formulae (AL-1) to (AL-4) (excluding (AL-1) when —X— is —NH— or a —N($C_{1-6}$ alkyl));) [excluding the parts outside the wavy lines at both ends of each formula]:

[C111]

(AL-1)

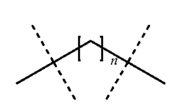

(AL-2)

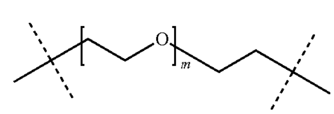

(AL-3)

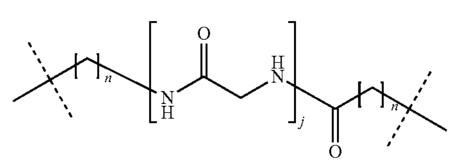

-continued (AL-4)

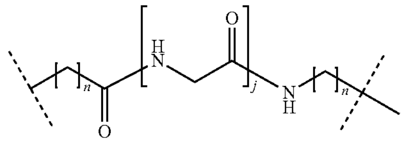

(in formulae (AL-1) to (AL-4), n represents an integer from 1 to 18, m represents an integer from 1 to 9 and j represents an integer from 0 to 9;

a hydrogen atom of a methylene group (—$CH_2$—) in formulae (AL-1) to (AL-4) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the $NR^aR^b$, ($R^aR^b$N)—$C_{1-6}$ alkyl or ($R^aR^b$N)C(═O)—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formulae (AL-1) to (AL-4), a $C_{3-8}$ cycloalkyl ring may be formed by binding between the alkyl groups; and the —NH— group in formula (AL-3) or formula (AL-4) may also form a non-aromatic heterocyclic ring with these substituents which have been substituted on adjacent carbon atoms] (with the proviso that 2-(2-aminoethoxy)ethyl (E)-3-(4-methoxyphenyl)acrylate, 2-(2-aminoethoxy)ethyl cinnamate, (E)-N-(2-(2-aminoethoxy)ethyl)-3-(4-propoxyphenyl) acrylamide, (E)-N-(2-(2-aminoethoxy)ethyl)-3-(3-methoxyphenyl) acrylamide, (E)-N-(2-(2-aminoethoxy)ethyl)-3-(3,4-dimethoxyphenyl) acrylamide, (E)-N-(2-(2-aminoethoxy)ethyl)-3-(4-ethoxyphenyl) acrylamide, (E)-N-(2-(2-aminoethoxy)ethyl)-3-(4-nitrophenyl) acrylamide, (E)-N-(2-(2-aminoethoxy)ethyl)-3-(4-isopropylphenyl) acrylamide, (E)-N-(2-(2-aminoethoxy)ethyl)-3-(4-fluorophenyl) acrylamide, (E)-N-(2-(2-aminoethoxy)ethyl)-3-(2,5-dimethoxyphenyl) acrylamide, (E)-N-(2-(2-aminoethoxy)ethyl)-3-(2-propoxyphenyl) acrylamide, (E)-N-(2-(2-aminoethoxy)ethyl)-3-(4-chlorophenyl) acrylamide, (E)-N-(2-(2-aminoethoxy)ethyl)-3-(3-isopropoxyphenyl) acrylamide, N-(2-(2-aminoethoxy)ethyl) cinnamide, (E)-N-(2-(2-aminoethoxy)ethyl)-3-(p-tolyl) acrylamide, (E)-N-(2-(2-(2-aminoethoxy)ethoxy)ethyl)-3-(4-hydroxyphenyl) acrylamide, (E)-N-(2-(2-aminoethoxy)ethyl)-3-(furan-2-yl) acrylamide, 1,3-diaminopropan-2-ylcinnamate, 5-aminopentyl (E)-3-(4-methoxyphenyl) acrylate, 3-aminopropyl (E)-3-(4-methoxyphenyl) acrylate, diaminomethyl cinnamate, 6-aminohexyl cinnamate, 4-aminobutyl cinnamate, 5-aminopentyl cinnamate, 8-aminooctyl cinnamate, 12-aminododecyl cinnamate, 3-aminopropyl cinnamate, 2-aminoethyl cinnamate, 1,2-diaminoethyl cinnamate, 2-aminoethyl (E)-3-(pyridine-4-yl) acrylate, 2-aminoethyl (E)-3-(thiophen-2-yl) acrylate, and 2-aminoethyl (E)-3-(furan-2-yl) acrylate are excluded), or a pharmaceutically acceptable salt thereof, or a solvate thereof.

[23-1] Embodiment 23-1 is a preferred embodiment of the compound of formula (AM-1) of the Embodiment [23], and specifically is a compound in which Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

—X— is —O— or —NH—; and

-A- is formula (AL-1) or (AL-2) of the Embodiment [23] (excluding formula (AL-1) when —X— is —NH— or a —N($C_{1-6}$ alkyl)) [excluding the parts outside the wavy lines at both ends of each formula] (wherein n in formula (AL-1) is an integer from 1 to 10; m in formula (AL-2) is an integer from 1 to 7; and a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the $NR^aR^b$, ($R^aR^b$N)—$C_{1-6}$ alkyl or ($R^aR^b$N)C(═O)—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group) (with the proviso that, 2-(2-aminoethoxy)ethyl (E)-3-(4-methoxyphenyl)acrylate, 2-(2-aminoethoxy)ethyl cinnamate, (E)-N-(2-(2-aminoethoxy)ethyl)-3-(4-propoxyphenyl) acrylamide, (E)-N-(2-(2-aminoethoxy)ethyl)-3-(3-methoxyphenyl) acrylamide, (E)-N-(2-(2-aminoethoxy)ethyl)-3-(3,4-dimethoxyphenyl) acrylamide, (E)-N-(2-(2-aminoethoxy)ethyl)-3-(4-ethoxyphenyl) acrylamide, (E)-N-(2-(2-aminoethoxy)ethyl)-3-(4-nitrophenyl) acrylamide, (E)-N-(2-(2-aminoethoxy)ethyl)-3-(4-isopropylphenyl) acrylamide, (E)-N-(2-(2-aminoethoxy)ethyl)-3-(4-fluorophenyl) acrylamide, (E)-N-(2-(2-aminoethoxy)ethyl)-3-(2,5-dimethoxyphenyl) acrylamide, (E)-N-(2-(2-aminoethoxy)ethyl)-3-(2-propoxyphenyl) acrylamide, (E)-N-(2-(2-aminoethoxy)ethyl)-3-(4-chlorophenyl) acrylamide, (E)-N-(2-(2-aminoethoxy)ethyl)-3-(3-isopropoxyphenyl) acrylamide, N-(2-(2-aminoethoxy)ethyl) cinnamide, (E)-N-(2-(2-aminoethoxy)ethyl)-3-(p-tolyl) acrylamide, (E)-N-(2-(2-(2-aminoethoxy)ethoxy)ethyl)-3-(4-hydroxyphenyl) acrylamide, (E)-N-(2-(2-aminoethoxy)ethyl)-3-(furan-2-yl) acrylamide, 1,3-diaminopropan-2-ylcinnamate, 5-aminopentyl (E)-3-(4-methoxyphenyl) acrylate, 3-aminopropyl (E)-3-(4-methoxyphenyl) acrylate, diaminomethyl cinnamate, 6-aminohexyl cinnamate, 4-aminobutyl cinnamate, 5-aminopentyl cinnamate, 8-aminooctyl cinnamate, 3-aminopropyl cinnamate, 2-aminoethyl cinnamate, 1,2-diaminoethyl cinnamate, 2-aminoethyl (E)-3-(pyridine-4-yl) acrylate, 2-aminoethyl (E)-3-(thiophen-2-yl) acrylate, and 2-aminoethyl (E)-3-(furan-2-yl) acrylate are excluded), or a pharmaceutically acceptable salt thereof, or a solvate thereof.

[23-2] Embodiment 23-2 is a more preferred embodiment of the compound of formula (AM-1) of the Embodiment [23], and specifically is a compound in which Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or 5- or 6-member heteroaryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl) oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring);

—X— is —O— or —NH—; and

-A- is formula (AL-1) or (AL-2) of the Embodiment [23] (excluding formula (AL-1) when —X— is —NH— or a —N($C_{1-6}$ alkyl)) [excluding the parts outside the wavy lines at both ends of each formula] (wherein n in formula (AL-1) is an integer from 1 to 8; m in formula (AL-2) is an integer from 1 to 5; and a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a —$NR^aR^b$, group (in which each of $R^a$ and $R^b$ in the $NR^aR^b$ group is each independently a group selected from a hydrogen atom, $C_{2-7}$ alkanoyl group, and $C_{1-6}$ alkylsulfonyl group), a $C_{7-16}$ aralkyl group or a heteroaryl $C_{1-6}$ alkyl group) (with the proviso that, 2-(2-aminoethoxy) ethyl (E)-3-(4-methoxyphenyl)acrylate, 2-(2-aminoethoxy) ethyl cinnamate, (E)-N-(2-(2-aminoethoxy)ethyl)-3-(4-propoxyphenyl) acrylamide, (E)-N-(2-(2-aminoethoxy) ethyl)-3-(3-methoxyphenyl) acrylamide, (E)-N-(2-(2-aminoethoxy)ethyl)-3-(3,4-dimethoxyphenyl) acrylamide, (E)-N-(2-(2-aminoethoxy)ethyl)-3-(4-ethoxyphenyl) acrylamide, (E)-N-(2-(2-aminoethoxy)ethyl)-3-(4-nitrophenyl) acrylamide, (E)-N-(2-(2-aminoethoxy)ethyl)-3-(4-isopropylphenyl) acrylamide, (E)-N-(2-(2-aminoethoxy)ethyl)-3-(4-fluorophenyl) acrylamide, (E)-N-(2-(2-aminoethoxy)ethyl)-3-(2,5-dimethoxyphenyl) acrylamide, (E)-N-(2-(2-aminoethoxy)ethyl)-3-(2-propoxyphenyl) acrylamide, (E)-N-(2-(2-aminoethoxy)ethyl)-3-(4-chlorophenyl) acrylamide, (E)-N-(2-(2-aminoethoxy)ethyl)-3-(3-isopropoxyphenyl) acrylamide, N-(2-(2-aminoethoxy)ethyl) cinnamide, (E)-N-(2-(2-aminoethoxy)ethyl)-3-(p-tolyl) acrylamide, (E)-N-(2-(2-(2-aminoethoxy)ethoxy)ethyl)-3-(4-hydroxyphenyl) acrylamide, (E)-N-(2-(2-aminoethoxy) ethyl)-3-(furan-2-yl) acrylamide, 1,3-diaminopropan-2-yl-cinnamate, 5-aminopentyl (E)-3-(4-methoxyphenyl) acrylate, 3-aminopropyl (E)-3-(4-methoxyphenyl) acrylate, diaminomethyl cinnamate, 6-aminohexyl cinnamate, 4-aminobutyl cinnamate, 5-aminopentyl cinnamate, 8-aminooctyl cinnamate, 3-aminopropyl cinnamate, 2-aminoethyl cinnamate, 1,2-diaminoethyl cinnamate, 2-aminoethyl (E)-3-(pyridine-4-yl) acrylate, 2-aminoethyl (E)-3-(thiophen-2-yl) acrylate, and 2-aminoethyl (E)-3-(furan-2-yl) acrylate are excluded), or a pharmaceutically acceptable salt thereof, or a solvate thereof.

[23-3] Embodiment 23-3 is a still more preferred embodiment of the compound of formula (AM-1) of the Embodiment [23], and specifically is a compound in which Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group or pyridyl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl)morpholine ring, 4-N—($C_{2-7}$ alkanoyl)-1,4-oxazepan ring or 4-N—($C_{1-6}$ alkylsulfonyl)-1,4-oxazepan ring);

—X— is —O— or —NH—; and

-A- is formula (AL-1) or (AL-2) of the Embodiment [23] (provided that excluding formula (AL-1) when —X— is —NH— or a —N($C_{1-6}$ alkyl)) [excluding the parts outside the wavy lines at both ends of each formula] (wherein n in formula (AL-1) is an integer from 2 to 6; and m in formula (AL-2) is an integer from 1 to 3) (with the proviso that, 2-(2-aminoethoxy)ethyl (E)-3-(4-methoxyphenyl) acrylate, 2-(2-aminoethoxy)ethyl cinnamate, (E)-N-(2-(2-aminoethoxy)ethyl)-3-(4-propoxyphenyl) acrylamide, (E)-N-(2-(2-aminoethoxy)ethyl)-3-(3-methoxyphenyl) acrylamide, (E)-N-(2-(2-aminoethoxy)ethyl)-3-(3,4-dimethoxyphenyl) acrylamide, (E)-N-(2-(2-aminoethoxy)ethyl)-3-(4-ethoxyphenyl) acrylamide, (E)-N-(2-(2-aminoethoxy)ethyl)-3-(4-nitrophenyl) acrylamide, (E)-N-(2-(2-aminoethoxy)ethyl)-3-(4-isopropylphenyl) acrylamide, (E)-N-(2-(2-aminoethoxy)ethyl)-3-(4-fluorophenyl) acrylamide, (E)-N-(2-(2-aminoethoxy)ethyl)-3-(2,5-dimethoxyphenyl) acrylamide, (E)-N-(2-(2-aminoethoxy)ethyl)-3-(2-propoxyphenyl) acrylamide, (E)-N-(2-(2-aminoethoxy)ethyl)-3-(4-chlorophenyl) acrylamide, (E)-N-(2-(2-aminoethoxy)ethyl)-3-(3-isopropoxyphenyl) acrylamide, N-(2-(2-aminoethoxy)ethyl) cinnamide, (E)-N-(2-(2-aminoethoxy)ethyl)-3-(p-tolyl) acrylamide, (E)-N-(2-(2-(2-aminoethoxy)ethoxy)ethyl)-3-(4-hydroxyphenyl) acrylamide, 1,3-diaminopropan-2-ylcinnamate, 5-aminopentyl (E)-3-(4-methoxyphenyl) acrylate, 3-aminopropyl (E)-3-(4-methoxyphenyl) acrylate, 6-aminohexyl cinnamate, 4-aminobutyl cinnamate, 5-aminopentyl cinnamate, 3-aminopropyl cinnamate, 2-aminoethyl cinnamate, 1,2-diaminoethyl cinnamate and 2-aminoethyl (E)-3-(pyridine-4-yl) acrylate are excluded), or a pharmaceutically acceptable salt thereof, or a solvate thereof.

[23-4] Embodiment 23-4 is a particularly preferred embodiment of the compound of formula (AM-1) of the Embodiment [23], and specifically is a compound in which Ar is a phenyl group or 2-pyridyl group (wherein the phenyl group or 2-pyridyl group may have any 1 to 3 groups selected from a cyano group, a fluorine atom, a trifluoromethyl group, and a methoxy group substituted for a hydrogen atom on the ring, and when two methoxy groups are substituted adjacent to one another on the phenyl group or 2-pyridyl group, they may form a 1,4-dioxane ring by binding between carbon atoms from which any one hydrogen atom each has been removed in the methyl groups of each of the two methoxy groups); and Ar is for example a phenyl group, 4-fluorophenyl group, 4-(trifluoromethyl)phenyl group, 4-methoxyphenyl group, 4-cyanophenyl group, 2,3-dihydrobenzo[b][1,4]dioxinyl group or 2-pyridyl group;

—X— is —O— or —NH—; and

-A- is formula (AL-1-1), (AL-2-1) or (AL-2-2) in the Embodiment [1-3] [excluding the parts outside the wavy lines at both ends of each formula] (with the proviso that, 2-(2-aminoethoxy)ethyl (E)-3-(4-methoxyphenyl) acrylate, 2-(2-aminoethoxy)ethyl cinnamate, (E)-N-(2-(2-aminoethoxy)ethyl)-3-(3-methoxyphenyl) acrylamide, (E)-N-(2-(2-aminoethoxy)ethyl)-3-(3,4-dimethoxyphenyl) acrylamide, (E)-N-(2-(2-aminoethoxy)ethyl)-3-(4-fluorophenyl) acrylamide, (E)-N-(2-(2-aminoethoxy)ethyl)-3-(2,5-dimethoxyphenyl) acrylamide, N-(2-(2-aminoethoxy)ethyl) cinnamide, 3-aminopropyl (E)-3-(4-methoxyphenyl) acrylate, and 3-aminopropyl cinnamate are excluded), or a pharmaceutically acceptable salt thereof, or a solvate thereof; such as for example, a compound represented by the following formulae:

[C112]

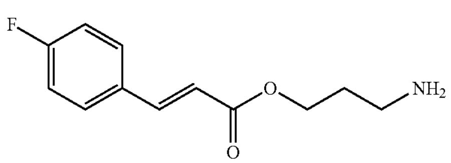

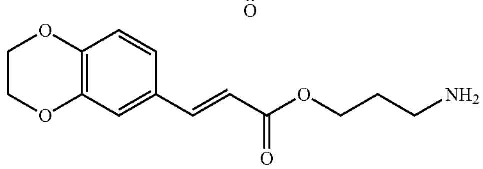

-continued

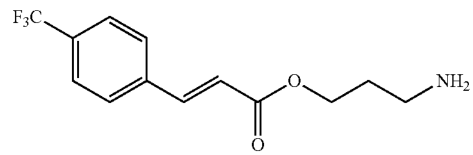

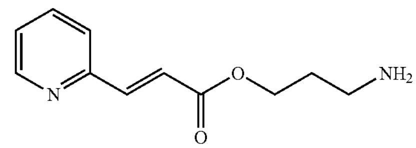

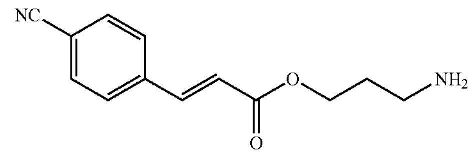

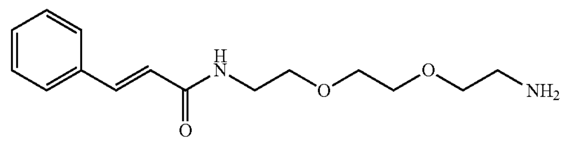

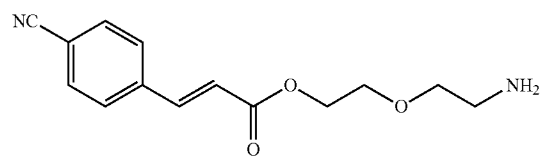

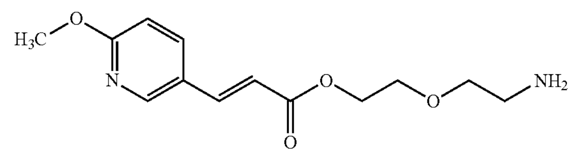

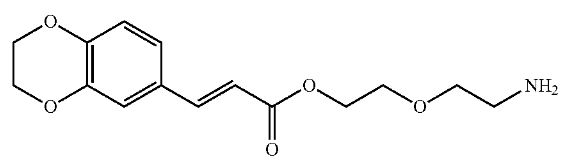

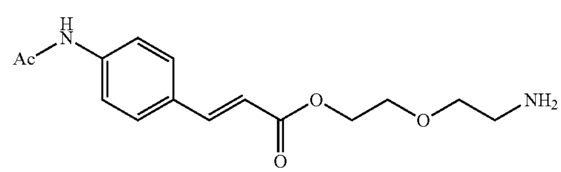

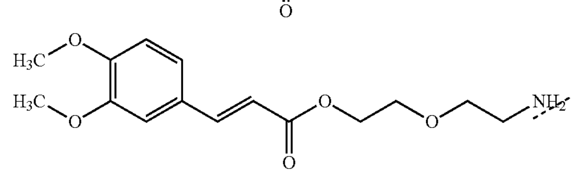

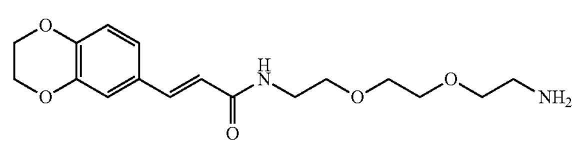

or a pharmaceutically acceptable salts thereof, or a solvate thereof.

[24] Embodiment 24 is as follows: a compound represented by the following formula (AM-2):

[C113]

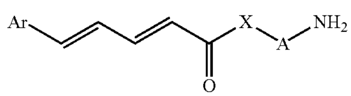

(AM-2)

[in the formula (AM-2), Ar is a $C_{6-10}$ aryl group or heterocyclic group (wherein the $C_{6-10}$ aryl group or heterocyclic group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group or heterocyclic group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heterocyclic group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring) (with the proviso that, when —X— is —NH— and A is formulae (AL-1) (n=1 to 6), a benzo[d][1,3]dioxolyl group is excluded from the heterocyclic group of this Ar, or if a $C_{1-6}$ alkyl group and a $C_{1-6}$ alkoxy group or two $C_{1-6}$ alkoxy groups are substituted adjacent to one other on the $C_{6-10}$ aryl group or heterocyclic group of the Ar, a 1,3-dioxolan ring is excluded from the cyclic ether formed by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups);

—X— represents —O—, —NH— or a —N($C_{1-6}$)alkyl; and -A- represents formulae (AL-1) to (AL-4) [excluding the parts outside the wavy lines at both ends of each formula]:

[C114]

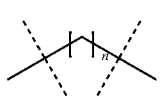

(AL-1)

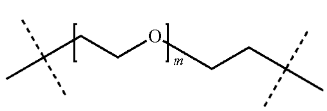

(AL-2)

-continued

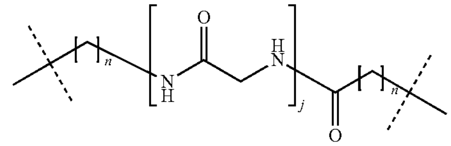

(AL-3)

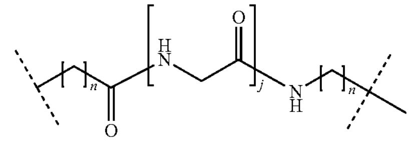

(AL-4)

(in formulae (AL-1) to (AL-4), n represents an integer from 1 to 18, m represents an integer from 1 to 9 and j represents an integer from 0 to 9;

a hydrogen atom of a methylene group (—$CH_2$—) in formulae (AL-1) to (AL-4) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the $NR^aR^b$, ($R^aR^b$N)—$C_{1-6}$ alkyl or ($R^aR^b$N)C(═O)—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formulae (AL-1) to (AL-4), a $C_{3-8}$ cycloalkyl ring may be formed by binding between carbon atoms from which any one hydrogen atom each has been removed in the alkyl groups of the two $C_{1-6}$ alkyl groups); and the —NH— group in formula (AL-3) or formula (AL-4) may also form a non-aromatic heterocyclic ring with these substituents which have been substituted on adjacent carbon atoms)], or a pharmaceutically acceptable salt thereof, or a solvate thereof.

[24-1] Embodiment 24-1 is a preferred embodiment of the compound of formula (AM-2) of the Embodiment [24], and specifically is a compound in which Ar is a $C_{6-10}$ aryl group or heteroaryl group (wherein the $C_{6-10}$ aryl group or heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group or heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heteroaryl group of the Ar, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkylsulfonyl) morpholine ring, 4-N—($C_{2-7}$ alkanoyl)-1,4-oxazepan ring or 4-N—($C_{1-6}$ alkylsulfonyl)-1,4-oxazepan ring) (with the proviso that, when —X— is —NH— and A is formulae (AL-1) (n=1 to 6), if a $C_{1-6}$ alkyl group and a $C_{1-6}$ alkoxy group or two $C_{1-6}$ alkoxy groups are substituted adjacent to one other on the $C_{6-10}$ aryl group or heteroaryl group, a 1,3-dioxolan ring is excluded from the cyclic ether formed by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups);

—X— is —O— or —NH—; and

-A- is formula (AL-1) or (AL-2) in the Embodiment [23] [excluding the parts outside the wavy lines at both ends of each formula] (wherein n in formula (AL-1) is an integer from 1 to 10 and m in formula (AL-2) is an integer from 1 to 7; and a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl or ($R^aR^b$N)C(═O)—$C_{1-6}$ alkyl group (in which each of $R^a$ and $R^b$ in the $NR^aR^b$, ($R^aR^b$N)—$C_{1-6}$ alkyl or ($R^aR^b$N)C(═O)—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formulae (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups), or a pharmaceutically acceptable salt thereof or a solvate thereof.

[24-2] Embodiment 24-2 is a more preferred embodiment of the compound of formula (AM-2) of the Embodiment [24], and specifically is a compound in which Ar is a $C_{6-10}$ aryl group or 5- or 6-member heteroaryl group (wherein the $C_{6-10}$ aryl group or 5- or 6-member heteroaryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group or 5- or 6-member heteroaryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or 5- or 6-member heteroaryl group of the Ar, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring) (with the proviso that, when —X— is —NH— and A is formulae (AL-1) (n=1 to 6), if a $C_{1-6}$ alkyl group and a $C_{1-6}$ alkoxy group or two $C_{1-6}$ alkoxy groups are substituted adjacent to one other on the $C_{6-10}$ aryl group or 5- or 6-member heteroaryl group, a 1,3-dioxolan ring is excluded from the cyclic ether formed by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups);

—X— is —O— or —NH—; and

-A- is formula (AL-1) or (AL-2) in the Embodiment [24] [excluding the parts outside the wavy lines at both ends of each formula] (wherein n in formula (AL-1) is an integer from 1 to 8 and m in formula (AL-2) is an integer from 1 to 5; and a hydrogen atom of a methylene group (—$CH_2$—) in formula (AL-1) or (AL-2) may be replaced with multiple (such as 1 to 10, or 1 to 5) groups selected from a halogen atom, a hydroxyl group, a $C_{1-6}$ alkyl group, a hydroxy $C_{1-6}$ alkyl group, a —$NR^aR^b$ group (in which each of $R^a$ and $R^b$ in the $NR^aR^b$ group is each independently a group selected from a hydrogen atom, $C_{1-6}$ alkyl group, $C_{2-7}$ alkanoyl group, and $C_{1-6}$ alkylsulfonyl group), a $C_{7-16}$ aralkyl group or a heteroaryl $C_{1-6}$ alkyl group; and if $C_{1-6}$ alkyl groups are substituted for the two hydrogen atoms of the methylene group (—$CH_2$—) in formulae (AL-1) or (AL-2), a $C_{3-8}$ cycloalkyl ring may be formed by binding between carbon atoms from which any one hydrogen atom each has been removed in the alkyl groups of the two $C_{1-6}$ alkyl groups), or a pharmaceutically acceptable salt thereof or a solvate thereof.

[24-3] Embodiment 24-3 is a preferred embodiment of the compound of formula (AM-2) of the Embodiment [24], and specifically is a compound in which Ar is a phenyl group or pyridyl group (wherein the phenyl group or pyridyl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the phenyl group or pyridyl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the phenyl group or pyridyl group of the Ar, a carbon atom from which any one hydrogen atom has been removed in the alkyl group of the $C_{1-6}$ alkoxy group may bind with the nitrogen atom from which the hydrogen atom has been removed in the —NHR$^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring) (with the proviso that, when —X— is —NH— and A is formulae (AL-1) (n=2 to 6), if a $C_{1-6}$ alkyl group and a $C_{1-6}$ alkoxy group or two $C_{1-6}$ alkoxy groups are substituted adjacent to one other on the phenyl group or pyridyl group, a 1,3-dioxolan ring is excluded from the cyclic ether formed by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups);

—X— is —O— or —NH—; and

-A- is formula (AL-1) or (AL-2) of the Embodiment [24] [excluding the parts outside the wavy lines at both ends of formula] (wherein n in formula (AL-1) is an integer from 2 to 6 and m in formula (AL-2) is an integer from 1 to 3), or a pharmaceutically acceptable salt thereof or a solvate thereof.

[24-4] Embodiment 24-4 is a preferred embodiment of the compound of formula (AM-2) of the Embodiment [24], and specifically is a compound in which Ar is a phenyl group (wherein 1 to 3 methoxy groups may be substituted for a hydrogen atom on the ring of the phenyl group); and for example, Ar is a phenyl group or 4-methoxyphenyl group;

—X— is —O—; and

-A- is formula (AL-1-1) of the Embodiment [1-3] [excluding the parts outside the wavy lines at both ends of each formula], or a pharmaceutically acceptable salt thereof or a solvate thereof; such as for example, a compound represented by the following formulae:

[C115]

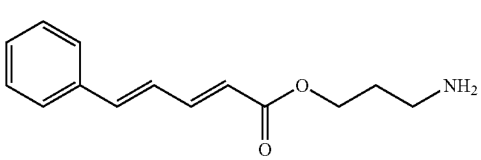

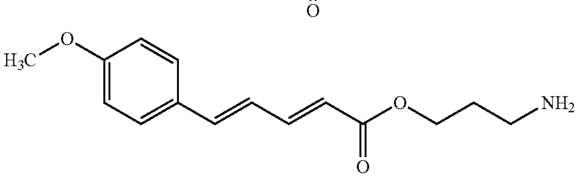

-continued

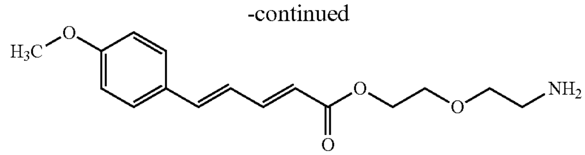

or a pharmaceutically acceptable salt thereof or a solvate thereof.

Each embodiment is explained in detail below.

1. Alginic Acid

In the present Description, references to alginic acid refer to at least one kind of alginic acid selected from the group consisting of alginic acid, alginic acid esters and salts thereof (such as sodium alginate). The alginic acid used may be either naturally derived or synthetic, but a naturally derived alginic acid is preferred. A preferred alginic acid is a bioabsorbable polysaccharide that is extracted from natural brown algae such as Lessonia, Macrocystis, Laminaria, Ascophyllum, Durvillea, Ecklonia cava, Eisenia bicyclis and Saccharina japonica, and is a polymer obtained by linear polymerization of two kinds of uronic acid, D-mannuronic acid (M) and L-guluronic acid (G). More specifically, this is a block copolymer including a homopolymer fraction of D-mannuronic acid (MM fraction), a homopolymer fraction of L-guluronic acid (GG fraction), and a fraction of randomly arranged D-mannuronic acid and L-guluronic acid (M/G fraction) in arbitrary combination.

Alginic acid as used herein may be designated as (ALG)-COOH, wherein (ALG) is alginic acid and —COOH is any one carboxyl group of alginic acid.

In some embodiments, the alginic acid is sodium alginate. Commercial sodium alginate may be used as the sodium alginate. In the following examples, the sodium alginate of A-1, A-2, and A-3 in the tables below (sold by Mochida Pharmaceutical Co., Ltd.) is used as the sodium alginate. Table 1 shows the viscosity, weight-average molecular weight and M/G ratio of a 1 w/w % aqueous solution of each sodium alginate.

TABLE 1

| Sodium alginate | 1 w/w % viscosity (mPa · s) | Weight-average molecular weight GPC | Weight-average molecular weight GPC-MALS | M/G ratio |
|---|---|---|---|---|
| A-1 | 10 to 40 | 300,000 to 700,000 | 60,000 to 130,000 | 0.5 to 1.8 |
| A-2 | 50 to 150 | 700,000 to 1,400,000 | 130,000 to 200,000 | |
| A-3 | 300 to 600 | 1,400,000 to 2,000,000 | 200,000 to 400,000 | |
| B-1 | 10 to 40 | 150,000 to 800,000 | 60,000 to 130,000 | 0.1 to 0.5 |
| B-2 | 70 to 150 | 800,000 to 1,500,000 | 130,000 to 200,000 | |
| B-3 | 400 to 600 | 1,500,000 to 2,500,000 | 200,000 to 350,000 | |

The physical property values for the sodium alginates A-1, A-2, A-3, B-1, B-2, and B-3 were measured by the methods described below. The measurement methods are not limited to these, and the physical property values may differ from those given above depending on the measurement method.

[Measuring Viscosity of Sodium Alginate]

This was measured by the rotational viscometer method (using a cone plate rotational viscometer) according to the viscosity measurement methods of the Japanese Pharmacopoeia (16th Edition). The specific measurement conditions are as follows. The sample solution was prepared using MilliQ water. A cone plate rotational viscometer (RS600 RheoStress rheometer (Thermo Haake GmbH) sensor: 35/1) was used as the measurement equipment. The rotation was set at 1 rpm when measuring a 1 w/w % sodium alginate solution. For the read time, the solution was measured for 2 minutes and the average value from 1 to 2 minutes after starting was used. The average of three measured values was used as the measurement value. The measurement temperature was 20° C.

[Measuring Weight-Average Molecular Weight of Sodium Alginate]

This was measured by two measurement methods, (1) gel permeation chromatography (GPC) and (2) GPC-MALS. The measurement conditions are as follows.

[Pre-Treatment Methods]

An eluent was added to dissolve the sample, which was then filtered through an 0.45-micron membrane filter to obtain a measurement solution.

(1) Gel Permeation Chromatography (GPC) Measurement

[Measurement Conditions (Relative Molecular Weight Distribution Measurement)]

Columns: TSKgel GMPW-XL×2+G2500PW-XL (7.8 mm I.D.×300 mm×3 columns)

Eluent: 200 mM sodium nitrate aqueous solution

Flowrate: 1.0 ml/min

Concentration: 0.05%

Detector: RI detector

Column temperature: 40° C.

Injection volume: 200 μl

Molecular weight standards: Standard pullulan, glucose (2) GPC-MALS Measurement

[Refractive Index Increment (Dn/Dc) Measurement (Measurement Conditions)]

Differential refractometer: Optilab T-rEX

Measurement wavelength: 658 nm

Measurement temperature: 40° C.

Solvent: 200 mM sodium nitrate aqueous solution

Sample concentration: 0.5 to 2.5 mg/ml (5 concentrations)

[Measurement Conditions (Absolute Molecular Weight Distribution Measurement)]

Columns: TSKgel GMPW-XL×2+G2500PW-XL (7.8 mm I.D.×300 mm×3 columns)

Eluent: 200 mM sodium nitrate aqueous solution

Flowrate: 1.0 ml/min

Concentration: 0.05%

Detectors: RI detector, light scattering detector (MALS)

Column temperature: 40° C.

Injection volume: 200 μl

The molecular weights of alginic acid, alginic acid derivatives, crosslinked alginic acids and crosslinked alginic acids a-s used herein may be given in units of Da (Daltons).

The constituent ratio of D-mannuronic acid and L-guluronic acid (M/G ratio) in an alginic acid mainly differs principally according to the seaweed or the like from which it is derived, and may also be affected by the organism's habitat and season, with a wide range from high-G (M/G ratio about 0.2) to high-M alginic acid (M/G ratio about 5). The gelling ability of the alginic acid and the properties of the resulting gel are affected by the M/G ratio, and in general, the gel strength is known to be greater the higher the G proportion. The M/G ratio also affects the hardness, fragility, water absorption, flexibility and the like of the gel. The M/G ratio of the alginic acid and/or salt thereof used is normally from 0.2 to 4.0, or preferably from 0.4 to 3.0, or still more preferably from 0.5 to 3.0.

When numerical ranges are indicated with "from" and "to" herein, the numbers after "from" and "to" are the minimum and maximum values of the range, respectively.

When used herein, an "alginic acid ester" or "alginic acid salt" is not particularly limited, but because it will react with a crosslinking agent, it must have no functional groups that would impede the crosslinking reaction. Desirable examples of alginic acid esters include propylene glycol alginate and the like.

Examples of alginic acid salts herein include monovalent salts and divalent salts of alginic acid. Preferred examples of monovalent alginic acid salts include sodium alginate, potassium alginate and ammonium alginate, of which sodium alginate and potassium alginate are more preferred, and sodium alginate is especially preferred. Preferred examples of divalent alginic acid salts include calcium alginate, magnesium alginate, barium alginate, strontium alginate and the like.

Alginic acid is a high-molecular-weight polysaccharide, and its molecular weight is hard to determine accurately, but generally its weight-average molecular weight is in the range of 1.000 to 10,000,000, or preferably 10,000 to 8,000,000, or more preferably 20,000 to 3,000,000. It is known that in molecular weight measurement of naturally derived high-molecular-weight substances, values may differ depending on the measurement method.

For example, the weight-average molecular weight as measured by gel permeation chromatography (GPC) or gel filtration chromatography (which together are also called size exclusion chromatography) is preferably at least 100,000, or more preferably at least 500,000, and is preferably not more than 5,000,000, or more preferably not more than 3,000,000. The preferred range is 100,000 to 5,000,000, or more preferably 150,000 to 3,000,000.

The absolute weight-average molecular weight can also be measured by the GPC-MALS method. The weight-average molecular weight (absolute molecular weight) as measured by the GPC-MALS method is preferably at least 10,000, or more preferably at least 50,000, or still more preferably at least 60,000, and is preferably not more than 1,000,000, or more preferably not more than 800,000, or still more preferably not more than 700,000, or especially not more than 500,000. The preferred range is 10,000 to 1,000,000, or more preferably 50,000 to 800,000, or still more preferably 60,000 to 700,000, or especially 60,000 to 500,000.

When the molecular weight of a high-molecular-weight polysaccharide is measured by such methods, a measurement error of 10% to 20% is normal. Thus, for example, a value of 400.000 may vary in the range of 320,000 to 480,000, a value of 500,000 may vary in the range of 400,000 to 600,000, and a value of 1,000,000 may vary in the range of 800,000 to 1,200,000.

The molecular weight of the alginic acid can be measured by ordinary methods.

Typical conditions for molecular weight measurement using gel filtration chromatography are described in the examples of this Description below. A Superose 6 Increase 10/300 GL column (GE Health Care Sciences) may be used as the column, a 10 mmol/L phosphoric acid buffer containing 0.15 mol/L NaCl (pH 7.4) may be used as the development solvent for example, and blue dextran, thyroglobulin, ferritin, aldolase, conalbumin, ovalbumin, ribonuclease A, and aprotinin may be used as molecular weight standards.

The viscosity of the alginic acid used herein is not particularly limited, but when measured in a 1 w/w % aqueous solution of the alginic acid, it is preferably 10 mPa s to 1,000 mPa·s, or more preferably 50 mPa·s to 800 mPa·s.

The viscosity of an aqueous solution of the alginic acid can be measured by ordinary methods. For example, it can be measured by rotational viscometry using a coaxial double cylindrical rotational viscometer, single cylindrical rotary viscometer (Brookfield viscometer), conical plate rotational viscometer (cone plate viscometer) or the like. Preferably it is measured following the viscosity measurement methods of the Japanese Pharmacopoeia (16th Edition). More preferably, a cone plate viscometer is used.

When first extracted from brown algae, alginic acids have a high molecular weight and a high viscosity, but the molecular weight and viscosity are reduced by the processes of heat drying, purification and the like. Alginic acids with different molecular weights can be manufactured by methods such as controlling the temperature and other conditions during the manufacturing process, selecting the brown algae used as raw materials, and fractioning the molecular weights in the manufacturing process. An alginic acid having the desired molecular weight can also be obtained by mixing alginic acids from different lots having different molecular weights or viscosities.

Some embodiments of the alginic acid used herein have been subjected to low endotoxin treatment, while others have not been subject to low endotoxin treatment. "Low endotoxin" means that the level of endotoxins is so low that there is no effective risk of inflammation or fever. An alginic acid that has been subjected to low endotoxin treatment is preferred.

Low endotoxin treatment can be performed by known methods or analogous methods. For example, it can be performed by the methods of Kan et al for purifying sodium hyaluronate (see for example Japanese Patent Application Publication No. H 09-324001, etc.), the methods of Yoshida et al for purifying β 1,3-glucan (see for example Japanese Patent Application Publication No. H 08-269102), the methods of William et al for purifying biopolymer salts such as alginate and gellan gum (see for example Japanese Translation of PCT Application Publication No. 2002-530440), the methods of James et al for purifying polysaccharides (see for example WO 93/13136, pamphlet), the methods of Lewis et al (see for example U.S. Pat. No. 5,589,591), and the methods of Herman Frank for purifying alginate (see for example Appl. Microbiol. Biotechnol. (1994) 40:638-643, etc.) and the like or analogous methods. Low endotoxin treatment is not limited to these methods, and may also be performed by known methods such as washing, filtration with a filter (endotoxin removal filter, charged filter or the like), ultrafiltration, column purification (using an endotoxin adsorption affinity column, gel filtration column, ion-exchange resin column or the like), adsorption by a hydrophobic substance, resin, activated carbon or the like, organic solvent treatment (organic solvent extraction, deposition/sedimentation with an organic solvent or the like), surfactant treatment (see for example Japanese Patent Application Publication No. 2005-036036) or the like, or by a suitable combination of these methods. Known methods such as centrifugation may also be combined with the steps of such treatment. The treatment is preferably selected appropriately according to the type of alginic acid.

The endotoxin level can be confirmed by known methods, such as limulus reagent (LAL) methods or methods using an Endospecy (registered trademark) ES-24S set (Seikagaku Corp.).

There are no particular limitations on the endotoxin treatment method used, but the resulting endotoxin content of the treated alginic acid is preferably not more than 500 endotoxin units (EU)/g, or more preferably not more than 100 EU/g, or still more preferably not more than 50 EU/g, or especially not more than 30 EU/g when measured with a limulus reagent (LAL). Low endotoxin treated sodium alginate is available as a commercial product such as Sea Matrix (registered trademark) (Mochida Pharmaceutical) or PRONOVA (trademark) UP LVG (FMC BioPolymer).

2. Alginic Acid Derivative

An alginic acid derivative is provided here. In the alginic acid derivative, some of the carboxylic groups of alginic acid are substituted with a photoreactive group represented by the following formula (I) [excluding the part to the right of the wavy line in the formula]:

[C116]

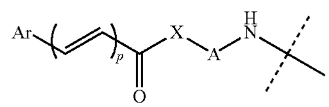

(I)

[in which Ar, p, —X—, and -A- are defined as above, such as in Embodiment 1], or in other words some of the carboxyl groups of the alginic acid have photoreactive groups. The photoreactive group (sometimes called a "photocrosslinking group") comprises a part that promotes cyclization in a photoreaction (photoreactive part). The photoreactive part may be any part that causes a dimerization reaction (cyclization reaction) or polymerization reaction in response to light exposure, and specific examples include a cinnamic acid part, a substituted cinnamic acid part, a phenylpenta-2,4-dienoic acid part, a substituted phenylpenta-2,4-dienoic acid part, a heterocyclic substituted acrylic acid part and the like. One form of the alkene moiety in formula (I) is described as a trans form, but any bonding style that allows the dimerization reaction (cyclization reaction) or polymerization reaction to proceed in response to light exposure is acceptable, and when p=1 either a trans form or cis form is acceptable, while when p=2 a bonding style combining trans bonding and cis bonding is also acceptable, and these forms are comprised in formula (I).

Of these photoreactive parts, a part having a vinylene part capable of forming a cyclobutene ring by a dimerization reaction is preferred, and for example a cinnamic acid part, substituted cinnamic acid part, phenylpenta-2,4-dienoic acid part, substituted phenylpenta-2,4-dienoic acid part or heterocyclic substituted acrylic acid part is preferred.

The photoreactive group may also have a spacer for binding the photoreactive part to the alginic acid and maintaining a certain distance between the two. A derivative including a spacer bound to a photoreactive part such as a cinnamic acid part, substituted cinnamic acid part, phenylpenta-2,4-dienoic acid part, substituted phenylpenta-2,4-dienoic acid part or heterocyclic substituted acrylic acid part is most preferred as a photoreactive group (photocrosslinking group).

The following alginic acid derivative is provided by some embodiments.

An alginic acid derivative comprising a photoreactive group represented by the following formula (I) [excluding the part to the right of the wavy line in the formula]:

[C117]

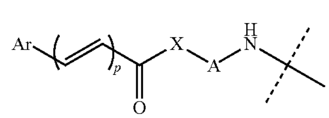

(I)

[in which Ar, p, —X—, and -A- are defined as above, such as in Embodiment 1] introduced into any one or more carboxyl groups of alginic acid.

For a photoreactive group to be introduced here means that any one or more of the carboxyl groups of alginic acid forms an amide bond with the terminal amino group of a linker in the photoreactive group, thereby binding any one or more carboxyl groups of alginic acid with the photoreactive group via the linker.

2.1 Photoreactive Part and Linker

In the photoreactive group of formula (I) above, the partial structural formula (I-S) [excluding the part to the right of the wavy line in the formula]:

[C118]

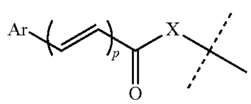

(I-S)

may be called a "photoreactive part" and the following formula -A- [excluding the parts outside the wavy lines in the formula]:

[C119]

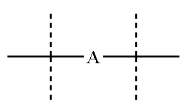

(A)

may also be called a "linker".

In the photoreactive part, Ar is a $C_{6-10}$ aryl group or heterocyclic group (wherein the $C_{6-10}$ aryl group or heterocyclic group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group or heterocyclic group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heterocyclic group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring).

In a different embodiment, Ar is a $C_{6-10}$ aryl group or heterocyclic group (wherein the $C_{6-10}$ aryl group or heterocyclic group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group or heterocyclic group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group or heterocyclic group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring) (with the proviso that, when Ar is a phenyl group, p=1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar)).

In a different embodiment, Ar is a $C_{6-10}$ aryl group (wherein the $C_{6-10}$ aryl group may have any 1 to 3 groups selected from a hydroxyl group, cyano group, nitro group, halogen atom, $C_{1-6}$ alkyl group, halogenated $C_{1-6}$ alkyl group, $C_{1-6}$ alkoxy group, and —$NR^AR^B$ group (in which each of $R^A$ and $R^B$ in —$NR^AR^B$ is each independently a group selected from a hydrogen atom, $C_{1-6}$ alkyl group, $C_{2-7}$ alkanoyl group, and $C_{1-6}$ alkylsulfonyl group (provided that —$NH_2$, —NH($C_{1-6}$ alkyl), and —N($C_{1-6}$ alkyl)$_2$ groups are excluded)) substituted for a hydrogen atom on the ring, and when a $C_{1-6}$ alkyl group and a $C_{1-6}$ alkoxy group or two $C_{1-6}$ alkoxy groups are substituted adjacent to one other on the $C_{6-10}$ aryl group, they may form a cyclic ether by binding between carbon atoms from which any one hydrogen atom each has been removed in the alkyl groups of the $C_{1-6}$ alkyl group and the $C_{1-6}$ alkoxy group, or between carbon atoms from which any one hydrogen atom each has been removed in the alkyl groups of the two $C_{1-6}$ alkoxy groups, or else when a $C_{1-6}$ alkoxy group and a —$NHR^G$ group (in which $R^G$ in the —$NHR^G$ group is a $C_{2-7}$ alkanoyl group or $C_{1-6}$ alkylsulfonyl group) are substituted adjacent to one another on the $C_{6-10}$ aryl group, a carbon atom from which any one hydrogen atom has been removed in the alkyl group of the $C_{1-6}$ alkoxy group may bind with the nitrogen atom from which the hydrogen atom has been removed in the —$NHR^G$ group to form a 3-N—($C_{2-7}$ alkanoyl)oxazolidine ring, 3-N—($C_{1-6}$ alkylsulfonyl)oxazolidine ring, 4-N—($C_{2-7}$ alkanoyl)morpholine ring, 4-N—($C_{1-6}$ alkyl sulfonyl)morpholine ring, 4-N—($C_{2-7}$ alkanoyl)-1,4-oxazepan ring or 4-N—($C_{1-6}$ alkylsulfonyl)-1,4-oxazepan ring)) (with the proviso that, when Ar is a phenyl group, p=1, -A- is formula (AL-1) and n=3 in formula (I), the any 1 to 3 groups selected from the group of substituents that are optionally substituted for a hydrogen atom on the Ar ring are substituted for a hydrogen atom on the phenyl group of this Ar)).

Any linear group may be used as the linker (-A-) above as long as it does not inhibit the photoreaction of the photoreactive moiety. Specifically, it is formulae (AL-1) to (AL-4) below [excluding the parts outside the wavy lines at both ends of each formula]:

[C120]

(AL-1)

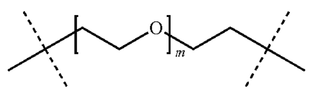

(AL-2)

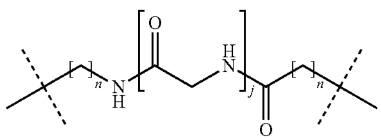

(AL-3)

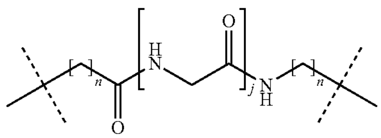

(AL-4)

(in formulae (AL-1) to (AL-4), n represents an integer from 1 to 18, m represents an integer from 1 to 9 and j represents an integer from 0 to 9;

a hydrogen atom of a methylene group (—$CH_2$—) in formulae (AL-1) to (AL-4) may be replaced with multiple (such as 1 to 10, or 1 to 5) groups selected from a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, $(R^aR^bN)$—$C_{1-6}$ alkyl or $(R^aR^bN)C(═O)$—$C_{1-6}$ alkyl group (in which each of $R^a$ and $R^b$ in the $NR^aR^b$, $(R^aR^bN)$—$C_{1-6}$ alkyl or $(R^aR^bN)C(═O)$—$C_{1-6}$ alkyl group is each independently a group selected from a hydrogen atom, $C_{1-6}$ alkyl group, $C_{2-7}$ alkanoyl group, and $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and if $C_{1-6}$ alkyl groups are substituted for the two hydrogen atoms of the methylene group (—$CH_2$—) in formulae (AL-1) to (AL-4), a $C_{3-8}$ cycloalkyl ring may be formed by binding between carbon atoms from which any one hydrogen atom each has been removed in the alkyl groups of the two $C_{1-6}$ alkyl groups; and the —NH— group in formula (AL-3) or formula (AL-4) may also form a non-aromatic heterocyclic ring with these substituents which have been substituted on adjacent carbon atoms).

In some embodiments, the photoreactive group (photocrosslinking group part) has photodimerization ability that allows it to absorb light (near wavelengths of 180 to 650 nm) and dimerize (dimerize into a truxillic acid derivative for example).

Introducing a linker allows the photocrosslinking reaction to proceed even when the introduction rate of the photoreactive group (photocrosslinking group) is low. The photocrosslinking reaction causes the alginic acid derivative to form three-dimensional mesh structures via the photocrosslinkin groups. Preferred alginic acid derivatives have improved post-crosslink stability.

The novel alginic acid derivative having an introduced photoreactive group represented by formula (I) herein may be manufactured by introducing a photoreactive group into an alginic acid by substitution for some of the carboxyl groups of the alginic acid, such as by the method of the following formula for example (for details, see the general manufacturing methods described below).

[C121]

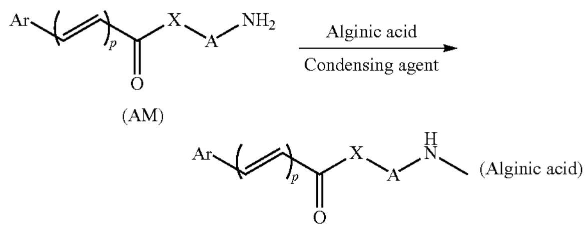

Alginic acid derivative

The weight-average molecular weight of the novel alginic acid derivative having an introduced photoreactive group represented by formula (I) herein is 100,000 Da to 3,000,000 Da, or preferably 300,000 Da to 2,500,000 Da, or more preferably 500,000 Da to 2,000,000 Da. The molecular weight of this alginic acid derivative can be determined by the same methods used for the alginic acid above.

The photoreactive group represented by formula (I) herein need not be attached to all of the carboxyl groups of the alginic acid structural units.

The introduction rate of the photoreactive group represented by formula (I) in the alginic acid derivative herein is preferably 0.5% to 30%, or more preferably 0.5% to 20%, or still more preferably 1.0% to 15%.

The introduction rate of the photoreactive group represented by formula (I) is a value representing the number of uronic acid monosaccharide units having introduced photoreactive groups represented by formula (I) as a percentage of the uronic acid monosaccharide units that are repeating units of the alginic acid. Unless otherwise specified, the % value used as the introduction rate of the photoreactive group represented by formula (I) in the alginic acid derivative herein is a mol % value. The introduction rate of the photoreactive group represented by formula (I) can be determined by the methods described in the examples below.

3. Method for Synthesis of Alginic Acid Derivative

The alginic acid derivative is obtained by a condensation reaction between the terminal amino groups of the linker in the photoreactive group part and the carboxyl groups of the alginic acid.

3.1 Synthesis of Photoreactive Group Part

[Manufacturing Method A] Method for Manufacturing Amine Derivative Represented by (AM-1) or Salt Thereof

[C122]

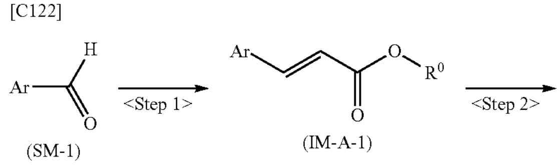

(SM-1) (IM-A-1)

-continued

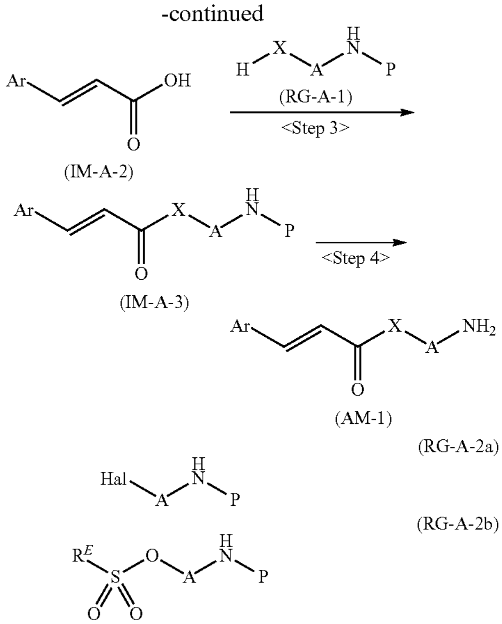

<Step 1>

Using the aldehyde represented by formula (SM-1) (the aldehyde of formula (SM-1) is a commercial compound or a compound that can be manufactured from a commercial compound by manufacturing methods known in the literature) and following methods described in known literature (such as "Experimental Chemistry Course 5th Edition, Vol. 13, Synthesis of Organic Compounds I: Synthesis of hydrocarbons and alkenes", pp. 118-139, 2004 (Maruzen)), the compound represented by formula (IM-A-1) [in which $R^D$ represents a $C_{1-6}$ alkyl group] can be manufactured by performing a reaction with a Wittig reagent (such as ethoxycarbonylmethyl triphenylphosphonium chloride, ethoxycarbonylmethyl triphenylphosphonium bromide, triphenylphosphoranylidene ethyl acetate, bis-2,2,2-trifluoroethoxyphosphinyl acetate, diorthotolylphosphonoethyl acetate, dimethylphosphonoethyl acetate, diethylphosphonoethyl acetate or 1-trimethyl silyl ethyl acetate) or a Horner Emmons reagent in a solvent selected from the alcohol solvents such as methanol or ethanol, the polar solvents such as N,N-dimethylformamide, the ether solvents such as 1,4-dioxane or tetrahydrofuran, the aromatic hydrocarbon solvents such as benzene, toluene, and xylene, and mixed solvents thereof in the presence of a base such as sodium hydride, butyl lithium, piperazine, morpholine, triethylamine, lithium diisopropylamide, lithium bis(trimethylsilyl)amide, sodium bis(trimethylsilyl) amide, potassium bis(trimethylsilyl)amide or phosphazene base-P4-tert-butyl at a temperature from −78° C. to the reflux temperature of the solvent.

<Step 2>

Using the compound of formula (IM-A-1) obtained in <Step 1> of [Manufacturing Method A], the compound represented by formula (IM-A-2) can be manufactured by adding an inorganic base such as lithium hydroxide, sodium hydroxide or potassium hydroxide in a mixed solvent of water and a solvent miscible with water (such as methanol, ethanol, tetrahydrofuran, N,N-dimethylformamide or dimethyl sulfoxide), and performing hydrolysis from 0° C. to the reflux temperature of the solvent.

In a different method, the compound represented by formula (IM-A-2) can be manufactured from the aldehyde represented by formula (SM-1) by using an active methylene compound such as malonic acid or Mel drum's acid in place of the Wittig reagent or Horner Emmons reagent in <Step 1> of [Manufacturing Method A], adding a base such as piperidine in a basic solvent such pyridine, and performing a reaction from room temperature to the reflux temperature of the solvent.

<Step 3>

Using the compound of formula (IM-A-1) obtained by <Step 2> of [Manufacturing Method A] or the different method above and the compound of formula (RG-A-1) (the compound of (RG-A-1) is a commercial compound or a compound that can be manufactured from a commercial compound by methods known in the literature; P is an amino group protective group, which can be selected appropriately from the protective groups described for example in Greene et al, "Protective Groups in Organic Synthesis", 4th Edition, 2007, John Wiley & Sons), a reaction can be performed by methods known in the literature (such as "Experimental Chemistry Course 5th Edition, Vol. 16, Synthesis of Organic Compounds IV: Carboxylic acids, derivatives and esters", pp. 35-70, "Acid amides and acid imides", pp. 118-154, "Amino acids and peptides", pp. 258-283, 2007 (Maruzen)) in the presence of a condensing agent such as 1,3-dicyclohexyl carbodiimide (DCC), 1-ethyl-3-(3-dimethylaminopropyl) carbodiimide hydrochloride (WSC.HCl), benzotriazol-1-yloxytris(dimethylamino) phosphonium hexafluorophosphate (BOP reagent), bis(2-oxo-3-oxazolidinyl) phosphinic chloride (BOP-Cl), 2-chloro-1,3-dimethylimidazolinium hexafluorophosphate (CIP) or 4-(4,6-dimethoxy-1,3,5-triazin-2-yl)-4-methyl morpholinium chloride (DMT-MM) in a solvent selected from the halogen solvents such as dichloromethane and chloroform, the ether solvents such as diethyl ether and tetrahydrofuran, the aromatic hydrocarbon solvents such as toluene and benzene, the polar solvents such as N,N-dimethylformamide and the alcohol solvents such as methanol, ethanol, 2-propanol, and the like, with or without a base such as triethylamine or pyridine, from 0° C. to the reflux temperature of the solvent to manufacture the compound of formula (IM-A-3).

The compound of formula (IM-A-3) can also be manufactured by first converting the carboxylic acid represented by formula (IM-A-2) to an acid halide or acid anhydride by methods known in the literature (such as "Experimental Chemistry Course 5th Edition, Vol. 16, Carboxylic acids and derivatives, acid halides and acid anhydrides", pp. 99-118, 2007 (Maruzen)), and then performing a reaction using the compound of formula (RG-A-1) in the presence of a base such as triethylamine or pyridine in a solvent selected from the halogen solvents such as dichloromethane and chloroform, the ether solvents such as diethyl ether and tetrahydrofuran, the aromatic hydrocarbon solvents such as toluene and benzene and the polar solvents such as N,N-dimethylformamide from 0° C. to the reflux temperature of the solvent.

Alternatively, the compound of formula (IM-A-3) can be manufactured using the carboxylic acid represented by formula (IM-A-2) following methods described in known literature (such as "Experimental Chemistry Course 5th Edition, Vol. 16, Carboxylic acids, derivatives and esters", p. 41, 2007 (Maruzen)) by performing a reaction using the halide compound represented by formula (RG-A-2a) or the sulfoxy compound represented by formula (RG-A-2b) (in which $R^E$ is a group selected from the methyl, ethyl, p-tosyl and trifluoromethyl groups and the like) in the presence of an inorganic base such as lithium carbonate, sodium carbonate, potassium carbonate or cesium carbonate or an organic base such as triethylamine or 1,8-diazabicyclo [5.4.0]-7-undecene (DBU) in a solvent selected from the polar solvents such as acetone, N,N-dimethylformamide, N-methylpyrrolidone and the like from 0° C. to the reflux temperature of the solvent.

<Step 4>

Using the compound of formula (IM-A-3) obtained in <Step 3> of [Manufacturing Method A], the compound represented by formula (AM-1) or a salt of (AM-1) can be manufactured by methods known in the literature (such as the methods described in Greene et al, "Protective Groups in Organic Synthesis", 4th Edition, 2007, John Wiley & Sons) by performing a reaction using an appropriate deprotection method selected according to the type of protective group.

The salt of (AM-1) is not particularly limited as long as it is a pharmaceutically acceptable salt, and examples include hydrochloride, hydrofluoride, hydrobromide, and trifluoroacetate salts, and the like.

[Manufacturing Method B] Method for manufacturing amine derivative represented by formula (AM-2) or salt thereof <Step 1>

Using the compounds represented by formula (SM-2) and formula (RG-B-1) (the compounds of formulae (SM-2) and (RG-B-1) are commercial compounds or compounds that can be manufactured from commercial compounds by methods known in the literature) and following methods described in known literature (such as "Organic Reactions Vol. 27", 1982 (Hoboken, N.J., USA)), the compound represented by formula (IM-B-1) can be manufactured by performing a reaction in the presence of a palladium catalyst such as palladium acetate (II) ($Pd(OAc)_2$), a phosphine reagent such as tris(o-tolyl)phosphine and an organic base such as triethylamine in a solvent such as toluene, xylene, N,N-dimethylformamide, N,N-dimethylacetamide, N-methylpyrrolidone, 1,2-dimethoxyethane, acetonitrile (acetonitrile/water), 1,4-dioxane (1,4-dioxane/water) or tetrahydrofuran (tetrahydrofuran/water) or a mixed solvent of these from 0° C. to the reflux temperature of the solvent.

<Step 2>

The compound of formula (IM-B-2) can be manufactured using the compound of formula (IM-B-1) obtained in <Step 1> of [Manufacturing Method B] by performing a reaction as in <Step 3> of [Manufacturing Method A], <Step 3>

The compound represented by formula (AM-2) or a salt of (AM-2) can be manufactured by performing a reaction as in <Step 4> of [Manufacturing Method A] using the compound of formula (IM-B-2) obtained in <Step 2> of [Manufacturing Method B].

The salt of (AM-2) is not particularly limited as long as it is a pharmaceutically acceptable salt, and examples include hydrochloride, hydrofluoride, hydrobromide, and trifluoroacetate salts, and the like.

<Step 4>

Using the compound of formula (SM-1) and trialkyl 4-phosphorocrotonate (which is a commercial compound or can be manufactured by methods known in the literature from commercial compounds; examples include triethyl 4-phosphorocrotonate), the compound represented by formula (IM-B-3) can be manufactured by performing a reaction according to methods known in the literature (such as the methods described in "Journal of the American Chemical Society", 127(43), pp. 15028-15029, 2005).

<Step 5>

The compound represented by formula (IM-B-1) can be manufactured by performing a reaction as in <Step 2> of [Manufacturing Method A] using the compound of formula (IM-B-3) obtained in <Step 4> of [Manufacturing Methods B].

The amine compound represented by formula (AM-1) or (AM-2) (including subordinate formulae of each formula), as used herein, may sometimes form a pharmaceutically acceptable salt (such as an acid addition salt). This salt is not particularly limited as long as it is a pharmaceutically acceptable salt, and examples include salts with inorganic acids, salts with organic acids, and salts with acidic amino acids and the like. Preferred examples of salts with inorganic acids include salts with hydrochloric acid, hydrobromic acid, hydroiodic acid, nitric acid, sulfuric acid and phosphoric acid. Preferred examples of salts with organic acids include salts with aliphatic monocarboxylic acids such as formic acid, acetic acid, trifluoroacetic acid, propionic acid, butyric acid, valeric acid, enanthic acid, capric acid, myristic acid, palmitic acid, stearic acid, lactic acid, sorbic acid and

[C123]

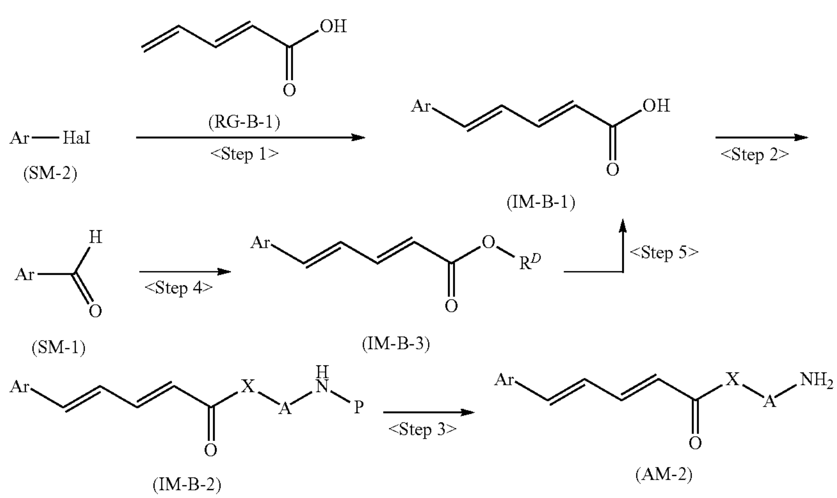

mandelic acid, salts with aliphatic dicarboxylic acids such as oxalic acid, malonic acid, succinic acid, fumaric acid, maleic acid, malic acid, and tartaric acid, salts with aliphatic tricarboxylic acids such as citric acid, salts with aromatic monocarboxylic acids such as benzoic acid and salicylic acid, salts with aromatic dicarboxylic acids such as phthalic acid, salts with organic carboxylic acids such as cinnamic acid, glycolic acid, pyruvic acid, oxylic acid, salicylic acid, and N-acetylcystein, salts with organic sulfonic acids such as methanesulfonic acid, benzenesulfonic acid and p-toluenesulfonic acid, and acid addition salts with acidic amino acids such as aspartic acid and glutamic acid. Preferred examples of salts with acidic amino acids include salts with aspartic acid, glutamic acid, and the like. Of these, a pharmaceutically acceptable salt is preferred.

This salt can be obtained by ordinary methods, such as for example by mixing a solution containing the compound of the invention and a suitable amount of an acid or base to form the target salt, and then either performing separation filtration or distilling the mixed solution. General information on salts is published in Stahl & Wermuth, "Handbook of Pharmaceutical Salts: Properties, Selection and Use" (Wiley-VCH, 2002), and details are described in this handbook.

The amine compound represented by formula (AM-1) or (AM-2) or a salt thereof as used herein may form a solvate with a solvent such as water, ethanol, glycerol or the like.

3.3 Synthesis of Alginic Acid Derivative

An alginic acid derivative with an introduced photoreactive group represented by formula (I) can be manufactured by reacting a 0.5 wt % to 1 wt % aqueous alginic acid solution and the compound of formula (AM-1) or (AM-2) or a salt thereof at temperatures from 0° C. to 50° C. with or without an inorganic base such as sodium hydrogen carbonate or sodium carbonate or an organic base such as triethylamine or pyridine in water, an ether solvent such as 1,4-dioxane, an alcohol solvent such as methanol or ethanol, a polar solvent such as N,N-dimethylformamide or a mixed solvent of these (provided that the mixed solvent must be such that the alginic acid does not precipitate) in the presence of a condensing agent such as 1,3-dicyclohexyl carbodiimide (DCC), 1-ethyl-3-(3-dimethylaminopropyl) carbodiimide hydrochloride (WSC.HCl), benzotriazol-1-yloxytris (dimethylamino) phosphonium hexafluorophosphate (BOP reagent), bis(2-oxo-3-oxazolidinyl) phosphinic chloride (BOP-Cl), 2-chloro-1,3-dimethylimidazolinium hexafluorophosphate (CIP) or 4-(4,6-dimethoxy-1,3,5-triazin-2-yl)-4-methyl morpholinium chloride (DMT-MM) following methods known in the literature (such as "Experimental Chemistry Course 5th Edition, Vol. 16, Synthesis of Organic Compounds IV: Carboxylic acids, derivatives, acid amides and acid imides", pp. 118-154, "Amino acids and peptides", pp. 258-283, 2007 (Maruzen)).

The introduction rate of the photocrosslinking group can be adjusted by suitably selecting and combining the various conditions according to the properties of the condensing agent and introduced photocrosslinking amine, such as by increasing or decreasing the equivalent amount of the condensing agent, lengthening or shortening the reaction time, changing the concentration of the alginic acid, or adding a water-miscible organic solvent to increase the solubility of the photocrosslinking group introduction reagent.

4. Crosslinked Alginic Acid

Crosslinked alginic acids include those that are crosslinked via (i) divalent metal ion bonds, (ii) chemical bonds, and (iii) both divalent metal ion bonds and chemical bonds. All these kinds of crosslinked alginic acid have the property of forming gels or semi-solids, or in some cases sponge-like forms.

When a crosslinked alginic acid is crosslinked via divalent metal ion bonds, the reaction progresses ultra-rapidly and is reversible, while when a crosslinked alginic acid is crosslinked via chemical bonds, the reaction progresses slowly under relatively mild conditions, and is irreversible. The physical properties of a crosslinked alginic acid can be adjusted by such methods as changing the concentration of the aqueous solution (such as a calcium carbonate aqueous solution) containing the divalent metal ion or changing the introduction rate of the reactive group introduced into the alginic acid or the like.

A variety of alginic acid structures can be prepared using the above crosslinking reaction. For example, a specific structure can be prepared instantaneously from an alginic acid solution by an ionic crosslinking reaction, and a crosslinking reaction via chemical bonds can then be used to structurally reinforce the resultant structure (to give it long-term stability for example). Alternatively, in a crosslinked alginic acid structure crosslinked via both divalent metal ion bonds and chemical bonds, the divalent metal ions incorporated by ionic crosslinking can be reversibly released, leaving a structure having only crosslinking via chemical bonds.

4.1 Photocrosslinked Alginic Acid

The photocrosslinked alginic acid is one that can be obtained by a photocyclization reaction in which an alginic acid derivative having an introduced photoreactive group represented by the formula (I) is exposed to light. In the photocrosslinked alginic acid structure, the alginic acid derivative forms a three-dimensional mesh structure via photocrosslinking groups (crosslinking by cyclobutane rings formed by a photoreaction). In a preferred alginic acid derivative, the stability of the crosslinked alginic acid is improved after crosslinking.

The light for light exposure is not particularly limited as long as it acts on the photoreactive group to cause a reaction such as polymerization or dimerization for example (preferably a photodimerization reaction (photocyclization reaction)). Ultraviolet rays, LED (light-emitting diode) light, visible light, infrared light, an electron beam or the like may be used as the light for light exposure. Of these, visible light, LED light or ultraviolet light is preferred, and ultraviolet light is more preferred. The wavelength of the light source used is preferably in the range of 180 to 650 nm, or more preferably in the range of 300 to 410 nm.

In some embodiments, the specific light quantity and wavelength for causing a photocrosslinking reaction are as follows. That is, with a HLR100T-2 (Sen Lights Corp.) the illuminance is 170 $mW/cm^2$ (50 mm distance from light source), the principal wavelength is 365 nm, and the exposure time is 10 minutes. When exposure is at a distance of 100 mm from the light source, the exposure amount is 25 $J/cm^2$.

In some embodiments of the photocrosslinked alginic acid, the photoreactive part (alkene part) of the photoreactive group represented by formula (I) is dimerized by a photocyclization reaction, resulting in a chemical crosslink including a cyclobutane ring (truxillic acid derivative) represented by formulae (II-L-1) to (II-L-3) for example:

[C124]

(II-L-1)

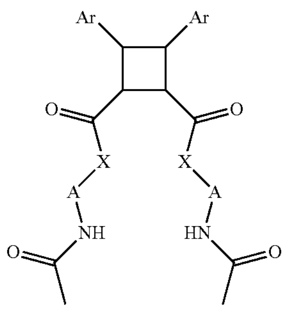

(II-L-2)

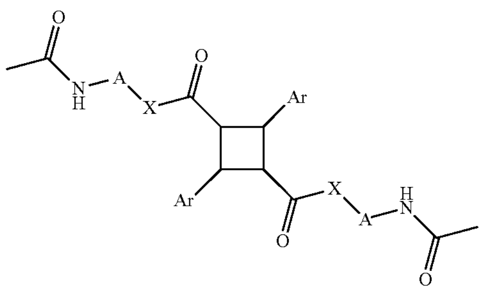

(III-L-3)

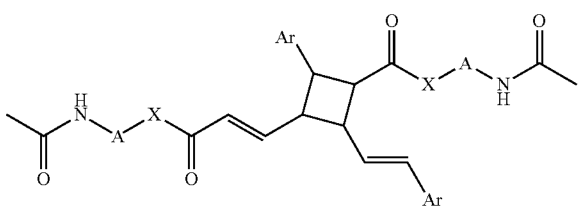

[in formulae (II-L-1) to (II-L-3), the —CONH— and —NHCO— at either end represent amide bonds via any carboxyl group of alginic acid, and -A-, —X—, and Ar are as defined in the Embodiments [1], [1a] and [1b]].

In the photocrosslinked alginic acid, not all of the carboxyl groups of the structural units of alginic acid must have the above crosslinks. The introduction rate (also called the crosslinking rate) of the crosslinks represented by the above formulae in the crosslinked alginic acid is in the range of for example 0.1% to 80%, or 0.3% to 60%, or 0.5% to 30%, or 1.0% to 10%.

The concentration of the alginic acid derivative used to obtain the photocrosslinked alginic acid is, for example, in the range of 1 to 500 mg/ml, or 5 to 100 mg/ml.

The temperature for the photocrosslinking reaction is normally room temperature (about 0° C. to about 35° C.).

The reaction time for forming the crosslinked alginic acid (hydrogel) is, for example, a few seconds to 24 hours, or a few seconds to 12 hours, or a few seconds to 30 minutes, or a few seconds to 10 minutes.

The reaction solvent or reaction solution used in the photocrosslinking reaction is not particularly limited, but examples include tap water, pure water (such as distilled water, deionized water, RO water, RO-EDI water, etc.), ultrapure water, cell culture medium, phosphate buffered saline (PBS), physiological saline, and the like, and ultrapure water is preferred.

In some embodiments, the photocrosslinked alginic acid may be a crosslinked alginic acid containing as crosslinks both chemical crosslinks including a cyclobutane ring (truxillic acid derivative) formed by a photoreaction and ionic crosslinks formed by partial crosslinking with a divalent metal ion (such as a calcium ion).

4.2 Preparing Photocrosslinked Alginic Acid Structure

The photocrosslinked alginic acid structure can be prepared by a method that comprises subjecting an alginic acid derivative having an introduced photoreactive group represented by the formula (I) to a crosslinking reaction by exposing it to light. It can be prepared for example by the following methods, but this is not a limitation.

More specifically, for example a solution of an alginic acid derivative having an introduced photoreactive group represented by formula (I) is dripped into a solution containing a divalent metal ion to obtain a specific structure comprising an ionic crosslink (crosslink formed by partial crosslinking with the divalent metal ion). Next, the resultant structure is exposed to light to form a photocrosslink (photocrosslink: cyclobutane ring (truxillic acid derivative)) and obtain a specific structure that is a photocrosslinked alginic acid structure.

The photocrosslinked alginic acid structure can be obtained by a method that comprises exposing an alginic acid derivative having a photoreactive group (photocrosslinking group) to light. The light for exposure is not particularly limited as long as it acts on the photocrosslinking group to cause a reaction such as polymerization or dimerization for example (preferably a photodimerization reaction). The light for exposure is not particularly limited as long as it acts on the photoreactive group (photocrosslinking group) to cause a reaction such as polymerization or dimerization for example (preferably a photodimerization reaction (photocyclization reaction)). The light for exposure may be, for example, ultraviolet light, LED (light-emitting diode) light), visible light, infrared light, an electron beam or the like. Of these, visible light, LED light or ultraviolet light is preferred, and ultraviolet light is more preferred. The wavelength of the light source used is preferably in the range of 180 to 650 nm, or more preferably in the range of 300 to 410 nm.

In some embodiments, the specific light quantity and wavelength for causing a photocrosslinking reaction are as follows. That is, with a HLR100T-2 (Sen Lights Corp.) the illuminance is 170 mW/cm$^2$ (50 mm distance from light source), the principal wavelength is 365 nm, and the exposure time is 10 minutes. When exposure is at a distance of 100 mm from the light source, the exposure amount is 25 J/cm$^2$.

The divalent metal ion used in the above method is not particularly limited: examples include calcium ions, magnesium ions, barium ions, strontium ions, zinc ions and the like, and a calcium ion is preferred.

The solution containing the calcium ion used in this method is not particularly limited: examples include aqueous solutions of calcium chloride, calcium carbonate, calcium gluconate, and the like, and an aqueous calcium chloride solution is preferred.

The calcium ion concentration of the solution containing the calcium ion used in this method is not particularly limited but may be 1 mM to 1 M for example, or preferably 5 mM to 500 mM, or more preferably 10 mM to 300 mM.

The solvent or solution used in this method is also not particularly limited, but examples include tap water, pure water (such as distilled water, deionized water, RO water, RO-EDI water, etc.), ultrapure water, cell culture medium, phosphate buffered saline (PBS), physiological saline, and the like, and ultrapure water is preferred.

The specific photocrosslinked alginic acid structure may be, for example, a fibrous structure, fibers, beads, a gel, a substantially spherical gel or the like. A preferred cross-linked alginic acid structure is one having improved stability. Moreover, the crosslinked alginic acid structure may also have the ability to hold contents within itself (content retention ability).

The physical properties of the alginic acid gel can be adjusted by adjusting the various physical property values such as hardness, elasticity, repulsive force, rupture force, stress at break, and the like.

5. Biocompatibility of Alginic Acid Derivative and Photocrosslinked Alginic Acid Derivative The alginic acid derivative or photocrosslinked alginic acid derivative as used herein has biocompatibility. Biocompatibility herein means the property of not causing reactions such as interactions between a biomaterial (in this case, an alginic acid derivative having an introduced photoreactive group represented by formula (I), or a photocrosslinked alginic acid structure manufactured using this alginic acid derivative) and a living body, or local reactions in tissue adjacent to the biomaterial, or systemic reactions and the like.

The biocompatibility of the alginic acid derivative or photocrosslinked alginic acid structure herein is confirmed in the Examples relating to biocompatibility below.

6. Stability of Photocrosslinked Alginic Acid Structure

The stability of the photocrosslinked alginic acid structure can be confirmed by measuring gel stability, while permeability can be confirmed by measuring gel permeability and the like.

[Method for Measuring Gel Stability]

Phosphate buffered saline (PBS) is added to a photocrosslinked alginic acid structure gel in a container, and the concentration (μg/ml) of alginic acid leaked into the PBS is measured. The measured alginic acid concentration is divided into the total alginic acid concentration obtained by decomposing the crosslinked alginic acid structure gel, and the resulting value is given as percentage and used as the gel collapse rate. Gel stability can be determined specifically by the methods described in the Examples below.

The gel collapse rate of the photocrosslinked alginic acid structure herein is preferably 0% to 90%, or more preferably 0% to 70%, or still more preferably 0% to 50%. The stability of the crosslinked alginic acid structure is greater the lower the concentration of the alginic acid leaked into an aqueous solution, or in other words the lower the gel collapse rate.

[Method for Measuring Gel Permeation Rate]

A photocrosslinked alginic acid structure gel containing fluorescein isothiocyanate-dextran is prepared, saline is added to the gel in a container, and the concentration of dextran leaking into the saline is measured. The measured dextran concentration is divided into the total dextran concentration obtained by decomposing the crosslinked alginic acid structure gel containing the fluorescein isothiocyanate-dextran, and the resulting value is given as percentage and used as the gel permeation rate. The gel permeation rate can be determined specifically by the methods described in the Examples below.

The gel permeation rate of the photocrosslinked alginic acid 24 hours after addition of the saline is preferably 0% to 90%, or more preferably 0% to 70%, or still more preferably 0% to 50% when the gel contains dextran with a molecular weight of 2,000,000. When it contains dextran with a molecular weight of 150,000, assuming that the intended use of the photocrosslinked alginic acid structure gel is releasing and producing proteins and antibodies, the gel permeation rate is preferably 1% to 100%, or more preferably 10% to 100%, or still more preferably 30% to 100%, while if the intended use is as an immune barrier, the gel permeation rate is preferably 0% to 90%, or more preferably 0% to 70%, or still more preferably 0% to 50%.

The lower the permeability of the photocrosslinked alginic acid structure, the lower the permeation of the gel contents or external substances, while the higher the permeability, the higher the permeation of the gel contents or external substances.

The gel permeation rate can be adjusted by adjusting the molecular weight and concentration of the alginic acid used, the type and introduction rate of the crosslinking group introduced into the alginic acid, the type and concentration of the divalent metal ion used for gelling, or a combination thereof.

[Method for Preparing Crosslinked Alginic Acid Structure Gel Containing Contents]

For example, a crosslinked alginic acid structure gel containing fluorescein isothiocyanate-dextran contents can be prepared by the following methods.

(1) A solution of an alginic acid derivative having an introduced photoreactive group represented by formula (I) is mixed with a fluorescein isothiocyanate-dextran solution.

(2) The mixed solution obtained in (1) is dripped into a solution containing a calcium ion, and the resulting gel is exposed to light to obtain a photocrosslinked alginic acid structure gel comprising ionic crosslinks and photocrosslinks (chemical crosslinks), and containing fluorescein isothiocyanate-dextran contents.

7. Use of Alginic Acid Derivative and Photocrosslinked Alginic Acid Structure

The alginic acid derivative may be used in place of conventional alginic acid in a wide range of fields including foodstuffs, cosmetics, fibers and paper. As preferred uses of the alginic acid derivative or photocrosslinked alginic acid structure, specific examples include medical materials such as wound dressings, postoperative adhesion prevention materials, sustained drug release materials, cell culture substrates and cell transplant substrates.

When used as a medical material, the photocrosslinked alginic acid structure may be in the form of fibers, beads, a gel or a substantially spherical gel or the like; a gel or substantially spherical gel is preferred, and a substantially spherical gel is more preferred.

The entire contents of all literature and publications cited herein are incorporated by reference herein regardless of their purpose.

Moreover, the objectives, features, advantages and ideas of the present invention are clear to a person skilled in the art from the descriptions of this Description, and the present invention can be easily implemented by a person skilled in the art based on the descriptions of this Description. The best mode and specific examples for implementing the invention are used to illustrate preferred embodiments of the present invention, and the present invention is not limited to these because they are given for purposes of example or explanation. Based on the descriptions of this Description, a person skilled in the art can understand that various modifications are possible within the intention and scope of the present invention as disclosed herein.

EXAMPLES

A JEOL JNM-ECX400 FT-NMR (JEOL) was used to measure the nuclear magnetic resonance spectrum.

In the NMR signal patterns of the $^{1}$H-NMR data, s means a singlet, d a doublet, t a triplet, q a quartet and m a multiplet, br means broad, J is a coupling constant, Hz means hertz, $CDCl_3$ is deuterated chloroform, DMSO-$d_6$ is deuterated dimethylsulfoxide, and $D_2O$ is deuterium. In the $^{1}$H-NMR data, signals that cannot be confirmed because they are broadband, such as protons of hydroxyl (OH), amino ($NH_2$) and carboxyl (COOH) groups, are not included in the data.

In the examples, the "introduction rate" was measured by the carbazole method and given as "mol %". In some cases, $^{1}$H-NMR measurement was performed in $D_2O$, and the results were given as "mol % (NMR integration ratio)" based on the ratio of the proton integration values of the photocrosslinking group and alginic acid.

"Room temperature" in the examples normally indicates a temperature from about 0° C. to about 35° C.

In the examples, sodium alginate exhibiting the physical property values shown in the Table 1 was used as the sodium alginate before introduction of a reactive group or complementary reactive group.

Tables 2-1 and 2-2 show the physical property values (specifically the photoreactive group introduction rate (mol %), molecular weight and weight-average molecular weight (in 10,000 Da)) of alginic acid derivatives with introduced photoreactive groups obtained in (Example 1) to (Example 19) (alginic acid derivatives EX1-a1, EX1-b, EX1-c, EX1-a2, EX1-d1, EX1-d2, EX2-a1, EX2-b, EX2-c, EX2-a2, EX3-a, EX4-a, EX5-a, EX6-a, EX6-b, EX7-a, EX8-a, EX9-a, EX10-a, EX11-a, EX12-a, EX13-a1, EX14-a1, EX15-a1, EX16-a1, EX17-a1, EX18-a1, and EX19-a1).

(Example 1) Synthesis of Alginic Acids with Introduced (E)-3-(4-fluorophenyl)acrylate Group (EX1-a1, EX1-b, EX1-c, EX1-a2, EX1-d1, EX1-d2)

<Step 1> Synthesis of ethyl (E)-3-(4-fluorophenyl)acrylate

[C125]

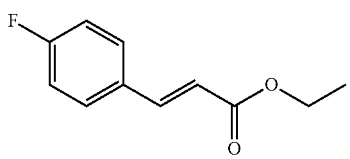

Triethyl phosphonoacetate (3.6 ml) was added to a tetrahydrofuran (20 ml) solution of 4-fluorobenzaldehyde (Commercial product: CAS No. 459-57-4: 2.0 g), sodium hydride (0.6 g, 70%) was added bit by bit under ice-water cooling and stirring, and the mixture was stirred at the same temperature for 40 minutes. Sodium hydride (0.1 g, 70%) was added, and the mixture was stirred for a further 20 minutes at the same temperature. Water (20 ml) and ethyl acetate (20 ml) were added to separate the reaction solution. The resulting organic phase was washed successively with water (5 ml) and brine (5 ml) and dried with anhydrous sodium sulfate, and the solvent was distilled off under reduced pressure. The oily product was dried under reduced pressure to obtain the title crude compound (3.4 g) as a colorless oily substance.

NMR data ($CDCl_3$) (δ: ppm): 7.64 (1H, d, J=16 Hz), 7.53 to 7.48 (2H, m) 7.07 (2H, tt, J=9, 2 Hz), 6.36 (1H, d, J=16 Hz), 4.26 (2H, q, J=7 Hz), 1.34 (3H, t, J=7 Hz)

<Step 2> Synthesis of (E)-3-(4-fluorophenyl) acrylic acid

[C126]

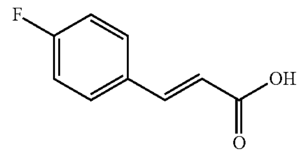

The compound obtained in <Step 1> of (Example 1) (3.1 g) was dissolved in ethanol (15.7 ml). A 1N-sodium hydroxide aqueous solution (17.7 ml) was added under ice-water cooling and stirred for 1.5 hours at 50 degrees. The pH was then adjusted to 2 with 2N-hydrochloric acid under ice-water cooling. The precipitated sediment was filtered out, water washed, and dried under reduced pressure to obtain the title compound (2.6 g) as a white solid.

NMR data (DMSO-$d_6$) (δ: ppm): 12.41 (1H, brs), 7.80 to 7.72 (2H, m), 7.59 (1H, d, J=16 Hz), 7.25 (2H, tt, J=9, 2 Hz), 6.50 (1H, d, J=16 Hz)

<Step 3> Synthesis of 3-((tert-butoxycarbonyl) amino)propyl (E)-3-(4-fluorophenyl)acrylate

[C127]

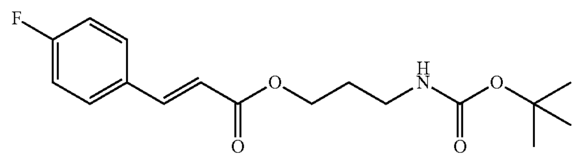

The compound obtained in <Step 2> of (Example 1) (500 mg) and tert-butyl(3-hydroxypropyl) carbamate (Commercial product: CAS No. 58885-58-8: 527 mg) were dissolved in N-methylpyrrolidone (5.0 ml). 1.26 ml of diisopropylethylamine and 1.37 g of 1-[bis(dimethylamino)methylene]-1H-1,2,3-triazolo[4,5-b] pyridinium 3-oxide hexafluorophosphate were added, and stirred for 21 hours at room temperature. 20 ml of water and 30 ml of methyl tert-butyl ether were then added to separate the reaction solution. The organic layer was washed sequentially with saturated sodium bicarbonate water (10 ml), water (10 ml, twice) and brine (10 ml) and dried with anhydrous sodium sulfate, and the solvent was distilled off under reduced pressure. The resulting oily substance was purified by silica gel column chromatography (heptane to 50% ethyl acetate/heptane) and triturated with heptane. The resulting solid was filtered out, washed with heptane, and dried under reduced pressure to obtain the title compound (511 mg) as a white solid.

NMR data ($CDCl_3$) (5: ppm): 7.65 (1H, d, J=16 Hz), 7.54 to 7.48 (2H, m), 7.08 (2H, tt, J=9, 2 Hz), 6.36 (1H, d, 16 Hz), 4.74 (1H, brs), 4.27 (2H, t, J=4 Hz), 3.25 (2H, q, J=6 Hz), 1.93 to 1.86 (2H, m), 1.44 (9H, s)

<Step 4> Synthesis of 3-aminopropyl (E)-3-(4-fluorophenyl)acrylate hydrochloride

[C128]

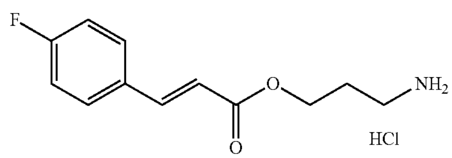

4N-hydrogen chloride/dioxane (2.1 ml) was added under ice-water cooling to 300 mg of the compound obtained in <Step 3> of (Example 1). The reaction solution was stirred for 1 hour at room temperature, and 6.3 ml of diisopropyl ether was added and stirred for one hour. The precipitated solid was filtered out, washed with diisopropyl ether, and dried under reduced pressure to obtain the title compound (223 mg) as a white solid.

NMR data (DMSO-$d_6$) (δ: ppm): 7.90 (3H, brs), 7.84 to 7.78 (2H, m), 7.68 (1H, d, J=16 Hz), 7.30 to 7.24 (2H, m), 6.63 (1H, d, J=16 Hz), 4.21 (2H, t, J=6 Hz), 2.91 (2H, t, J=8 Hz), 1.99 to 1.91 (2H, m)

<Step 5-1> Synthesis of Alginic Acid Having Introduced (E)-3-(4-fluorophenyl)acrylic acid-3-aminopropyl Group (EX1-a1)

[C129]

EX1-a1

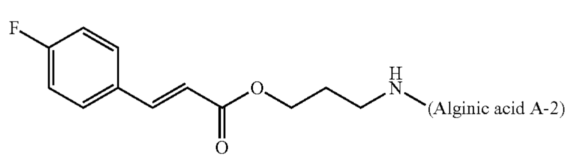

The compound obtained in <Step 4> of (Example 1) (39.3 mg), 4-(4,6-dimethoxy-1,3,5-triazin-2-yl)-4-methylmorpholinium chloride (69.8 mg) and 1-molar sodium bicarbonate water (189 μl) were added under ice-water cooling to 15 ml of a sodium alginate (Mochida Pharmaceutical: A-2) aqueous solution adjusted to 1 wt %, and stirred for 3 hours at room temperature. Sodium chloride (150 mg) was added, followed by ethanol (30 ml), and the mixture was stirred for 30 minutes at room temperature. The resulting sediment was filtered out, washed with ethanol, and dried under reduced pressure to obtain the title compound (159 mg) as a white solid.

<Step 5-2> Synthesis of Alginic Acid Having Introduced (E)-3-(4-fluorophenyl)acrylic acid-3-aminopropyl Group (EX1-b)

[C130]

EX1-b

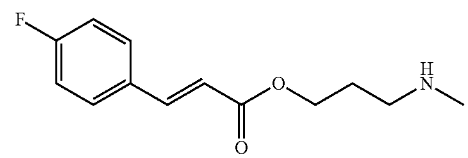

(Alginic acid A-1)

The title compound (135 mg) was obtained as a white solid by the same operations as in <Step 5-1> of (Example 1) using 15 ml of a sodium alginate (Mochida Pharmaceutical: A-1) aqueous solution adjusted to 1 wt % and 39.3 mg of the compound obtained in <Step 4> of (Example 1).

<Step 5-3> Synthesis of Alginic Acid Having Introduced (E)-3-(4-fluorophenyl)acrylic acid-3-aminopropyl Group (EX1-c)

[C131]

EX1-c

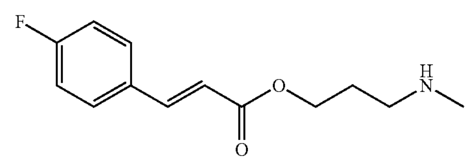

(Alginic acid A-3)

The title compound (154 mg) was obtained as a white solid by the same operations as in <Step 5-1> of (Example 1) using 30 ml of a sodium alginate (Mochida Pharmaceutical: A-3) aqueous solution adjusted to 0.5 wt % and 39.3 mg of the compound obtained in <Step 4> of (Example 1).

<Step 5-4> Synthesis of Alginic Acid Having Introduced (E)-3-(4-fluorophenyl)acrylic acid-3-aminopropyl Group (EX1-a2)

[C132]

EX1-a2

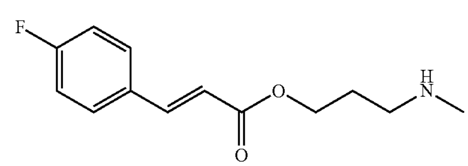

(Alginic acid A-2)

The title compound (112 mg) was obtained as a white solid by the same operations as in <Step 5-1> of (Example 1) using 10 ml of a sodium alginate (Mochida Pharmaceutical: A-2) aqueous solution adjusted to 1 wt %, 65.5 mg of the compound obtained in <Step 4> of (Example 1), 104.7 mg of 4-(4,6-dimethoxy-1,3,5-triazin-2-yl)-4-methylmorpholinium chloride and 277 μl of 1-molar sodium bicarbonate water.

<Step 5-5> Synthesis of Alginic Acid Having Introduced (E)-3-(4-fluorophenyl)acrylic acid-3-aminopropyl Group (EX1-d1)

[C133]

EX1-d1

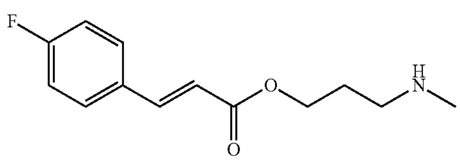

(Alginic acid B-2)

The title compound (312 mg) was obtained as a white solid by operations similar to those of <Step 5-1> of (Example 1) by reacting 30 ml of a sodium alginate (Mochida Pharmaceutical: B-2) aqueous solution adjusted to 1 wt %, 78.6 mg of the compound obtained in <Step 4> of (Example 1), 251 mg of 4-(4,6-dimethoxy-1,3,5-triazin-2-yl)-4-methylmorpholinium chloride and 378 μl of 1-molar sodium bicarbonate water for 3 hours at 30° C.

<Step 5-6> Synthesis of Alginic Acid Having Introduced (E)-3-(4-fluorophenyl)acrylic acid-3-aminopropyl Group (EX1-d2)

[C134]

EX1-d2

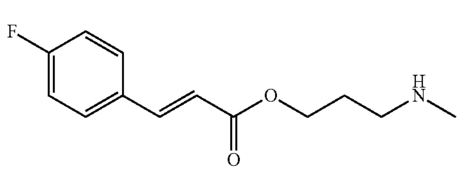

(Alginic acid B-2)

The title compound (372 mg) was obtained as a white solid by operations similar to those of <Step 5-1> of (Example 1) by reacting 40 ml of a sodium alginate (Mochida Pharmaceutical: B-2) aqueous solution adjusted to 1 wt %, 26.2 mg of the compound obtained in <Step 4> of (Example 1), 83.7 mg of 4-(4,6-dimethoxy-1,3,5-triazin-2-yl)-4-methylmorpholinium chloride and 151 μl of 1-molar sodium bicarbonate water for 3 hours at 30° C.

(Example 2) Synthesis of Alginic Acids Having Introduced (E)-3-phenylacrylic acid-3-aminopropyl Group (EX2-a1, EX2-b, EX2-c, EX2-a2)

<Step 1> Synthesis of 3-((tert-butoxycarbonyl)amino)propyl cinnamate

[C135]

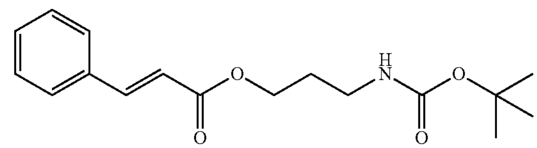

A chloroform (2.6 ml) solution of cinnamoyl chloride (commercial product: CAS No. 17082-09-6: 1.0 g) was dripped under ice-water cooling into a chloroform (2.6 ml) solution of tert-butyl(3-hydroxypropyl)carbamate (1.2 g), triethylamine (0.9 ml) and N,N-dimethyl-4-aminopyridine (220 mg), and stirred for 2.8 hours at room temperature. Ethyl acetate (40 ml) was added to separate the reaction solution. The organic layer was washed successively with 1N-citric acid (20 ml), semi-saturated sodium bicarbonate water (20 ml, twice), water (10 ml) and brine (10 ml) and then dried with anhydrous sodium sulfate, and the solvent was distilled off under reduced pressure. The oily product was purified by silica gel column chromatography (heptane to 30% ethyl acetate/heptane), and then triturated with heptane. The resulting solid was filtered out, washed with heptane, and dried under reduced pressure to obtain the title compound (1.3 g) as a white solid.

NMR data ($CDCl_3$) (δ: ppm): 7.69 (1H, d, J=16 Hz), 7.55 to 7.50 (2H, m), 7.41 to 7.37 (3H, m), 6.43 (1H, d, J=16 Hz), 4.75 (1H, brs), 4.28 (2H, t, J=6 Hz), 3.25 (2H, q, J=6 Hz), 1.94 to 1.86 (2H, m), 1.45 (9H, s)

<Step 2> Synthesis of 3-aminopropyl cinnamate hydrochloride

[C136]

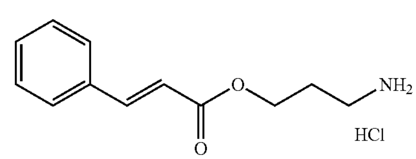

The title compound (0.9 g) was obtained as a white solid by the same operations as in <Step 4> of (Example 1) using the compound (1.2 g) obtained in <Step 1> of (Example 2).

NMR data (DMSO-$d_6$) (δ: ppm): 8.02 (3H, brs), 7.75 to 7.71 (2H, m), 7.68 (1H, d, J=16 Hz), 7.46 to 7.41 (3H, m), 6.66 (1H, d, J=16 Hz), 4.22 (2H, t, J=6 Hz), 2.91 (2H, t, J=7 Hz), 2.01 to 1.92 (2H, m)

<Step 3-1> Synthesis of Alginic Acid Having Introduced (E)-3-phenylacrylic acid-3-aminopropyl Group (EX2-a1)

[C137]

EX2-a1

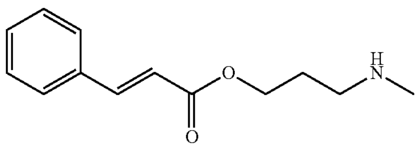

(Alginic acid A-2)

The title compound (590 mg) was obtained as a white solid by the same operations as in <Step 5-1> of (Example 1) using 54.5 ml of a sodium alginate (Mochida Pharmaceutical: A-2) aqueous solution adjusted to 1 wt % and 122 mg of the compound obtained in <Step 2> of (Example 2).

<Step 3-2> Synthesis of Alginic Acid Having Introduced (E)-3-phenylacrylic acid-3-aminopropyl Group (EX2-b)

[C138]

EX2-b

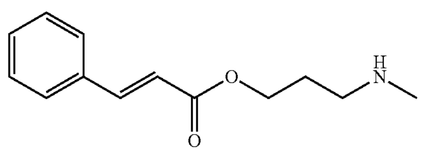

(Alginic acid A-1)

The title compound (161 mg) was obtained as a white solid by the same operations as in <Step 5-1> of (Example 1) using 15 ml of a sodium alginate (Mochida Pharmaceutical: A-1) aqueous solution adjusted to 1 wt % and 36.6 mg of the compound obtained in <Step 2> of (Example 2).

<Step 3-3> Synthesis of Alginic Acid Having Introduced (E)-3-phenylacrylic acid-aminopropyl Group (EX2-c)

[C139]

EX2-c

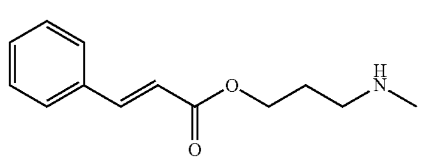

(Alginic acid A-3)

The title compound (104 mg) was obtained as a white solid by the same operations as in <Step 5-1> of (Example 1) using 20 ml of a sodium alginate (Mochida Pharmaceutical: A-3) aqueous solution adjusted to 0.5 wt % and 24.4 mg of the compound obtained in <Step 2> of (Example 2).

<Step 3-4> Synthesis of Alginic Acid Having Introduced (E)-3-phenylacrylic acid-3-aminopropyl Group (EX2-a2)

[C140]

EX2-a2

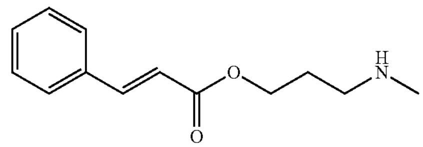

(Alginic acid A-2)

The title compound (111 mg) was obtained as a white solid by the same operations as in <Step 5-1> of (Example 1) using 10 ml of a sodium alginate (Mochida Pharmaceutical: A-2) aqueous solution adjusted to 1 wt %, 61.0 mg of the compound obtained in <Step 2> of (Example 2), 104.7 mg of 4-(4,6-dimethoxy-1,3,5-triazin-2-yl)-4-methylmorpholinium chloride and 277 μl of 1-molar sodium bicarbonate water.

(Example 3) Synthesis of Aliginic Acid Having Introduced (E)-3-(4-trifluoromethyl)phenyl)acrylic acid-3-aminopropyl Group (EX3a)

<Step 1> Synthesis of 3-((tert-butoxycarbonyl) amino)propyl (E)-3-(4-(trifluoromethyl)phenyl)acrylate

[C141]

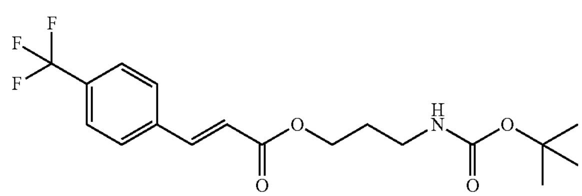

1-hydroxybenzotriazole monohydrate (372 mg), N,N-dimethyl-4-aminopyridine (28 mg) and 1-ethyl-3-(3-dimethylaminopropyl)carbodiimide hydrochloride (488 mg) were added to a methylene chloride (5.0 ml) solution of 4-(trifluoromethyl)cinnamic acid (commercial product: CAS No. 16642-92-5: 500 mg) and tert-butyl(3-hydroxypropyl)carbamate (405 mg), and stirred for 16 hours at room temperature. N-methylpyrrolidone (3 ml) was added to the reaction solution, which was then stirred for 6 hours at 50° C. Ethyl acetate (20 ml) and water (10 ml) were added to separate the solution. The organic layer was washed successively with water (5 ml, 3 times) and brine (5 ml) and then dried with anhydrous sodium sulfate, and the solvent was distilled off under reduced pressure. The oily product was purified by silica gel column chromatography (heptane to 30% ethyl acetate/heptane) and then triturated with heptane. The resulting solid was filtered out, washed with heptane, and then dried under reduced pressure to obtain the title compound (263 mg) as a white solid.

NMR data ($CDCl_3$) (δ: ppm): 7.69 (1H, d, J=16 Hz), 7.65 (2H, d, J=9 Hz), 7.62 (2H, d, J=9 Hz), 6.51 (1H, d, J=16 Hz), 4.73 (1H, brs), 4.29 (2H, t, J=6 Hz), 3.26 (2H, q, J=7 Hz), 1.95 to 1.87 (2H, m), 1.45 (9H, s)

<Step 2> Synthesis of 3-aminopropyl (E)-3-(4-(trifluoromethyl)phenyl)acrylate hydrochloride

[C142]

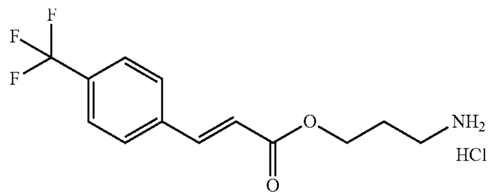

The title compound (148 mg) was obtained as a white solid by the same operations as in <Step 4> of (Example 1) using the compound (200 mg) obtained in <Step 1> of (Example 3).

NMR data (DMSO-$d_6$) (δ: ppm): 7.96 (2H, d, J=8 Hz), 7.89 (3H, brs), 7.79 (2H, d, J=8 Hz), 7.76 (1H, d, J=16 Hz), 6.82 (1H, d, J=16 Hz), 4.24 (2H, t, J=6 Hz), 2.92 (2H, t, J=7 Hz), 2.01 to 1.93 (2H, m)

<Step 3> Synthesis of Alginic Acid Having Introduced (E)-3-(4-(trifluoromethyl)phenyl)acrylic acid-3-aminopropyl Group (EX3-a)

[C143]

EX3-a

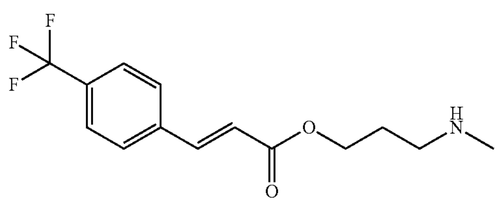

(Alginic acid A-2)

The title compound (109 mg) was obtained as a white solid by the same operations as in <Step 5-1> of (Example 1) using 10.9 ml of a sodium alginate (Mochida Pharmaceutical: A-2) aqueous solution adjusted to 1 wt % and 31.2 mg of the compound obtained in <Step 2> of (Example 3).

(Example 4) Synthesis of Alginic Acid Having Introduced (E)-2-(2-(2-cinnamic acid amidoethoxy) ethoxy)ethyl amino Group (EX4a)

<Step 1> Synthesis of tert-butyl(2-(2-(2-aminoethoxy)ethoxy)ethyl carbamate

[C144]

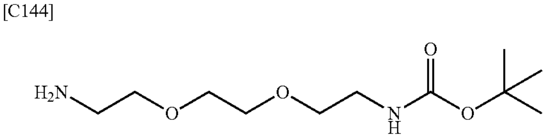

A methylene chloride (37.5 ml) solution of di-tert-butyl dicarbonate (3.0 g) was dripped over the course of 4.8 hours under ice-water cooling into a dichloroethane (30 ml) solution of 1,2-bis(2-aminoethoxy)ethane (commercial product: CAS No. 929-59-9: 5.1 g) and triethylamine (11.5 ml), and stirred for 18.5 hours at room temperature. The reaction solvent was distilled off under reduced pressure, and the solution was triturated with methylene chloride (30 ml). Insoluble matter was filtered out and washed with methylene chloride (30 ml, 20 ml). The filtrate was washed successively with water (10 ml) and brine (10 ml), dried with anhydrous sodium sulfate, and then concentrated under reduced pressure. The oily product was dried under reduced pressure to obtain the title compound (2.7 g) as a colorless liquid.

NMR data ($CDCl_3$) (δ: ppm): 5.15 (1H, brs), 3.63 to 3.61 (4H, m), 3.55 (2H, t, J=5 Hz), 3.52 (2H, t, J=5 Hz), 3.32 (2H, q, J=5 Hz), 2.88 (2H, t, J=5 Hz), 1.45 (9H, s)

<Step 2> Synthesis of tert-Butyl (2-(2-(2-cinnamamidoethoxy)ethoxy)ethyl)carbamate

[C145]

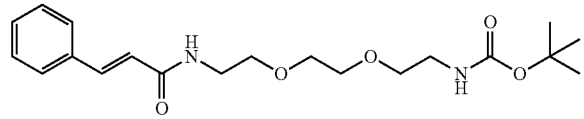

A methylene chloride (1.0 ml) solution of cinnamoyl chloride (0.24 g) was dripped under ice-water cooling into a methylene chloride (1.4 ml) solution of the compound obtained in <Step 1> of (Example 4) (0.35 g), triethylamine (0.22 ml) and N,N-dimethyl-4-aminopyridine (20 mg), and stirred for 1 hour at room temperature. Ethyl acetate (15 ml) and water (5 ml) were added to separate the reaction solution. The organic layer was washed successively with saturated sodium bicarbonate water (5 ml), water (5 ml) and brine (2 ml) and then dried with anhydrous sodium sulfate, and the solvent was distilled off under reduced pressure. The oily product was purified by silica gel column chromatography (heptane to ethyl acetate) and dried under reduced pressure to obtain the title compound (0.42 g) as a colorless liquid.

NMR data ($CDCl_3$) (δ: ppm): 7.63 (1H, d, J=16 Hz), 7.54 to 7.47 (2H, m), 7.39 to 7.30 (3H, m), 6.43 (1H, d, J=16 Hz), 6.28 (1H, brs), 5.02 (1H, brs), 3.70 to 3.55 (10H, m), 3.38 to 3.26 (2H, q, J=5 Hz), 1.44 (9H, s)

<Step 3> Synthesis of N-(2-(2-(2-aminoethoxy)ethoxy)ethyl)cinnamamide hydrochloride

[C146]

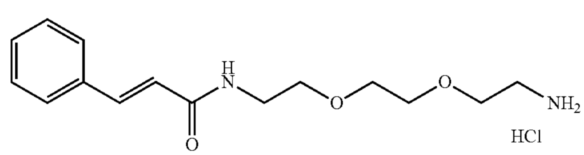

The title compound (0.4 g) was obtained as a colorless liquid by the same operations as in <Step 4> of (Example 1) using the compound (0.42 g) obtained in <Step 2> of (Example 4).

NMR data ($D_2O$) (δ: ppm): 7.59 to 7.53 (2H, m), 7.46 (1H, d, J=16 Hz), 7.42 to 7.36 (3H, m), 6.57 (1H, d, J=16 Hz), 3.71 to 3.62 (8H, m), 3.46 (2H, t, J=5 Hz), 3.13 (2H, t, J=5 Hz)

<Step 4> Synthesis of Alginic Acid Having Introduced (E)-2-(2-(2-cinnamic acid amidoethoxy)ethoxy)ethylamino Group (EX4-a)

[C147]

EX4-a

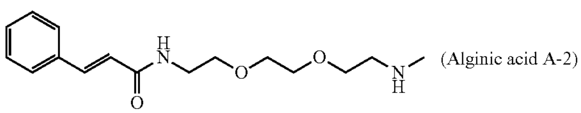

The title compound (81 mg) was obtained as a white solid by the same operations as in <Step 5-1> of (Example 1) using 10.9 ml of a sodium alginate (Mochida Pharmaceutical: A-2) aqueous solution adjusted to 1 wt % and 46 mg of the compound obtained in <Step 3> of (Example 4).

(Example 5) Synthesis of Alginic Acid Having Introduced (E)-3-phenylacrylic Acid-2-(2-aminoethoxy)ethyl Group (EX5-a)

<Step 1> Synthesis of 2-(2-((tert-butoxycarbonyl)amino)ethoxy)ethyl cinnamate

[C148]

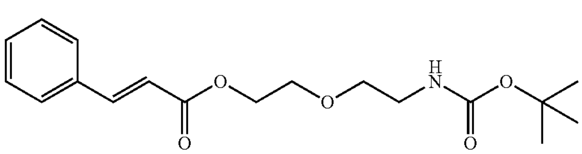

The title compound (0.77 g) was obtained by the same operations as in <Step 1> of (Example 2) using cinnamoyl chloride (0.50 g) and tert-butyl(2-(2-hydroxyethoxy)ethyl) carbamate (commercial product: CAS No. 139115-91-6: 0.62 g).

NMR data ($CDCl_3$) (δ: ppm): 7.71 (1H, d, J=16 Hz, 7.55 to 7.51 (2H, m), 7.41 to 7.38 (3H, m), 6.48 (1H, d, J=16 Hz), 4.92 (1H, brs), 4.36 (2H, t, J=5 Hz), 3.74 (2H, t, J=5 Hz), 3.58 (2H, t, J=5 Hz), 3.34 (2H, q, J=5 Hz), 1.43 (9H, s)

<Step 2> Synthesis of 2-(2-aminoethoxy)ethyl cinnamate hydrochloride

[C149]

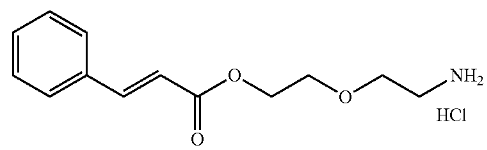

The title compound (0.56 g) was obtained as a white powder by the same operations as in <Step 4> of (Example 1) using the compound (0.77 g) obtained in <Step 1> of (Example 5).

NMR data (DMSO-$d_6$) (δ: ppm): 7.94 (3H, brs), 7.75 to 7.71 (2H, m), 7.68 (1H, d, J=16 Hz), 7.46 to 7.42 (3H, m), 6.66 (1H, d, J=16 Hz), 4.32 to 4.29 (2H, m), 3.75 to 3.71 (2H, m), 3.66 (2H, t, J=5 Hz), 2.98 (2H, t, J=5 Hz)

<Step 3> Synthesis of Alginic Acid Having Introduced (E)-3-phenylacrylic acid-2-(2-aminoethoxy)ethyl Group (EX5-a)

[C150]

Ex5-a

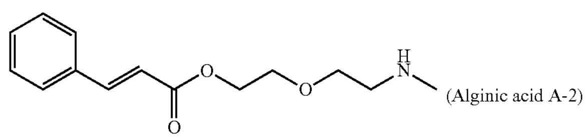

The title compound (138 mg) was obtained as a white solid by the same operations as in <Step 5-1> of (Example 1) using 15 ml of a sodium alginate (Mochida Pharmaceutical: A-2) aqueous solution adjusted to 1 wt % and 41 mg of the compound obtained in <Step 2> of (Example 5).

(Example 6) Synthesis of Alginic Acids Having Introduced (E)-3-(4-methoxyphenyl)acrylic acid-3-aminopropyl Groups (EX6a, EX6b)

<Step 1> Synthesis of (E)-3-(4-methoxyphenyl)acrylic acid

[C151]

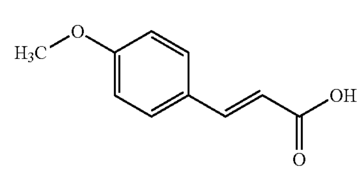

1N-sodium hydroxide aqueous solution (16 ml) was added to an ethanol (15 ml) solution of (E)-3-(4-methoxyphenyl)acrylic acid ethyl ester (commercial product: CAS No. 24393-56-4: 3.0 g), and stirred for 1.3 hours at 60° C. and 15.5 hours at room temperature. Water (15 ml) was added to the reaction solution, after which the pH was adjusted to 1. The resulting solid was filtered out, washed with water (10 ml, 3 times), and dried under reduced pressure at 50° C. to obtain the title compound (2.5 g) as a white solid.

NMR data ($CDCl_3$) (δ: ppm): 7.73 (1H, d, J=16 Hz), 7.50 (2H, d, J=9 Hz), 6.92 (2H, d, J=9 Hz), 6.32 (1H, d, J=16 Hz), 3.85 (3H, s)

<Step 2> Synthesis of 3-((tert-butoxycarbonyl) amino)propyl (E)-3-(4-methoxyphenyl)acrylate

[C152]

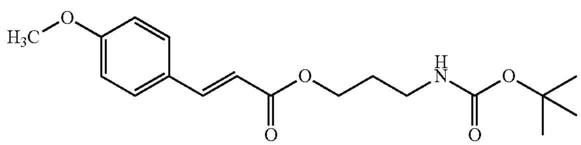

N-methylpyrrolidone (2.0 ml) was added to the compound obtained in <Step 1> of (Example 6) (0.20 g), tert-butyl(3-bromopropyl) carbamate (0.27 g), potassium carbonate (0.16 g) and potassium iodide (20 mg) and stirred for 1 hour at 40° C. 4.5 hours at 70° C. and 2.5 hours at 100° C., after which additional tert-butyl(3-bromopropyl) carbamate (0.16 g), potassium carbonate (96 mg) and potassium iodide (20 mg) were added, and the mixture was stirred for 2 hours at 100° C. Ethyl acetate (20 ml) and water (10 ml) were then added to separate the reaction solution. The organic layer was washed successively with water (5 ml, 3 times) and brine (5 ml) and then dried with anhydrous sodium sulfate, and the solvent was distilled off under reduced pressure. The oily product was purified by silica gel column chromatography (heptane to 50% ethyl acetate/heptane) to obtain the title compound (0.31 g) as a colorless oily substance.

NMR data ($CDCl_3$) (δ: ppm): 7.64 (1H, d, J=16 Hz), 7.47 (2H, d, J=9 Hz), 6.90 (2H, d, J=9 Hz), 6.30 (1H, d, J=16 Hz), 4.75 (1H, brs), 4.26 (2H, t, J=6 Hz), 3.84 (3H, s), 3.24 (2H, q, J=7 Hz), 1.92 to 1.86 (2H, m), 1.45 (9H, s)

<Step 3> Synthesis of 3-aminopropyl (E)-3-(4-methoxyphenyl)acrylate hydrochloride

[C153]

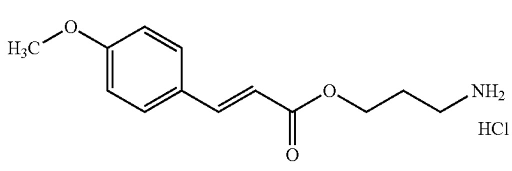

The title compound (0.23 g) was obtained as a light beige solid by the same operations as in <Step 4> of (Example 1) using the compound obtained in <Step 2> of (Example 6) (0.31 g).

NMR data (DMSO-$d_6$) (δ: ppm): 7.84 (3H, brs), 7.67 (2H, d, J=9 Hz), 7.62 (1H, d, J=16 Hz), 6.98 (2H, d, J=9 Hz), 6.49 (1H, d, J=16 Hz), 4.20 (2H, t, J=6 Hz), 3.80 (3H, s), 2.91 (2H, t, J=8 Hz), 1.98 to 1.91 (2H, m)

<Step 4-1> Synthesis of Alginic Acid Having Introduced (E)-3-(4-methoxyphenyl)acrylic acid-3-aminopropyl Group (EX6-a)

[C154]

Ex6-a

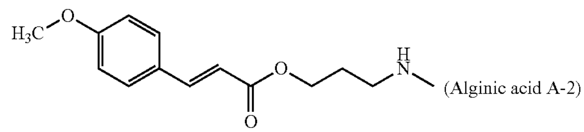

The title compound (191 mg) was obtained as a white solid by operations similar to those of <Step 5-1> of (Example 1) by reacting 20 ml of a sodium alginate (Mochida Pharmaceutical: A-2) aqueous solution adjusted to 1 wt %, the compound obtained in <Step 3> of (Example 6) (54.8 mg), 4-(4,6-dimethoxy-1,3,5-triazin-2-yl)-4-methylmorpholinium chloride (83.7 mg) and 1-molar sodium bicarbonate water (252 μl) for 3 hours at 30° C.

<Step 4-2> Synthesis of Alginic Acid Having Introduced (E)-3-(4-methoxyphenyl)acrylic acid-3-aminopropyl Group (EX6-b)

[C155]

Ex6-b

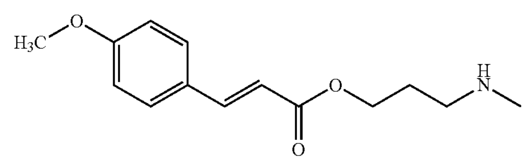

(Alginic acid B-2)

The title compound (375 mg) was obtained as a white solid by operations similar to those of <Step 5-1> of (Example 1) by reacting 40 ml of a sodium alginate (Mochida Pharmaceutical: B-2) aqueous solution adjusted to 1 wt %, the compound obtained in <Step 3> of (Example 6) (27.4 mg), 4-(4,6-dimethoxy-1,3,5-triazin-2-yl)-4-methylmorpholinium chloride (83.7 mg) and 1-molar sodium bicarbonate water (151 μl) for 3 hours at 30° C.

(Example 7) Synthesis of Aliginic Acid Having Introduced (E)-3-(4-cyanophenyl)acrylic acid-3-aminopropyl Group (EX7-a)

<Step 1> Synthesis of (E)-3-(4-cyanophenyl)acrylic acid

[C156]

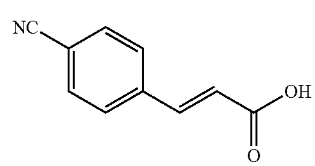

Pyridine (25.0 ml) was added to 4-formylbenzonitrile (commercial product: CAS No. 105-07-7: 2.50 g) and malonic acid (3.97 g), and stirred to dissolve for 10 minutes at 45° C. Piperidine (0.38 ml) was added to the reaction solution, which was then stirred for 0.5 hours at 100° C. and 4.5 hours at 125° C. The pH of the reaction solution was then adjusted to 1 with 6N-hydrochloric acid under ice-water cooling. The resulting solid was filtered out, washed with water (10 ml, 3 times), and dried under reduced pressure at 50° C. to obtain the title compound (3.02 g) as a white solid.

NMR data (DMSO-$d_6$) (δ: ppm): 12.64 (1H, brs), 7.90 (2H, d, J=9 Hz), 7.87 (2H, d, J=9 Hz), 7.64 (1H, d, J=16 Hz), 6.70 (1H, d, J=16 Hz)

<Step 2> Synthesis of 3-((tert-butoxycarbonyl) amino)propyl (E)-3-(4-cyanophenyl)acrylate

[C157]

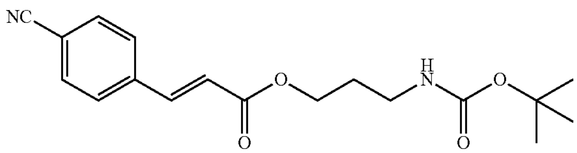

N-methylpyrrolidone (2.0 ml) was added to the compound obtained in <Step 1> of (Example 7) (0.20 g), tert-butyl(3-bromopropyl)carbamate (0.41 g), potassium carbonate (0.24 g) and potassium iodide (40 mg) and stirred for 1 hour at 80° C. Ethyl acetate (20 ml) and water (10 ml) were added to separate the reaction solution. The organic layer was washed successively with water (5 ml, 3 times) and brine (5 ml), and then dried with anhydrous sodium sulfate, and the solvent was distilled off under reduced pressure. The oily product was purified by silica gel column chromatography (heptane to 60% ethyl acetate/heptane) to obtain the title compound (0.36 g) as a white solid.

NMR data ($CDCl_3$) (δ: ppm): 7.68 (2H, d, J=9 Hz), 7.66 (1H, d, J=16 Hz), 7.60 (2H, d, J=9 Hz), 6.51 (1H, d, J=16 Hz), 4.69 (1H, brs), 4.29 (2H, t, J=6 Hz), 3.25 (2H, q, J=7 Hz), 1.94 to 1.87 (2H, m), 1.44 (9H, s)

<Step 3> Synthesis of 3-aminopropyl (E)-3-(4-cyanophenyl)acrylate hydrochloride

[C158]

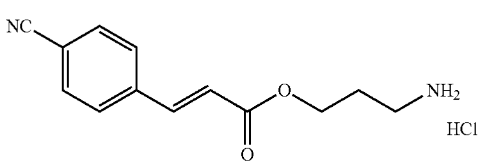

The title compound (0.27 g) was obtained as a white solid by the same operations as in <Step 4> of (Example 1) using the compound obtained in <Step 2> of (Example 7) (0.36 g).

NMR data (DMSO-$d_6$) (δ: ppm): 7.94 (2H, d, J=9 Hz), 7.90 (2H, d, J=9 Hz), 7.83 (3H, brs), 7.74 (1H, d, J=16 Hz), 6.84 (1H, d, J=16 Hz), 4.24 (2H, t, J=6 Hz), 2.91 (2H, t, J=7 Hz), 1.99 to 1.92 (2H, m)

<Step 4> Synthesis of Alginic Acid Having Introduced (E)-3-(4-cyanophenyl)acrylic acid-3-aminopropyl Group (EX7-a)

[C159]

Ex7-a

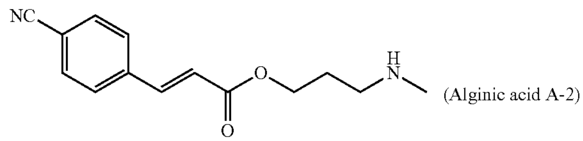

The title compound (191 mg) was obtained as a white solid by operations similar to those of <Step 5-1> of (Example 1) by reacting 20 ml of a sodium alginate (Mochida Pharmaceutical: A-2) aqueous solution adjusted to 1 wt %, 53.8 mg of the compound obtained in <Step 3> of (Example 7), 83.7 mg of 4-(4,6-dimethoxy-1,3,5-triazin-2-yl)-4-methylmorpholinium chloride and 252 μl of 1-molar sodium bicarbonate water for 3 hours at 30° C.

(Example 8) Synthesis of Alginic Acid Having Introduced (E)-3-(pyridine-2-yl)acrylic acid-3-aminopropyl Group <Step 1> Synthesis of (E)-3-(pyridine-2-yl) acrylic acid

[C160]

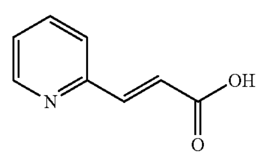

Pyridine (5.0 ml), piperidine (0.17 ml) and picolinaldehyde (commercial product: CAS No. 1121-60-4: 4.46 ml) were added to malonic acid (4.86 g), and stirred for 2 hours at 100° C. Tert-butyl methyl ether (30 ml) and water (30 ml) were added to the reaction solution, which was then stirred for 30 minutes at room temperature. The resulting solid was filtered out, washed with tert-butyl methyl ether (5 ml, twice) and water (5 ml, twice), and dried under reduced pressure at 50° C. to obtain the title compound (1.35 g) as a gray solid.

NMR data (DMSO-$d_6$) (δ: ppm): 12.49 (1H, brs), 8.63 (1H, dd, J=5, 1 Hz), 7.85 (1H, dt, J=8, 2 Hz), 7.73 to 7.58 (1H, m), 7.58 (1H, d, 16 Hz), 7.39 (1H, ddd, J=8, 5, 1 Hz), 6.82 (1H, d, J=16 Hz)

<Step 2> Synthesis of 3-((tert-butoxycarbonyl)amino)propyl (E)-3-(pyridin-2-yl)acrylate

[C161]

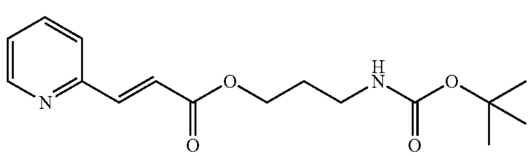

N-methylpyrrolidone (2.0 ml) was added to the compound obtained in <Step 1> of (Example 8) (0.20 g), tert-butyl(3-bromopropyl)carbamate (0.48 g), potassium carbonate (0.28 g) and potassium iodide (40 mg) and stirred for 30 minutes at 80° C. Ethyl acetate (20 ml) and water (10 ml) were added to separate the reaction solution. The organic layer was washed successively with water (5 ml, 3 times) and brine (5 ml) and dried with anhydrous sodium sulfate, and the solvent was distilled off under reduced pressure. The oily product was purified by silica gel column chromatography (heptane to 60% ethyl acetate/heptane) to obtain the title compound (0.40 g) as a colorless oily substance.

NMR data ($CDCl_3$) (δ: ppm): 8.64 (1H, dd, J=5, 1 Hz), 7.71 (1H, dt, J=8, 2 Hz), 7.68 (1H, d, J=16 Hz), 7.43 to 7.40 (1H, m), 7.28 to 7.25 (1H, m), 6.92 (1H, d, J=16 Hz), 4.73 (1H, brs), 4.29 (2H, t, J=6 Hz), 3.24 (2H, q, J=6 Hz), 1.93 to 1.87 (2H, m), 1.44 (9H, s)

<Step 3> Synthesis of 3-aminopropyl (E)-3-(pyridin-2-yl)acrylate hydrochloride

[C162]

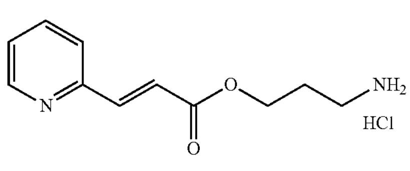

The title compound (0.34 g) was obtained as a light green solid by the same operations as in <Step 4> of (Example 1) using the compound (0.40 g) obtained in <Step 2> of (Example 8).

NMR data (DMSO-$d_6$) (δ: ppm): 8.67 (1H, dt, J=5, 1 Hz), 7.95 (1H, dt, J=8, 2 Hz), 7.94 (3H, brs), 7.85 to 7.82 (1H, m), 7.71 (1H, d, J=16 Hz), 7.49 (1H, ddd, J=8, 5, 1), 6.97 (1H, d, J=16 Hz), 4.24 (2H, t, J=6 Hz), 2.97 to 2.87 (2H, m), 2.01 to 1.94 (2H, m)

<Step 4> Synthesis of Alginic Acid Having Introduced (E)-3-(pyridine-2-yl) acrylic acid-3-aminopropyl Group (EX8-a)

[C163]

Ex8-a

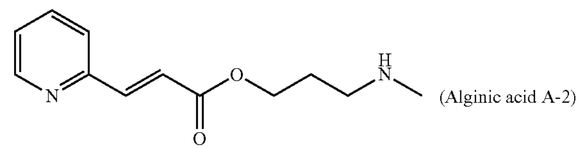

The title compound (189 mg) was obtained as a white solid by the operations similar to those of <Step 5-1> of (Example 1) by reacting 20 ml of a sodium alginate (Mochida Pharmaceutical: A-2) aqueous solution adjusted to 1 wt %, the compound obtained in <Step 3> of (Example 7) (56.3 mg), 4-(4,6-dimethoxy-1,3,5-triazin-2-yl)-4-methylmorpholinium chloride (83.7 mg) and 1-molar sodium bicarbonate water (453 μl) for 3 hours at 30° C.

(Example 9) Synthesis of Alginic Acid Having Introduced (E)-3-(2,3-dihydrobenzo[b][1,4]dioxin-6-yl)acrylic acid-3-aminopropyl Group (EX9-a)

<Step 1> Synthesis of 3-((tert-butoxycarbonyl)amino)propyl (E)-3-(2,3-dihydrobenzo[b][1,4]dioxin-6-yl)acrylate

[C164]

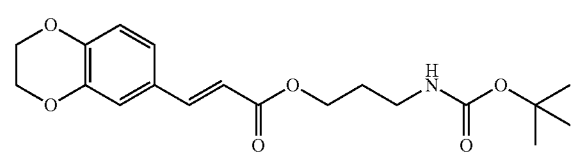

N-methylpyrrolidone (3.0 ml) was added to (E)-3-(2,3-dihydrobenzo[b][1,4]dioxin-6-yl) acrylic acid (commercial product: CAS No. 151539-59-2: 0.30 g), tert-butyl(3-bromopropyl) carbamate (commercial product: CAS No. 83948-53-2: 0.52 g), potassium carbonate (0.30 g) and potassium iodide (50 mg) and stirred for 30 minutes at 80° C. Ethyl acetate (25 ml) and water (12 ml) were added to separate the reaction solution. The organic layer was washed successively with water (5 ml, 3 times) and brine (5 ml) and dried with anhydrous sodium sulfate, and the solvent was distilled off under reduced pressure. The oily product was purified by silica gel column chromatography (heptane to 50% ethyl acetate/heptane) to obtain the title compound (0.52 g) as a light-yellow rubbery substance.

NMR data ($CDCl_3$) (δ: ppm): 7.56 (1H, d, J=16 Hz), 7.06 to 7.01 (2H, m), 6.86 (1H, d, J=8 Hz), 6.27 (1H, d, J=16 Hz), 4.77 (1H, brs), 4.30 to 4.24 (6H, m), 3.24 (2H, q, J=7 Hz), 1.92 to 1.85 (2H, m), 1.44 (9H, s)

<Step 2> Synthesis of 3-aminopropyl (E)-3-(2,3-dihydrobenzo[b][1,4]dioxin-6-yl)acrylate hydrochloride

[C165]

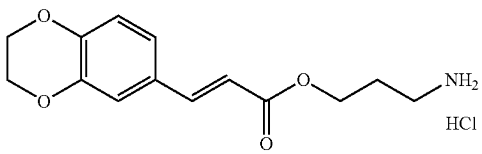

The title compound (0.38 g) was obtained as a white solid by the same operations as in <Step 4> of (Example 1) using the compound obtained in <Step 1> of (Example 9) (0.52 g).

NMR data (DMSO-$d_6$) (δ: ppm): 7.89 (3H, brs), 7.56 (1H, d, J=16 Hz), 7.27 (1H, d, J=2 Hz), 7.21 (1H, dd, J=8, 2 Hz), 6.89 (1H, d, J=8 Hz), 6.48 (1H, d, J=16 Hz), 4.29 to 4.24 (2H, m), 4.19 (2H, t, J=6 Hz), 2.90 (2H, t, J=7 Hz), 1.98 to 1.91 (2H, m)

<Step 3> Synthesis of Alginic Acid Having Introduced (E)-3-(2,3-dihydrobenzo[b][1,4]dioxin-6-yl) acrylic acid-3-aminopropyl Group (EX9-a)

[C166]

Ex9-a

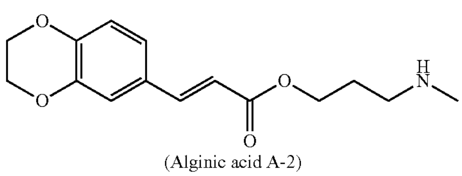

The title compound (395 mg) was obtained as a white solid by operations similar to those of <Step 5-1> of (Example 1) by reacting 40 ml of a sodium alginate (Mochida Pharmaceutical: A-2) aqueous solution adjusted to 1 wt %, 30.2 mg of the compound obtained in <Step 2> of (Example 9), 112 mg of 4-(4,6-dimethoxy-1,3,5-triazin-2-yl)-4-methylmorpholinium chloride and 151 μl of 1-molar sodium bicarbonate water for 3 hours at 30° C.

(Example 10) Synthesis of Alginic Acid Having Introduced (E)-3-(4-methoxyphenyl)acrylic acid-2-(2-aminoethoxy)ethyl Group (EX10-a)

<Step 1> Synthesis of 2-(2-((tert-butoxycarbonyl) amino)ethoxy)ethyl (E)-3-(4-methoxyphenyl)acrylate

[C167]

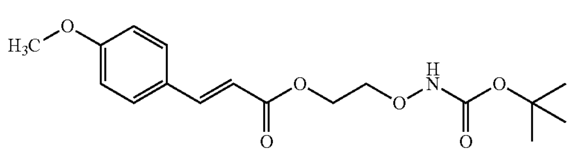

Thionyl chloride (250 μl) and N,N-dimethylformamide (1.3 μl) were added to the compound obtained in <Step 1> of (Example 6) (0.30 g) and stirred for 30 minutes at 80° C. The resulting solution was concentrated under reduced pressure, and azeotropically distilled twice with methylene chloride (1 ml). The resulting solid was dissolved in methylene chloride (1.5 ml), and a methylene chloride (1.5 ml) solution of tert-butyl(2-(2-hydroxyethoxy)ethyl) carbamate (commercial product: CAS No. 139115-91-6: 0.41 g), triethylamine (0.7 ml) and N,N-dimethylaminopyridine (40 mg) was added under ice-water cooling. This was stirred for 1.5 hour at room temperature and separated by addition of ethyl acetate (20 ml) and water (10 ml). The organic layer was washed successively with semi-saturated sodium bicarbonate water (10 ml), water (5 ml) and brine (5 ml) and dried with anhydrous sodium sulfate, and the solvent was distilled off under reduced pressure. The oily product was purified by silica gel column chromatography (heptane to 30% ethyl acetate/heptane) to obtain the title compound (0.54 g) as a colorless oily substance.

NMR data ($CDCl_3$) (δ: ppm): 7.67 (1H, d, J=16 Hz), 7.48 (2H, d, J=9 Hz), 6.90 (2H, d, J=9 Hz), 6.35 (1H, d, J=16 Hz), 4.93 (1H, brs), 4.37 to 4.33 (2H, m), 3.84 (3H, s), 3.73 (2H, t, J=5 Hz), 3.57 (2H, t, J=5 Hz), 3.34 (2H, q, J=5 Hz), 1.44 (9H, s)

<Step 2> Synthesis of 2-(2-aminoethoxy)ethyl (E)-3-(4-methoxyphenyl)acrylate hydrochloride

[C168]

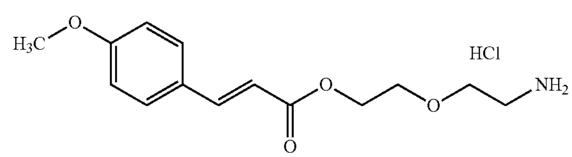

The title compound (0.42 g) was obtained as a white solid by the same operations as in <Step 4> of (Example 1) using the compound (0.54 g) obtained in <Step 1> of (Example 10).

NMR data (DMSO-$d_6$) (δ: ppm): 7.86 (3H, brs), 7.68 (2H, d, J=9 Hz), 7.62 (1H, d, J=16 Hz), 6.98 (2H, d, J=9 Hz), 6.50 (1H, d, J=16 Hz), 4.31 to 4.26 (2H, m), 3.80 (3H, s), 3.72 (2H, t, J=5 Hz), 3.64 (2H, t, J=5 Hz), 2.98 (2H, t, J=5 Hz)

<Step 3> Synthesis of Alginic Acid Having Introduced (E)-3-(4-methoxyphenyl)acrylic acid-2-(2-aminoethoxy)ethyl Group (EX10-a)

[C169]

Ex 10-a

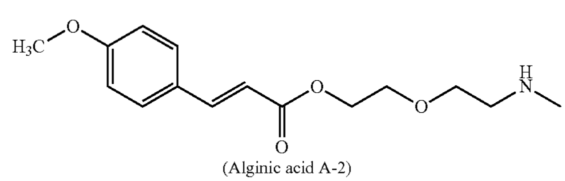

The title compound (393 mg) was obtained as a white solid by the operations similar to those of <Step 5-1> of (Example 1) by reacting 40 ml of a sodium alginate (Mochida Pharmaceutical: A-2) aqueous solution adjusted to 1 wt %, the compound obtained in <Step 2> of (Example 10) (31 mg), 4-(4,6-dimethoxy-1,3,5-triazin-2-yl)-4-methylmorpholinium chloride (112 mg) and 1-molar sodium bicarbonate water (151 μl) for 3 hours at 30° C.

(Example 11) Synthesis of Alginic Acid Having Introduced (2E,4E)-5-phenylpenta-2,4-dienoic acid-3-aminopropyl Group (EX11-a)

<Step 1> Synthesis of 3-((tert-butoxycarbonyl) amino)propyl (2E,4E)-5-phenylpenta-2,4-dienoate

[C170]

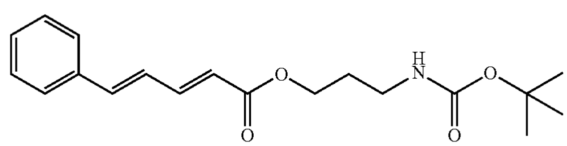

N-methylpyrrolidone (2.0 ml) was added to (2E,4E)-5-phenylpenta-2,4-dienoic acid (commercial product: CAS No. 28010-12-0: 0.20 g), tert-butyl(3-bromopropyl) carbamate (0.41 g), potassium carbonate (0.24 g), and potassium iodide (40 mg) and stirred for 1 hour at 80° C. Tert-butyl methyl ether (25 ml) and water (10 ml) were added to separate the reaction solution. The organic layer was washed successively with water (10 ml, 3 times) and brine (5 ml) and then dried with anhydrous sodium sulfate, and the solvent was distilled off under reduced pressure. The resulting solid was purified by silica gel column chromatography (heptane to 50% ethyl acetate/heptane) to obtain the title compound (0.34 g) as a white solid.

NMR data ($CDCl_3$) (δ: ppm): 7.48 to 7.41 (3H, m), 7.38 to 7.29 (3H, m), 6.95 to 6.82 (2H, m), 5.98 (1H, d, J=15 Hz), 4.74 (1H, brs), 4.24 (2H, t, J=6 Hz), 3.23 (2H, q, J=6 Hz), 1.91 to 1.84 (2H, m), 1.45 (9H, s)

<Step 2> Synthesis of 3-aminopropyl (2E,4E)-5-phenylpenta-2,4-dienoate hydrochloride

[C171]

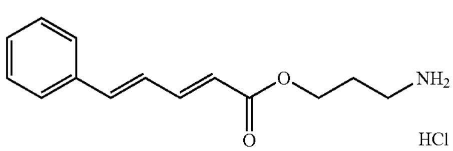

The title compound (0.25 g) was obtained as a white solid by the same operations as in <Step 4> of (Example 1) using the compound (0.34 g) obtained in <Step 1> of (Example 11).

NMR data (DMSO-$d_6$) (δ: ppm): 7.90 (3H, brs), 7.56 (2H, dd, J=9, 1 Hz), 7.47 to 7.32 (4H, m), 7.18 to 7.08 (2H, m), 6.11 (1H, d, J=15 Hz), 4.18 (2H, t, J=6 Hz), 2.89 (2H, t, J=7 Hz), 1.97 to 1.90 (2H, m)

<Step 3> Synthesis of Alginic Acid Having Introduced (2E,4E)-5-phenylpenta-2,4-dienoic acid-3-aminopropyl Group (EX11-a)

[C172]

Ex 11-a

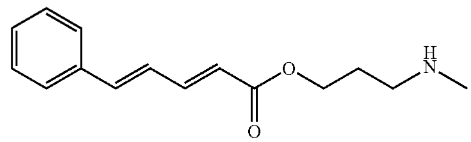

(Alginic acid A-2)

The title compound (210 mg) was obtained as a white solid by operations similar to those of <Step 5-1> of (Example 1) by reacting 20 ml of a sodium alginate (Mochida Pharmaceutical: A-2) aqueous solution adjusted to 1 wt %, the compound obtained in <Step 2> of (Example 11) (40.5 mg), 4-(4,6-dimethoxy-1,3,5-triazin-2-yl)-4-methylmorpholinium chloride (112 mg), 1-molar sodium bicarbonate water (202 μl) and ethanol (2.0 m) for 3 hours at 30° C.

(Example 12) Synthesis of Alginic Acid Having Introduced (2E,4E)-5-(4-methoxyphenyl)penta-2,4-dienoic acid-3-aminopropyl Group (EX12-a)

<Step 1> Synthesis of (2E,4E)-5-(4-methoxyphenyl)penta-2,4-dienoic acid

[C173]

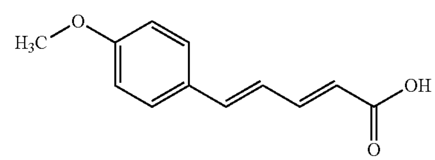

1N-sodium hydroxide aqueous solution (1.4 ml) was added under ice-water cooling to an ethanol (1.5 ml) solution of (2E,4E)-5-(4-methoxyphenyl)penta-2,4-dienoic acid ethyl ester (295 mg), which had been synthesized from 4-methoxybenzaldehyde (commercial product: CAS No. 123-11-5) and triethyl 4-phosphonocrotonate (commercial product: CAS No. 42516-28-9) by the methods described in the literature (Journal of American Chemical Society, 127 (43), 15028-15029, 2005), and the mixture was stirred for 1 hour at room temperature and 1.5 hours at 50° C. Additional 1N-sodium hydroxide aqueous solution (0.4 ml) was added, and the mixture was stirred for 3 hours at 50° C. The pH of the reaction solution was adjusted to 1 with 2N-hydrochloric acid, and ethyl acetate (20 ml) and water (5 ml) were added to separate the solution. The organic layer was washed successively with water (5 ml) and brine (5 ml) and then dried with anhydrous sodium sulfate, and the solvent was distilled off under reduced pressure. The resulting solid was dried under reduced pressure to obtain the title compound (256 mg) as a light yellow solid.

NMR data ($CDCl_3$) (δ: ppm): 7.51 (1H, dd, J=15, 11 Hz), 7.43 (2H, d, J=9 Hz), 6.92 to 6.87 (3H, m), 6.82 to 6.74 (1H, m), 5.94 (1H, d, J=15 Hz), 3.84 (3H, s)

<Step 2> Synthesis of 3-((tert-butoxycarbonyl) amino)propyl (2E,4E)-5-(4-methoxyphenyl)penta-2,4-dienoate

[C174]

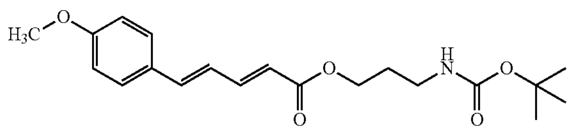

N-methylpyrrolidone (2.6 ml) was added to the compound (256 mg) obtained in <Step 1> of (Example 12), tert-butyl(3-bromopropyl) carbamate (448 mg), potassium carbonate (260 mg) and potassium iodide (42 mg), and stirred for 2.5 hours at 80° C. Ethyl acetate (25 ml) and water (12 ml) were added to separate the reaction solution. The organic layer was washed successively with water (5 ml, 3 times) and brine (5 ml) and then dried with anhydrous sodium sulfate, and the solvent was distilled off under reduced pressure. The oily product was purified by silica gel column chromatography (heptane to 40% ethyl acetate/heptane) to obtain the title compound (402 mg) as a white solid.

NMR data ($CDCl_3$) (δ: ppm): 7.47 to 7.38 (3H, m), 6.91 to 6.84 (3H, m), 6.74 (1H, dd, J=15, 11 Hz), 5.93 (1H, d, J=15 Hz), 4.76 (1H, brs), 4.23 (2H, t, J=6 Hz), 3.83 (3H, s), 3.23 (2H, q, J=6 Hz), 1.90 to 1.84 (2H, m), 1.45 (9H, s)

<Step 3> Synthesis of 3-aminopropyl (2E,4E)-5-(4-methoxyphenyl)penta-2,4-dienoate hydrochloride

[C175]

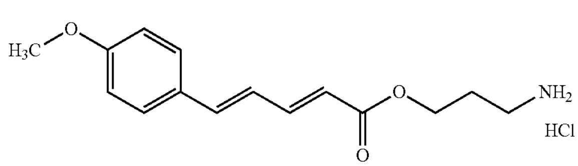

The title compound (0.32 g) was obtained as a white solid by the same methods as in <Step 4> of (Example 1) using the compound (0.40 g) obtained in <Step 2> of (Example 12).

NMR data (DMSO-$d_6$) (δ: ppm): 7.85 (3H, brs), 7.52 (2H, d, J=9 Hz), 7.41 (1H, dd, J=15, 10 Hz), 7.08 to 6.95 (4H, m), 6.03 (1H, d, J=15 Hz), 4.17 (2H, t, J=6 Hz), 3.78 (3H, s), 2.89 (2H, t, J=7 Hz), 1.96 to 1.89 (2H, m)

<Step 4> Synthesis of Alginic Acid Having Introduced (2E,4E)-5-phenylpenta-2,4-dienoic acid-3-aminopropyl Group (EX12-a)

[C176]

Ex12-a

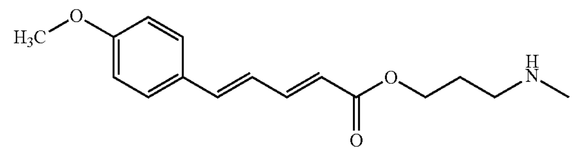

(Alginic acid A-2)

The title compound (381 mg) was obtained as a white solid by operations similar to those of <Step 5-1> of (Example 1) by reacting 40 ml of a sodium alginate (Mochida Pharmaceutical: A-2) aqueous solution adjusted to 1 wt %, the compound obtained in <Step 3> of (Example 12) (30.0 mg), 4-(4,6-dimethoxy-1,3,5-triazin-2-yl)-4-methylmorpholinium chloride (112 mg) and 1-molar sodium bicarbonate water (151 μl) for 4 hours at 30° C.

(Example 13) Synthesis of Alginic Acid Having Introduced (E)-3-(4-cyanophenyl) acrylic acid-2-(2-aminoethoxy)ethyl Group (EX13-a1)

<Step 1> Synthesis of 2-(2-((tert-butoxycarbonyl) amino)ethoxy)ethyl (E)-3-(4-cyanophenyl)acrylate

[C177]

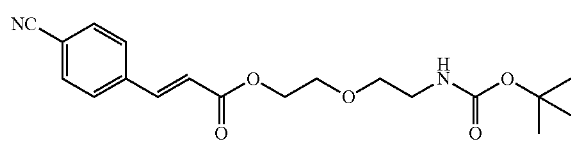

Thionyl chloride (0.34 ml) and N,N-dimethylformamide (1.8 μl) were added to the compound (0.40 g) obtained in <Step 1> of (Example 7), and the mixture was stirred for 40 minutes at 80° C. The resulting solution was concentrated under reduced pressure, and azeotropically distilled twice with methylene chloride (1 ml). Methylene chloride (2 ml) was added to the resulting solid, and a methylene chloride (2 ml) solution of tert-butyl(2-(2-hydroxyethoxy)ethyl) carbamate (0.57 g), triethylamine (0.97 ml) and N,N-dimethylaminopyridine (0.06 g) was added under ice-water cooling. This was stirred for 30 minutes at room temperature and separated by addition of ethyl acetate (20 ml) and water (10 ml). The organic layer was washed successively with semi-saturated sodium bicarbonate water (10 ml), water (5 ml) and brine (5 ml) and then dried with anhydrous sodium sulfate, and the solvent was distilled off under reduced pressure. The oily product was purified by silica gel column chromatography (16% ethyl acetate/heptane to ethyl acetate) to obtain the title compound (0.78 g) as a white amorphous substance.

NMR data ($CDCl_3$) (δ: ppm): 7.71 to 7.66 (3H, m), 7.61 (2H, d, J=8 Hz), 6.56 (1H, d, J=16 Hz), 4.89 (1H, brs), 4.38 (2H, t, J=5 Hz), 3.74 (2H, t, J=5 Hz), 3.57 (2H, t, J=5 Hz), 3.34 (2H, dd, J=10, 5 Hz), 1.43 (9H, s)

<Step 2> Synthesis of 2-(2-aminoethoxy)ethyl (E)-3-(4-cyanophenyl)acrylate hydrochloride

[C178]

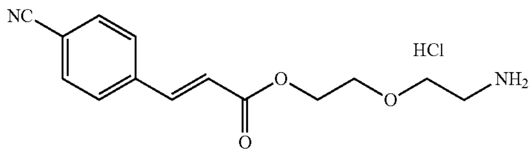

The compound obtained in <Step 1> of (Example 13) (0.78 g) was dissolved in 1,4-dioxane (2.35 ml), and 4N-hydrogen chloride/dioxane (5.48 ml) was gradually added under water cooling. The reaction solution was stirred at room temperature for 1 hour and 30 minutes, and diisopropyl ether (50 ml) was added. The precipitated solid was filtered out, washed with diisopropyl ether, and dried under reduced pressure to obtain the title compound (0.56 g) as a white solid.

NMR data (DMSO-$d_6$) (δ: ppm): 7.96 to 7.89 (7H, m), 7.73 (1H, d, J=16 Hz), 6.85 (1H, d, J=16 Hz), 4.34 to 4.31 (2H, m), 3.74 to 3.71 (2H, m), 3.65 (2H, t, J=5 Hz), 3.00 to 2.96 (2H, m)

<Step 3> Synthesis of Alginic Acid Having Introduced (E)-3-(4-cyanophenyl) acrylic acid-2-(2-aminoethoxy)ethyl Group (Ex13-a1)

[C179]

Ex13a-1

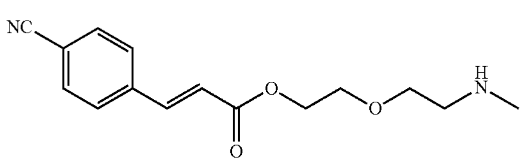

(Alginic acid A-2)

The title compound (384 mg) was obtained as a white solid by operations similar to those of <Step 5-1> of (Example 1) by reacting 40 ml of a sodium alginate (Mochida Pharmaceutical: A-2) aqueous solution adjusted to 1 wt %, the compound obtained in <Step 2> of (Example 13) (27 mg), 4-(4,6-dimethoxy-1,3,5-triazin-2-yl)-4-methylmorpholinium chloride (122 mg) and 1-molar sodium bicarbonate water (137 µl) for 3 hours at 30° C.

(Example 14) Synthesis of Alginic Acid Having Introduced (E)-3-(2,3-dihydrobenzo[b][1,4]dioxin-6-yl)acrylic Acid-2-(2-aminoethoxy)ethyl Group (EX14-a1)

<Step 1> Synthesis of 2-(2-((tert-butoxycarbonyl) amino)ethoxy)ethyl (E)-3-(2,3-dihydrobenzo[b][1,4] dioxin-6-yl)acrylate

[C180]

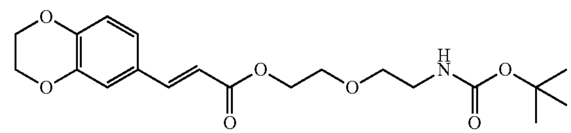

Thionyl chloride (0.21 ml) and N,N-dimethylformamide (1.1 µl) were added to (E)-3-(2,3-dihydrobenzo[b][1,4]dioxin-6-yl) acrylic acid (commercial product: CAS No. 151539-59-2: 0.30 g), and stirred for 1 hour at 80° C. The resulting solution was concentrated under reduced pressure, and azeotropically distilled twice with methylene chloride (1 ml). Methylene chloride (1.5 ml) was added to the resulting solid, and a methylene chloride (1.5 ml) solution of tert-butyl (2-(2-hydroxyethoxy)ethyl)carbamate (0.3 g), triethylamine (0.61 ml) and N,N-dimethylaminopyridine (0.04 g) was added under ice-water cooling. This was stirred for 1 hour at room temperature and separated by addition of ethyl acetate (20 ml) and water (10 ml). The organic layer was washed successively with semi-saturated sodium bicarbonate water (10 ml), water (5 ml) and brine (5 ml) and dried with anhydrous sodium sulfate, and the solvent was distilled off under reduced pressure. The oily product was purified by silica gel column chromatography (8% ethyl acetate/heptane to 68% ethyl acetate/heptane) to obtain the title compound (0.51 g) as a colorless oily substance.

NMR data ($CDCl_3$) (δ: ppm): 7.59 (1H, d, J=16 Hz), 7.06 to 6.99 (2H, m), 6.85 (1H, d, J=8 Hz), 6.32 (1H, d, J=16 Hz), 4.91 (1H, brs), 4.34 (2H, t, J=5 Hz), 4.28 (4H, dd, J=8, 5 Hz), 3.72 (2H, t, J=5 Hz), 3.57 (2H, t, J=5 Hz), 3.36 to 3.29 (2H, m), 1.44 (9H, s)

<Step 2> Synthesis of 2-(2-aminoethoxy)ethyl (E)-3-(2,3-dihydrobenzo[b][1,4]dioxin-6-yl)acrylate hydrochloride

[C181]

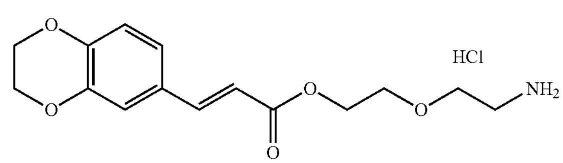

The compound obtained in <Step 1> of (Example 14) (0.51 g) was dissolved in 1,4-dioxane (1.52 ml), and 4N-hydrogen chloride/dioxane (3.56 ml) was added gradually under water cooling. The reaction solution was stirred at room temperature for 1 hour and 30 minutes, and diisopropyl ether (50 ml) was added to produce a rubbery compound. The solution was concentrated under reduced pressure, and the resulting solid was triturated by addition of 30 ml of diisopropyl ether. The solid was filtered out, washed with diisopropyl ether, and dried under reduced pressure to obtain the title compound (0.4 g) as a light pink amorphous substance.

NMR data (DMSO-$d_6$) (δ: ppm): 7.87 (3H, brs), 7.55 (1H, d, J=16 Hz), 7.28 (1H, d, J=2 Hz), 7.21 (1H, dd, J=8, 2 Hz), 6.89 (1H, d, J=8 Hz), 6.48 (1H, d, J=16 Hz), 4.29 to 4.24 (6H, m), 3.73 to 3.70 (2H, m), 3.66 to 3.61 (2H, m), 3.02 to 2.94 (2H, m)

<Step 3> Synthesis of Alginic Acid Having Introduced (E)-3-(2,3-dihydrobenzo[b][1,4]dioxin-6-yl) acrylic acid-2-(2-aminoethoxy)ethyl Group (Ex14-a1)

[C182]

Ex14-a1

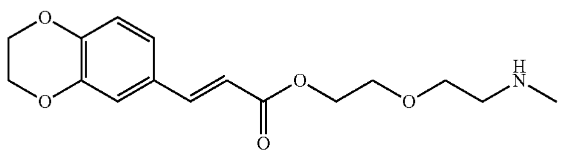

(Alginic acid A-2)

The title compound (386 mg) was obtained as a white solid by operations similar to those of <Step 5-1> of (Example 1) by reacting 40 ml of a sodium alginate (Mochida Pharmaceutical: A-2) aqueous solution adjusted to 1 wt %, the compound obtained in <Step 2> of (Example 14) (30 mg), 4-(4,6-dimethoxy-1,3,5-triazin-2-yl)-4-methylmorpholinium chloride (122 mg) and 1-molar sodium bicarbonate water (137 μl) for 3 hours at 30° C.

(Example 15) Synthesis of Aliginic Acid Having Introduced (E)-3-(3,4-dimethoxyphenyl)acrylic acid-2-(2-aminoethoxy)ethyl Group (EX15-a1)

<Step 1> Synthesis of (E)-3-(3,4-dimethoxyphenyl) acrylic acid

[C183]

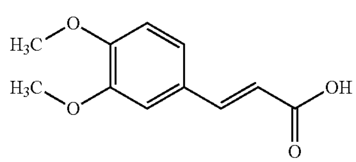

Pyridine (30.0 ml) was added to 3,4-dimethoxybenzaldehyde (commercial product: CAS No. 120-14-9: 3.00 g) and malonic acid (3.76 g), and stirred to dissolve for 10 minutes at 45° C. Pyridine (0.31 ml) was added to the reaction solution, which was then stirred for 0.5 hours at 100° C. and 2.5 hours at 125° C. The pyridine solvent was distilled off under reduced pressure to half the volume. The pH of the reaction solution was adjusted to 2 with 6N-hydrochloric acid under ice-water cooling. The resulting solid was filtered out, washed with water (10 ml, 3 times) and dried under reduced pressure at 40° C. to obtain the title compound (3.34 g) as a white solid.

NMR data (DMSO-$d_6$) (δ: ppm): 12.18 (1H, brs), 7.51 (2H, d, J=16 Hz), 7.30 (1H, d, J=2 Hz), 7.20 (1H, dd, J=9, 2 Hz), 6.97 (1H, d, J=9 Hz), 6.43 (1H, d, J=16 Hz), 3.80 (3H, s), 3.78 (3H, s)

<Step 2> Synthesis of 2-(2-((tert-butoxycarbonyl) amino)ethoxy)ethyl (E)-3-(3,4-dimethoxyphenyl) acrylate

[C184]

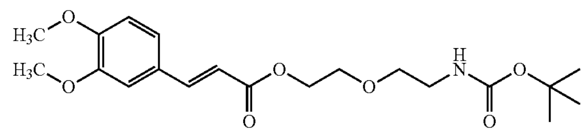

Thionyl chloride (210 μl) and N,N-dimethylformamide (1.1 μl) were added to the compound (0.30 g) obtained in <Step 1> of (Example 15), and stirred for 30 minutes at 80° C. The resulting solution was concentrated under reduced pressure, and azeotropically distilled twice with methylene chloride (1 ml). The resulting acid chloride was dissolved in methylene chloride (1.5 ml), and added to a methylene chloride (1.5 ml) solution of tert-butyl(2-(2-hydroxyethoxy) ethyl) carbamate (0.35 g), triethylamine (0.6 ml) and N,N-dimethylaminopyridine (35 mg) under ice-water cooling. This was stirred for 1.5 hours at room temperature and separated by addition of ethyl acetate (20 ml) and water (10 ml). The organic layer was washed successively with semi-saturated sodium bicarbonate water (10 ml), water (5 ml) and brine (5 ml) and then dried with anhydrous sodium sulfate, and the solvent was distilled off under reduced pressure. The oily product was purified by silica gel column chromatography (20% ethyl acetate/heptane to 50% ethyl acetate/heptane) to obtain the title compound (0.53 g) as a colorless oily substance.

NMR data ($CDCl_3$) (δ: ppm): 7.66 (1H, d, J=16 Hz), 7.11 (1H, dd, J=8, 2 Hz), 7.07 to 7.05 (1H, m), 6.86 (1H, d, J=8 Hz), 6.36 (1H, d, J=16 Hz), 4.92 (1H, brs), 4.35 (2H, t, J=5 Hz), 3.92 (6H, s), 3.73 (2H, t, J=5 Hz), 3.58 (2H, t, J=5 Hz), 3.34 (2H, q, J=5 Hz), 1.44 (9H, s)

<Step 3> Synthesis of 2-(2-aminoethoxy)ethyl (E)-3-(3,4-dimethoxyphenyl)acrylate hydrochloride

[C185]

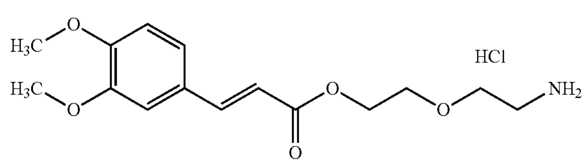

The title compound (0.39 g) was obtained as a white solid by the same operations as in <Step 4> of (Example 1) using the compound (0.53 g) obtained in <Step 2> of (Example 15).

NMR data (DMSO-$d_6$) (δ: ppm): 7.95 (3H, brs), 7.60 (1H, d, J=16 Hz), 7.36 (1H, d, J=2 Hz), 7.25 (1H, dd, J=8, 2 Hz), 6.98 (1H, d, J=8 Hz), 6.58 (1H, d, J=16 Hz), 4.29 (2H, dd, J=5, 4 Hz), 3.81 (3H, s), 3.79 (3H, s), 3.72 (2H, dd, J=5, 4 Hz), 3.65 (2H, t, J=6 Hz), 3.02 to 2.94 (2H, m)

<Step 4> Synthesis of Alginic Acid Having Introduced (E)-3-(3,4-dimethoxyphenyl)acrylic acid-2-(2-aminoethoxy)ethyl Group (Ex15-a1)

[C186]

Ex15-a1

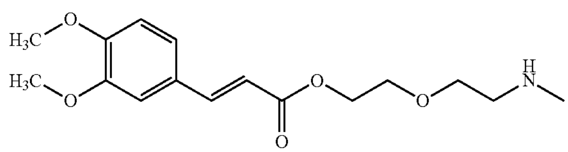

(Alginic acid A-2)

The title compound (392 mg) was obtained as a white solid by operations similar to those of <Step 5-1> of (Example 1) by reacting 40 ml of a sodium alginate (Mochida Pharmaceutical: A-2) aqueous solution adjusted to 1 wt %, a methanol (4 ml) solution of the compound obtained in <Step 3> of (Example 15) (34 mg), 4-(4,6-dimethoxy-1,3,5-triazin-2-yl)-4-methylmorpholinium chloride (112 mg) and 1-molar sodium bicarbonate water (151 μl) for 3 hours at 30° C.

(Example 16) Synthesis of Alginic Acid Having Introduced (E)-3-(2-methoxypyridin-5-yl)acrylic acid-2-(2-aminoethoxy)ethyl Group (EX16-a1)

<Step 1> Synthesis of (E)-3-(2-methoxypyridin-5-yl)acrylic acid

[C187]

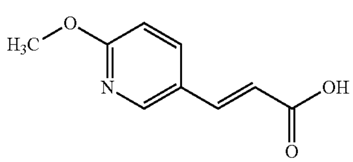

Pyridine (20.0 ml) was added to 5-formyl-2-methoxypyridine (commercial product: CAS No. 65873-72-5: 2.00 g) and malonic acid (3.04 g) and stirred for 10 minutes at 45° C. to dissolve. Piperidine (0.29 ml) was added to the reaction solution, which was then stirred for 0.5 hours at 100° C. and 2 hours at 125° C. The pyridine solvent was distilled off under reduced pressure to one-half volume. The pH of the reaction solution was adjusted to 2 with 6N-hydrochloric acid under ice-water cooling. The pH was further adjusted to 4 with saturated sodium bicarbonate water. The resulting solid was filtered out, washed with water (10 ml, 5 times), and dried under reduced pressure at 50° C. to obtain the title compound (2.50 g) as a white solid.

NMR data (DMSO-$d_6$) (δ: ppm): 12.34 (1H, brs), 8.43 (1H, d, J=2 Hz), 8.11 (1H, dd, J=9, 2 Hz), 7.57 (1H, d, J=16 Hz), 6.86 (1H, d, J=9 Hz), 6.50 (1H, d, J=16 Hz), 3.88 (3H, s)

<Step 2> Synthesis of 2-(2-aminoethoxy)ethyl (E)-3-(2-methoxypyridin-5-yl)acrylate hydrochloride

[C188]

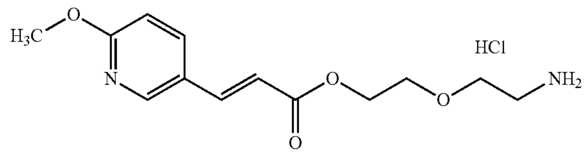

Oxalyl chloride (0.59 ml) and N,N-dimethylformamide (1.7 μl) were added under ice cooling to a suspension of methylene chloride (4 ml) and the compound (0.40 g) obtained in <Step 1> of (Example 16), and stirred for 1 hour and 30 minutes at room temperature. The resulting solution was concentrated under reduced pressure and suspended in methylene chloride (2 ml), and a methylene chloride (2 ml) solution of tert-butyl(2-(2-hydroxyethoxy)ethyl) carbamate (0.46 g) and N-ethyldiisopropylamine (1.17 ml) was added under ice-water cooling. This was stirred at room temperature for 30 minutes and separated by addition of ethyl acetate (20 ml and water (10 ml). The organic layer was washed successively with semi-saturated sodium bicarbonate water (10 ml), water (5 ml) and brine (5 ml) and then dried with anhydrous sodium sulfate, and the solvent was distilled off under reduced pressure. The resulting coarse product was purified by silica gel column chromatography (8% ethyl acetate/heptane to 68% ethyl acetate/heptane (once), 16% ethyl acetate/heptane to 100% ethyl acetate (twice)) to obtain a fraction (0.15 g) containing the title compound.

The title compound (0.14 g) was obtained as a white solid as in <Step 2> of (Example 13) using the fraction (0.15 g) containing the title compound.

NMR data (DMSO-$d_6$) (δ: ppm): 8.49 (1H, d, J=2 Hz), 8.16 (1H, dd, J=9, 2 Hz), 7.96 (3H, br s), 7.66 (1H, d, J=16 Hz), 6.88 (1H, d, J=9 Hz), 6.64 (1H, d, J=16 Hz), 4.31 to 4.28 (2H, m), 3.89 (3H, s), 3.73 to 3.71 (2H, m), 3.65 (2H, t, J=5 Hz), 3.01 to 2.94 (2H, m)

<Step 3> Synthesis of Alginic Acid Having Introduced (E)-3-(3,4-dimethoxyphenyl)acrylic acid-2-(2-aminoethoxy)ethyl Group (Ex16-a1)

[C189]

Ex16-a1

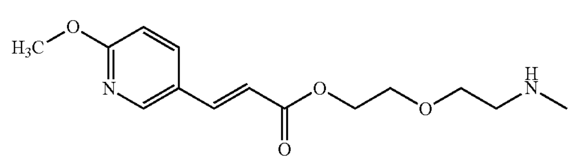

(Alginic acid A-2)

The title compound (375 mg) was obtained as a white solid by the operations similar to those of <Step 5-1> of (Example 1) by reacting 40 ml of a sodium alginate (Mochida Pharmaceutical: A-2) aqueous solution adjusted to 1 wt %, the compound obtained in <Step 2> of (Example 16) (28 mg), 4-(4,6-dimethoxy-1,3,5-triazin-2-yl)-4-methylmorpholinium chloride (122 mg) and 1-molar sodium bicarbonate water (137 μl) for 3 hours at 30° C.

(Example 17) Synthesis of Alginic Acid Having Introduced (E)-3-(4-acetylaminophenyl)acrylic acid-2-(2-aminoethoxy)ethyl Group (EX17-a1)

<Step 1> Synthesis of (E)-3-(4-acetylaminophenyl) acrylic acid

[C190]

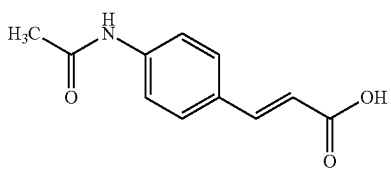

Pyridine (20.0 ml) was added to 4-acetylaminobenzaldehyde (commercial product: CAS No. 122-85-0: 2.00 g) and malonic acid (2.55 g), and the mixture was dissolved by stirring for 10 minutes at 45° C. Piperidine (0.24 ml) was added to the reaction solution, which was then stirred for 0.5 hours at 100° C. and 2 hours at 125° C. The pyridine solvent was distilled off under reduced pressure to half the volume. The pH of the reaction solution was adjusted to 1 with 6N-hydrochloric acid under ice-water cooling. The resulting solid was filtered out, washed with water (10 ml, 5 times) and dried under reduced pressure at 50° C. to obtain the title compound (2.37 g) as a white solid.

NMR data (DMSO-$d_6$) (δ: ppm): 12.26 (1H, brs), 10.13 (1H, s), 7.61 (4H, s), 7.51 (2H, d, J=16 Hz), 6.40 (1H, d, J=16 Hz), 2.06 (3H, s)

<Step 2> Synthesis of 2-(2-((tert-butoxycarbonyl) amino)ethoxy)ethyl (E)-3-(4-acetamidophenyl)acrylate

[C191]

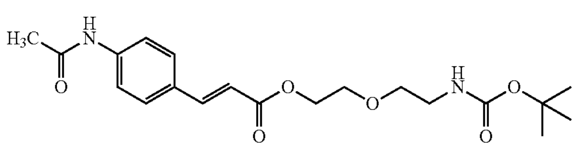

Thionyl chloride (0.28 ml) and N,N-dimethylformamide (1.5 μl) were added to the compound obtained in <Step 1> of (Example 17) (0.40 g), and stirred for 40 minutes at 80° C. The resulting solution was concentrated under reduced pressure, and azeotropically distilled twice with methylene chloride (1 ml). The resulting solid was dissolved in methylene chloride (2 ml), and a methylene chloride (2 ml) solution of tert-butyl(2-(2-hydroxyethoxy)ethyl) carbamate (0.48 g), triethylamine (0.82 ml) and N,N-dimethylaminopyridine (0.05 g) was added under ice-water cooling. This was stirred for 30 minutes at room temperature and separated by addition of ethyl acetate (20 ml) and water (10 ml). The organic layer was washed successively with semi-saturated sodium bicarbonate water (10 ml), water (5 ml) and brine (5 ml) and then dried with anhydrous sodium sulfate, and the solvent was distilled off under reduced pressure. The resulting coarse product was purified twice by silica gel column chromatography (25% ethyl acetate/heptane to ethyl acetate) to obtain the title compound (0.63 g) as a brown rubbery substance.

NMR data ($CDCl_3$) (δ: ppm): 7.66 (1H, d, J=16 Hz), 7.54 (2H, d, J=9 Hz), 7.49 (2H, d, J=9 Hz), 7.21 (1H, brs), 6.41 (1H, d, J=16 Hz), 4.92 (1H, brs), 4.35 (2H, t, J=5 Hz), 3.73 (2H, t, J=5 Hz), 3.59 to 3.54 (2H, m), 3.38 to 3.30 (2H, m), 2.20 (3H, s), 1.43 (9H, s)

<Step 3> Synthesis of 2-(2-aminoethoxy)ethyl (E)-3-(4-acetamidophenyl)acrylate hydrochloride

[C192]

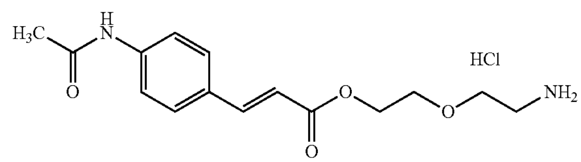

The title compound (0.47 g) was obtained as a light yellow solid by the same operations as in <Step 2> of (Example 13) using the compound obtained in <Step 2> of (Example 17) (0.63 g).

NMR data (DMSO-$d_6$) (δ: ppm): 10.27 (1H, s), 7.98 (3H, brs), 7.66 (4H, s), 7.60 (1H, d, J=16 Hz), 6.53 (1H, d, J=16 Hz), 4.29 (2H, t, J=5 Hz), 3.72 (2H, t, J=5 Hz), 3.65 (2H, t, J=5 Hz), 3.00 to 2.94 (2H, m), 2.07 (3H, s)

<Step 4> Synthesis of Alginic Acid Having Introduced (E)-3-(4-acetylaminophenyl)acrylic acid-2-(2-aminoethoxy)ethyl Group (Ex17-a1)

[C193]

Ex17-a1

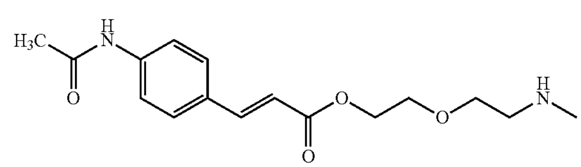

(Alginic acid A-2)

The title compound (382 mg) was obtained as a light yellow solid by operations similar to those of <Step 5-1> of (Example 1) by reacting 40 ml of a sodium alginate (Mochida Pharmaceutical: AL100) aqueous solution adjusted to 1 wt %, 30 mg of the compound obtained in <Step 3> of (Example 17), 122 mg of 4-(4,6-dimethoxy-1,3,5-triazin-2-yl)-4-methylmorpholinium chloride and 137 μl of 1-molar sodium bicarbonate water for 3 hours at 30° C.

(Example 18) Synthesis of Alginic Acid Having Introduced (2E,4E)-5-phenylpenta-2,4-dienoic acid-2-(2-aminoethoxy)ethyl Group (EX18-a1)

<Step 1> Synthesis of 2-(2-((tert-butoxycarbonyl)amino)ethoxy)ethyl (2E,4E)-5-(4-methoxyphenyl)penta-2,4-dienoate

[C194]

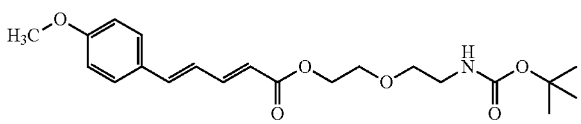

Thionyl chloride (0.21 ml) and N,N-dimethylformamide (1.1 μl) were added to the compound obtained in <Step 1> of (Example 12) (0.30 g), and stirred for 30 minutes at 80° C. The resulting solution was concentrated under reduced pressure, and azeotropically distilled twice with methylene chloride (1 ml). The resulting solid was dissolved in methylene chloride (1.5 ml), and a methylene chloride (1.5 ml) solution of tert-butyl(2-(2-hydroxyethoxy)ethyl)carbamate (0.3 g), triethylamine (0.61 ml) and N,N-dimethylaminopyridine (0.04 g) was added under ice-water cooling. This was stirred for 4 hours at room temperature and separated by addition of ethyl acetate (20 ml) and water (10 ml). The organic layer was washed successively with semi-saturated sodium bicarbonate water (10 ml), water (5 ml) and brine (5 ml) and dried with anhydrous sodium sulfate, and the solvent was distilled off under reduced pressure. The oily product was purified by silica gel column chromatography (12% ethyl acetate/heptane to 100% ethyl acetate) to obtain the title compound (0.44 g) as a brown oily substance.

NMR data ($CDCl_3$) (δ: ppm): 7.49 to 7.36 (3H, m), 6.92 to 6.85 (3H, m), 6.74 (1H, dd, J=15, 11 Hz), 5.97 (1H, d, J=15 Hz), 4.92 (1H, br s), 4.32 (2H, t, J=5 Hz), 3.83 (3H, s), 3.71 (2H, t, J=5 Hz), 3.56 (2H, t, J=5 Hz), 3.33 (2H, q, J=5 Hz), 1.45 (9H, s)

<Step 2> Synthesis of 2-(2-aminoethoxy)ethyl (2E,4E)-5-(4-methoxyphenyl)penta-2,4-dienoate hydrochloride

[C195]

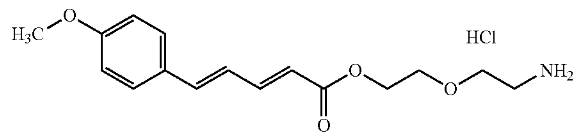

The title compound (0.343 g) was obtained as a light yellow solid by the same operations as in <Step 2> of (Example 13) using the compound obtained in <Step 1> of (Example 18) (0.44 g).

NMR data (DMSO-$d_6$) (δ: ppm): 7.79 (3H, br s), 7.51 (2H, d, J=9 Hz), 7.41 (1H, dd, J=15, 10 Hz), 7.08 to 6.95 (4H, m), 6.03 (1H, d, J=15 Hz), 4.25 (2H, t, J=5 Hz), 3.78 (3H, s), 3.70 (2H, t, J=5 Hz), 3.63 (2H, t, J=5 Hz), 3.01 to 2.98 (2H, br m)

<Step 3> Synthesis of Alginic Acid Having Introduced (2E,4E)-5-phenylpenta-2,4-dienoic acid-2-(2-aminoethoxy)ethyl Group (Ex18-a1)

[C196]

Ex18-a1

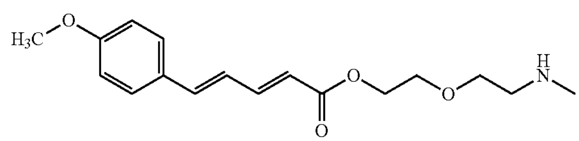

(Alginic acid A-2)

The title compound (386 mg) was obtained as a light yellow solid by operations similar to those of <Step 5-1> of (Example 1) by reacting 40 ml of a sodium alginate (Mochida Pharmaceutical: A-2) aqueous solution adjusted to 1 wt %, the compound obtained in <Step 2> of (Example 18) (30 mg), 4-(4,6-dimethoxy-1,3,5-triazin-2-yl)-4-methylmorpholinium chloride (122 mg) and 1-molar sodium bicarbonate water (137 μl) for 3 hours at 30° C.

(Example 19) Synthesis of Alginic Acid Having Introduced (E)-3-(2,3-dihydrobenzo[b][1,4]dioxin-6-yl)acrylic acid amido-2-(2-(2-aminoethoxy)ethoxy)ethyl Group (EX19-a1)

<Step 1> Synthesis of (E)-(2-(2-(2-(3-(2,3-dihydrobenzo[b][1,4]dioxin-6-yl)acrylamido)ethoxy)ethoxy)ethyl)carbamate

[C197]

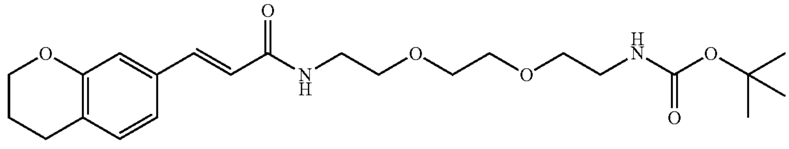

(E)-3-(2,3-dihydrobenzo[b][1,4]dioxin-6-yl) acrylic acid (commercial product: CAS No. 151539-59-2: 0.20 g) and the compound of <Step 1> of (Example 4) (0.27 g) were dissolved in ethanol (4 ml), 4-(4,6-dimethoxy-1,3,5-triazin-2-yl)-4-methylmorpholinium chloride (0.56 g) was added, and the mixture was stirred for 23 hours at room temperature. Ethyl acetate (30 ml) and water (8 ml) were added to separate the reaction solution. The organic layer was washed successively with water (10 ml) and brine (5 ml) and then dried with anhydrous sodium sulfate, and the solvent was distilled off under reduced pressure. The oily product was purified by silica gel column chromatography (20% ethyl acetate/heptane to ethyl acetate) to obtain the title compound (0.39 g) as a colorless rubbery substance.

NMR data ($CDCl_3$) (δ: ppm): 7.51 (1H, d, J=16 Hz), 7.03 to 6.98 (2H, m), 6.84 (1H, d, J=8 Hz), 6.26 (1H, d, J=16 Hz), 6.16 (1H, brs), 5.00 (1H, brs), 4.29 to 4.24 (4H, m), 3.68 to 3.54 (10H, m), 3.37 to 3.28 (2H, m), 1.44 (9H, s)

<Step 2> Synthesis of (E)-N-(2-(2-(2-aminoethoxy)ethoxy)ethyl)-3-(2,3-dihydrobenzo[b][1,4]dioxin-6-yl)acrylamide hydrochloride

[C198]

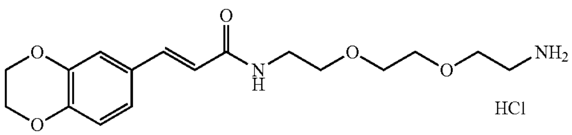

The title compound (0.25 g) was obtained as a light-yellow rubbery substance by the same operations as in <Step 4> of (Example 1) using the compound (0.39 g) obtained in <Step 1> of (Example 19).

NMR data (DMSO-$d_6$) (δ: ppm): 8.16 (1H, t, J=6 Hz), 7.97 (3H, brs), 7.29 (1H, d, J=16 Hz), 7.07 to 7.02 (2H, m), 6.88 (1H, d, J=8 Hz), 6.53 (1H, d, J=16 Hz), 4.28 to 4.23 (4H, m), 3.63 to 3.54 (6H, m), 3.48 (2H, t, J=6 Hz), 3.33 (2H, q, J=6 Hz), 2.99 to 2.91 (2H, m)

<Step 3> Synthesis of Alginic Acid Having Introduced (E)-3-(2,3-dihydrobenzo[b][1,4]dioxin-6-yl) acrylic acid amido-2-(2-(2-aminoethoxy)ethoxy) ethyl Group (EX19-a1)

[C199]

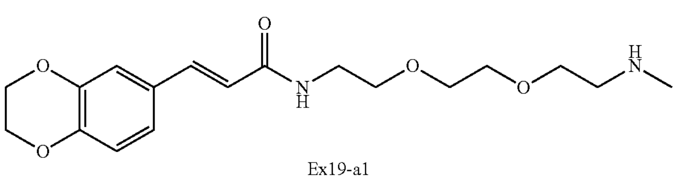

Ex19-a1

The title compound (384 mg) was obtained as a white solid by operations similar to those of <Step 5-1> of (Example 1) by reacting 40 ml of a sodium alginate (Mochida Pharmaceutical: A-2) aqueous solution adjusted to 1 wt %, the compound obtained in <Step 2> of (Example 19) (38 mg), 4-(4,6-dimethoxy-1,3,5-triazin-2-yl)-4-methylmorpholinium chloride (112 mg) and 1-molar sodium bicarbonate water (151 μl) for 3 hours at 30° C.

[Measuring Introduction Rate of Photoreactive Group]

The introduction rate of the photoreactive group (photocrosslinking group) is a value representing the number of introduced photoreactive groups as a percentage relative to uronic acid monosaccharide units, which are the repeating units of alginic acid. The amount of alginic acid necessary for calculating the introduction rate is measured by the carbazole-sulfuric acid method using a calibration curve, and the quantity of reactive groups or complementary reactive groups is measured by absorbance measurement using the calibration curve.

In these examples, the introduction rate of the reactive group or complementary reactive group (mol %) was calculated based on the $^1$H-NMR integral ratio. The amount of alginic acid necessary for calculating the introduction rate can be measured by the carbazole-sulfuric acid method using a calibration curve, while the amount of reactive groups or complementary reactive groups can be measured by absorbance measurement using a calibration curve.

[Measuring Molecular Weight]

Solid bodies of the alginic acid derivatives with introduced photoreactive groups obtained in the examples were dissolved in 10 mmol/L phosphate buffer (pH 7.4) containing 0.15 mol/L NaCl to prepare 0.2% solutions, which were then passed through a cellulose acetate filter with a pore size of 0.2 microns (DISMIC-25cs, Advantec) to remove insoluble matter, and 200 μl of this was supplied to a Superose 6 Increase 10/300 GL column (GE Health Care Sciences). Gel filtration was performed under conditions of room temperature, flow rate 0.6 ml/min using an AKTA Explorer 10S as the chromatograph and 10 mmol/L phosphate buffer (pH 7.4) containing 0.15 mol/ALaCl as the developing solvent. Sample elution profiles were prepared by monitoring absorption at 280 nm. The resulting chromatograms were analyzed with Unicom 5.31 software (GE Health Care Sciences) to determine the peak ranges.

As an alternative method, solid bodies of the alginic acid derivatives with introduced photoreactive groups obtained in the examples were dissolved in 10 mmol/L phosphate buffer (pH 7.4) containing 0.15 mol/L NaCl to prepare 0.1% solutions, which were then passed through a polyethersulfone filter with a pore size of 0.22 microns (Minisart High Flow Filter, Sartorius) to remove insoluble matter and obtain samples for gel filtration. The sample spectra were measured with a DU-800 spectrophotometer (Beckman-Coulter), and the measurement wavelength of each compound in gel filtration was determined. A differential refractometer was used for compounds lacking specific absorption wavelengths. 200 μl of each sample for gel filtration was supplied to a Superose 6 Increase 10/300 GL column (GE Health Care Sciences). Gel filtration was performed under conditions of room temperature, flow rate 0.8 ml/min using an AKTA Explorer 10S as the chromatograph and 10 mmol/L phosphate buffer (pH 7.4) containing 0.15 mol/L NaCl as the developing solvent. Sample elution profiles were prepared by monitoring absorption at the wavelength determined for each compound. The resulting chromatograms were analyzed with Unicom 5.31 software (GE Health Care Sciences) to determine the peak ranges.

As yet another method, solid bodies of the alginic acid derivatives with introduced photoreactive groups obtained in the examples were dissolved in 10 mmol/L phosphate buffer (pH 7.4) containing 0.15 mol/L NaCl to prepare 0.1% solutions, which were then passed through a cellulose acetate filter with a pore size of 0.2 microns (DISMIC-25cs, Advantec) to remove insoluble matter and obtain samples for gel filtration. The sample spectra were measured with a DU-800 spectrophotometer (Beckman-Coulter), and the measurement wavelength of each compound in gel filtration was determined. A differential refractometer was used for compounds lacking specific absorption wavelengths. 200 μl of each sample for gel filtration was supplied to a Superose 6 Increase 10/300 GL column (GE Health Care Sciences). Gel filtration was performed under conditions of room temperature, flow rate 0.8 ml/min using an AKTA Explorer 10S as the chromatograph and 10 mmol/L phosphate buffer (pH 7.4) containing 0.15 mol/L NaCl as the developing solvent. Sample elution profiles were prepared by monitoring absorption at the wavelength determined for each compound. The resulting chromatograms were analyzed with Unicom 5.31 software (GE Health Care Sciences) to determine the peak ranges.

The molecular weights of the alginic acids with introduced photoreactive groups were determined by performing gel filtration using blue dextran (molecular weight 2,000,000 Da, SIGMA), thyroglobulin (molecular weight 669,000 Da, GE Health Care Sciences), ferritin (molecular weight 440,000 Da, GE Health Care Sciences), aldolase (molecular weight 158,000 Da, GE Health Care Sciences), conalbumin (molecular weight 75,000 Da, GE Health Care Sciences), ovalbumin (molecular weight 44,000 Da, GE health Care Sciences), ribonuclease A (molecular weight 13,700 Da, GE Health Care Sciences) and aprotinin (molecular weight 6,500 Da, GE Health Care Sciences) as standard substances under the same conditions used for the alginic acids having introduced photoreactive groups (photocrosslinking groups), and determining the elution volume of each component with the Unicorn software. The elution volumes of the components were plotted on the horizontal axis and the logarithms of the molecular weights on the vertical axis, and linear regression was performed to create a calibration curve. Two calibration curves were prepared, one for blue dextran to ferritin and one for ferritin to aprotinin.

Using these calibration curves, the molecular weights (Mi) at the elution times i in the chromatogram obtained above were calculated. Next, the absorbance values at the elution times i were read and given as Hi. The weight-average molecular weights (Mw) were then determined by the following formula from these data.

[Math. 1]

$$Mw = \frac{\sum_{i=1}^{\infty}(Hi \times Mi)}{\sum_{i=1}^{\infty} Hi}$$

TABLE 2-1

| Derivative | Example | Alginic acid | Photoreactive group introduction rate (mol %) | Molecular weight | Weight-average molecular weight (Da) |
|---|---|---|---|---|---|
| EX1-a1 | Ex. 1 <Step 5-1> | A-2 | 2.6 | Peak value at 1,830,000 Da, broadly eluted from 2,610,000 to 14,000 Da | 1,450,000 |
| EX1-b | Ex. 1 <Step 5-2> | A-1 | 2.8 | Peak value at 1,860,000 Da, broadly eluted from 2,490,000 to 4,000 Da | 1,110,000 |
| EX1-c | Ex. 1 <Step 5-3> | A-3 | 2.1 | Peak value at 1,790,000 Da, broad eluted from 2,640,000 to 27,000 Da | 1,530,000 |
| EX1-a2 | Ex. 1 <Step 5-4> | A-2 | 15 (*) | Peak value at 1,790,000 Da, broadly eluted from 2,580,000 to 9,000 Da | 1,480,000 |
| EX1-d1 | Ex. 1 <Step 5-5> | B-2 | 15 (*) | Peak value at 1,860,000 Da, broadly eluted from 2,810,000 to 3,000 Da | 1,390,000 |
| EX1-d2 | Ex. 1 <Step 5-6> | B-2 | 4.2 (*) | Peak value at 1,760,000 Da, broadly eluted from 2,570,000 to 3,000 Da | 1,410,000 |
| EX2-a1 | Ex. 2 <Step 3-1> | A-2 | 2.8 | Peak value at 1,500,000 Da, broadly eluted from 2,630,000 to 21,000 Da | 1,460,000 |
| EX2-b | Ex. 2 <Step 3-2> | A-1 | 2.8 | Peak value at 1,880,000 Da, broadly eluted from 2,480,000 to 7,000 Da | 1,090,000 |
| EX2-c | Ex. 2 <Step 3-3> | A-3 | 2.8 | Peak value at 1,730,000 Da, broadly eluted from 2,610,000 to 39,000 Da | 1,560,000 |
| EX2-a2 | Ex. 2 <Step 3-4> | A-2 | 15 | Peak value at 1,710,000 Da, broadly eluted from 2,590,000 to 7,000 Da | 1,440,000 |
| EX3-a | Ex. 3 <Step 3> | A-2 | 4.1 | Peak value at 1,810,000 Da, broadly eluted from 2,590,000 to 18,000 Da | 1,480,000 |
| EX4-a | Ex. 4 <Step 4> | A-2 | 5.1 | Peak value at 1,740,000 Da, broadly eluted from 2,600,000 to 23,000 Da | 1,470,000 |
| EX5-a | Ex. 5 <Step 3> | A-2 | 6.6 | Peak value at 1,790,000 Da, broadly eluted from 2,620,000 to 8,000 Da | 1,390,000 |
| EX6-a | Ex. 6 <Step 4-1> | A-2 | 8.7 (*) | Peak value at 1,870,000 Da, broadly eluted from 2,730,000 to 3,000 Da | 1,460,000 |
| EX6-b | Ex. 6 <Step 4-2> | B-2 | 4.0 (*) | Peak value at 1,690,000 Da, broadly eluted from 2,590,000 to 3,000 Da | 1,400,000 |
| EX7-a | Ex. 7 <Step 4> | A-2 | 9.3 (*) | Peak value at 1,770,000 Da, broadly eluted from 2,750,000 to 1,000 Da | 1,440,000 |
| EX8-a | Ex. 8 <Step 4> | A-2 | 8.7 (*) | Peak value at 1,610,000 Da, broadly eluted at 2,800,000 to 7,000 Da | 1,440,000 |
| EX9-a | Ex. 9 <Step 3> | A-2 | 3.6 (*) | Peak value at 1,780,000 Da, broadly eluted from 2,650,000 to 1,000 Da | 1,410,000 |

TABLE 2-1-continued

| Derivative | Example | Alginic acid | Photoreactive group introduction rate (mol %) | Molecular weight | Weight-average molecular weight (Da) |
|---|---|---|---|---|---|
| EX10-a | Ex. 10 <Step 3> | A-2 | 5.3 (*) | Peak value at 1,590,000 Da, broadly eluted at 2,690,000 to 1,000 Da | 1,390,000 |
| EX11-a | Ex. 11 <Step 3> | A-2 | 11 (*) | Peak value at 1,910,000 Da, broadly eluted from 2,570,000 to 1,000 Da | 920,000 |
| EX12-a | Ex. 12 <Step 4> | A-2 | 3.8 (*) | Peak value at 1,720,000 Da, broadly eluted at 2,680,000 to 1,000 Da | 1,410,000 |

(*) = NMR integral ratio

TABLE 2-2

| Derivative | Example | Alginic acid | Photoreactive group introduction rate (mol %) | Molecular weight | Weight-average molecular weight (Da) |
|---|---|---|---|---|---|
| EX13-a1 | Ex. 13 <Step-3> | A-2 | 4.5 (*) | Peak value at 1,860,000, broadly eluted at 2,840,000 to 1,000 Da | 1,460,000 |
| EX14-a1 | Ex. 14 <Step-3> | A-2 | 3.9 (*) | Peak value at 1,890,000 Da, broadly eluted at 2,650,000 to 2,000 Da | 1,450,000 |
| EX15-a1 | Ex. 15 <Step-4> | A-2 | 3.7 (*) | Peak value at 1,820,000 Da, broadly eluted at 2,650,000 to 4,000 Da | 1,440,000 |
| EX16-a1 | Ex. 16 <Step-3> | A-2 | 3.3 (*) | Peak value at 1,800,000 Da, broadly eluted at 3,080,000 to 6,000 Da | 1,450,000 |
| EX17-a1 | Ex. 17 <Step-4> | A-2 | 3.7 (*) | Peak value at 1,780,000 Da, broadly eluted at 2,780,000 to 2,000 Da | 1,460,000 |
| EX18-a1 | Ex. 18 <Step-3> | A-2 | 3.0 (*) | Peak value at 1,970,000 Da, broadly eluted at 2,730,000 to 500 Da | 1,440,000 |
| EX19-a1 | Ex. 19 <Step-3> | A-2 | 3.9 (*) | Peak value at 1,750,000 Da, broadly eluted at 2,900,000 to 500 Da | 1,440,000 |

(*) = NMR integral ratio

[Measuring Gel Stability]

(Measuring Gel Stability (1))

The alginic acid derivative (EX1-b) obtained in <Step 5-2> of (Example 1), the alginic acid derivative (EX2-b) obtained in <Step 3-2> of (Example 2) and alginic acid (A-2; control) were dissolved in water to a concentration of 1% to obtain aqueous alginic acid solutions. Each solution was placed in a syringe equipped with an 18-gauge needle, this syringe was attached to a syringe pump set to a flow rate of 1 ml/minute, and the solution was dripped for 30 seconds into a 300 mmol/L calcium chloride solution, which was then stirred for 5 minutes to obtain an alginic acid gel with an introduced photoreactive group. This gel was washed once with 10 ml of phosphate-buffered saline (PBS), and exposed to light in water for 10 minutes with a UV curing unit (Sen Lights Corp. HLR100T-2) to obtain a photocrosslinked alginic acid structure gel. 19.5 ml of PBS was added to this gel in a container and shaken at 37° C., and the aqueous solution was collected over time and replenished with PBS in the same amount as the collected amount. After completion of testing, 2 μl of alginate lyase (Nippon Gene, 319-08261) was added to the test solution, which was then shaken for 1 hour at 37° C. to completely collapse the gel, and the aqueous solution was collected. The alginic acid concentration in the collected aqueous solution was measured by the carbazole-sulfuric acid method, the alginic acid concentration in the aqueous solution at each point in time was corrected by the alginic acid concentration of the previously collected solution, the resulting value was divided by the total alginic acid concentration calculated from the alginic acid concentration at all time points and the alginic acid concentration after completion of testing, and the resulting value represented as a percentage was given as the gel collapse rate and used as an indicator of gel stability.

The results are shown in FIG. 1.

While the photocrosslinked alginic acid structure gel prepared from the alginic acid (A-2) used as a control dissolved almost completely within 4 hours, each of the photocrosslinked alginic acid derivatives of the examples had improved stability. In comparison with the photocrosslinked alginic acid structure gel prepared from the alginic acid derivative (EX2-b), the photocrosslinked alginic acid structure gel prepared from the alginic acid derivative (EX1-b) had more improved stability.

(Measuring Gel Stability (2))

The alginic acid derivative (EX6-b) obtained in <Step 4-2> of (Example 6) was dissolved in water to a concentration of 1% to obtain an aqueous alginic acid solution. This aqueous solution was placed in a syringe equipped with an 18-gauge needle, this syringe was attached to a syringe pump set to a flow rate of 1 ml/minute, and the solution was dripped for 30 seconds into a 30 mmol/L calcium chloride solution and stirred for 5 minutes to obtain an alginic acid gel with an introduced photoreactive group. This gel was washed once with 10 ml of phosphate-buffered saline (PBS), and exposed to light in water for 3, 10 and 60 minutes with a UV curing unit (Sen Lights Corp. HLR100T-2) to obtain a photocrosslinked alginic acid structure gel. 20 ml of PBS was added to this gel and shaken at 37° C., and the aqueous solution was collected after 1, 2, 4, 8, 24, 48, 72, and 144 hours, and replenished with PBS in the same amount as the collected amount. After completion of testing, 10 μl of alginate lyase (Creative Enzymes, NATE-1563) was added to the test solution, which was then shaken overnight at 37° C. to completely collapse the gel, and the aqueous solution was collected. The alginic acid concentration in the collected aqueous solution was measured by the carbazole-sulfuric acid method, the alginic acid concentration in the aqueous solution at each point in time was corrected by the alginic acid concentration of the previously collected solution, the resulting value was divided by the total alginic acid concentration calculated from the alginic acid concentration at all time points and the alginic acid concentration after completion of testing, and the resulting value represented as a percentage was given as the gel collapse rate and used as an indicator of gel stability.

The results are shown in FIG. 3.

While the calcium-crosslinked alginic acid structure gel prepared from the alginic acid derivative (EX6-b) used as a control (light exposure time 0 minutes) dissolved 98.7% within 1 hour, each of the photocrosslinked alginic acid gels (light exposure times 3,10, and 30 minutes) prepared from the alginic acid derivative (EX6-b) had improved stability.

(Measuring Gel Stability (3))

The alginic acid derivative (EX9-a) obtained in (Example 9) and the alginic acid derivative (EX12-a) obtained in (Example 12) were dissolved in water to a concentration of 1% to obtain aqueous alginic acid solutions. Each solution was placed in a syringe equipped with an 18-gauge needle, this syringe was attached to a syringe pump set to a flow rate of 1 ml/minute, and the solution was dripped for 30 seconds into 30 mmol/L calcium chloride solution and stirred for 5 minutes to obtain an alginic acid gel with an introduced photoreactive group. This gel was washed once with 10 ml of phosphate-buffered saline (PBS), and exposed to light in PBS for 10 minutes with a UV curing unit (Sen Lights Corp. HLR100T-2) to obtain a photocrosslinked alginic acid gel. 20 ml of PBS was added to this gel and shaken at 37° C., and the aqueous solution was collected after 1.5, 6, 24 and 96 hours and replenished with PBS in the same amount as the collected amount. After completion of testing, 5 μl of alginate lyase (Nippon Gene, 319-08261) was added to the test solution, which was then shaken for 3 hours at 37° C. to completely collapse the gel, and the aqueous solution was collected. The alginic acid concentration in the collected aqueous solution was measured by the carbazole-sulfuric acid method, the alginic acid concentration in the aqueous solution at each point in time was corrected by the concentration of the previously collected solution, the resulting values were divided by the total alginic acid concentration calculated from the alginic acid concentration at all time points and the alginic acid concentration after completion of testing, and the resulting value represented as a percentage was given as the gel collapse rate and used as an indicator of gel stability.

The results are shown in FIG. 4.

Both of the photocrosslinked alginic acid gels of the examples were confirmed to have high stability (about 12% collapse rate for photocrosslinked alginic acid gel from EX9-a and about 11% collapse rate for photocrosslinked alginic acid gel from EX12-a after 96 hours).

(Measuring Gel Stability (4))

The alginic acid derivative (EX10-a) obtained in (Example 10) was dissolved in water to a concentration of 1% to obtain an alginic acid solution. This solution was placed in a syringe equipped with an 18-gauge needle, this syringe was attached to a syringe pump set to a flow rate of 1 ml/minute, and the solution was dripped for 30 seconds into 30 mmol/L calcium chloride solution and stirred for 5 minutes to obtain an alginic acid gel with an introduced photoreactive group. This gel was washed once with 10 ml of phosphate-buffered saline (PBS), and exposed to light in water for 10 minutes with a UV curing unit (Sen Lights Corp. HLR100T-2) to obtain a photocrosslinked alginic acid gel. 20 ml of PBS was added to this gel and shaken at 37° C., and the aqueous solution was collected after 1.5, 6, 24 and 96 hours and replenished with PBS in the same amount as the collected amount. After completion of testing, 5 μl of alginate lyase (Nippon Gene, 319-08261) was added to the test solution, which was then shaken overnight at 37° C. to completely collapse the gel, and the aqueous solution was collected. The alginic acid concentration in the collected aqueous solution was measured by the carbazole-sulfuric acid method, the alginic acid concentration in the aqueous solution at the alginic acid concentration of the previously collected solution, the resulting value was divided by the total alginic acid concentration calculated from the alginic acid concentration at all time points and the alginic acid concentration after completion of testing, and the resulting value represented as a percentage given as the gel collapse rate and used as an indicator of gel stability.

The results are shown in FIG. 5.

The photocrosslinked alginic acid gel of this example was confirmed to be highly stable (about 16% collapse rate after 96 hours).

(Measuring Gel Stability (5))

The alginic acid derivative (EX13-a1) obtained in (Example 13), the alginic acid derivative (EX14-a1) obtained in (Example 14) and the alginic acid derivative (EX17-a1) obtained in (Example 17) were dissolved in water to a concentration of 1% to obtain aqueous alginic acid solutions. Each solution was placed in a syringe equipped with an 18-gauge needle, this syringe was attached to a syringe pump set to a flow rate of 1 ml/minute, and the solution was dripped for 30 seconds into a 30 mmol/L calcium chloride solution and stirred for 5 minutes to obtain an alginic acid gel with an introduced photoreactive group. This gel was washed once with 10 ml of phosphate-buffered saline (PBS), and exposed to light for 10 minutes in water with a UV curing unit (Sen Lights Corp. HLR100T-2) to obtain a photocrosslinked alginic acid gel. 19.5 ml of PBS was added to this gel and shaken at 37° C., and the aqueous solution was collected after 1.5, 6, 24 and 96 hours and replenished with PBS in the same amount as the collected amount. After completion of testing, 10 μl of alginate lyase (Nippon Gene, 319-08261) was added to the test solution, which was then shaken overnight at 37° C. to completely collapse the gel, and the aqueous solution was collected. The alginic acid concentration in the collected aqueous solution was measured by the carbazole-sulfuric acid method, the alginic acid concentration in the aqueous solution at each point in time was corrected by the alginic acid concentration of the previously collected solution, the resulting value was divided by the total alginic acid concentration calculated from the alginic acid concentration at all time points and the alginic acid concentration after completion of testing, and the resulting value represented as a percentage was given as the gel collapse rate and used as an indicator of gel stability.

The results are shown in FIG. 6.

The photocrosslinked alginic acid gels of these examples were all confirmed to be stable (collapse rate about 38% with photocrosslinked alginic acid gel from EX13-a1, about 37% with photocrosslinked alginic acid gel from EX14-a and about 43% with photocrosslinked alginic acid gel from EX17-a1 after 96 hours).

(Measuring Gel Stability (6))

The alginic acid derivative (EX15-a1) obtained in (Example 1) and the alginic acid derivative (EX18-a1) obtained in (Example 18) were dissolved in water to a concentration of 1% to obtain aqueous alginic acid solutions. Each solution was placed in a syringe equipped with an 18-gauge needle, this syringe was attached to a syringe pump set to a flow rate of 1 ml/minute, and the solution was dripped for 30 seconds into 30 mmol/L calcium chloride solution and stirred for 5 minutes to obtain an alginic acid gel with an introduced photoreactive group. This gel was washed once with 10 ml of phosphate-buffered saline (PBS), and exposed to light for 10 minutes in PBS with a UV curing unit (Sen Lights Corp. HLR100T-2) to obtain a photocrosslinked alginic acid gel. 19.5 ml of PBS was added to this gel and shaken at 37° C., and the aqueous solution was collected after 1.5, 6, 24 and 96 hours and replenished with PBS in the same amount as the collected amount. After completion of testing, 10 µl of alginate lyase (Nippon Gene, 319-08261) was added to the test solution, which was then shaken overnight at 37° C. to completely collapse the gel, and the aqueous solution was collected. The alginic acid concentration in the collected aqueous solution was measured by the carbazole-sulfuric acid method, the alginic acid concentration in the aqueous solution at each point in time was corrected by the alginic acid concentration of the previously collected solution, the resulting value was divided by the total alginic acid concentration calculated from the alginic acid concentration at all time points and the alginic acid concentration after completion of testing, and the resulting values represented as a percentage was given as the gel collapse rate and used as an indicator of gel stability.

The results are shown in FIG. 7.

The photocrosslinked alginic acid gels of these examples were all confirmed to be highly stable (collapse rate about 24% with photocrosslinked alginic acid gel from EX15-a1 and about 5% with photocrosslinked alginic acid gel from EX18-a1 after 96 hours).

(Measuring Gel Stability (7))

The alginic acid derivative (EX9-a) obtained in (Example 9), the alginic acid derivative (EX12-a1) obtained in (Example 12), the alginic acid derivative (EX13-a1) obtained in (Example 13), the alginic acid derivative (EX14-a1) obtained in (Example 14), the alginic acid derivative (EX15-a1) obtained in (Example 15), the alginic acid derivative (EX17-a1) obtained in (Example 17) and the alginic acid derivative (EX18-a1) obtained in (Example 18) were dissolved in water to a concentration of 1% to obtain aqueous alginic acid solutions. Each solution was placed in a syringe equipped with an 18-gauge needle, this syringe was attached to a syringe pump set to a flow rate of 1 ml/minute, and the solution was dripped for 30 seconds into 30 mmol/L calcium chloride solution and stirred for 5 minutes to obtain an alginic acid gel with an introduced photoreactive group. This gel was washed once with 10 ml of physiological saline and exposed to light for 10 minutes in water with a UV curing unit (Sen Lights Corp. HLR100T-2) to obtain a photocrosslinked alginic acid gel. 19.5 ml of 5 mM ethylenediaminetetraacetic acid dipotassium salt dihydrate (EDTA-2K)/physiological saline aqueous solution was added to this gel and shaken at 37° C., and after 24 hours the aqueous solution was collected and replenished with 5 mM ethylenediaminetetraacetic acid dipotassium salt dihydrate (EDTA.2K)/physiological saline aqueous solution in the same amount as the collected amount. After completion of testing, 10 µl or 20 µl of alginate lyase (Nippon Gene, 319-08261) was added to the test solution, which was then shaken for at least 3 hours at 37° C. to completely collapse the gel, and the aqueous solution was collected. The alginic acid concentration in the collected aqueous solution was measured by the carbazole-sulfuric acid method, the alginic acid concentration in the aqueous solution at each point in time was corrected by the concentration of the previously collected solution, the resulting value was divided by the total alginic acid concentration calculated from the alginic acid concentration at all time points and the alginic acid concentration after completion of testing, and the resulting value represented as a percentage was given as the gel collapse rate and used as an indicator of gel stability.

The results are shown in FIG. 8.

After being treated with EDTA to remove the calcium crosslinking, the photocrosslinked alginic acid gels of these examples were all confirmed to be highly stable (even after the lapse of 24 hours, about 17% with photocrosslinked alginic acid gel from Ex9-a, about 18% with photocrosslinked alginic acid gel from Ex12-a1, about 34% with photocrosslinked alginic acid gel from Ex13-a1, about 28% with photocrosslinked alginic acid gel from Ex14-a1, about 31% with photocrosslinked alginic acid gel from Ex17-a1, about 18% with photocrosslinked alginic acid gel from Ex15-a1 and about 12% with photocrosslinked alginic acid gel from Ex18-a1).

[Measuring Gel Leak Rate]

(Measuring Gel Leak Rate (1))

The alginic acid derivative (EX1-a1) obtained in <Step 5-1> of (Example 1), the alginic acid derivative (EX2-a1) obtained in <Step 3-1> of (Example 2) and alginic acid (A-2; control) were dissolved in water to a concentration of 1% to obtain aqueous alginic acid solutions. Each aqueous solution of alginic acid with introduced photocrosslinking group was mixed with the same amount of an aqueous solution of blue dextran (Amersham Biosciences, molecular weight 2,000,000) adjusted to a concentration of 10 mg/ml to prepare a 5 mg/ml blue dextran-containing 0.5% aqueous solution of an alginic acid with an introduced crosslinking group. This solution was placed in a syringe equipped with an 18-gauge needle, the syringe was attached to a syringe pump set to a flow rate of 1 ml/minute, and the solution was dripped for 30 seconds into 100 mol/L calcium chloride solution and stirred for 5 minutes to obtain a blue dextran-containing gel of an alginic acid with an introduced photoreactive group. This gel was washed once with 10 ml of PBS and exposed to light for 10 minutes in water with a UV curing unit (Sen Lights Corp. HLR100T-2) to obtain a photocrosslinked alginic acid structure gel containing blue dextran. 2 ml of PBS was added to this gel in a container and shaken at 37° C., and the aqueous solution of the supernatant was collected over time, measured for absorbance, and returned to the test solution. The blue dextran concentration in the collected aqueous solution was measured by absorbance measurement (610 nm) using a calibration curve. For the leak rate, the blue dextran concentration when 0.5 ml of blue dextran-containing photocrosslinking group-introduced alginic acid aqueous solution was added to 2 ml of PBS was given as 100%, and the blue dextran concentration in the aqueous solution at each point in time was subtracted from this to obtain a percentage value.

The results are shown in (A) and (B) of FIG. 2.

(A) While 50% of the alginic acid structure gel prepared with the alginic acid (A-2) used as a control leaked in less than 5 hours, the alginic acid structure gel prepared with the alginic acid derivative (EX2-a1) had a more extended leak time of about 7 hours, and the alginic acid structure gel prepared with the alginic acid derivative (EX1-a1) had a significantly longer leak time of almost 12 hours (confirmed by Tukey-Kramer test (*$p<0.05$, ##$p<0.01$)).

(B) Similar results were obtained in an evaluation based on 80% leakage. That is, the 80% leak time of an alginic acid structure gel prepared from the alginic acid (A-2) used as a control was about 7 hours, while that of an alginic acid structure gel prepared from the alginic acid derivative (EX2-a1) was a longer time of about 11 hours, and the alginic acid structure gel prepared from the alginic acid derivative (EX1-a1) had a significantly longer leak time of about 18 hours (confirmed by Tukey-Kramer test (*$p<0.05$, ##$p<0.01$)).

[Measuring Gel Permeability]

The alginic acid derivative (EX9-a) obtained in (Example 9), the alginic acid derivative (EX10-a) obtained in (Example 10), the alginic acid derivative (EX12-a1) obtained in (Example 12), the alginic acid derivative (EX13-a1) obtained in (Example 13), the alginic acid derivative (EX14-a1) obtained in (Example 14), the alginic acid derivative (EX15-a1) obtained in (Example 15), the alginic acid derivative (EX17-a1) obtained in (Example 17) and the alginic acid derivative (EX18-a1) obtained in (Example 18) were dissolved in water to a concentration of 2% to obtain aqueous alginic acid aqueous solutions. ⅕ the volume of fluorescein isothiocyanate-dextran with a molecular weight of 150,000 adjusted to 1 mg/ml (Sigma Aldrich, FD150S) and ⅘ the volume of water were added to these aqueous alginic acid solutions, to obtain 1.0% alginic acid aqueous solutions containing 0.1 mg/ml fluorescein isothiocyanate-dextran.

Each 1.0% alginic acid aqueous solution containing 0.1 mg/ml fluorescein isothiocyanate-dextran was placed in a syringe equipped with an 18-gauge needle, the syringe was attached to a syringe pump set to a flow rate of 1 ml/minute, and the solution was dripped for 30 seconds into 30 mmol/L calcium chloride solution and stirred for 5 minutes to obtain an alginic acid gel. This gel was washed once with 10 ml of physiological saline to obtain an alginic acid gel having an introduced photoreactive group and containing fluorescein isothiocyanate-dextran. This gel was washed once with 10 ml of physiological saline and exposed to light for 10 minutes in water with a UV curing unit (Sen Lights Corp. HLR100T-2) to obtain a photocrosslinked alginic acid gel containing fluorescein isothiocyanate-dextran.

19.5 ml of physiological saline was added to the resulting gel and shaken for 37° C., and the aqueous solution was collected over time. After completion of testing, 10 to 20 μl of alginate lyase (Nippon Gene, 319-08261) was added to the test solution, which was then shaken for at least 3 hours at 37° C. to completely collapse the gel, and the aqueous solution was collected. The dextran concentration in the collected aqueous solution was measured by the fluorimetric method (excitation light: 485 nm, fluorescence: 535 nm), and the value obtained by dividing the dextran concentration at each point in time by the dextran concentration after completion of testing was expressed as a percentage and given as the permeability.

The results are shown in FIG. 9 and FIG. 10.

The photocrosslinked alginic acids of these examples had excellent permeability, exhibiting about 40% permeability 3 hours after the start of measurement and about 60% permeability 24 hours after the start of measurement.

[Evaluating Biocompatibility]

Biocompatibility was evaluated by the following methods. The methods used to evaluate biocompatibility herein are only examples, and the methods used are not limited to these.

An alginic acid derivative (EX1-a3) with an introduction rate (NMR integration ratio) of 4.1 mol % manufactured by the same methods as in <Step 5-1> of (Example 1), the alginic acid derivative (EX9-a) obtained in <Step 3> of (Example 9), the alginic acid derivative (EX10-a) obtained in <Step 3> of (Example 10), and alginic acid derivative (EX12-a) obtained in <Step 4> of (Example 12) and alginic acid (A-2; control) were each dissolved in water to a concentration of 1.0 w/w % to obtain aqueous alginic acid solutions, and 1/10 the volume of 11× concentrated physiological saline was added to obtain alginic acid physiological saline solutions (1a3), (9a), (10a), (12a) and (REF) each with a concentration of 0.9 w/w %.

CHO cells were mixed with these alginic acid saline solutions to $5.0\times10^6$ cells/ml to obtain cell solutions. Each cell solution was then placed in a syringe equipped with an 18-gauge needle, the syringe was attached to a syringe pump set to a flow rate of 1 ml/minute, and the solution was dripped into a 30 mmol/L calcium chloride solution and stirred for 5 minutes, after which 10 ml of phosphate-buffered saline (PBS) was substituted, and the solution was exposed to light for 10 minutes in PBS with a UV curing unit (Sen Lights Corp. HLR100T-2) and washed once with medium of the composition shown in the table below to obtain CHO cell-containing alginic acid gels (gel CHO-1a3), (gel CHO-9a), (gel CHO-10a), (gel CHO-12a) and (gel CHO-REF).

Each of these CHO cell-containing alginic acid gels is seeded on a 6-well plate (Falcon, Cat #351146), and 5 ml/well of a medium with the composition shown in Table 3 below is added to impregnate the gels, which are then cultured in a 5% $CO_2$ incubator at 37° C. to confirm the biocompatibility of the alginic acid derivatives with introduced photoreactive groups and the photocrosslinked alginic acid structures (beads).

TABLE 3

| | Sample | Manufacturer | Added amount (ml) | Final concentration |
|---|---|---|---|---|
| Medium | G016 medium | Irvine | 950 | |
| Additive | L-Glutamine 200 mM | Sigma | 40 | 8 mM |
| | Penicillin Streptomycin | Invitrogen | 10 | 1% |

The invention claimed is:

1. An alginic acid derivative comprising a photoreactive group represented by formula (I) below [excluding the part to the right of the broken line in the formula] introduced into any one or more carboxyl groups of alginic acid:

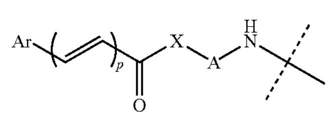

(I)

wherein in formula (I),

Ar represents a $C_{6-10}$ aryl group, wherein the $C_{6-10}$ aryl group is substituted with 1 to 3 substituents selected from the group consisting of a cyano group, a halogen atom, a $C_{1-6}$ alkoxy group, and a —$NR^AR^B$ group, wherein $R^A$ is a hydrogen atom and $R^B$ is a $C_{2-7}$ alkanoyl group, and further wherein when two $C_{1-6}$ alkoxy groups are substituted adjacent to one other on the $C_{6-10}$ aryl group, they may form a cyclic ether by binding between carbon atoms from which any one hydrogen atom has been removed in each of the alkyl groups of the $C_{1-6}$ alkoxy group;

p is the integer 1 or 2;

—X— represents —O—; and

-A- represents formulae (AL-1) to (AL-4) [excluding the parts outside the broken lines at both ends of each formula]:

(AL-1)

(AL-2)

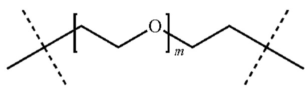

(AL-3)

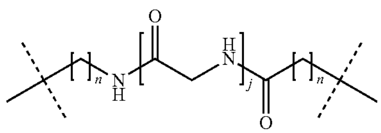

(AL-4)

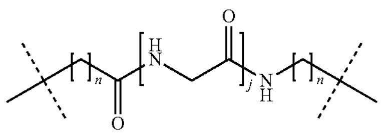

wherein in formulae (AL-1) to (AL-4), n represents an integer from 1 to 18, m represents an integer from 1 to 9 and j represents an integer from 0 to 9;

a hydrogen atom of a methylene group (—$CH_2$—) in formulae (AL-1) to (AL-4) may be replaced with 1 to 10 substituents selected from the group consisting of a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a carboxy $C_{1-6}$ alkyl group, a —$NR^aR^b$, ($R^aR^b$N)—$C_{1-6}$ alkyl, and ($R^aR^b$N)C(═O)—$C_{1-6}$ alkyl group, wherein each $R^a$ and $R^b$ in the $NR^aR^b$, ($R^aR^b$N)—$C_{1-6}$ alkyl or ($R^aR^b$N)C(═O)—$C_{1-6}$ alkyl group is independently a group selected from a hydrogen atom, a $C_{1-6}$ alkyl group, a $C_{2-7}$ alkanoyl group, and a $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group, or a heteroaryl $C_{1-6}$ alkyl group; and if $C_{1-6}$ alkyl groups are substituted for the two hydrogen atoms of the methylene group (—$CH_2$—) in formulae (AL-1) to (AL-4), a $C_{3-8}$ cycloalkyl ring may be formed by binding between the alkyl groups; and the —NH— group in formula (AL-3) or formula (AL-4) may also form a non-aromatic heterocyclic ring with these substituents which have been substituted on adjacent carbon atoms.

2. The alginic acid derivative according to claim 1, wherein the introduction rate of the photoreactive group represented by the formula (I) is from 0.5% to 30%.

3. The alginic acid derivative according to claim 1, wherein the weight-average molecular weight as measured by gel permeation chromatography of the alginic acid derivative is 100,000 Da to 3,000,000 Da.

4. A photocrosslinked alginic acid obtained by exposing the alginic acid derivative according to claim 1 to light.

5. The photocrosslinked alginic acid according to claim 4, wherein p=1 in formula (I) and wherein the chemical crosslink formed by light exposure of the alginic acid derivative is a structure selected from formula (II-L-1) and formula (II-L-2) below:

(II-L-1)

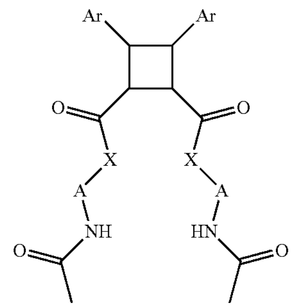

(II-L-2)

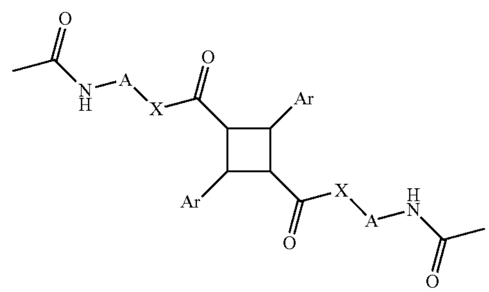

wherein in formula (II-L-1) or formula (II-L-2), the —CONH— and —NHCO— at either end represent amide bonds via any carboxyl group of alginic acid, and -A-, —X—, and Ar are as defined above.

6. The photocrosslinked alginic acid according to claim 4, wherein p=2 in formula (I) and wherein the chemical crosslink formed by light exposure of the alginic acid derivative is a structure selected from formula (II-L-3) below:

(II-L-3)

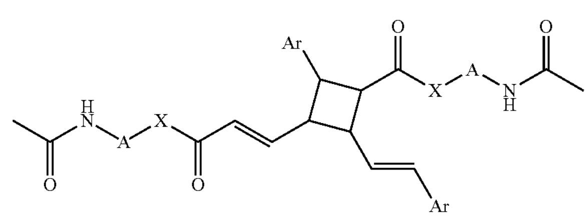

wherein in formula (II-L-3), the —CONH— and —NHCO— at either end represent amide bonds via any carboxyl group of alginic acid, and -A-, —X—, and Ar are as defined above.

7. The photocrosslinked alginic acid according to claim 4, wherein the light for exposure is selected from ultraviolet rays and LED light.

8. A photocrosslinked alginic acid structure that is obtained by light exposure of a gel obtained by dripping a solution of the alginic acid derivative according to claim 1 into a solution containing a divalent metal ion, and that comprises as crosslinks both an ionic crosslink formed by partial crosslinking with a divalent metal ion and a chemical crosslink formed by light exposure.

9. The photocrosslinked alginic acid structure according to claim 8, wherein p=1 in formula (I) and wherein the chemical crosslink formed by light exposure of the alginic acid derivative is a structure selected from formula (II-L-1) and formula (II-L-2) below:

(II-L-1)

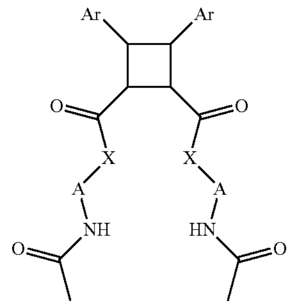

(II-L-2)

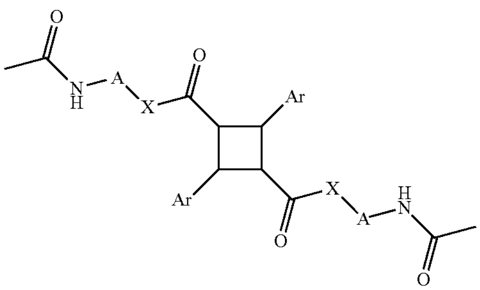

wherein in formula (II-L-1) or formula (II-L-2), the —CONH— and —NHCO— at either end represent amide bonds via any carboxyl group of alginic acid, and -A-, —X—, and Ar are as defined above.

10. The photocrosslinked alginic acid structure according to claim 8, wherein p=2 in formula (I) and wherein the chemical crosslink formed by light exposure of the alginic acid derivative is a structure selected from formula (II-L-3) below:

(II-L-3)

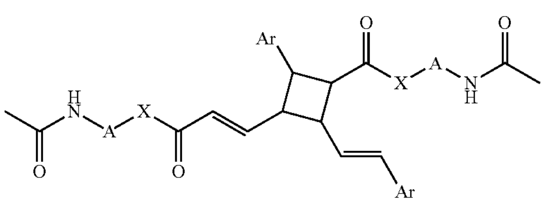

wherein in formula (II-L-3), the —CONH— and —NHCO— at either end represent amide bonds via any carboxyl group of alginic acid, and -A-, —X—, and Ar are as defined above.

11. The photocrosslinked alginic acid structure according to claim 8, wherein the light for exposure is selected from ultraviolet rays and LED light.

12. The photocrosslinked alginic acid structure according to claim 8, in the form of beads or a substantially spherical gel.

13. A medical material containing a photocrosslinked alginic acid structure according to claim 8.

14. The medical material according to claim 13, in the form of beads or a substantially spherical gel.

15. A method for manufacturing a photocrosslinked alginic acid comprising exposing the alginic acid derivative according to claim 1 to light.

16. The photocrosslinked alginic acid manufacturing method according to claim 15, wherein p=1 in formula (I) and wherein the chemical crosslink formed by light exposure of the alginic acid derivative is a structure selected from formula (II-L-1) and formula (II-L-2) below:

(II-L-1)

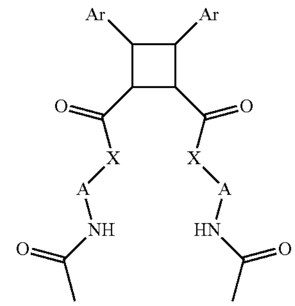

(II-L-2)

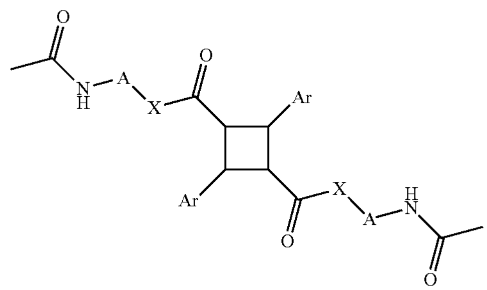

wherein in formula (II-L-1) or formula (II-L-2), the —CONH— and —NHCO— at either end represent amide bonds via any carboxyl group of alginic acid, and -A-, —X—, and Ar are as defined above.

17. The photocrosslinked alginic acid manufacturing method according to claim 15, wherein p=2 in formula (I) and wherein the chemical crosslink formed by light exposure of the alginic acid derivative is a structure selected from formula (II-L-3) below:

(II-L-3)

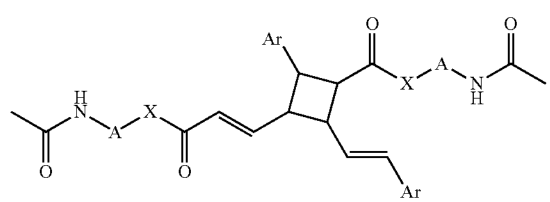

wherein in formula (II-L-3), the —CONH— and —NHCO— at either end represent amide bonds via any carboxyl group of alginic acid, and -A-, —X—, and Ar are as defined above.

18. The photocrosslinked alginic acid manufacturing method according to claim 15, wherein the light for exposure is selected from ultraviolet rays and LED light.

19. A method for manufacturing a photocrosslinked alginic acid structure, comprising dripping a solution of the alginic acid derivative according to claim 1 into a solution containing a divalent metal ion to obtain a gel that is then exposed to light to obtain a photocrosslinked alginic acid structure, wherein the photocrosslinked alginic acid structure comprises both an ionic crosslink formed by partial crosslinking with a divalent metal ion and a chemical crosslink formed by light exposure.

20. The method for manufacturing a photocrosslinked alginic acid structure according to claim 19, wherein p=1 in formula (I) and wherein the chemical crosslink formed by light exposure of the alginic acid derivative is a structure selected from formula (II-L-1) and formula (II-L-2) below:

(II-L-1)

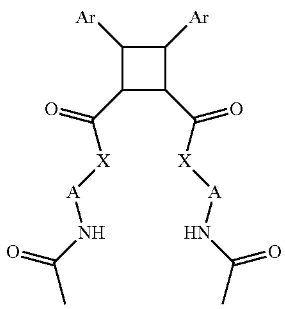

(II-L-2)

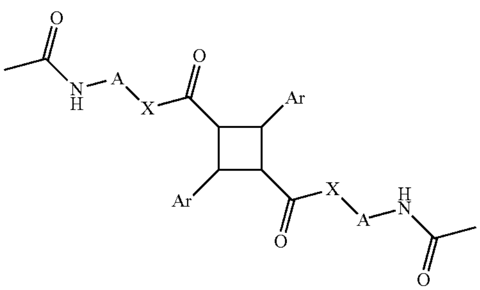

wherein in formula (II-L-1) or formula (II-L-2), the —CONH— and —NHCO— at either end represent amide bonds via any carboxyl group of alginic acid, and -A-, —X—, and Ar are as defined above.

21. The method for manufacturing a photocrosslinked alginic acid structure according to claim 19, wherein p=2 in formula (I) and wherein the chemical crosslink formed by light exposure of the alginic acid derivative is a structure selected from formula 3) below:

(II-L-3)

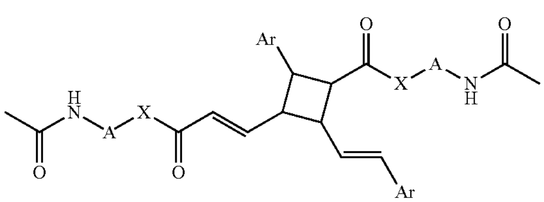

wherein in formula (II-L-3), the —CONH— and —NHCO— at either end represent amide bonds via any carboxyl group of alginic acid, and -A-, —X—, and Ar are as defined above.

22. The method for manufacturing a photocrosslinked alginic acid structure according to claim 19, wherein the light for exposure is selected from ultraviolet rays and LED light.

23. A method for manufacturing a photocrosslinked alginic acid structure, comprising forming a specific structure by partial ionic crosslinking of the alginic acid derivative according to claim 1 with a divalent metal ion, and then chemically crosslinking the resultant structure by light exposure to obtain a photocrosslinked alginic acid structure.

24. The method for manufacturing a photocrosslinked alginic acid structure according to claim 23, wherein the light for exposure is selected from ultraviolet rays and LED light.

25. A photocrosslinked alginic acid structure having the ability to retain contents, obtained by using a divalent metal ion and light exposure to crosslink the alginic acid derivative according to claim 1.

26. The alginic acid derivative according to claim 1, a photocrosslinked alginic acid according to claim 4 or a photocrosslinked alginic acid structure according to claim 8, having biocompatibility.

27. The alginic acid derivative according to claim 1, wherein the combination of Ar, p, —X—, and -A is as shown in any one of the following partial structural formulae excluding the part to the right of the broken line in each formula:

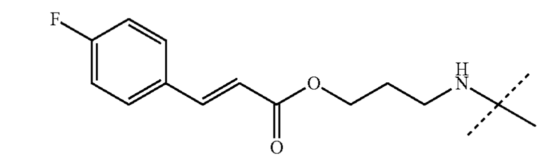

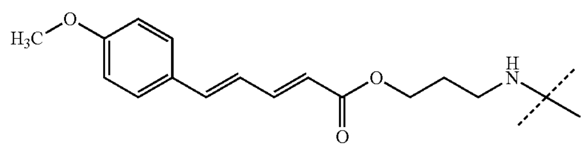

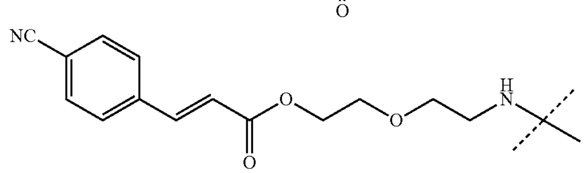

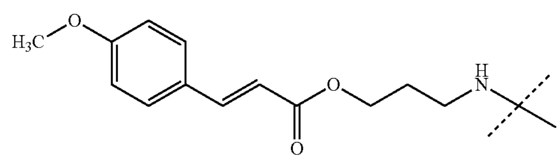

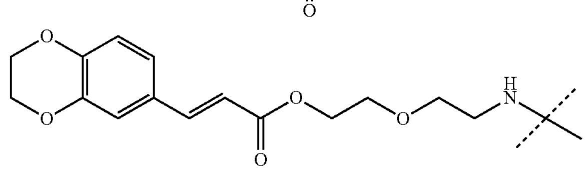

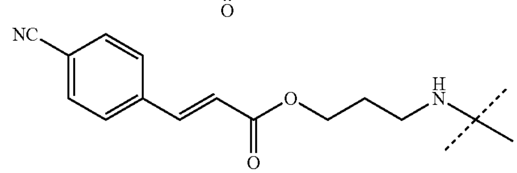

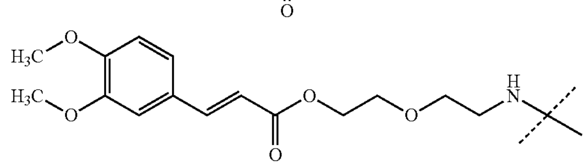

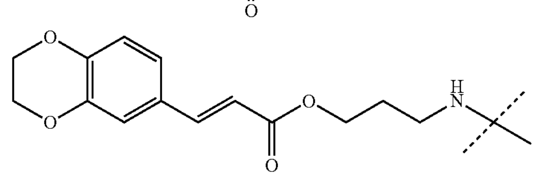

-continued
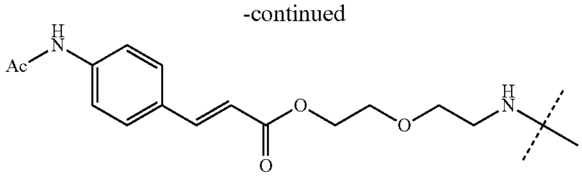
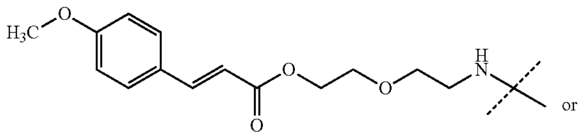
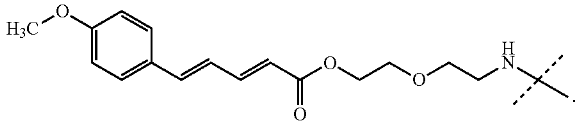
* * * * *